US012647497B2

(12) United States Patent
Giuliani et al.

(10) Patent No.: US 12,647,497 B2
(45) Date of Patent: Jun. 2, 2026

(54) TECHNIQUES FOR CONNECTING TO EXTERNAL DEVICES

(71) Applicant: Apple Inc., Cupertino, CA (US)

(72) Inventors: Vincenzo O. Giuliani, Thousand Oaks, CA (US); Brandon A. Lynne, Palo Alto, CA (US); Joshua D. Deitel, San Francisco, CA (US); Patrick L. Coffman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 6 days.

(21) Appl. No.: 18/652,558

(22) Filed: May 1, 2024

(65) Prior Publication Data

US 2024/0406290 A1 Dec. 5, 2024

Related U.S. Application Data

(60) Provisional application No. 63/471,066, filed on Jun. 5, 2023.

(51) Int. Cl.
*G06F 15/16* (2006.01)
*H04L 67/52* (2022.01)
*H04L 67/75* (2022.01)

(52) U.S. Cl.
CPC .............. *H04L 67/75* (2022.05); *H04L 67/52* (2022.05)

(58) Field of Classification Search
CPC ................................ H04L 67/75; H04L 67/52
USPC .......................................................... 709/203
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |

(Continued)

FOREIGN PATENT DOCUMENTS

| | | |
|---|---|---|
| CN | 104735878 B | 7/2018 |
| KR | 2016-0150612 A | 12/2016 |

(Continued)

OTHER PUBLICATIONS

International Patent Application No. PCT/US2024/032194; Invitation to Pay Add'l Fees; dated Sep. 19, 2024; 12 pages.

(Continued)

*Primary Examiner* — Alan S Chou
(74) *Attorney, Agent, or Firm* — Kyle B. Morse; Benjamin J. Bolin; BAKERHOSTETLER

(57) ABSTRACT
The present disclosure generally relates to connecting to one or more external devices. In some examples, one or more techniques are described, such as automatically connecting an external device, connecting to an external device, managing a set of external devices, controlling media playback, and managing media controls.

20 Claims, 56 Drawing Sheets

(56) References Cited

U.S. PATENT DOCUMENTS

| | | | |
|---|---|---|---|
| 8,479,122 B2 | 7/2013 | Hotelling et al. | |
| 8,732,193 B2 | 5/2014 | Skeen et al. | |
| 9,348,458 B2 | 5/2016 | Hotelling et al. | |
| 9,933,937 B2 | 4/2018 | Lemay et al. | |
| 9,973,910 B1 * | 5/2018 | Dannamaneni | H04W 4/60 |
| 10,298,567 B1 * | 5/2019 | Chew | H04W 4/18 |
| 11,275,405 B2 | 3/2022 | Hotelling | |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2012/0268365 A1 | 10/2012 | Lee et al. | |
| 2013/0154486 A1 | 6/2013 | Barrilleaux | |
| 2015/0035440 A1 | 2/2015 | Spero | |
| 2015/0126806 A1 | 5/2015 | Barroso et al. | |
| 2015/0237470 A1 * | 8/2015 | Mayor | G01C 21/3484 |
| | | | 455/456.2 |
| 2016/0173929 A1 * | 6/2016 | Klappert | H04N 21/4821 |
| | | | 725/25 |
| 2016/0313902 A1 | 10/2016 | Hill et al. | |
| 2018/0167547 A1 | 6/2018 | Casey et al. | |
| 2018/0253145 A1 | 9/2018 | Swaminathan et al. | |
| 2019/0145615 A1 | 5/2019 | Newton et al. | |
| 2019/0334782 A1 | 10/2019 | Dellinger et al. | |
| 2020/0279539 A1 | 9/2020 | Triverio et al. | |
| 2020/0304863 A1 * | 9/2020 | Domm | G06F 3/04886 |
| 2020/0379711 A1 | 12/2020 | Graham et al. | |
| 2020/0379730 A1 | 12/2020 | Graham et al. | |
| 2021/0289262 A1 | 9/2021 | O'Connor et al. | |
| 2021/0304078 A1 | 9/2021 | Holland et al. | |
| 2022/0100265 A1 | 3/2022 | Kies et al. | |
| 2022/0155946 A1 | 5/2022 | Sharifi et al. | |
| 2023/0066232 A1 | 3/2023 | Caro et al. | |
| 2023/0098814 A1 | 3/2023 | Carrigan et al. | |

FOREIGN PATENT DOCUMENTS

| | | | |
|---|---|---|---|
| WO | WO 2013/169849 A2 | 11/2013 | |
| WO | WO 2014/105276 A1 | 7/2014 | |

OTHER PUBLICATIONS

Marquardt et al.; "Gradual Engagement: Facilitating Information Exchange between Digital Devices as a Function of Proximity"; ACM Int'l Conf. on Interactive Tabletops and Surfaces; 2012; 10 pages.

International Patent Application No. PCT/US2024/032396; Int'l Search Report and the Written Opinion; dated Sep. 25, 2024; 17 pages.

International Patent Application No. PCT/US2024/032189; Invitation to Pay Add'l Fees; dated Sep. 25, 2024; 10 pages.

T. Ricker; "This inexpensive backlight makes your big TV even more immersive"; The Verge; Jul. 8, 2021; p. 1-19, Vox Media, https://www.theverge.com/22566408/govee-immersion-ambilight-tv-backlight-review; 19 pages.

International Patent Application No. PCT/US2024/020808; Invitation to Pay Add'l Fees; dated Jul. 2, 2024; 16 pages.

International Patent Application No. PCT/US2024/020808; Int'l Search Report and the Written Opinion; dated Aug. 23, 2024; 21 pages.

International Patent Application No. PCT/US2024/032194; Int'l Search Report and the Written Opinion; dated Nov. 12, 2024; 18 pages.

International Patent Application No. PCT/US2024/032189; Int'l Search Report and the Written Opinion; dated Nov. 20, 2024; 18 pages.

International Patent Application No. PCT/US2024/053238; Invitation to Pay Add'l Fees; dated Jan. 31, 2025; 11 pages.

U.S. Appl. No. 60/936,562, filed Jun. 20, 2007, N/A.

International Patent Application No. PCT/US2024/053238; Int'l Search Report and the Written Opinion; dated Mar. 24, 2025; 18 pages.

International Patent Application No. PCT/US2025/017399; Invitation to Pay Add'l Fees; dated Apr. 23, 2025; 11 pages.

U.S. Appl. No. 18/649,288; Non-Final Office Action; dated Jun. 13, 2025; 20 pages.

International Patent Application No. PCT/US2025/017399; Int'l Search Report and the Written Opinion; dated Jun. 17, 2025; 19 pages.

International Patent Application No. PCT/US2025/018166; Int'l Search Report and the Written Opinion; dated Aug. 19, 2025; 16 pages.

U.S. Appl. No. 18/643,722; Non-Final Office Action; dated Sep. 12, 2025; 12 pages.

* cited by examiner

Portable Multifunction Device 100

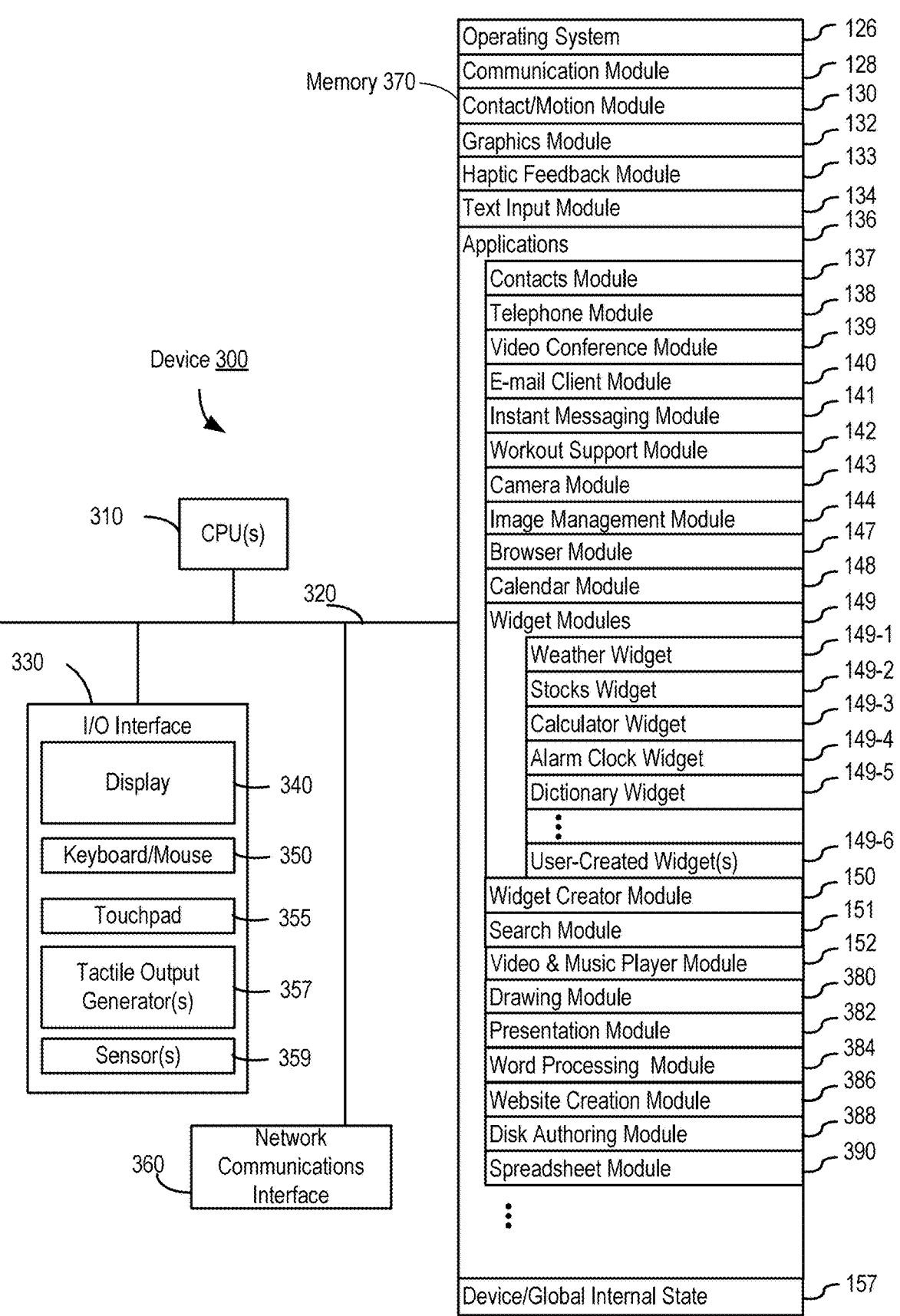

Memory 370

Operating System — 126
Communication Module — 128
Contact/Motion Module — 130
Graphics Module — 132
Haptic Feedback Module — 133
Text Input Module — 134
Applications — 136

Contacts Module — 137
Telephone Module — 138
Video Conference Module — 139
E-mail Client Module — 140
Instant Messaging Module — 141
Workout Support Module — 142
Camera Module — 143
Image Management Module — 144
Browser Module — 147
Calendar Module — 148
Widget Modules — 149

Weather Widget — 149-1
Stocks Widget — 149-2
Calculator Widget — 149-3
Alarm Clock Widget — 149-4
Dictionary Widget — 149-5

User-Created Widget(s) — 149-6

Widget Creator Module — 150
Search Module — 151
Video & Music Player Module — 152
Drawing Module — 380
Presentation Module — 382
Word Processing  Module — 384
Website Creation Module — 386
Disk Authoring Module — 388
Spreadsheet Module — 390

Device/Global Internal State — 157

Device 300

310 — CPU(s)

320

330

I/O Interface

Display — 340
Keyboard/Mouse — 350
Touchpad — 355
Tactile Output Generator(s) — 357
Sensor(s) — 359

360 — Network Communications Interface

*FIG. 3*

Portable Multifunction Device 100

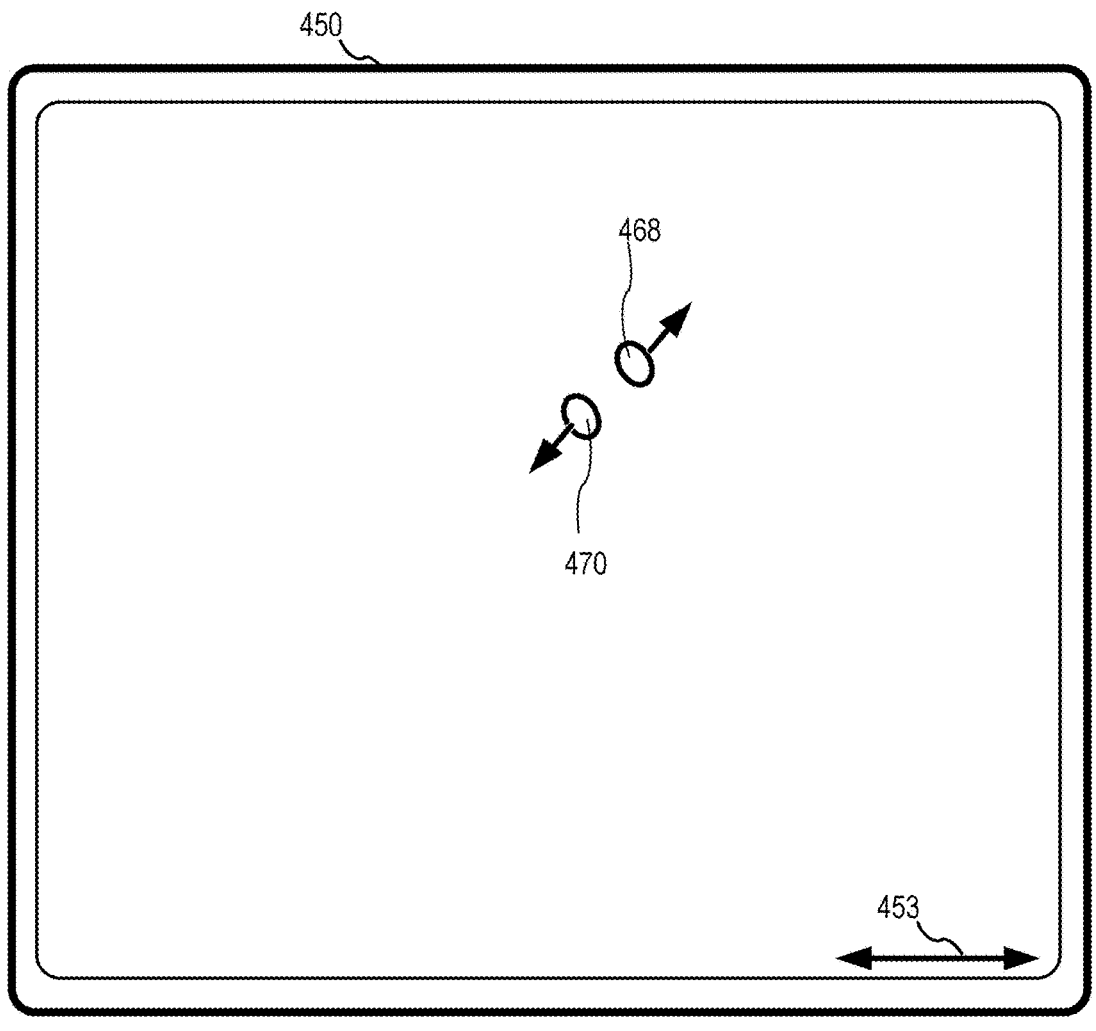
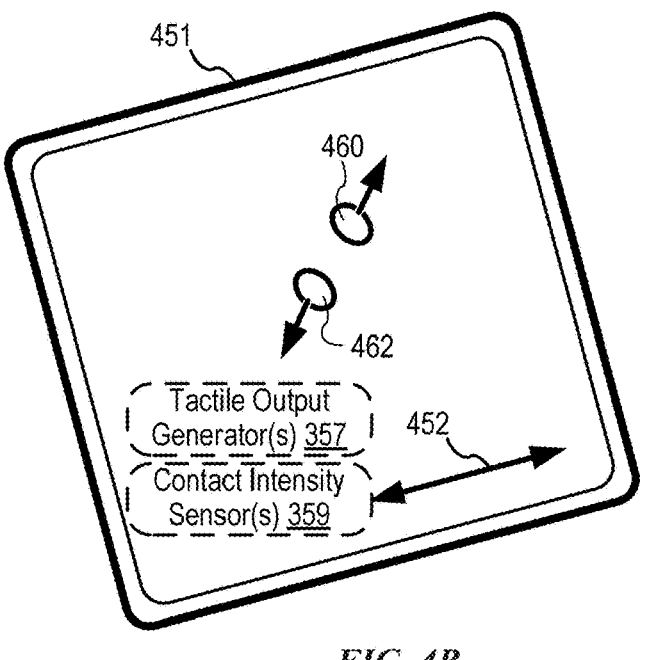
*FIG. 4B*

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Weaker |
| Living Room Speaker | Video | - |
| Living Room TV | Video | Stronger |

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Weaker |
| Living Room Speaker | Video | - |
| Living Room TV | Video | Stronger |

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Weaker |
| Living Room Speaker | Video | - |
| Living Room TV | Video | Stronger |

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Weaker |
| Living Room Speaker | Video | - |
| Living Room TV | Video | Stronger |

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Weaker |
| Living Room Speaker | Video | - |
| Living Room TV | Video | Stronger |

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Weaker |
| Living Room Speaker | Video | - |
| Living Room TV | Video | Stronger |

| Jane's Home - Bedroom | | |
|---|---|---|
| Device | Application | Pattern of Use |
| Bedroom Speaker | Music | Weaker |
| Bedroom TV | Music | Stronger |
| Bedroom Speaker | Audiobook | Weaker |
| Bedroom TV | Audiobook | Weaker |
| Bedroom Speaker | Video | Weaker |
| Bedroom TV | Video | Stronger |

| Jane's Home - Bedroom | | |
|---|---|---|
| Device | Application | Pattern of Use |
| Bedroom Speaker | Music | Weaker |
| Bedroom TV | Music | Stronger |
| Bedroom Speaker | Audiobook | Weaker |
| Bedroom TV | Audiobook | Weaker |
| Bedroom Speaker | Video | Weaker |
| Bedroom TV | Video | Stronger |

| Jane's Home - Bedroom | | |
|---|---|---|
| Device | Application | Pattern of Use |
| Bedroom Speaker | Music | Weaker |
| Bedroom TV | Music | Stronger |
| Bedroom Speaker | Audiobook | Weaker |
| Bedroom TV | Audiobook | Weaker |
| Bedroom Speaker | Video | Weaker |
| Bedroom TV | Video | Stronger |

| Jane's Home - Bedroom | | |
|---|---|---|
| Device | Application | Pattern of Use |
| Bedroom Speaker | Music | Weaker |
| Bedroom TV | Music | Stronger |
| Bedroom Speaker | Audiobook | Weaker |
| Bedroom TV | Audiobook | Weaker |
| Bedroom Speaker | Video | Weaker |
| Bedroom TV | Video | Stronger |

| Jane's Home - Bedroom | | |
|---|---|---|
| Device | Application | Pattern of Use |
| Bedroom Speaker | Music | Weaker |
| Bedroom TV | Music | Stronger |
| Bedroom Speaker | Audiobook | Weaker |
| Bedroom TV | Audiobook | Weaker |
| Bedroom Speaker | Video | Weaker |
| Bedroom TV | Video | Stronger |

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Weaker |
| Living Room Speaker | Video | - |
| Living Room TV | Video | Stronger |

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Weaker |
| Living Room Speaker | Video | - |
| Living Room TV | Video | Stronger |

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Weaker |
| Living Room Speaker | Video | - |
| Living Room TV | Video | Stronger |

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Weaker |
| Living Room Speaker | Video | - |
| Living Room TV | Video | Stronger |

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Weaker |
| Living Room Speaker | Video | - |
| Living Room TV | Video | Stronger |

| Jane's Home - Living Room | | |
|---|---|---|
| Device | Application | Pattern of Use |
| Living Room Speaker | Music | Stronger |
| Living Room TV | Music | Weaker |
| Living Room Speaker | Audiobook | Weaker |
| Living Room TV | Audiobook | Stronger |
| Living Room Speaker | Video | - |
| Living Room TV | Video | Stronger |

| Jane's Home - Living Room | | |
|---|---|---|
| Device | Application | Pattern of Use |
| Living Room Speaker | Podcast | - |
| Living Room TV | Podcast | - |
| Living Room Sub | Podcast | - |

| Jane's Home - Living Room | | |
|---|---|---|
| Device | Application | Pattern of Use |
| Living Room Speaker | Audiobook | - |
| Living Room TV | Audiobook | - |
| Living Room Sub | Audiobook | - |

| Hotel Room | | |
|---|---|---|
| Device | Application | Pattern of Use |
| Hotel Speaker | Music | - |
| Hotel TV | Music | - |
| Hotel Speaker | Audiobook | - |
| Hotel TV | Audiobook | - |
| Hotel Speaker | Video | - |
| Hotel TV | Video | - |

| Hotel Room | | |
|---|---|---|
| Device | Application | Pattern of Use |
| Hotel Speaker | Music | - |
| Hotel TV | Music | - |
| Hotel Speaker | Audiobook | - |
| Hotel TV | Audiobook | - |
| Hotel Speaker | Video | - |
| Hotel TV | Video | Stronger |

700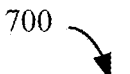

WHILE THE FIRST COMPUTER SYSTEM IS AT A LOCATION, DETECT A USE OF A SET OF ONE OR MORE APPLICATIONS, WHEREIN THE USE CORRESPONDS TO A PATTERN OF USE ASSOCIATED WITH THE SET OF ONE OR MORE APPLICATIONS AND THE LOCATION    702

IN RESPONSE TO DETECTING THE USE OF THE SET OF ONE OR MORE APPLICATIONS:    704

IN ACCORDANCE WITH A DETERMINATION THAT A FIRST SET OF ONE OR MORE USE CRITERIA IS SATISFIED WITH RESPECT TO THE USE AND THE PATTERN OF USE, AUTOMATICALLY CAUSE OUTPUT OF CONTENT ASSOCIATED WITH THE SET OF ONE OR MORE APPLICATIONS VIA A SECOND COMPUTER SYSTEM DIFFERENT FROM THE FIRST COMPUTER SYSTEM    706

IN ACCORDANCE WITH A DETERMINATION A SECOND SET OF ONE OR MORE USE CRITERIA, DIFFERENT FROM THE FIRST SET OF ONE OR MORE USE CRITERIA, IS SATISFIED WITH RESPECT TO THE USE AND THE PATTERN OF USE, AUTOMATICALLY CAUSE OUTPUT OF THE CONTENT ASSOCIATED WITH THE SET OF ONE OR MORE APPLICATIONS VIA A THIRD COMPUTER SYSTEM DIFFERENT FROM THE FIRST COMPUTER SYSTEM AND THE SECOND COMPUTER SYSTEM    708

*FIG. 7*

800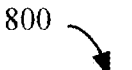

WHILE THE FIRST COMPUTER SYSTEM IS AT A LOCATION, DETECT USE OF A SET OF ONE OR MORE APPLICATIONS, WHEREIN THE USE CORRESPONDS TO A PATTERN OF USE ASSOCIATED WITH THE SET OF ONE OR MORE APPLICATIONS AND THE LOCATION — 802

IN RESPONSE TO DETECTING THE USE OF THE SET OF ONE OR MORE APPLICATIONS: — 804

IN ACCORDANCE WITH A DETERMINATION THAT THE PATTERN OF USE IS A FIRST TYPE OF PATTERN OF USE, AUTOMATICALLY CONNECT TO A SECOND COMPUTER SYSTEM DIFFERENT FROM THE FIRST COMPUTER SYSTEM, AND WHEREIN THE SECOND COMPUTER SYSTEM CORRESPONDS TO THE LOCATION — 806

IN ACCORDANCE WITH A DETERMINATION THAT THE PATTERN OF USE IS A SECOND TYPE OF PATTERN OF USE, DIFFERENT FROM THE FIRST TYPE OF PATTERN OF USE, FORGO AUTOMATIC CONNECTION TO THE SECOND COMPUTER SYSTEM — 808

*FIG. 8*

| Steve's House - Living Room | | |
|---|---|---|
| Device | Application | Pattern of Use |
| Living Room Speaker | Music | Stronger |
| Living Room TV | Music | Weaker |
| Outdoor Speaker | Music | New |
| Living Room Speaker | Audiobook | - |
| Living Room TV | Audiobook | Weaker |
| Outdoor Speaker | Audiobook | New |
| Living Room Speaker | Video | Weaker |
| Living Room TV | Video | Stronger |
| Outdoor Speaker | Video | New |

| Steve's House - Bedroom | | |
|---|---|---|
| Device | Application | Pattern of Use |
| Bedroom Speaker | Music | Weaker |
| Bedroom TV | Music | Stronger |
| Bedroom Speaker | Audiobook | Weaker |
| Bedroom TV | Audiobook | Weaker |
| Bedroom Speaker | Video App. | Stronger |
| Bedroom TV | Video App. | Weaker |

| Steve's House - Bedroom | | |
|---|---|---|
| Device | Application | Pattern of Use |
| Bedroom Speaker | Music | Weaker |
| Bedroom TV | Music | Stronger |
| Bedroom Speaker | Audiobook | Weaker |
| Bedroom TV | Audiobook | Weaker |
| Bedroom Speaker | Video App. | Stronger |
| Bedroom TV | Video App. | Weaker |

| Steve's House - Bedroom | | |
|---|---|---|
| Device | Application | Pattern of Use |
| Bedroom Speaker | Music | Weaker |
| Bedroom TV | Music | Stronger |
| Bedroom Speaker | Audiobook | Weaker |
| Bedroom TV | Audiobook | Weaker |
| Bedroom Speaker | Video App. | Stronger |
| Bedroom TV | Video App. | Weaker |

| Steve's House - Bedroom | | |
|---|---|---|
| Device | Application | Pattern of Use |
| Bedroom Speaker | Music | Weaker |
| Bedroom TV | Music | Stronger |
| Bedroom Speaker | Audiobook | Weaker |
| Bedroom TV | Audiobook | Weaker |
| Bedroom Speaker | Video App. | Weaker |
| Bedroom TV | Video App. | Stronger |

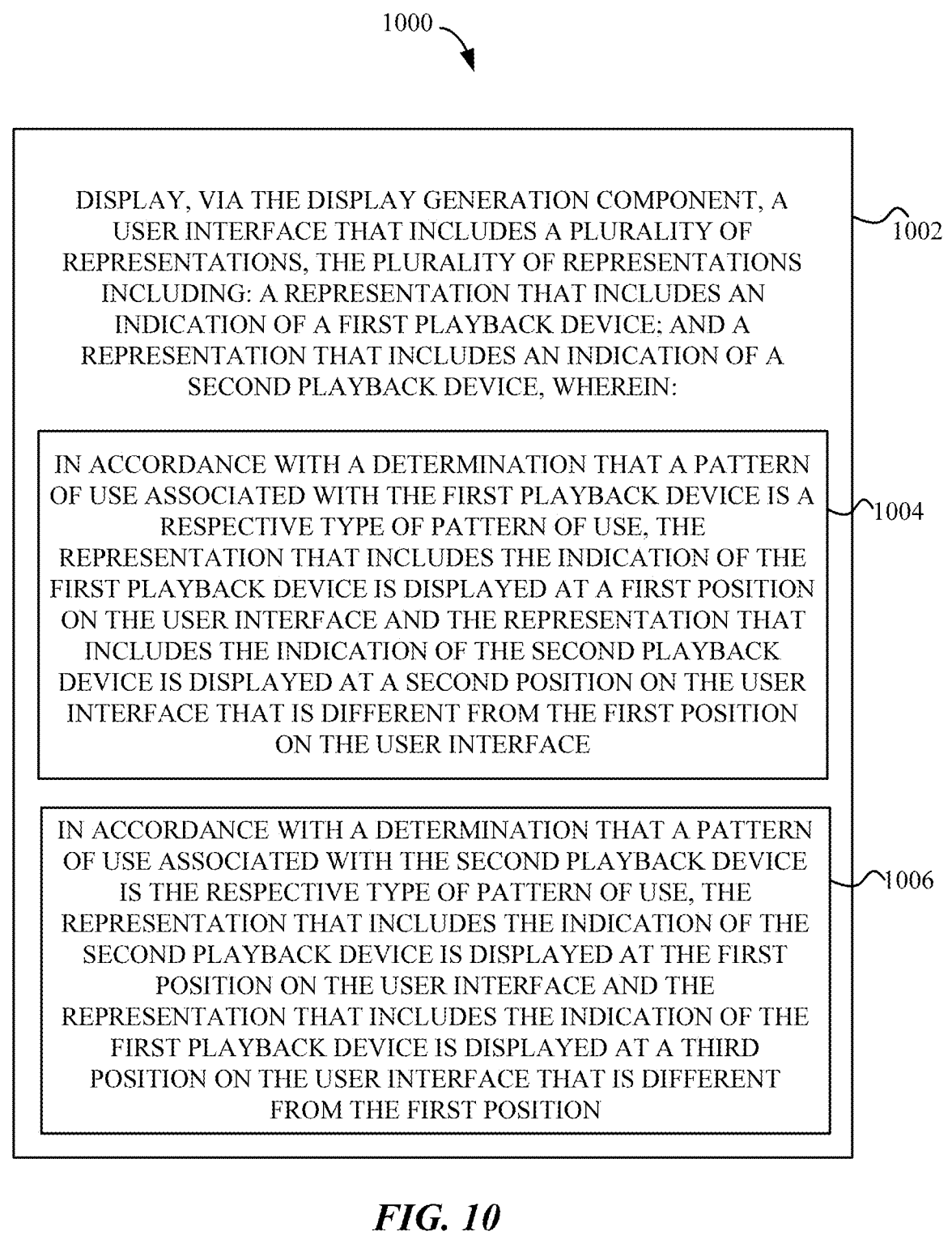

1000

DISPLAY, VIA THE DISPLAY GENERATION COMPONENT, A USER INTERFACE THAT INCLUDES A PLURALITY OF REPRESENTATIONS, THE PLURALITY OF REPRESENTATIONS INCLUDING: A REPRESENTATION THAT INCLUDES AN INDICATION OF A FIRST PLAYBACK DEVICE; AND A REPRESENTATION THAT INCLUDES AN INDICATION OF A SECOND PLAYBACK DEVICE, WHEREIN:          1002

IN ACCORDANCE WITH A DETERMINATION THAT A PATTERN OF USE ASSOCIATED WITH THE FIRST PLAYBACK DEVICE IS A RESPECTIVE TYPE OF PATTERN OF USE, THE REPRESENTATION THAT INCLUDES THE INDICATION OF THE FIRST PLAYBACK DEVICE IS DISPLAYED AT A FIRST POSITION ON THE USER INTERFACE AND THE REPRESENTATION THAT INCLUDES THE INDICATION OF THE SECOND PLAYBACK DEVICE IS DISPLAYED AT A SECOND POSITION ON THE USER INTERFACE THAT IS DIFFERENT FROM THE FIRST POSITION ON THE USER INTERFACE          1004

IN ACCORDANCE WITH A DETERMINATION THAT A PATTERN OF USE ASSOCIATED WITH THE SECOND PLAYBACK DEVICE IS THE RESPECTIVE TYPE OF PATTERN OF USE, THE REPRESENTATION THAT INCLUDES THE INDICATION OF THE SECOND PLAYBACK DEVICE IS DISPLAYED AT THE FIRST POSITION ON THE USER INTERFACE AND THE REPRESENTATION THAT INCLUDES THE INDICATION OF THE FIRST PLAYBACK DEVICE IS DISPLAYED AT A THIRD POSITION ON THE USER INTERFACE THAT IS DIFFERENT FROM THE FIRST POSITION          1006

*FIG. 10*

| Device | John's House | | |
|---|---|---|---|
| | Jane | John | Steve |
| Living Room Speaker | × | | |
| Living Room TV | × | | |
| Bedroom 1 Speaker | | × | |
| Bedroom 1 TV | | × | |
| Bedroom 2 Speaker | | | × |
| Bedroom 2 TV | | | × |

| Device | Jane | John | Steve |
|---|---|---|---|
| Living Room Speaker | X | | |
| Living Room TV | X | | |
| Bedroom 1 Speaker | | X | |
| Bedroom 1 TV | | X | |
| Bedroom 2 Speaker | | | X |
| Bedroom 2 TV | | | X |

Figure 12:
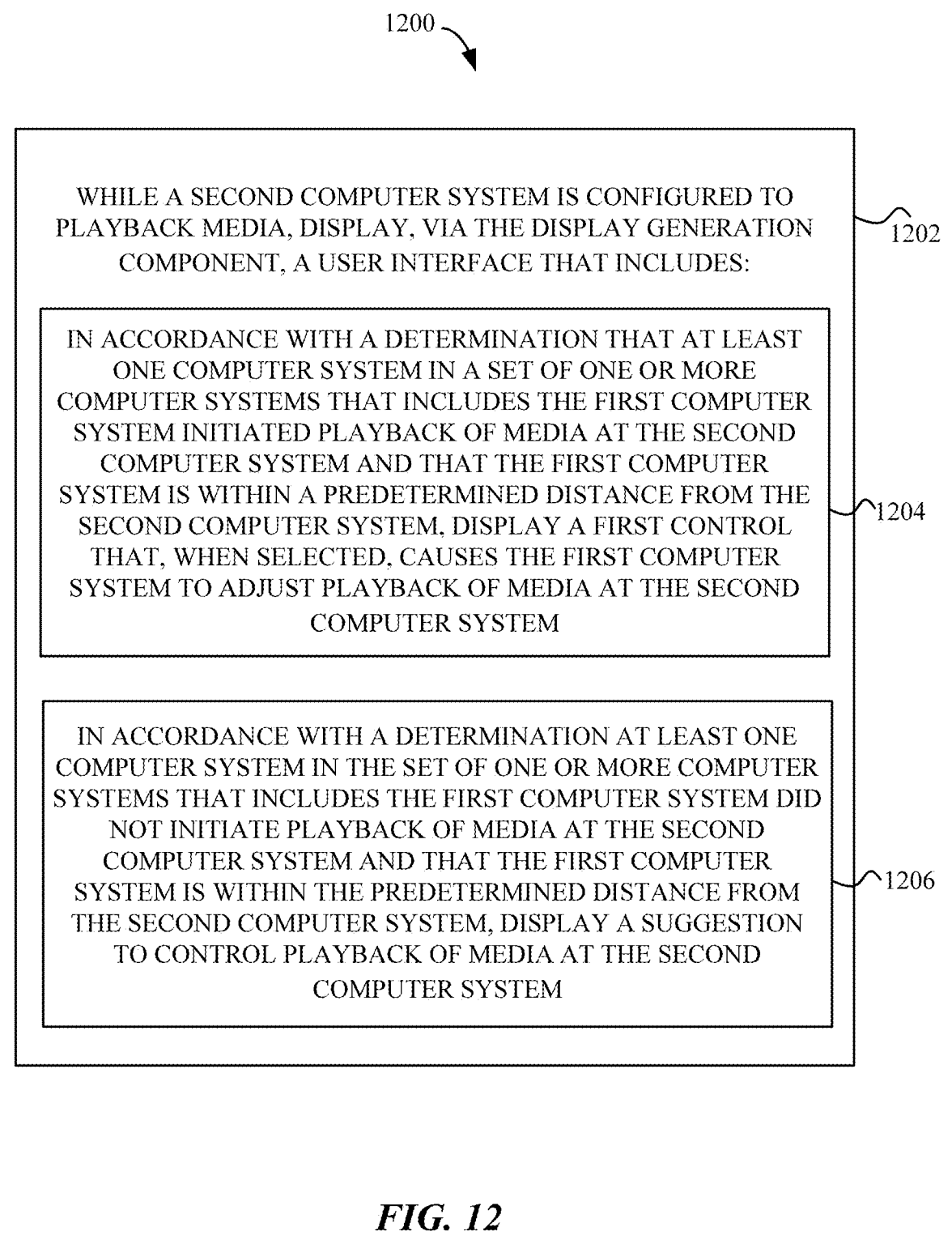

1200

WHILE A SECOND COMPUTER SYSTEM IS CONFIGURED TO PLAYBACK MEDIA, DISPLAY, VIA THE DISPLAY GENERATION COMPONENT, A USER INTERFACE THAT INCLUDES:    1202

IN ACCORDANCE WITH A DETERMINATION THAT AT LEAST ONE COMPUTER SYSTEM IN A SET OF ONE OR MORE COMPUTER SYSTEMS THAT INCLUDES THE FIRST COMPUTER SYSTEM INITIATED PLAYBACK OF MEDIA AT THE SECOND COMPUTER SYSTEM AND THAT THE FIRST COMPUTER SYSTEM IS WITHIN A PREDETERMINED DISTANCE FROM THE SECOND COMPUTER SYSTEM, DISPLAY A FIRST CONTROL THAT, WHEN SELECTED, CAUSES THE FIRST COMPUTER SYSTEM TO ADJUST PLAYBACK OF MEDIA AT THE SECOND COMPUTER SYSTEM    1204

IN ACCORDANCE WITH A DETERMINATION AT LEAST ONE COMPUTER SYSTEM IN THE SET OF ONE OR MORE COMPUTER SYSTEMS THAT INCLUDES THE FIRST COMPUTER SYSTEM DID NOT INITIATE PLAYBACK OF MEDIA AT THE SECOND COMPUTER SYSTEM AND THAT THE FIRST COMPUTER SYSTEM IS WITHIN THE PREDETERMINED DISTANCE FROM THE SECOND COMPUTER SYSTEM, DISPLAY A SUGGESTION TO CONTROL PLAYBACK OF MEDIA AT THE SECOND COMPUTER SYSTEM    1206

Figure 13:
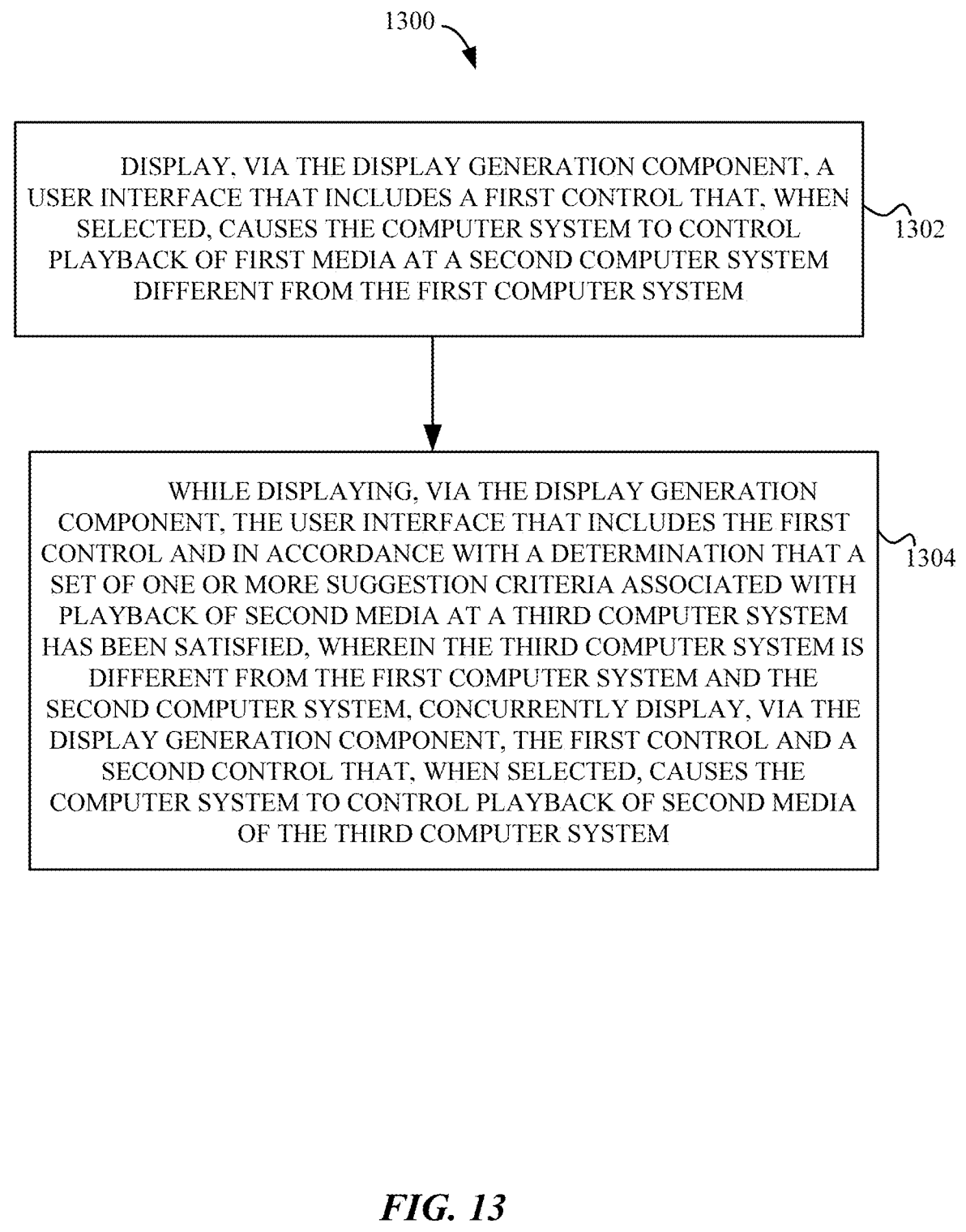

DISPLAY, VIA THE DISPLAY GENERATION COMPONENT, A USER INTERFACE THAT INCLUDES A FIRST CONTROL THAT, WHEN SELECTED, CAUSES THE COMPUTER SYSTEM TO CONTROL PLAYBACK OF FIRST MEDIA AT A SECOND COMPUTER SYSTEM DIFFERENT FROM THE FIRST COMPUTER SYSTEM

1302

WHILE DISPLAYING, VIA THE DISPLAY GENERATION COMPONENT, THE USER INTERFACE THAT INCLUDES THE FIRST CONTROL AND IN ACCORDANCE WITH A DETERMINATION THAT A SET OF ONE OR MORE SUGGESTION CRITERIA ASSOCIATED WITH PLAYBACK OF SECOND MEDIA AT A THIRD COMPUTER SYSTEM HAS BEEN SATISFIED, WHEREIN THE THIRD COMPUTER SYSTEM IS DIFFERENT FROM THE FIRST COMPUTER SYSTEM AND THE SECOND COMPUTER SYSTEM, CONCURRENTLY DISPLAY, VIA THE DISPLAY GENERATION COMPONENT, THE FIRST CONTROL AND A SECOND CONTROL THAT, WHEN SELECTED, CAUSES THE COMPUTER SYSTEM TO CONTROL PLAYBACK OF SECOND MEDIA OF THE THIRD COMPUTER SYSTEM

TECHNIQUES FOR CONNECTING TO EXTERNAL DEVICES

CROSS-REFERENCE TO RELATED APPLICATIONS

This application claims priority to U.S. Provisional Application Ser. No. 63/471,066, filed Jun. 5, 2023, entitled "TECHNIQUES FOR CONNECTING TO EXTERNAL DEVICES" which is incorporated by reference herein in its entirety.

FIELD

The present disclosure relates generally to computer user interfaces, and more specifically to techniques for connecting to one or more external devices.

BACKGROUND

Computer systems often connect to external devices to playback media. When connecting to external devices, computer systems require various user inputs and interfaces to initiate media playback.

SUMMARY

Some techniques for connecting to one or more external devices using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for connecting to one or more external devices. Such methods and interfaces optionally complement or replace other methods for connecting to one or more external devices. Such methods and interfaces reduce the cognitive burden on a user and produce a more efficient human-machine interface. For battery-operated computing devices, such methods and interfaces conserve power and increase the time between battery charges.

In some examples, a method that is performed at a first computer system is described. In some examples, the method comprises: while the first computer system is at a location, detecting a use of a set of one or more applications, wherein the use corresponds to a pattern of use associated with the set of one or more applications and the location; and in response to detecting the use of the set of one or more applications: in accordance with a determination that a first set of one or more use criteria is satisfied with respect to the use and the pattern of use, automatically causing output of content associated with the set of one or more applications via a second computer system different from the first computer system; and in accordance with a determination a second set of one or more use criteria, different from the first set of one or more use criteria, is satisfied with respect to the use and the pattern of use, automatically causing output of the content associated with the set of one or more applications via a third computer system different from the first computer system and the second computer system.

In some examples, a non-transitory computer-readable storage medium storing one or more programs configured to be executed by one or more processors of a first computer system is described. In some examples, the one or more programs includes instructions for: while the first computer system is at a location, detecting a use of a set of one or more applications, wherein the use corresponds to a pattern of use associated with the set of one or more applications and the location; and in response to detecting the use of the set of one or more applications: in accordance with a determination that a first set of one or more use criteria is satisfied with respect to the use and the pattern of use, automatically causing output of content associated with the set of one or more applications via a second computer system different from the first computer system; and in accordance with a determination a second set of one or more use criteria, different from the first set of one or more use criteria, is satisfied with respect to the use and the pattern of use, automatically causing output of the content associated with the set of one or more applications via a third computer system different from the first computer system and the second computer system.

In some examples, a transitory computer-readable storage medium storing one or more programs configured to be executed by one or more processors of a first computer system is described. In some examples, the one or more programs includes instructions for: while the first computer system is at a location, detecting a use of a set of one or more applications, wherein the use corresponds to a pattern of use associated with the set of one or more applications and the location; and in response to detecting the use of the set of one or more applications: in accordance with a determination that a first set of one or more use criteria is satisfied with respect to the use and the pattern of use, automatically causing output of content associated with the set of one or more applications via a second computer system different from the first computer system; and in accordance with a determination a second set of one or more use criteria, different from the first set of one or more use criteria, is satisfied with respect to the use and the pattern of use, automatically causing output of the content associated with the set of one or more applications via a third computer system different from the first computer system and the second computer system.

In some examples, a first computer system is described. In some examples, the first computer system comprises one or more processors and memory storing one or more programs configured to be executed by the one or more processors. In some examples, the one or more programs includes instructions for: while the first computer system is at a location, detecting a use of a set of one or more applications, wherein the use corresponds to a pattern of use associated with the set of one or more applications and the location; and in response to detecting the use of the set of one or more applications: in accordance with a determination that a first set of one or more use criteria is satisfied with respect to the use and the pattern of use, automatically causing output of content associated with the set of one or more applications via a second computer system different from the first computer system; and in accordance with a determination a second set of one or more use criteria, different from the first set of one or more use criteria, is satisfied with respect to the use and the pattern of use, automatically causing output of the content associated with the set of one or more applications via a third computer system different from the first computer system and the second computer system.

In some examples, a first computer system is described. In some examples, the first computer system comprises means for performing each of the following steps: while the first computer system is at a location, detecting a use of a set of one or more applications, wherein the use corresponds to a pattern of use associated with the set of one or more applications and the location; and in response to detecting the use of the set of one or more applications: in accordance with a determination that a first set of one or more use criteria is satisfied with respect to the use and the pattern of use, automatically causing output of content associated with the set of one or more applications via a second computer system different from the first computer system; and in accordance with a determination a second set of one or more use criteria, different from the first set of one or more use criteria, is satisfied with respect to the use and the pattern of use, automatically causing output of the content associated with the set of one or more applications via a third computer system different from the first computer system and the second computer system.

In some examples, a computer program product is described. In some examples, the computer program product comprises one or more programs configured to be executed by one or more processors of a first computer system. In some examples, the one or more programs include instructions for: while the first computer system is at a location, detecting a use of a set of one or more applications, wherein the use corresponds to a pattern of use associated with the set of one or more applications and the location; and in response to detecting the use of the set of one or more applications: in accordance with a determination that a first set of one or more use criteria is satisfied with respect to the use and the pattern of use, automatically causing output of content associated with the set of one or more applications via a second computer system different from the first computer system; and in accordance with a determination a second set of one or more use criteria, different from the first set of one or more use criteria, is satisfied with respect to the use and the pattern of use, automatically causing output of the content associated with the set of one or more applications via a third computer system different from the first computer system and the second computer system.

In some examples, a method that is performed at a first computer system is described. In some examples, the method comprises: while the first computer system is at a location, detecting use of a set of one or more applications, wherein the use corresponds to a pattern of use associated with the set of one or more applications and the location; and in response to detecting the use of the set of one or more applications: in accordance with a determination that the pattern of use is a first type of pattern of use, automatically connecting to a second computer system different from the first computer system, and wherein the second computer system corresponds to the location; and in accordance with a determination that the pattern of use is a second type of pattern of use, different from the first type of pattern of use, forgoing automatically connecting to the second computer system.

In some examples, a non-transitory computer-readable storage medium storing one or more programs configured to be executed by one or more processors of a first computer system is described. In some examples, the one or more programs includes instructions for: while the first computer system is at a location, detecting use of a set of one or more applications, wherein the use corresponds to a pattern of use associated with the set of one or more applications and the location; and in response to detecting the use of the set of one or more applications: in accordance with a determination that the pattern of use is a first type of pattern of use, automatically connecting to a second computer system different from the first computer system, and wherein the second computer system corresponds to the location; and in accordance with a determination that the pattern of use is a second type of pattern of use, different from the first type of pattern of use, forgoing automatically connecting to the second computer system.

In some examples, a transitory computer-readable storage medium storing one or more programs configured to be executed by one or more processors of a first computer system is described. In some examples, the one or more programs includes instructions for: while the first computer system is at a location, detecting use of a set of one or more applications, wherein the use corresponds to a pattern of use associated with the set of one or more applications and the location; and in response to detecting the use of the set of one or more applications: in accordance with a determination that the pattern of use is a first type of pattern of use, automatically connecting to a second computer system different from the first computer system, and wherein the second computer system corresponds to the location; and in accordance with a determination that the pattern of use is a second type of pattern of use, different from the first type of pattern of use, forgoing automatically connecting to the second computer system.

In some examples, a first computer system is described. In some examples, the first computer system comprises one or more processors and memory storing one or more programs configured to be executed by the one or more processors. In some examples, the one or more programs includes instructions for: while the first computer system is at a location, detecting use of a set of one or more applications, wherein the use corresponds to a pattern of use associated with the set of one or more applications and the location; and in response to detecting the use of the set of one or more applications: in accordance with a determination that the pattern of use is a first type of pattern of use, automatically connecting to a second computer system different from the first computer system, and wherein the second computer system corresponds to the location; and in accordance with a determination that the pattern of use is a second type of pattern of use, different from the first type of pattern of use, forgoing automatically connecting to the second computer system.

In some examples, a first computer system is described. In some examples, the first computer system comprises means for performing each of the following steps: while the first computer system is at a location, detecting use of a set of one or more applications, wherein the use corresponds to a pattern of use associated with the set of one or more applications and the location; and in response to detecting the use of the set of one or more applications: in accordance with a determination that the pattern of use is a first type of pattern of use, automatically connecting to a second computer system different from the first computer system, and wherein the second computer system corresponds to the location; and in accordance with a determination that the pattern of use is a second type of pattern of use, different from the first type of pattern of use, forgoing automatically connecting to the second computer system.

In some examples, a computer program product is described. In some examples, the computer program product comprises one or more programs configured to be executed by one or more processors of a first computer system. In some examples, the one or more programs include instructions for: while the first computer system is at a location, detecting use of a set of one or more applications, wherein the use corresponds to a pattern of use associated with the set of one or more applications and the location; and in response to detecting the use of the set of one or more applications:

in accordance with a determination that the pattern of use is a first type of pattern of use, automatically connecting to a second computer system different from the first computer system, and wherein the second computer system corresponds to the location; and in accordance with a determination that the pattern of use is a second type of pattern of use, different from the first type of pattern of use, forgoing automatically connecting to the second computer system.

In some examples, a method that is performed at a computer system that is in communication with a display generation component is described. In some examples, the method comprises: displaying, via the display generation component, a user interface that includes a plurality of representations, the plurality of representations including: a representation that includes an indication of a first playback device; and a representation that includes an indication of a second playback device, wherein: in accordance with a determination that a pattern of use associated with the first playback device is a respective type of pattern of use, the representation that includes the indication of the first playback device is displayed at a first position on the user interface and the representation that includes the indication of the second playback device is displayed at a second position on the user interface that is different from the first position on the user interface; and in accordance with a determination that a pattern of use associated with the second playback device is the respective type of pattern of use, the representation that includes the indication of the second playback device is displayed at the first position on the user interface and the representation that includes the indication of the first playback device is displayed at a third position on the user interface that is different from the first position.

In some examples, a non-transitory computer-readable storage medium storing one or more programs configured to be executed by one or more processors of a computer system that is in communication with a display generation component is described. In some examples, the one or more programs includes instructions for: displaying, via the display generation component, a user interface that includes a plurality of representations, the plurality of representations including: a representation that includes an indication of a first playback device; and a representation that includes an indication of a second playback device, wherein: in accordance with a determination that a pattern of use associated with the first playback device is a respective type of pattern of use, the representation that includes the indication of the first playback device is displayed at a first position on the user interface and the representation that includes the indication of the second playback device is displayed at a second position on the user interface that is different from the first position on the user interface; and in accordance with a determination that a pattern of use associated with the second playback device is the respective type of pattern of use, the representation that includes the indication of the second playback device is displayed at the first position on the user interface and the representation that includes the indication of the first playback device is displayed at a third position on the user interface that is different from the first position.

In some examples, a transitory computer-readable storage medium storing one or more programs configured to be executed by one or more processors of a computer system that is in communication with a display generation component is described. In some examples, the one or more programs includes instructions for: displaying, via the display generation component, a user interface that includes a plurality of representations, the plurality of representations including: a representation that includes an indication of a first playback device; and a representation that includes an indication of a second playback device, wherein: in accordance with a determination that a pattern of use associated with the first playback device is a respective type of pattern of use, the representation that includes the indication of the first playback device is displayed at a first position on the user interface and the representation that includes the indication of the second playback device is displayed at a second position on the user interface that is different from the first position on the user interface; and in accordance with a determination that a pattern of use associated with the second playback device is the respective type of pattern of use, the representation that includes the indication of the second playback device is displayed at the first position on the user interface and the representation that includes the indication of the first playback device is displayed at a third position on the user interface that is different from the first position.

In some examples, a computer system that is in communication with a display generation component is described. In some examples, the computer system that is in communication with a display generation component comprises one or more processors and memory storing one or more programs configured to be executed by the one or more processors. In some examples, the one or more programs includes instructions for: displaying, via the display generation component, a user interface that includes a plurality of representations, the plurality of representations including: a representation that includes an indication of a first playback device; and a representation that includes an indication of a second playback device, wherein: in accordance with a determination that a pattern of use associated with the first playback device is a respective type of pattern of use, the representation that includes the indication of the first playback device is displayed at a first position on the user interface and the representation that includes the indication of the second playback device is displayed at a second position on the user interface that is different from the first position on the user interface; and in accordance with a determination that a pattern of use associated with the second playback device is the respective type of pattern of use, the representation that includes the indication of the second playback device is displayed at the first position on the user interface and the representation that includes the indication of the first playback device is displayed at a third position on the user interface that is different from the first position.

In some examples, a computer system that is in communication with a display generation component is described. In some examples, the computer system that is in communication with a display generation component comprises means for performing each of the following steps: displaying, via the display generation component, a user interface that includes a plurality of representations, the plurality of representations including: a representation that includes an indication of a first playback device; and a representation that includes an indication of a second playback device, wherein: in accordance with a determination that a pattern of use associated with the first playback device is a respective type of pattern of use, the representation that includes the indication of the first playback device is displayed at a first position on the user interface and the representation that includes the indication of the second playback device is displayed at a second position on the user interface that is different from the first position on the user interface; and in accordance with a determination that a pattern of use associated with the second playback device is the respective type of pattern of use, the representation that includes the indication of the second playback device is displayed at the first position on the user interface and the representation that includes the indication of the first playback device is displayed at a third position on the user interface that is different from the first position.

In some examples, a computer program product is described. In some examples, the computer program product comprises one or more programs configured to be executed by one or more processors of a computer system that is in communication with a display generation component. In some examples, the one or more programs include instructions for: displaying, via the display generation component, a user interface that includes a plurality of representations, the plurality of representations including: a representation that includes an indication of a first playback device; and a representation that includes an indication of a second playback device, wherein: in accordance with a determination that a pattern of use associated with the first playback device is a respective type of pattern of use, the representation that includes the indication of the first playback device is displayed at a first position on the user interface and the representation that includes the indication of the second playback device is displayed at a second position on the user interface that is different from the first position on the user interface; and in accordance with a determination that a pattern of use associated with the second playback device is the respective type of pattern of use, the representation that includes the indication of the second playback device is displayed at the first position on the user interface and the representation that includes the indication of the first playback device is displayed at a third position on the user interface that is different from the first position.

In some examples, a method that is performed at a first computer system that is in communication with a display generation component is described. In some examples, the method comprises: while a second computer system is configured to playback media, displaying, via the display generation component, a user interface that includes: in accordance with a determination that at least one computer system in a set of one or more computer systems that includes the first computer system initiated playback of media at the second computer system and that the first computer system is within a predetermined distance from the second computer system, displaying a first control that, when selected, causes the first computer system to adjust playback of media at the second computer system; and in accordance with a determination at least one computer system in the set of one or more computer systems that includes the first computer system did not initiate playback of media at the second computer system and that the first computer system is within the predetermined distance from the second computer system, displaying a suggestion to control playback of media at the second computer system.

In some examples, a non-transitory computer-readable storage medium storing one or more programs configured to be executed by one or more processors of a first computer system that is in communication with a display generation component is described. In some examples, the one or more programs includes instructions for: while a second computer system is configured to playback media, displaying, via the display generation component, a user interface that includes: in accordance with a determination that at least one computer system in a set of one or more computer systems that includes the first computer system initiated playback of media at the second computer system and that the first computer system is within a predetermined distance from the second computer system, displaying a first control that, when selected, causes the first computer system to adjust playback of media at the second computer system; and in accordance with a determination at least one computer system in the set of one or more computer systems that includes the first computer system did not initiate playback of media at the second computer system and that the first computer system is within the predetermined distance from the second computer system, displaying a suggestion to control playback of media at the second computer system.

In some examples, a transitory computer-readable storage medium storing one or more programs configured to be executed by one or more processors of a first computer system that is in communication with a display generation component is described. In some examples, the one or more programs includes instructions for: while a second computer system is configured to playback media, displaying, via the display generation component, a user interface that includes: in accordance with a determination that at least one computer system in a set of one or more computer systems that includes the first computer system initiated playback of media at the second computer system and that the first computer system is within a predetermined distance from the second computer system, displaying a first control that, when selected, causes the first computer system to adjust playback of media at the second computer system; and in accordance with a determination at least one computer system in the set of one or more computer systems that includes the first computer system did not initiate playback of media at the second computer system and that the first computer system is within the predetermined distance from the second computer system, displaying a suggestion to control playback of media at the second computer system.

In some examples, a first computer system that is in communication with a display generation component is described. In some examples, the first computer system that is in communication with a display generation component comprises one or more processors and memory storing one or more programs configured to be executed by the one or more processors. In some examples, the one or more programs includes instructions for: while a second computer system is configured to playback media, displaying, via the display generation component, a user interface that includes: in accordance with a determination that at least one computer system in a set of one or more computer systems that includes the first computer system initiated playback of media at the second computer system and that the first computer system is within a predetermined distance from the second computer system, displaying a first control that, when selected, causes the first computer system to adjust playback of media at the second computer system; and in accordance with a determination at least one computer system in the set of one or more computer systems that includes the first computer system did not initiate playback of media at the second computer system and that the first computer system is within the predetermined distance from the second computer system, displaying a suggestion to control playback of media at the second computer system.

In some examples, a first computer system that is in communication with a display generation component is described. In some examples, the first computer system that is in communication with a display generation component comprises means for performing each of the following steps: while a second computer system is configured to playback media, displaying, via the display generation component, a user interface that includes: in accordance with a determination that at least one computer system in a set of one or more computer systems that includes the first computer system initiated playback of media at the second computer system and that the first computer system is within a predetermined distance from the second computer system, displaying a first control that, when selected, causes the first computer system to adjust playback of media at the second computer system; and in accordance with a determination at least one computer system in the set of one or more computer systems that includes the first computer system did not initiate playback of media at the second computer system and that the first computer system is within the predetermined distance from the second computer system, displaying a suggestion to control playback of media at the second computer system.

In some examples, a computer program product is described. In some examples, the computer program product comprises one or more programs configured to be executed by one or more processors of a first computer system that is in communication with a display generation component. In some examples, the one or more programs include instructions for: while a second computer system is configured to playback media, displaying, via the display generation component, a user interface that includes: in accordance with a determination that at least one computer system in a set of one or more computer systems that includes the first computer system initiated playback of media at the second computer system and that the first computer system is within a predetermined distance from the second computer system, displaying a first control that, when selected, causes the first computer system to adjust playback of media at the second computer system; and in accordance with a determination at least one computer system in the set of one or more computer systems that includes the first computer system did not initiate playback of media at the second computer system and that the first computer system is within the predetermined distance from the second computer system, displaying a suggestion to control playback of media at the second computer system.

In some examples, a method that is performed at a first computer system in communication with a display generation component is described. In some examples, the method comprises: displaying, via the display generation component, a user interface that includes a first control that, when selected, causes the computer system to control playback of first media at a second computer system; and while displaying, via the display generation component, the user interface that includes the first control and in accordance with a determination that a set of one or more suggestion criteria associated with playback of second media at a third computer system has been satisfied, wherein the third computer system is different from the first computer system and the second computer system, concurrently displaying, via the display generation component, the first control and a second control that, when selected, causes the computer system to control playback of second media of the third computer system.

In some examples, a non-transitory computer-readable storage medium storing one or more programs configured to be executed by one or more processors of a first computer system in communication with a display generation component is described. In some examples, the one or more programs includes instructions for: displaying, via the display generation component, a user interface that includes a first control that, when selected, causes the computer system to control playback of first media at a second computer system; and while displaying, via the display generation component, the user interface that includes the first control and in accordance with a determination that a set of one or more suggestion criteria associated with playback of second media at a third computer system has been satisfied, wherein the third computer system is different from the first computer system and the second computer system, concurrently displaying, via the display generation component, the first control and a second control that, when selected, causes the computer system to control playback of second media of the third computer system.

In some examples, a transitory computer-readable storage medium storing one or more programs configured to be executed by one or more processors of a first computer system in communication with a display generation component is described. In some examples, the one or more programs includes instructions for: displaying, via the display generation component, a user interface that includes a first control that, when selected, causes the computer system to control playback of first media at a second computer system; and while displaying, via the display generation component, the user interface that includes the first control and in accordance with a determination that a set of one or more suggestion criteria associated with playback of second media at a third computer system has been satisfied, wherein the third computer system is different from the first computer system and the second computer system, concurrently displaying, via the display generation component, the first control and a second control that, when selected, causes the computer system to control playback of second media of the third computer system.

In some examples, a first computer system in communication with a display generation component is described. In some examples, the first computer system in communication with a display generation component comprises one or more processors and memory storing one or more programs configured to be executed by the one or more processors. In some examples, the one or more programs includes instructions for: displaying, via the display generation component, a user interface that includes a first control that, when selected, causes the computer system to control playback of first media at a second computer system; and while displaying, via the display generation component, the user interface that includes the first control and in accordance with a determination that a set of one or more suggestion criteria associated with playback of second media at a third computer system has been satisfied, wherein the third computer system is different from the first computer system and the second computer system, concurrently displaying, via the display generation component, the first control and a second control that, when selected, causes the computer system to control playback of second media of the third computer system.

In some examples, a first computer system in communication with a display generation component is described. In some examples, the first computer system in communication with a display generation component comprises means for performing each of the following steps: displaying, via the display generation component, a user interface that includes a first control that, when selected, causes the computer system to control playback of first media at a second computer system; and while displaying, via the display generation component, the user interface that includes the first control and in accordance with a determination that a set of one or more suggestion criteria associated with playback of second media at a third computer system has been satisfied, wherein the third computer system is different from the first computer system and the second computer system, concurrently displaying, via the display generation component, the first control and a second control that, when selected, causes the computer system to control playback of second media of the third computer system.

In some examples, a computer program product is described. In some examples, the computer program product comprises one or more programs configured to be executed by one or more processors of a first computer system in communication with a display generation component. In some examples, the one or more programs include instructions for: displaying, via the display generation component, a user interface that includes a first control that, when selected, causes the computer system to control playback of first media at a second computer system; and while displaying, via the display generation component, the user interface that includes the first control and in accordance with a determination that a set of one or more suggestion criteria associated with playback of second media at a third computer system has been satisfied, wherein the third computer system is different from the first computer system and the second computer system, concurrently displaying, via the display generation component, the first control and a second control that, when selected, causes the computer system to control playback of second media of the third computer system.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for connecting to one or more external devices, thereby increasing the effectiveness, efficiency, and user satisfaction with such devices. Such methods and interfaces may complement or replace other methods for connecting to one or more external devices.

DESCRIPTION OF THE FIGURES

For a better understanding of the various described examples, reference should be made to the Detailed Description below, in conjunction with the following drawings in which like reference numerals refer to corresponding parts throughout the figures.

FIG. 3 is a block diagram of an exemplary multifunction device with a display and a touch-sensitive surface in accordance with some examples.

FIG. 4B illustrates an exemplary user interface for a multifunction device with a touch-sensitive surface that is separate from the display in accordance with some examples.

FIG. 7 is a flow diagram illustrating a method for automatically connecting an external device in accordance with some examples.

FIG. 8 is a flow diagram illustrating methods for connecting to an external device in accordance with some examples.

FIG. 10 is a flow diagram illustrating a method for managing a set of external devices in accordance with some examples.

FIG. 12 is a flow diagram illustrating a method for controlling media playback in accordance with some examples.

FIG. 13 is a flow diagram illustrating a method for managing media controls in accordance with some examples.

The following description sets forth exemplary methods, parameters, and the like. It should be recognized, however, that such description is not intended as a limitation on the scope of the present disclosure but is instead provided as a description of exemplary examples.

There is a need for computer systems that provide efficient methods and interfaces for connecting to one or more external devices. For example, computer systems can automatically be enabled to causes an external device to playback media and/or receive a suggestion to initiate playback of media at a computer system. Such techniques can reduce the cognitive burden on a user who connects to a set of external devices, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for connecting to one or more external devices.

Figure 6A:
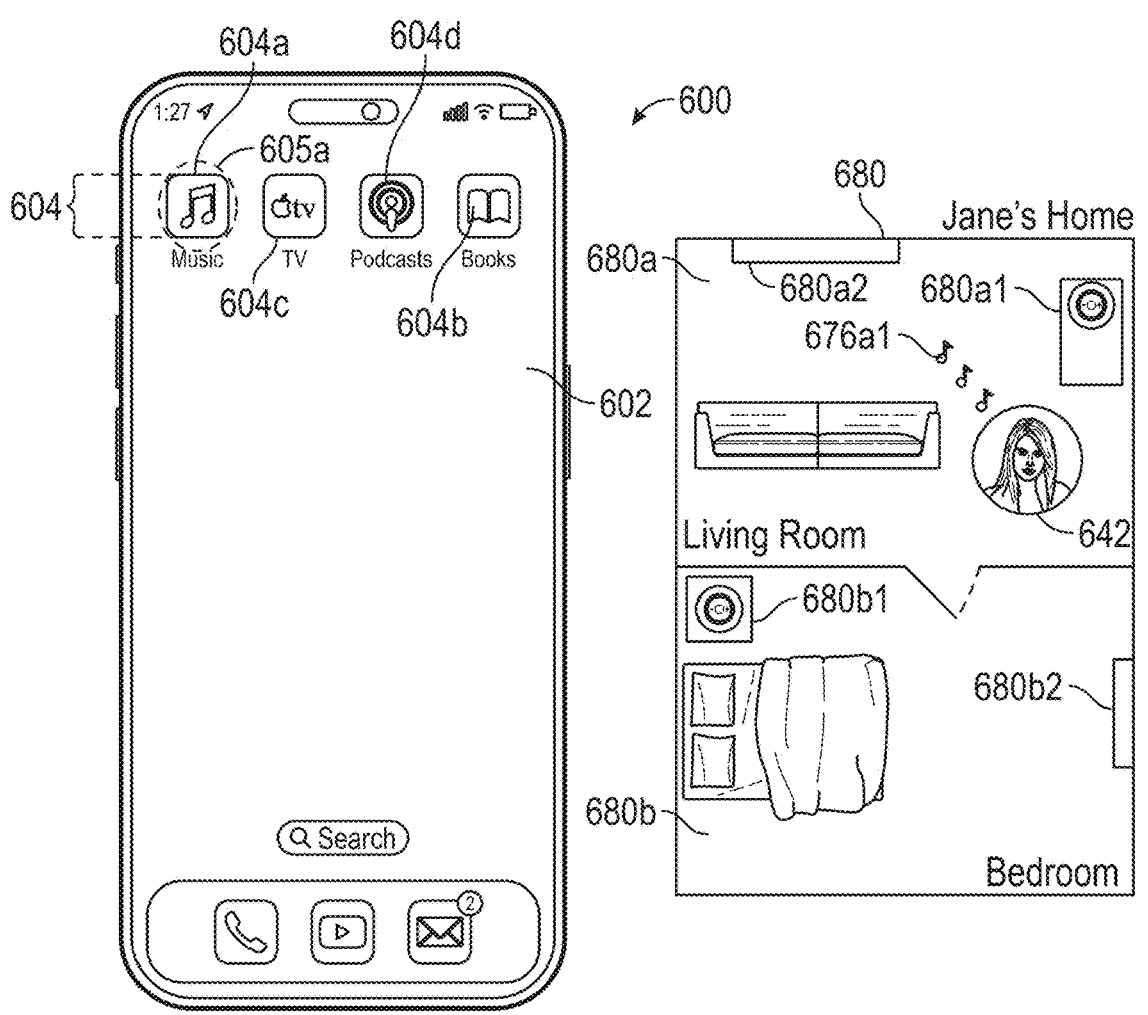
FIGS. 6A-6X illustrate exemplary user interfaces for connecting an external device in accordance with some examples.
Figure 6B:
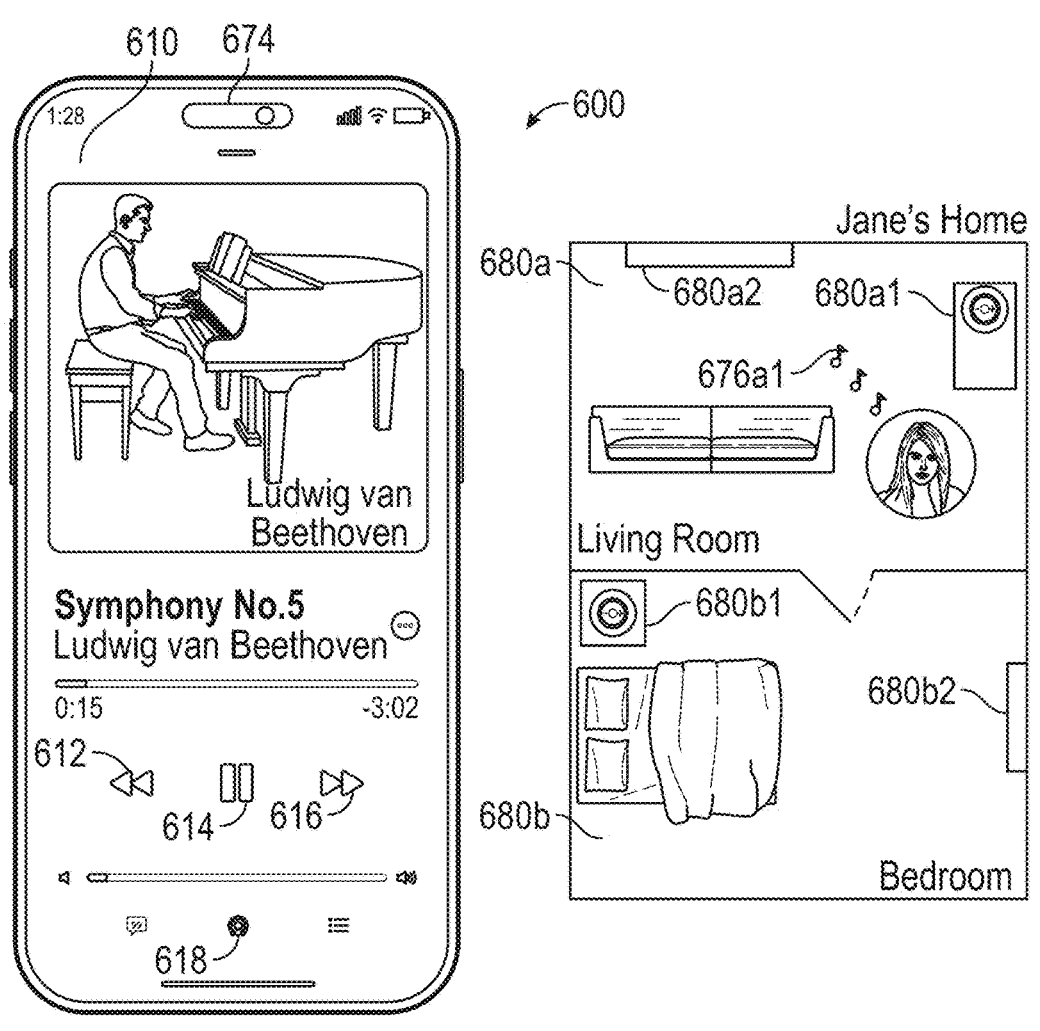
Figure 6C:
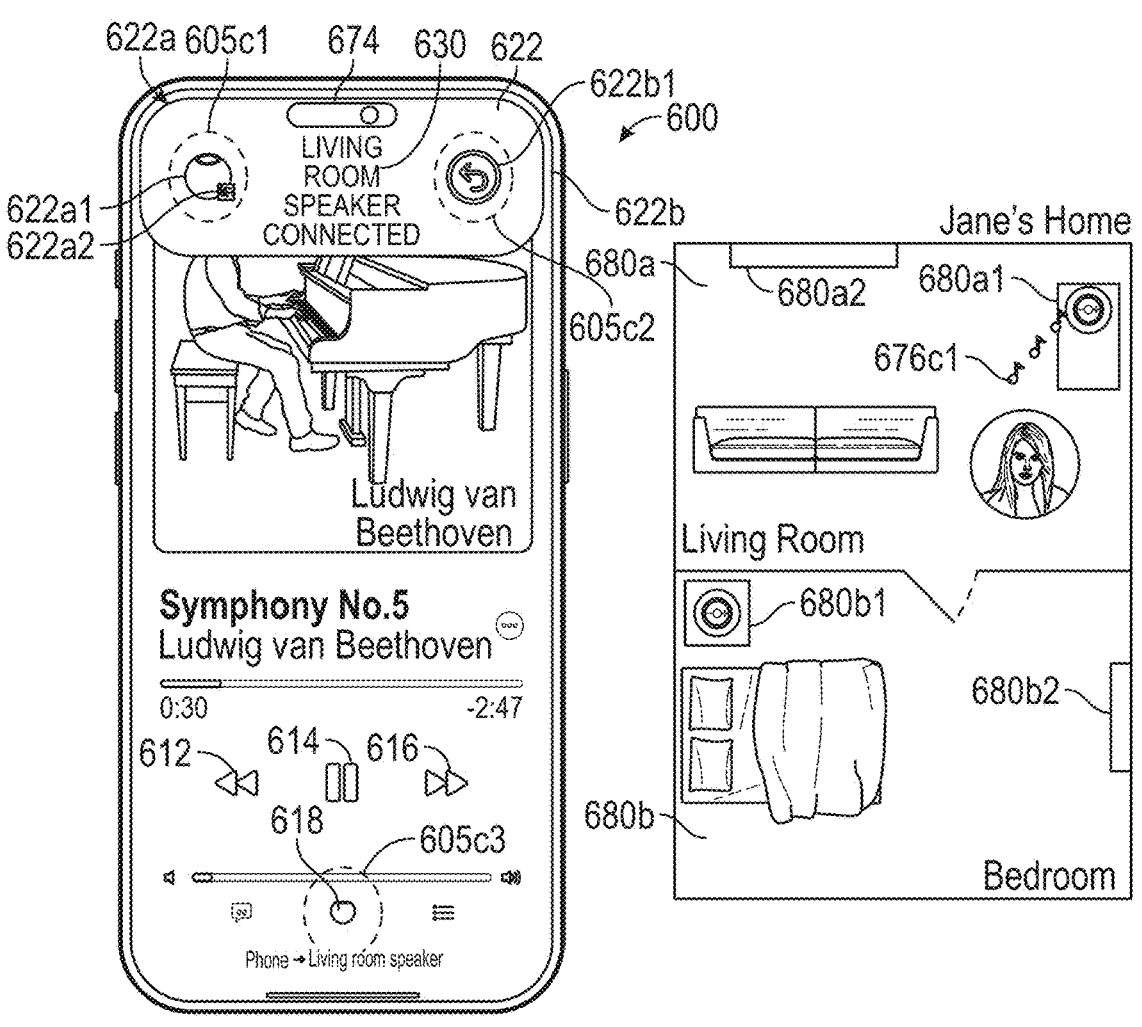
Figure 6D:
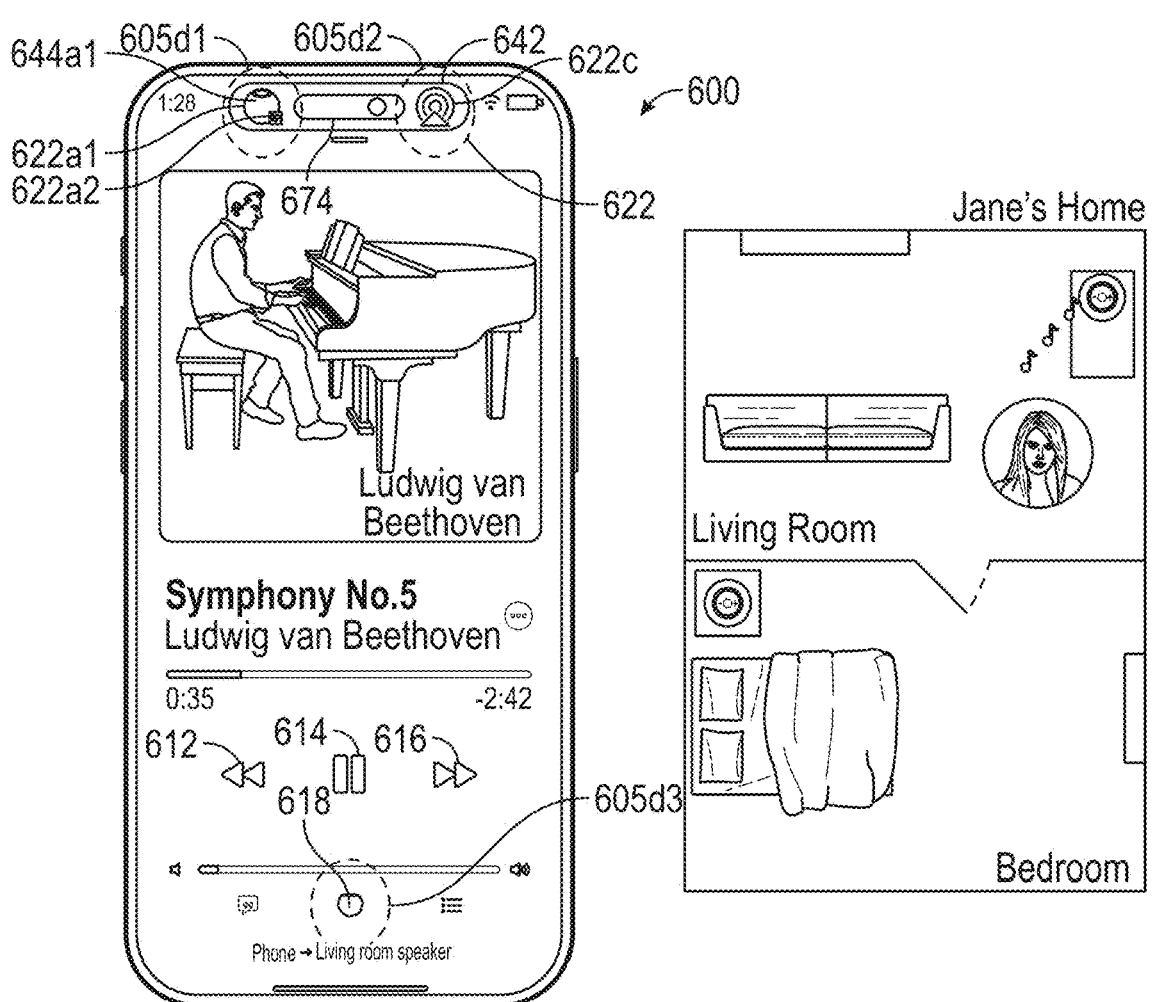
Figure 6E:
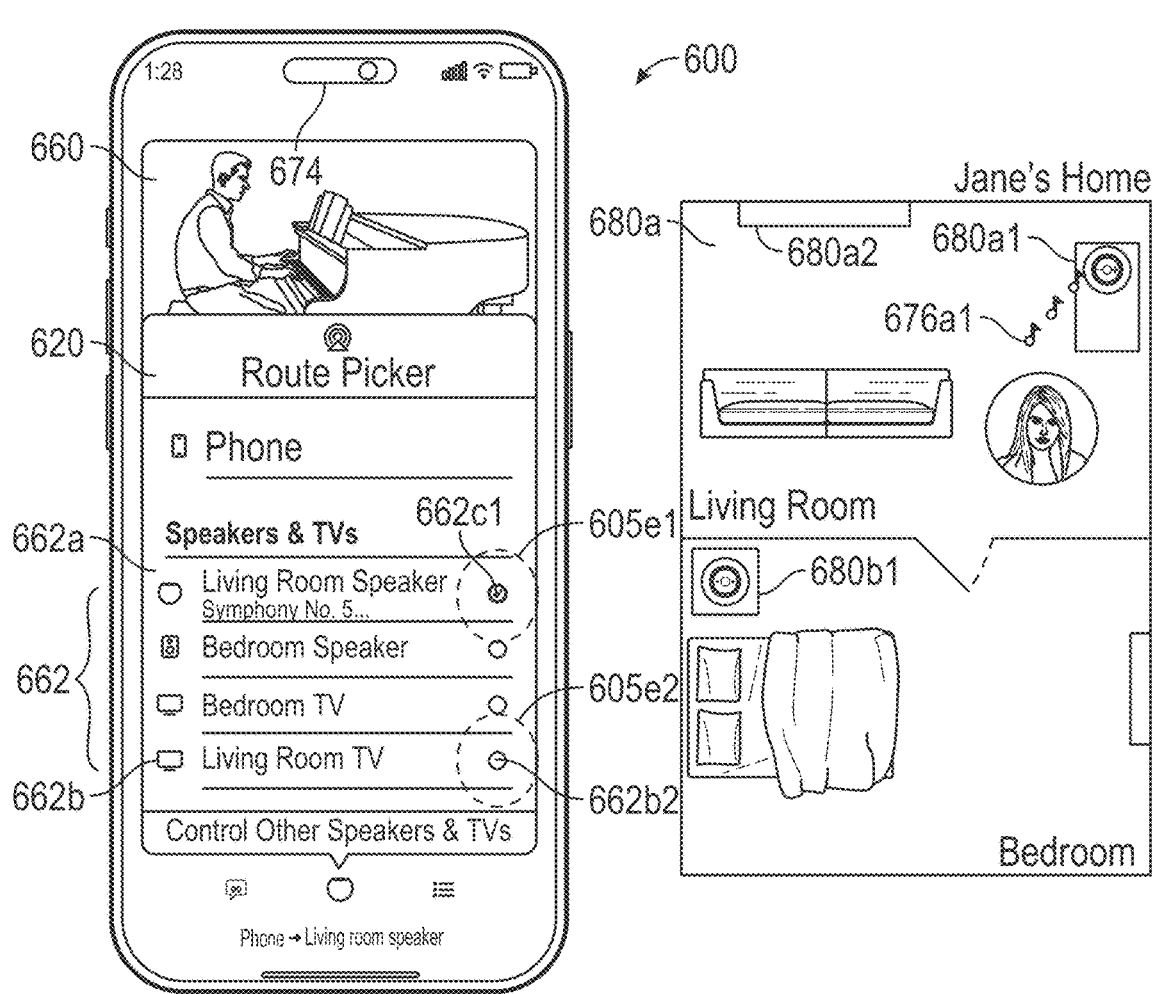
Figure 6F:
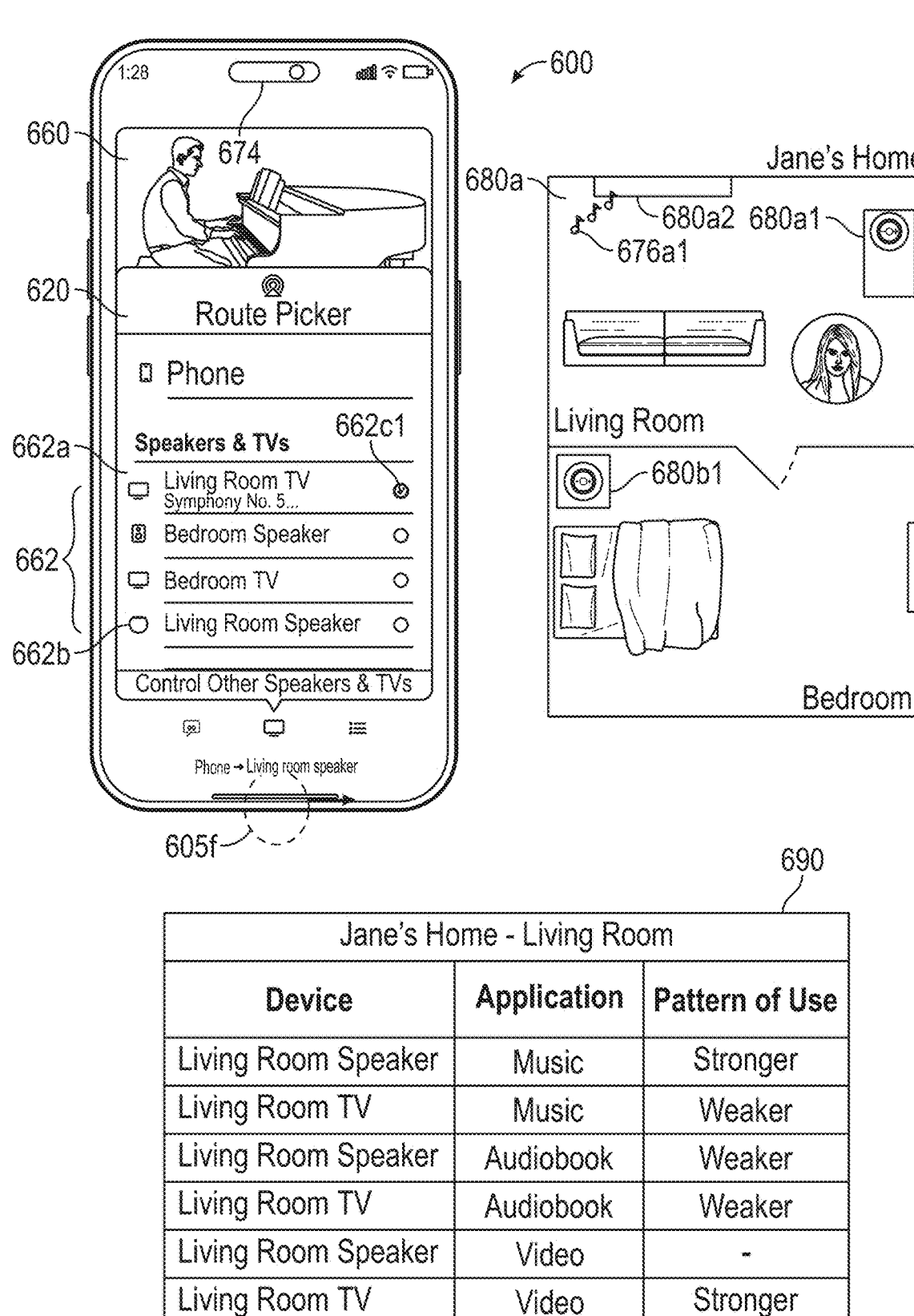
Figure 6G:
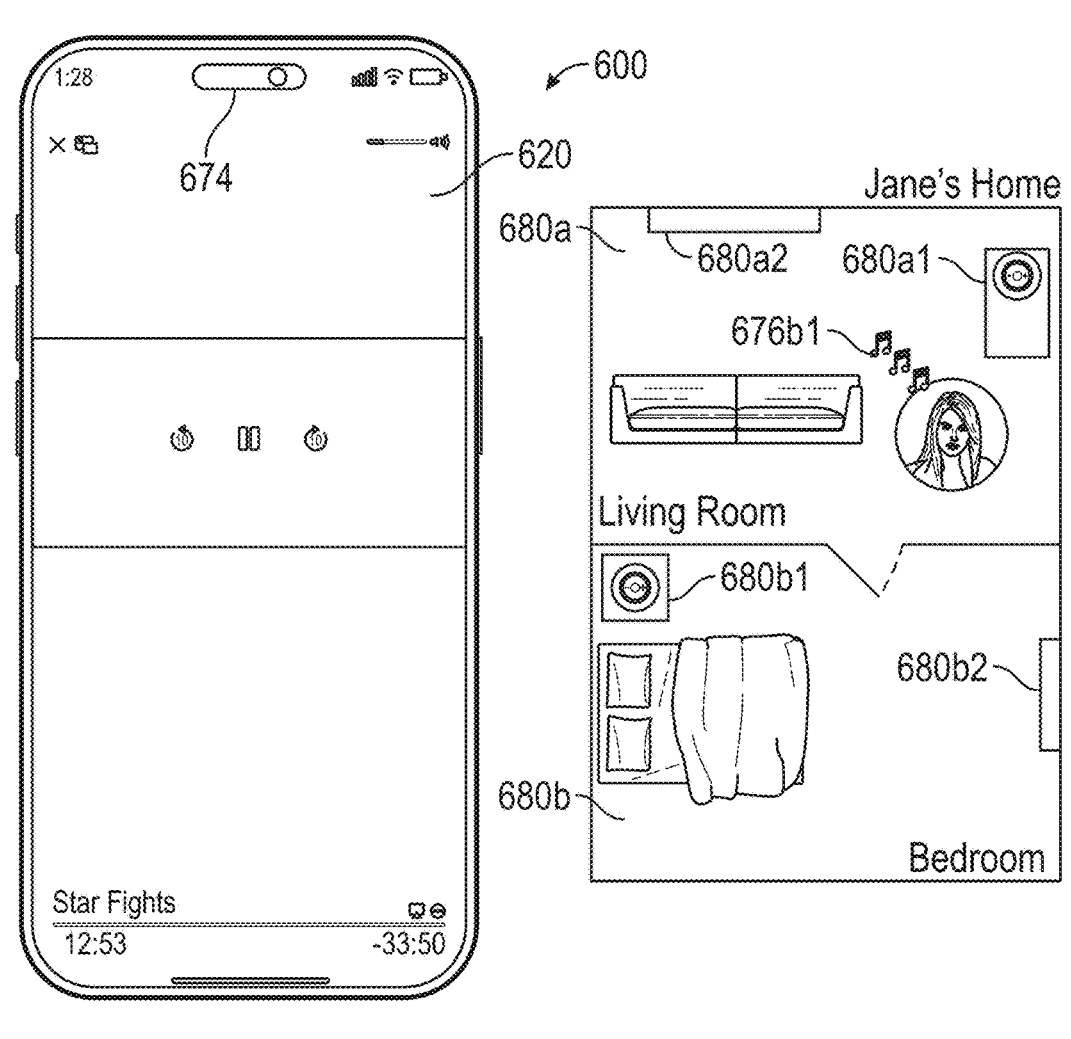
Figure 6H:
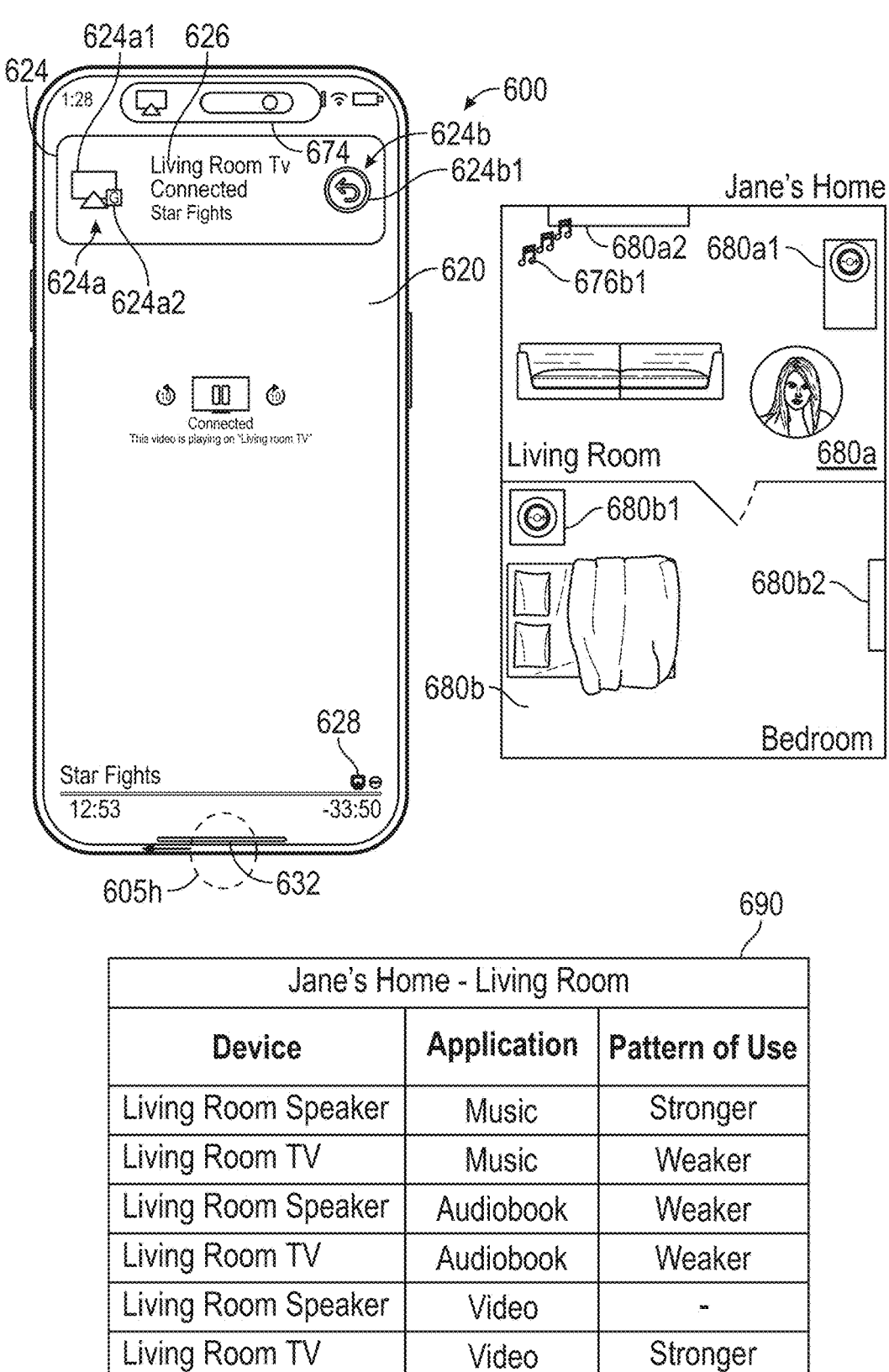
Figure 6I:
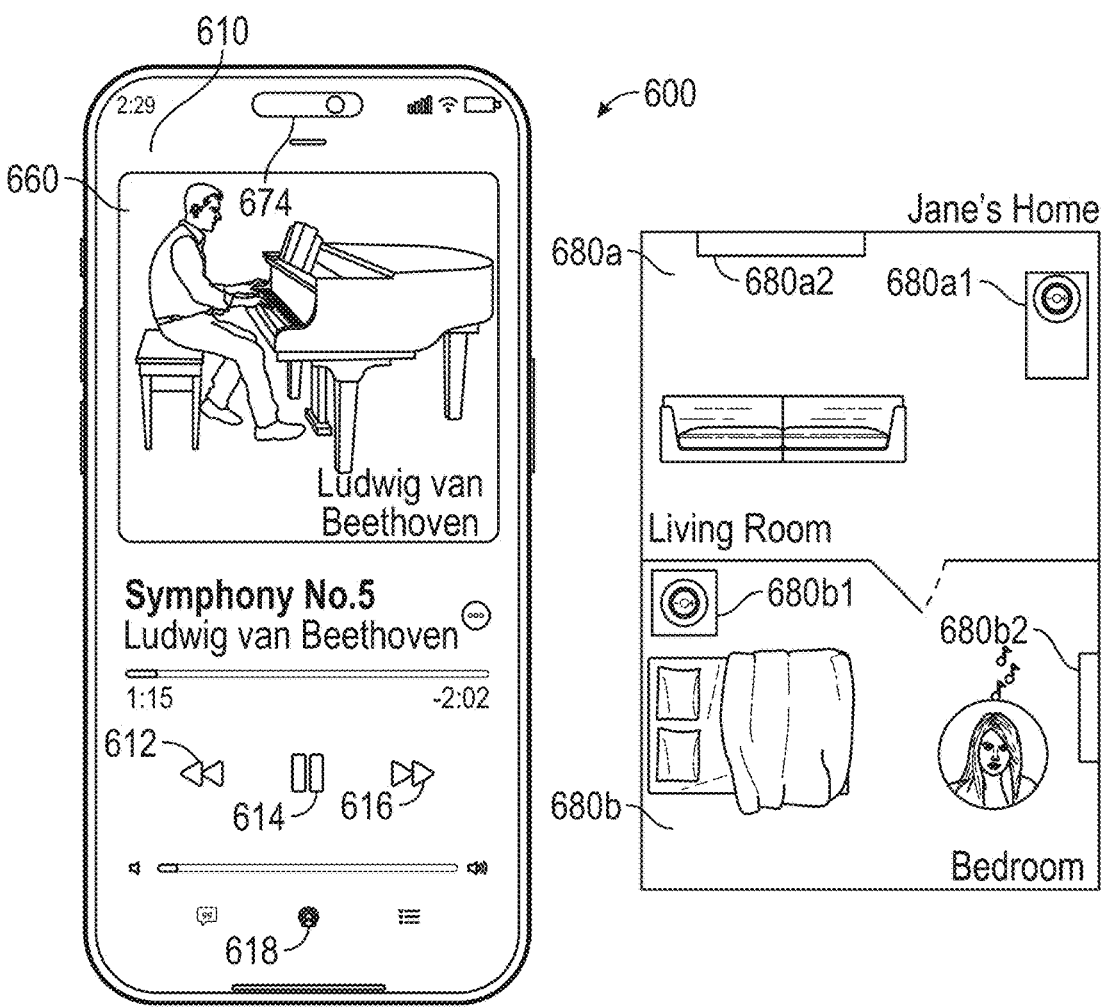
Figure 6J:
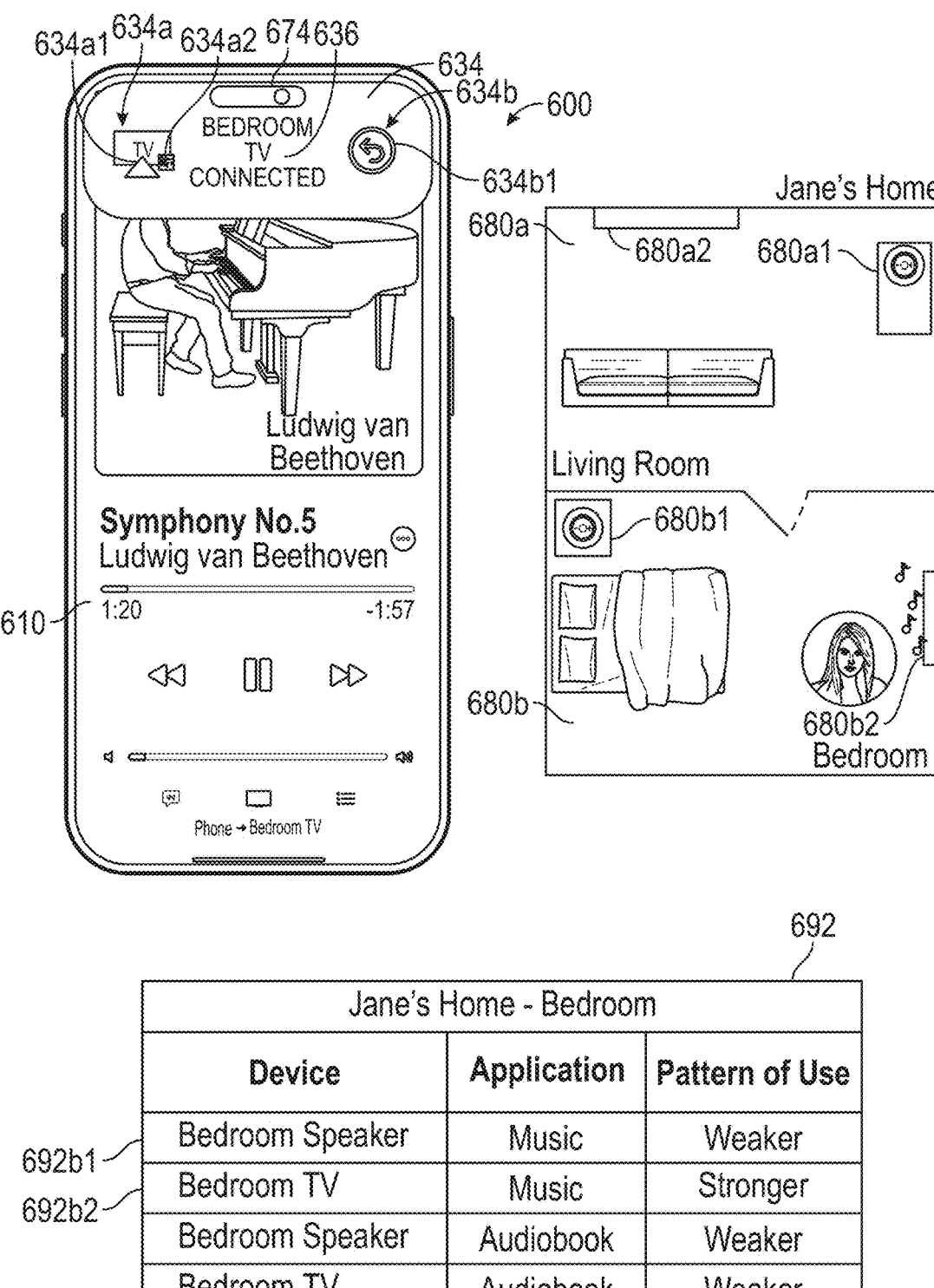
Figure 6K:
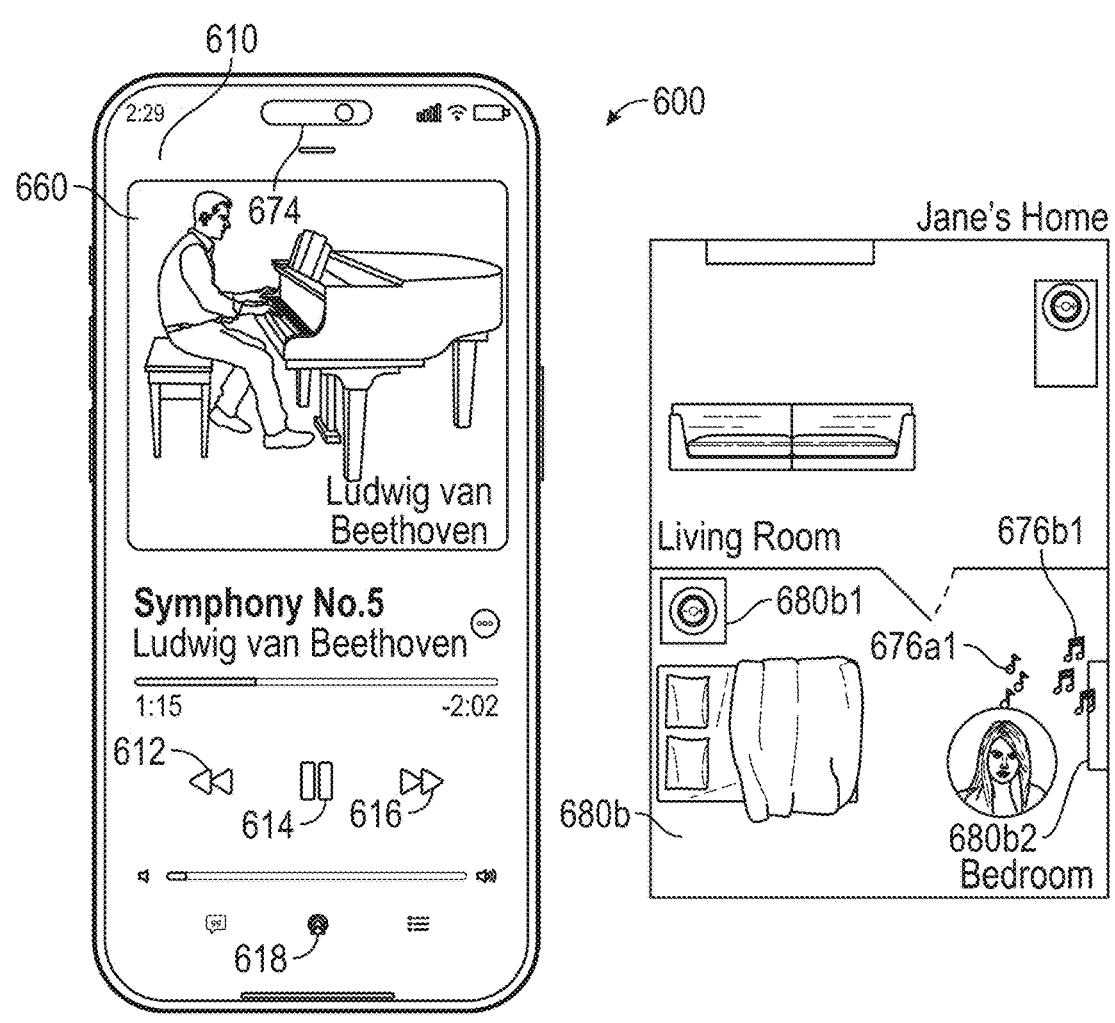
Figure 6L:
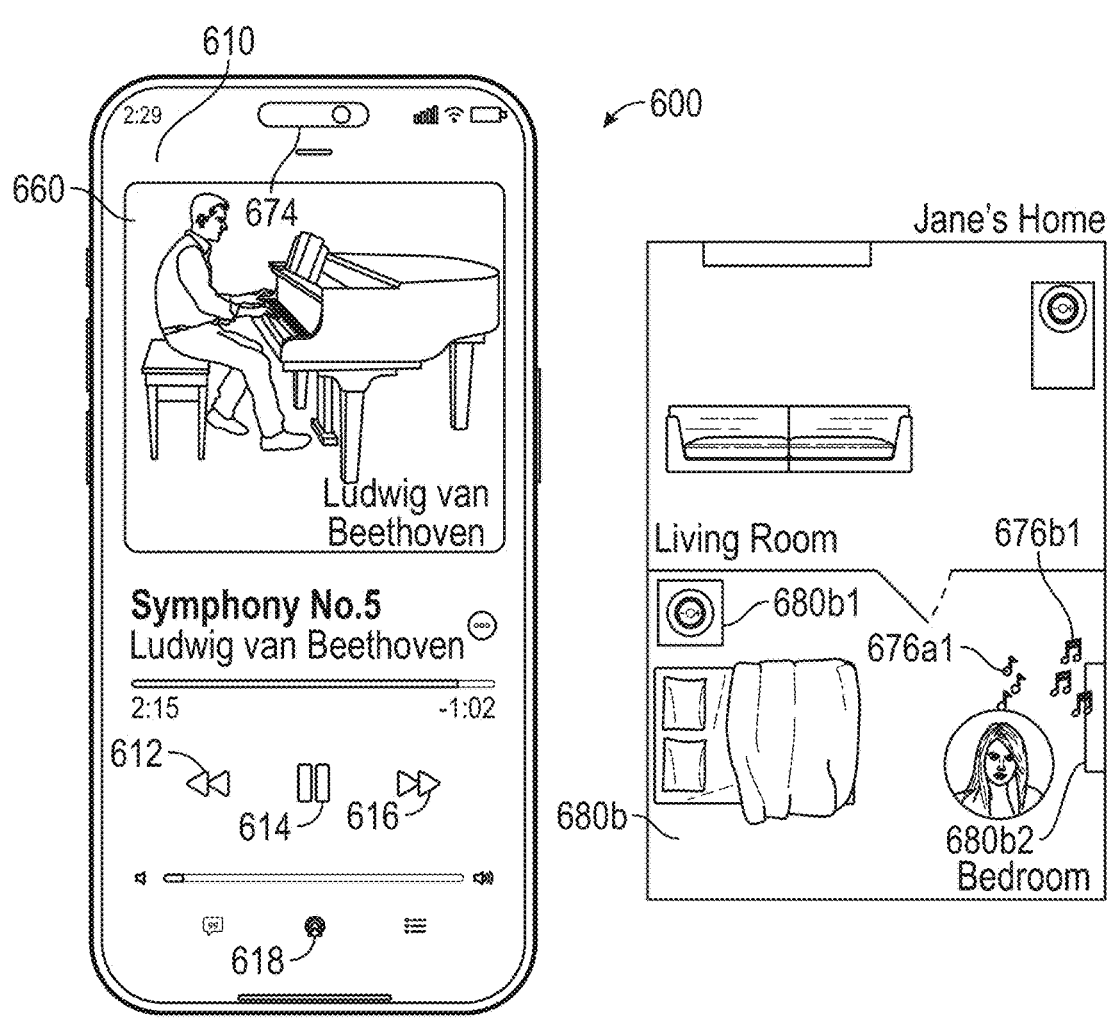
Figure 6M:
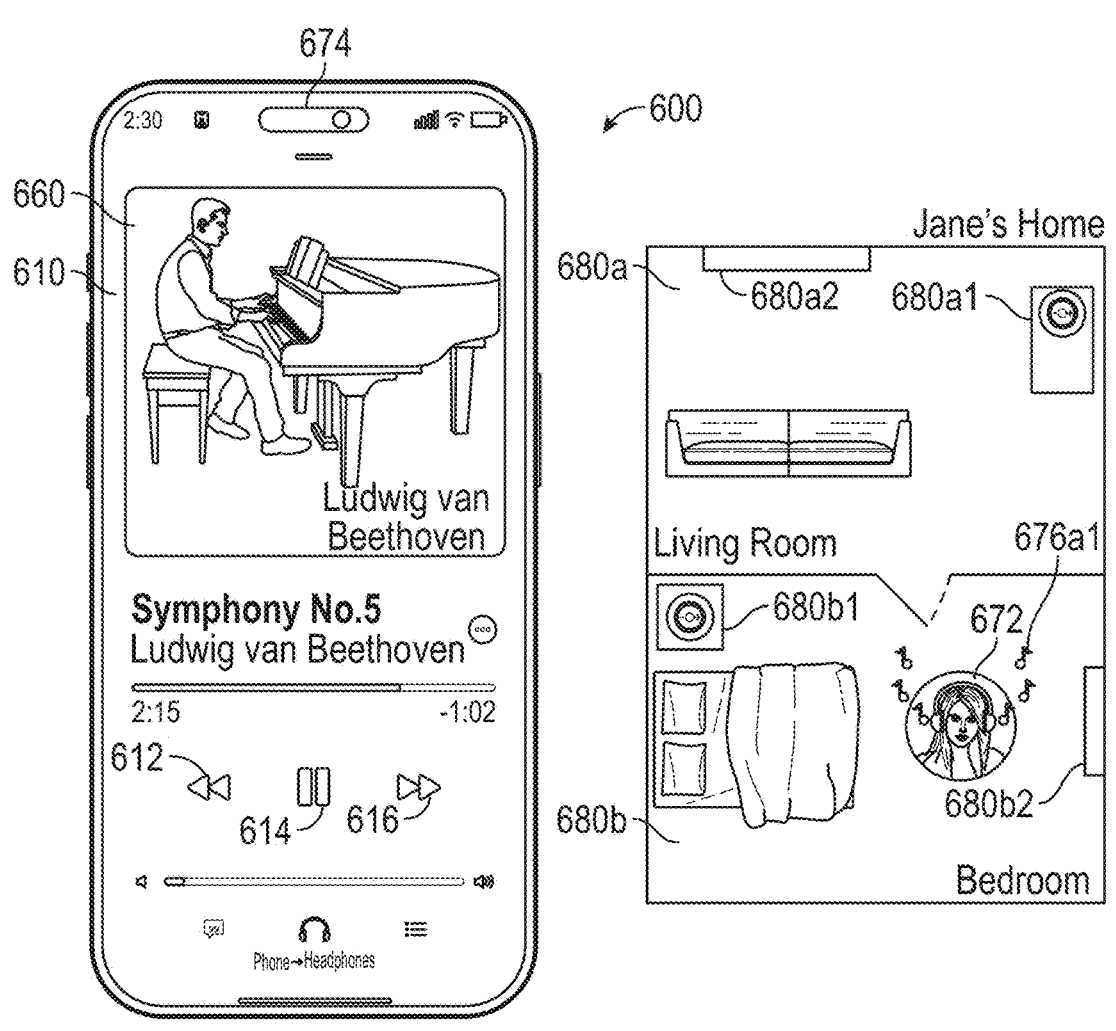
Figure 6N:
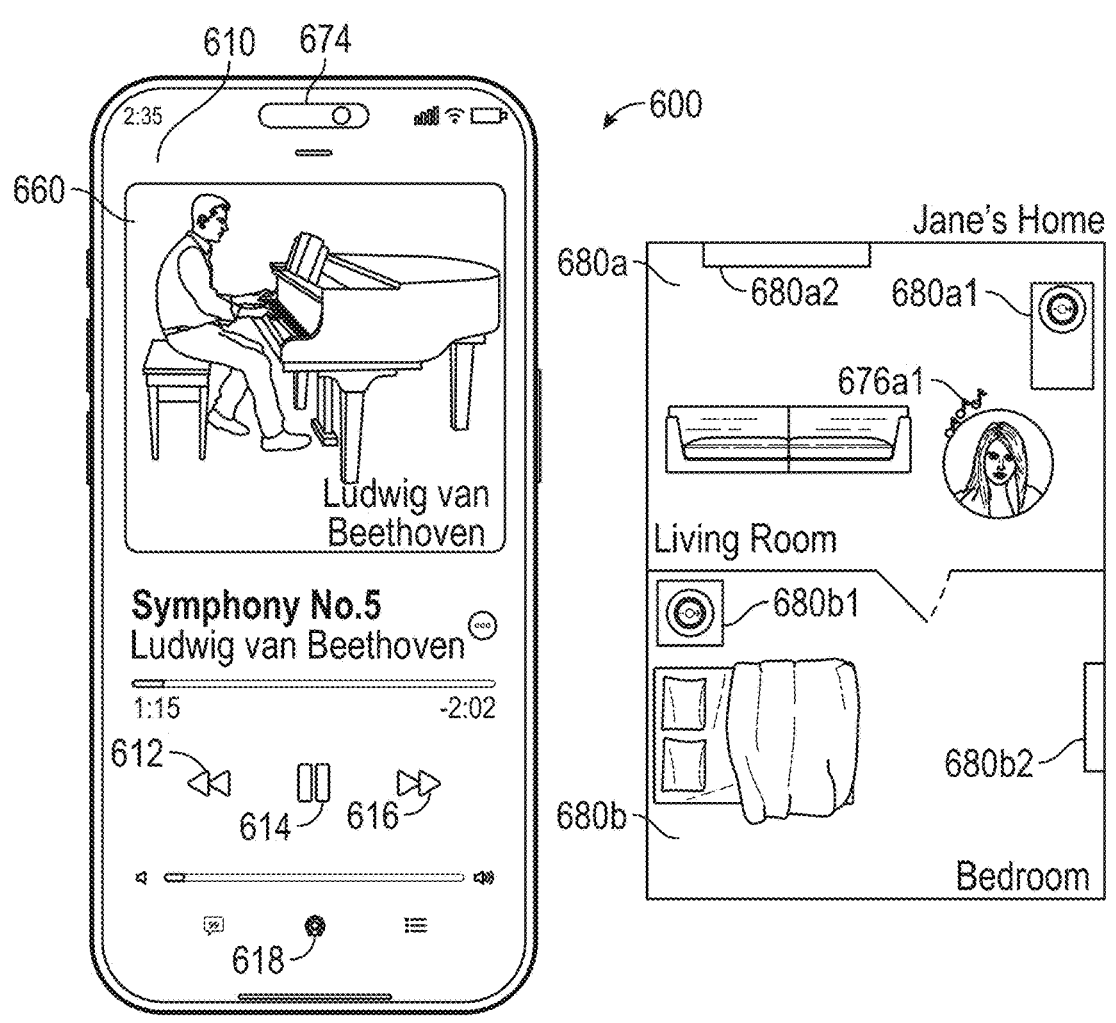
Figure 6O:
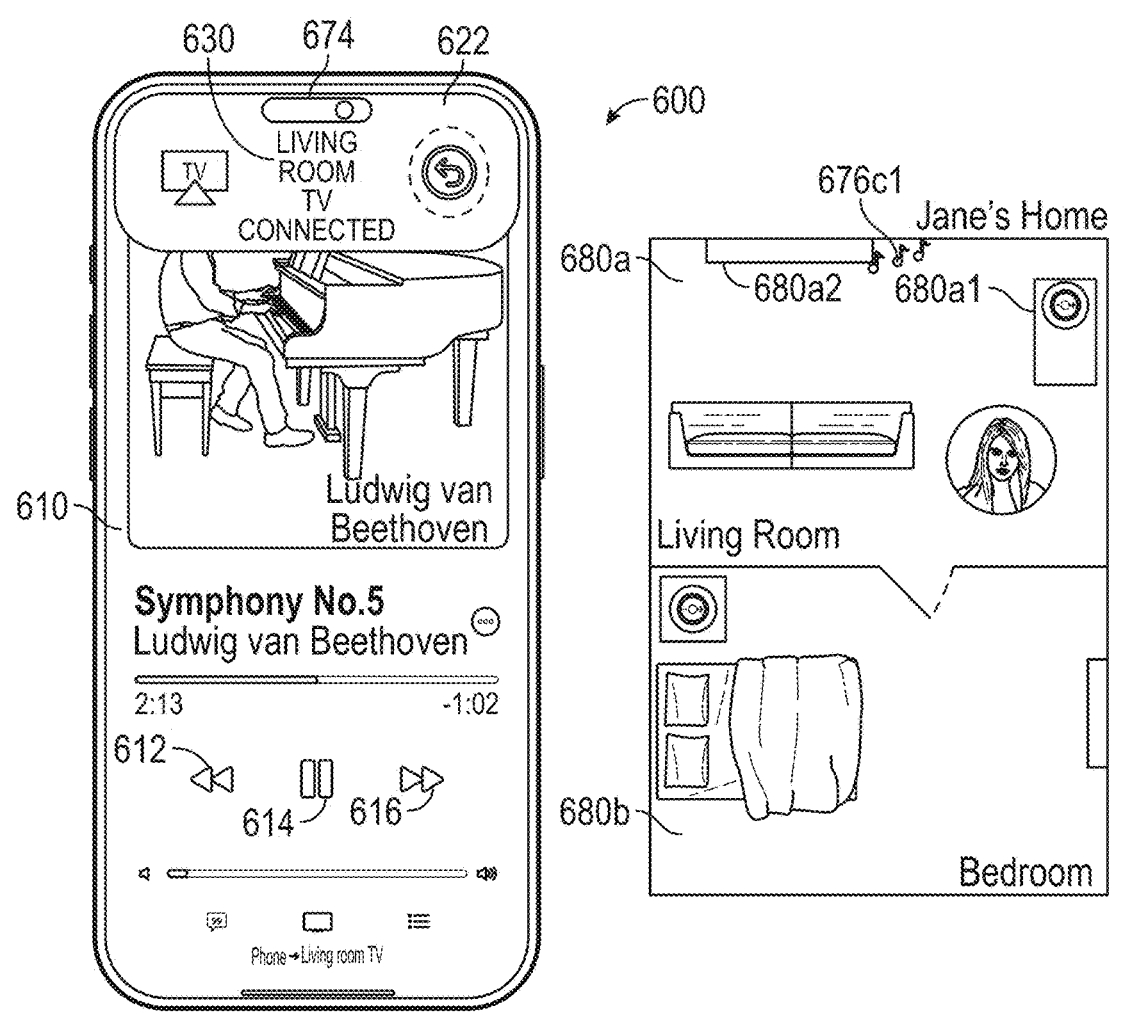
Figure 6P:
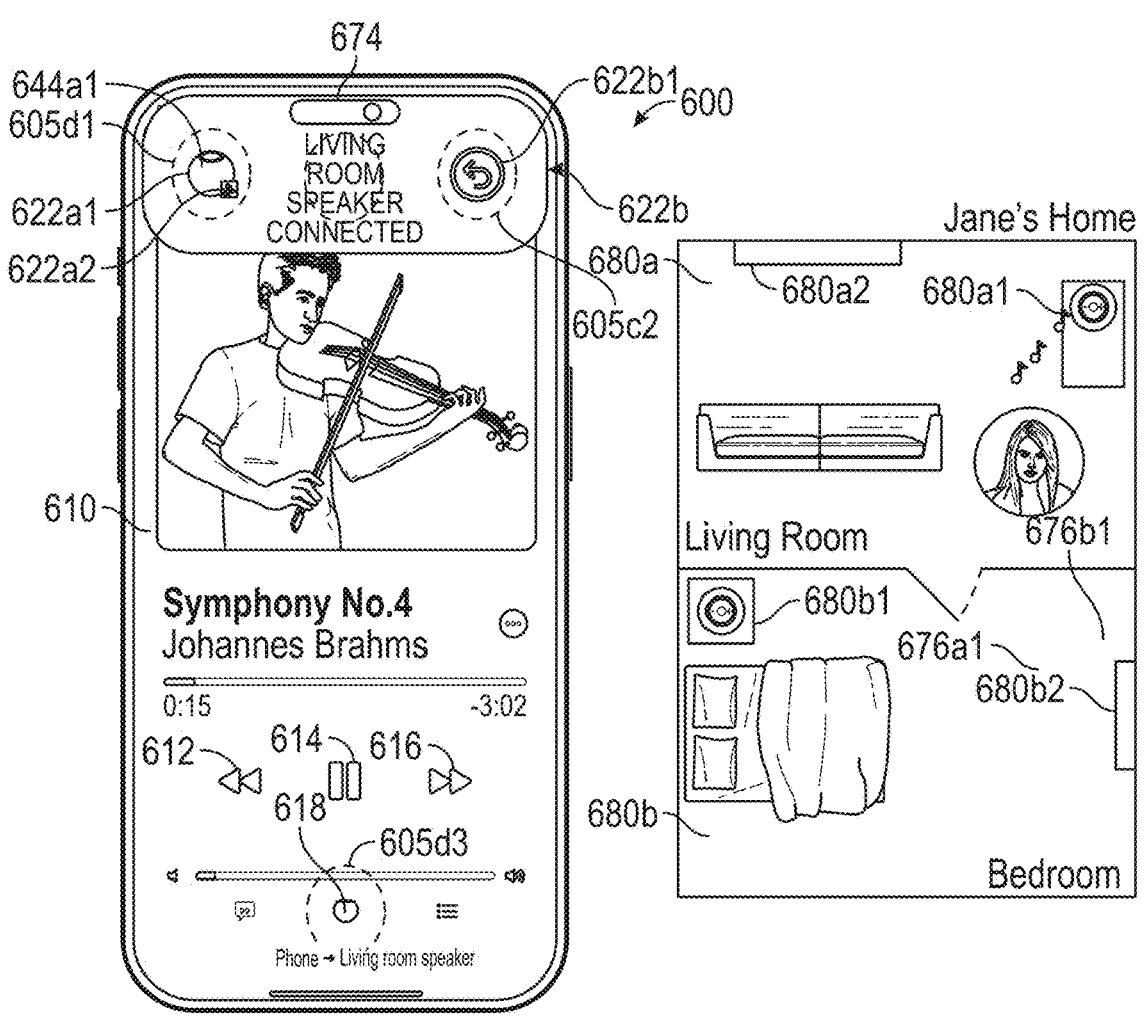
Figure 6Q:
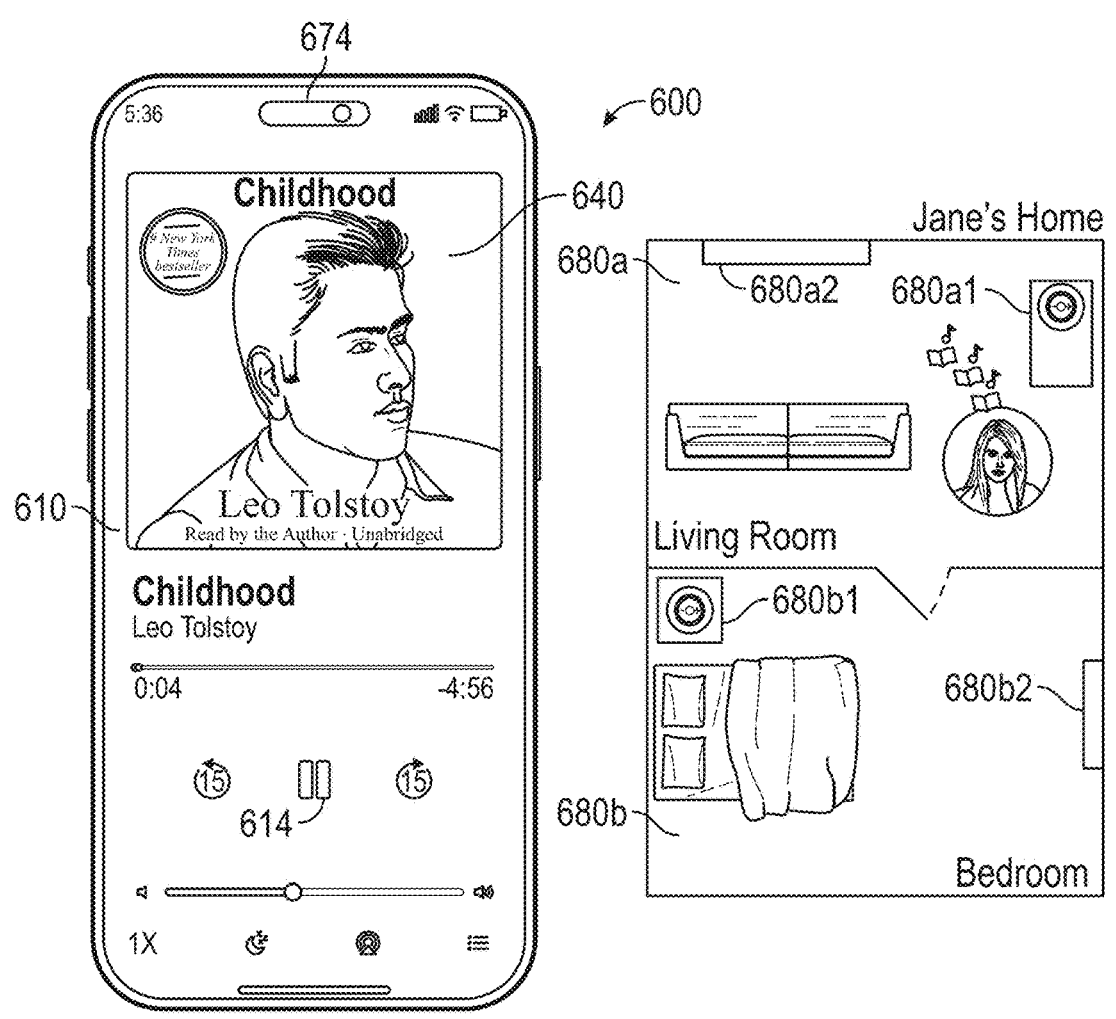
Figure 6R:
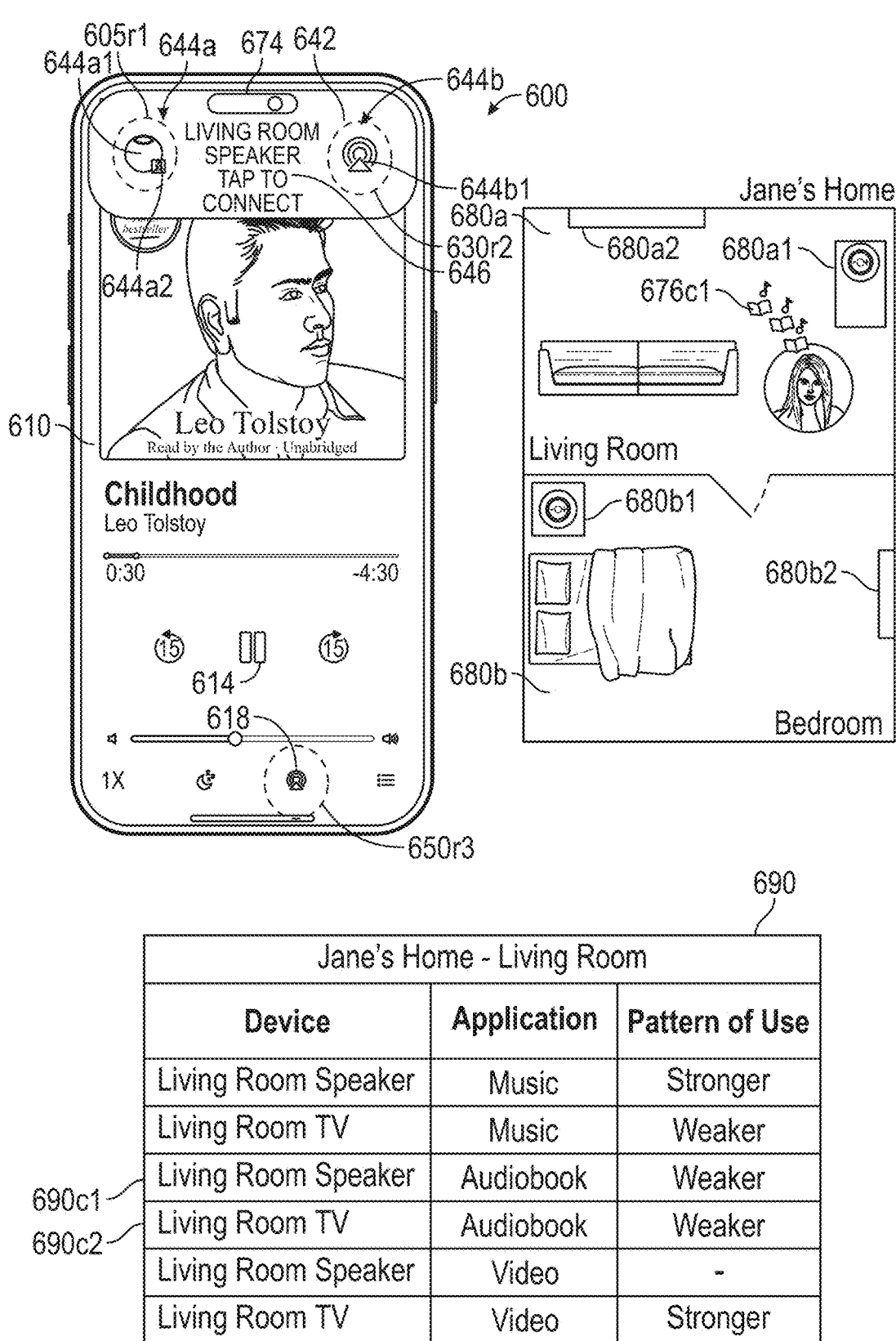
Figure 6S:
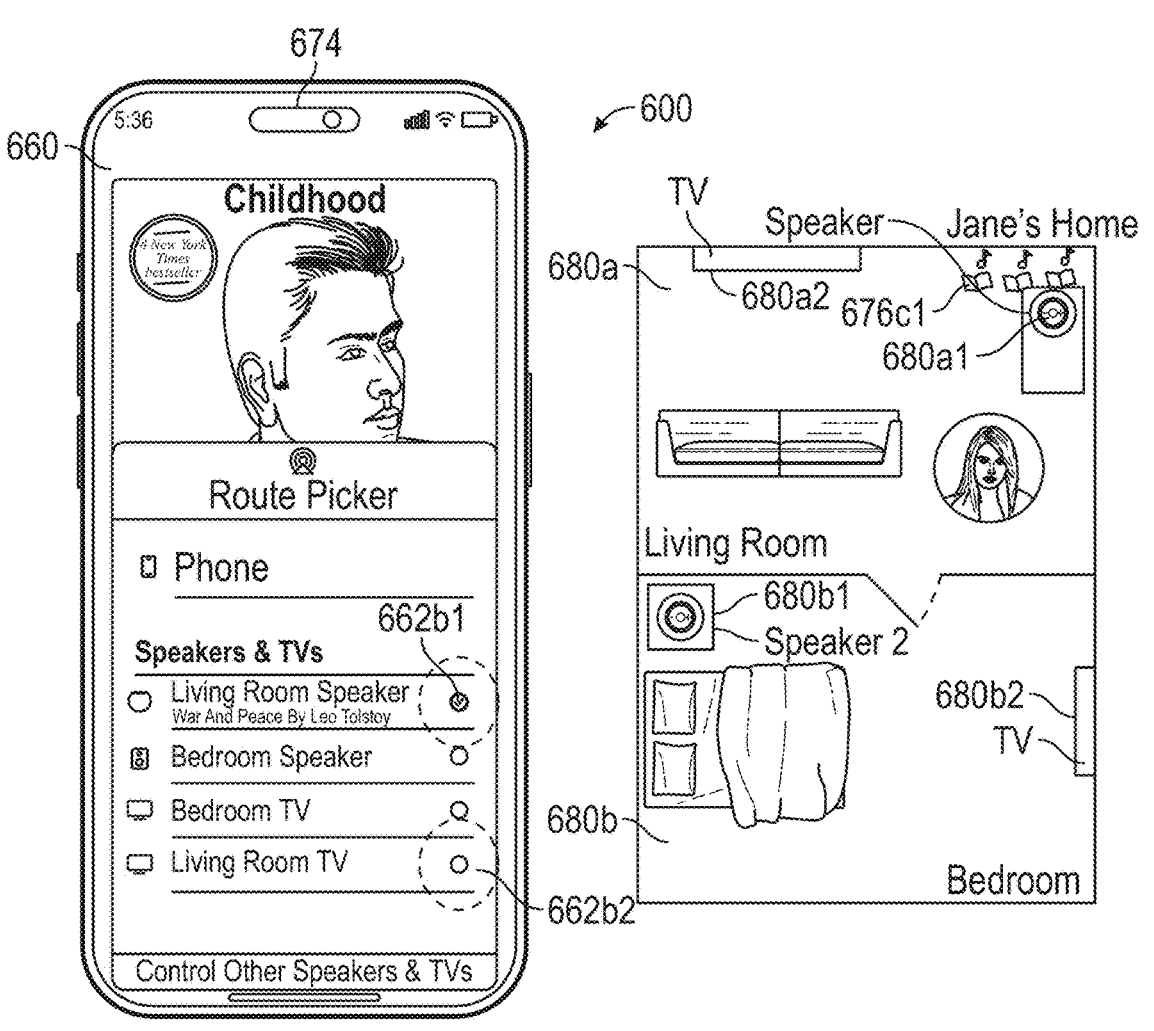
Figure 6T:
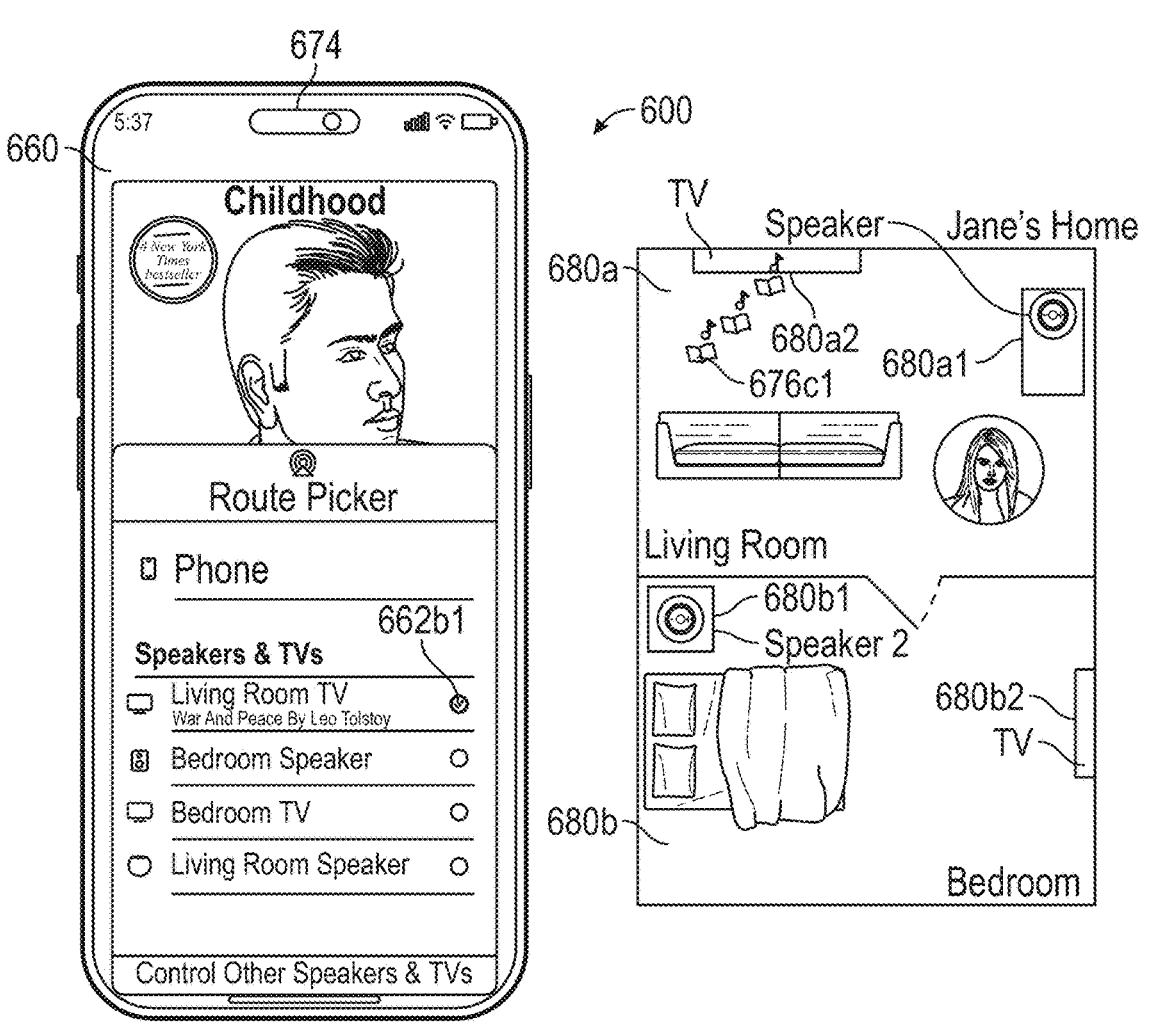
Figure 6U:
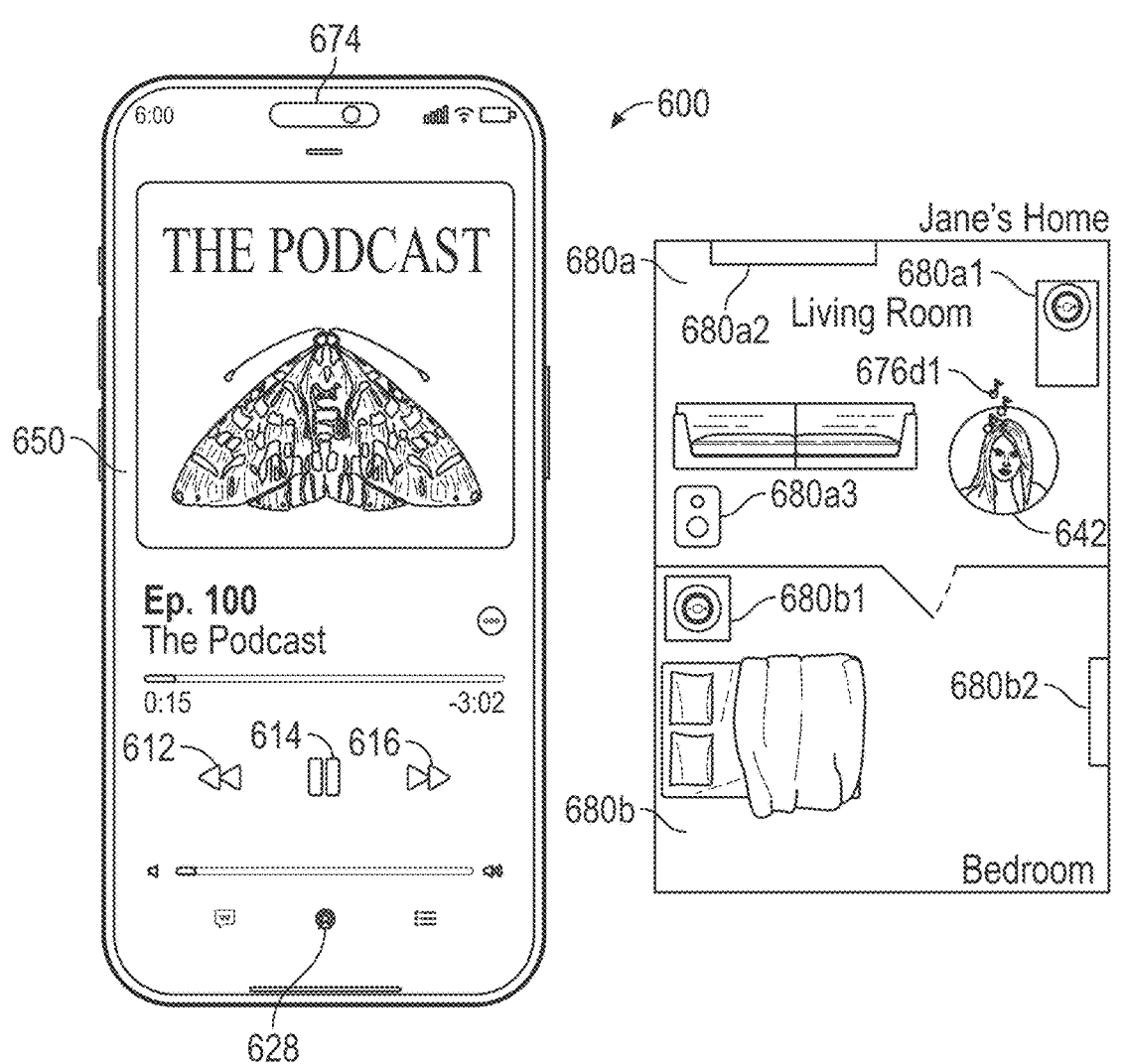
Figure 6V:
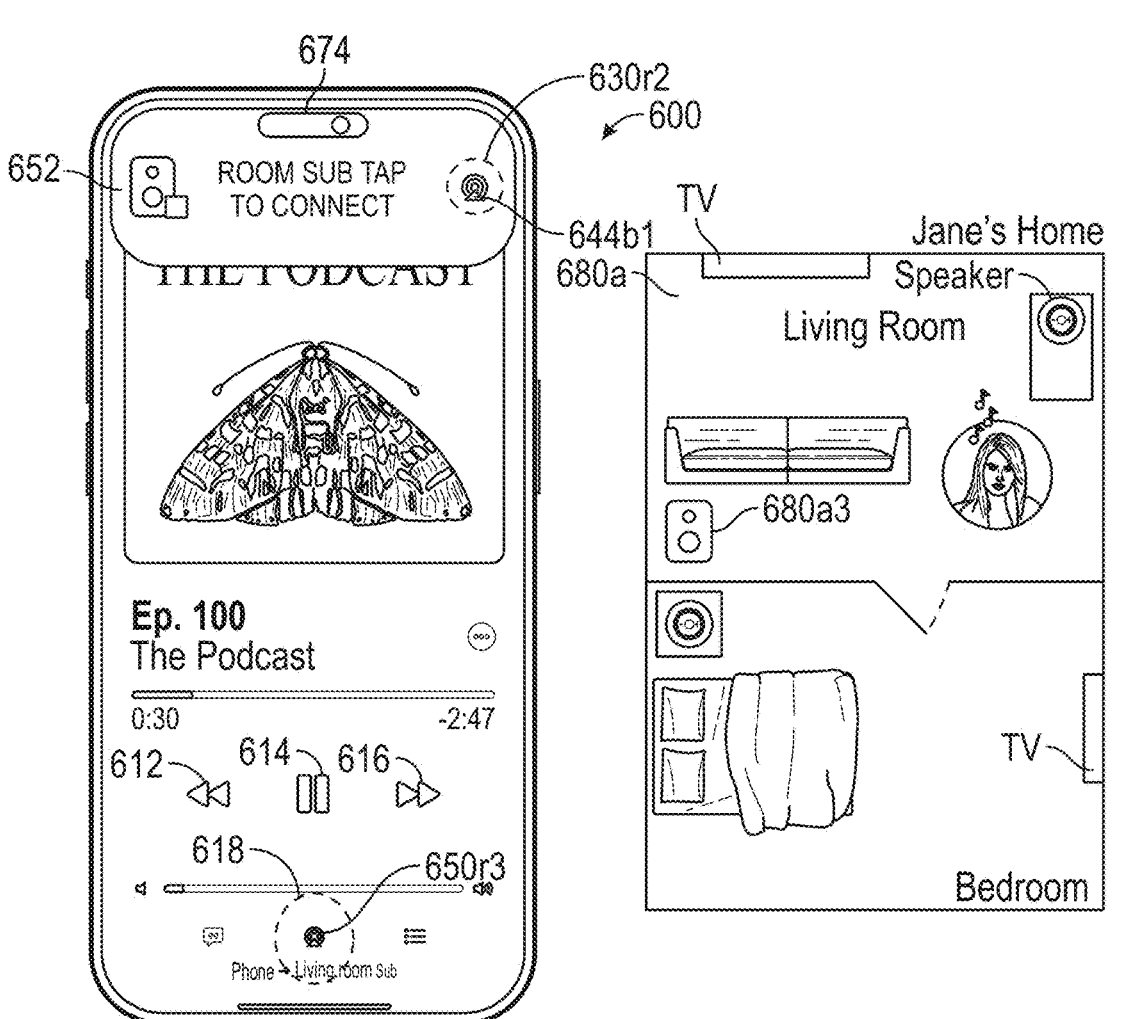
Figure 6W:
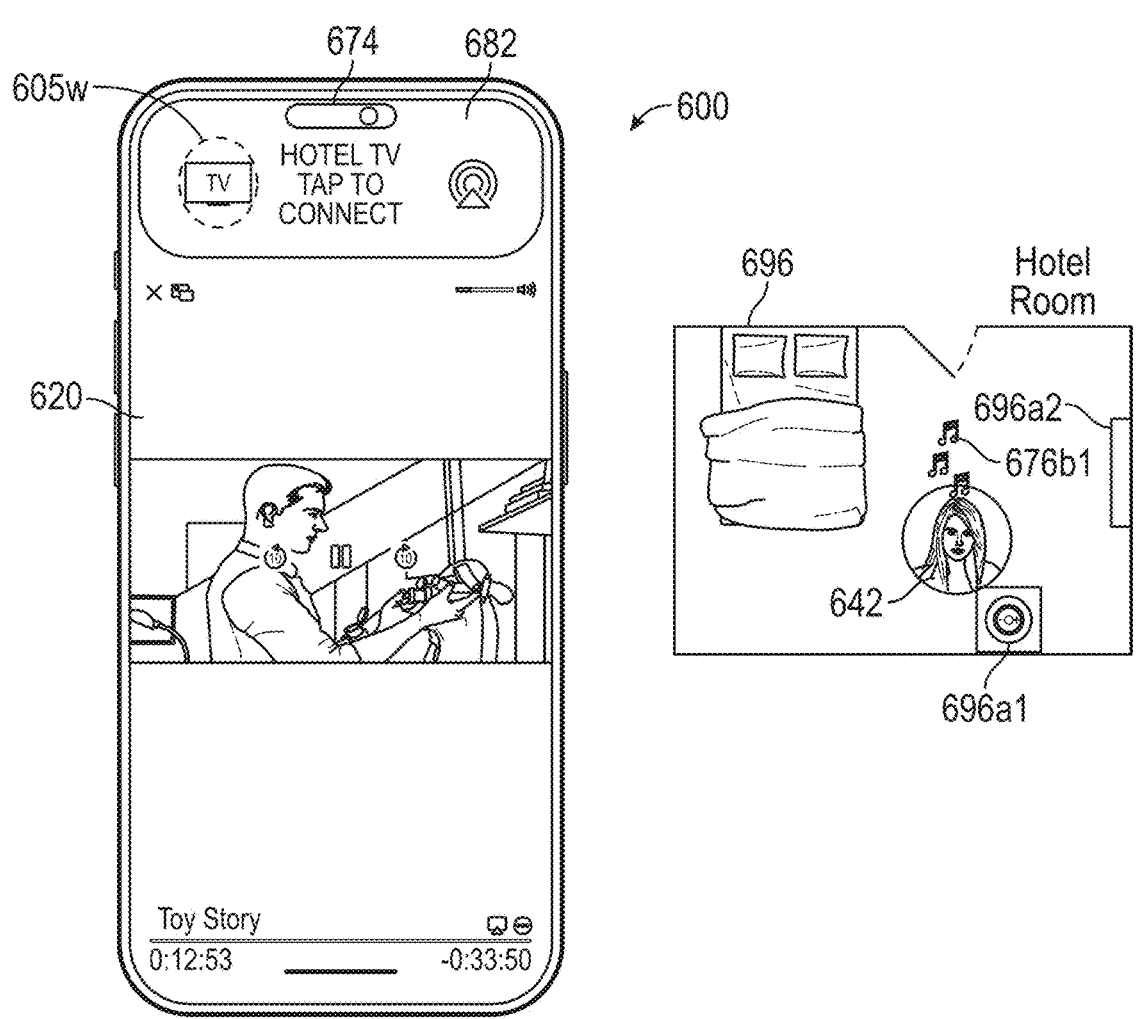
Figure 6X:
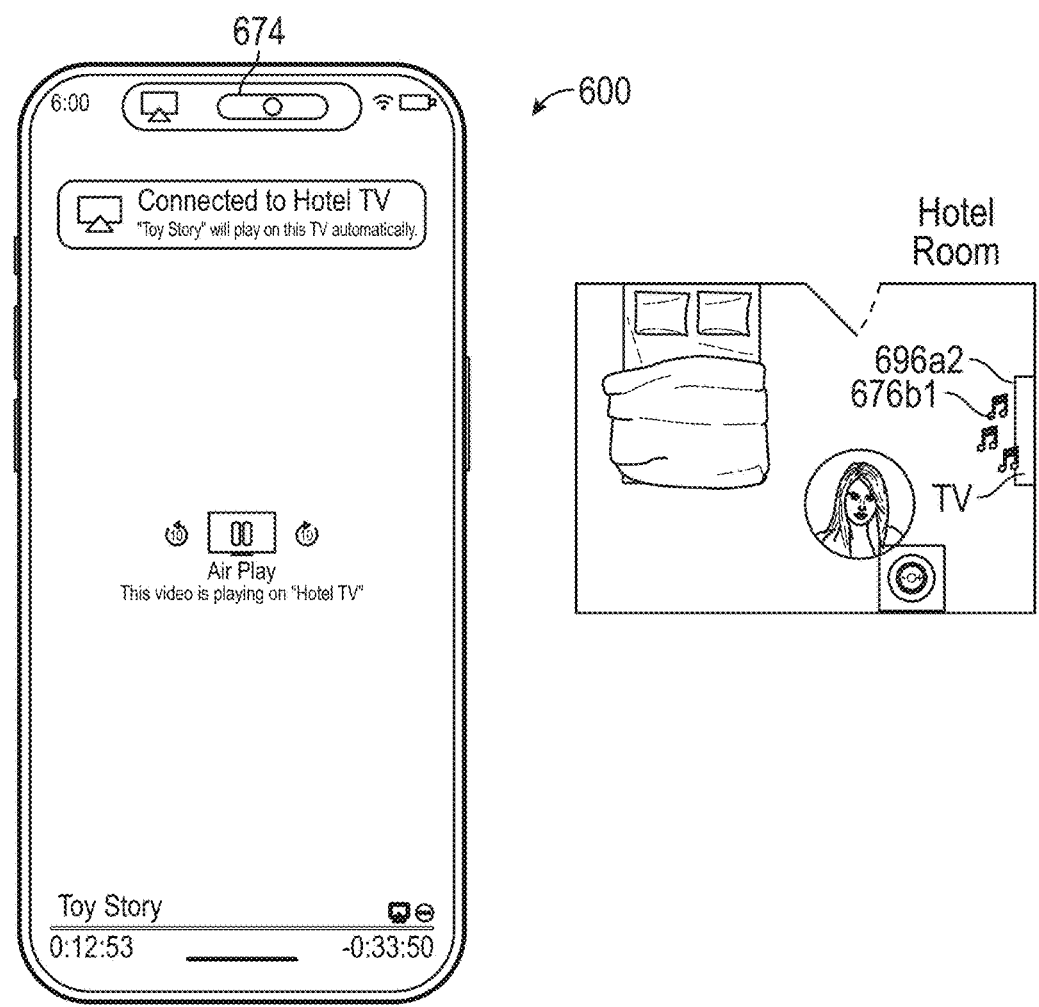

FIGS. 6A-6X illustrate exemplary user interfaces for connecting an external device in accordance with some examples. FIG. 7 is a flow diagram illustrating a method for connecting an external device in accordance with some examples. FIG. 8 is a flow diagram illustrating a method for connecting to an external device in accordance with some examples. The user interfaces in FIGS. 6A-6X illustrate the processes described in relation to FIGS. 7-8.

FIGS. 9A-9I illustrate exemplary user interfaces for managing a set of external devices in accordance with some examples. FIG. 10 is a flow diagram illustrating a method for managing a set of external devices in accordance with some examples. The user interfaces in FIGS. 9A-9I illustrate the processes described in relation to FIG. 10.

FIGS. 11A-11J illustrate exemplary user interfaces for managing media controls in accordance with some examples. FIG. 12 is a flow diagram illustrating a method for controlling media playback in accordance with some examples. FIG. 13 is a flow diagram illustrating a method for managing media controls in accordance with some examples. The user interfaces in FIGS. 11A-11J illustrate the processes described in relation to FIGS. 12-13.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some examples, these terms are used to distinguish one element from another. For example, a first touch could be termed a second touch, and, similarly, a second touch could be termed a first touch, without departing from the scope of the various described examples. In some examples, the first touch and the second touch are two separate references to the same touch. In some examples, the first touch and the second touch are both touches, but they are not the same touch.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/of" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some examples, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
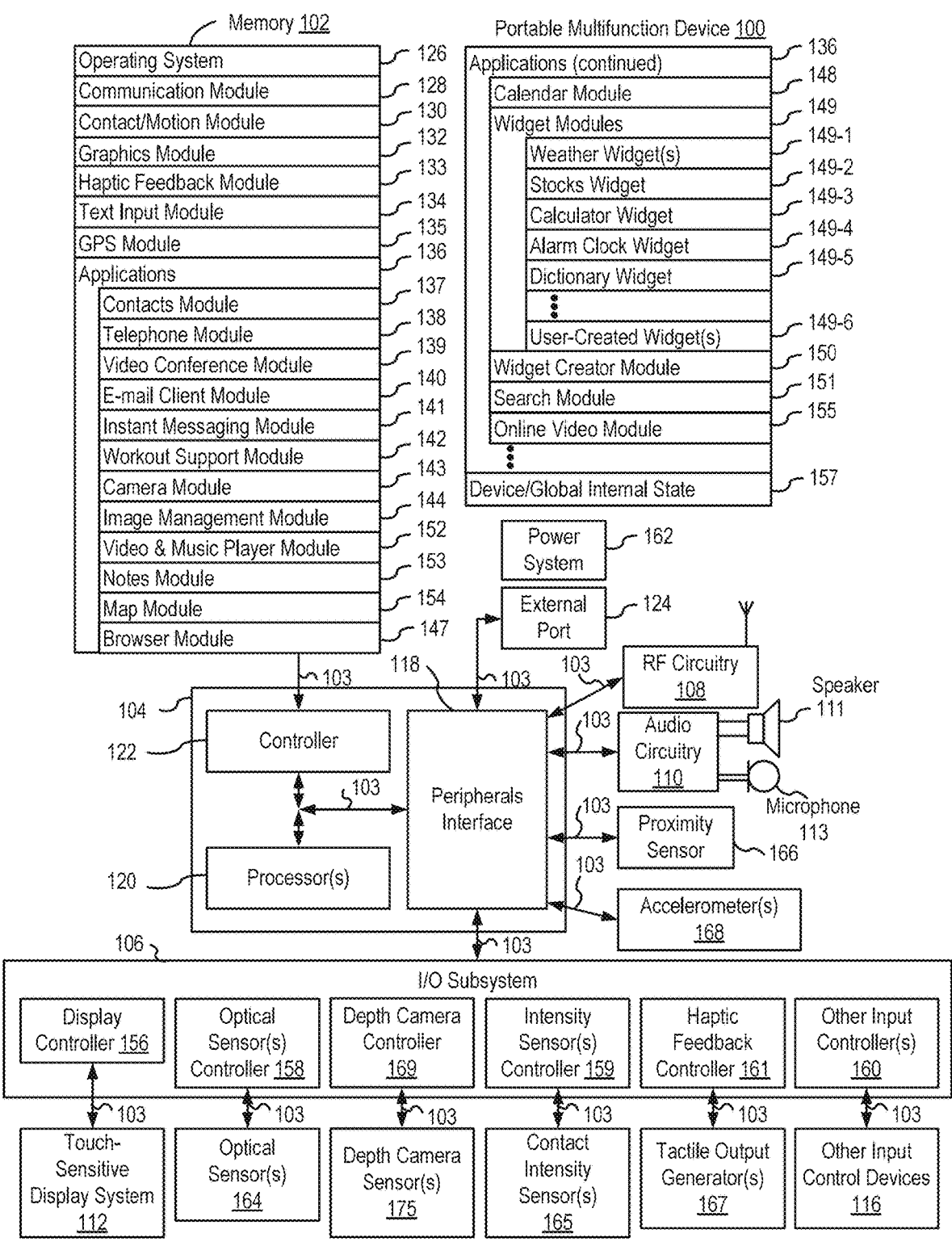
FIG. 1A is a block diagram illustrating a portable multifunction device with a touch-sensitive display in accordance with some examples.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
    Telephone module 138;
    Video conference module 139;
    E-mail client module 140;
    Instant messaging (IM) module 141;
    Workout support module 142;
    Camera module 143 for still and/or video images;
    Image management module 144;
    Video player module;
    Music player module;
    Browser module 147;
    Calendar module 148;
    Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
    Widget creator module 150 for making user-created widgets 149-6;
    Search module 151;
    Video and music player module 152, which merges video player module and music player module;
    Notes module 153;
    Map module 154; and/or
    Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
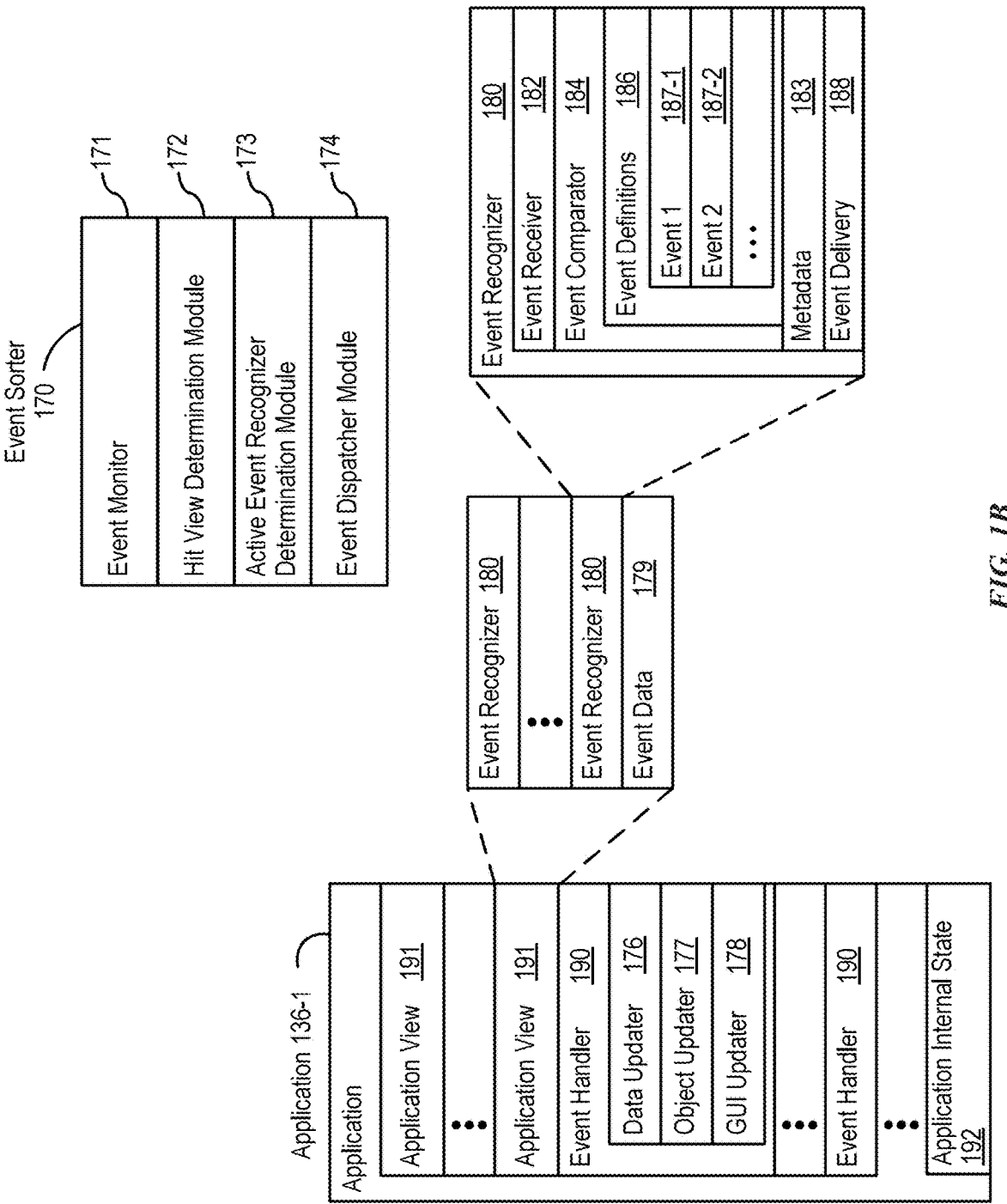
FIG. 1B is a block diagram illustrating exemplary components for event handling in accordance with some examples.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
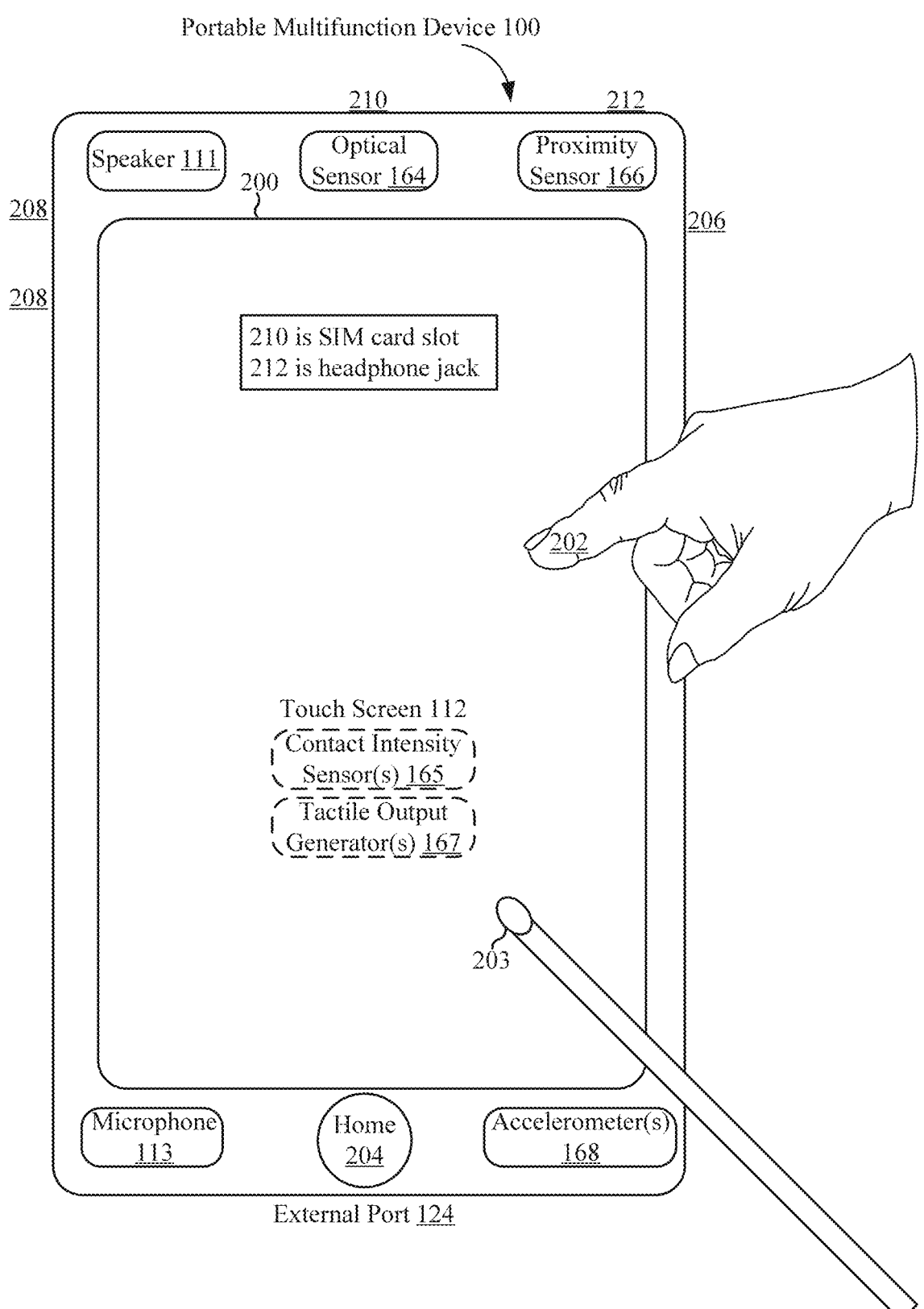
FIG. 2 illustrates a portable multifunction device having a touch screen in accordance with some examples.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
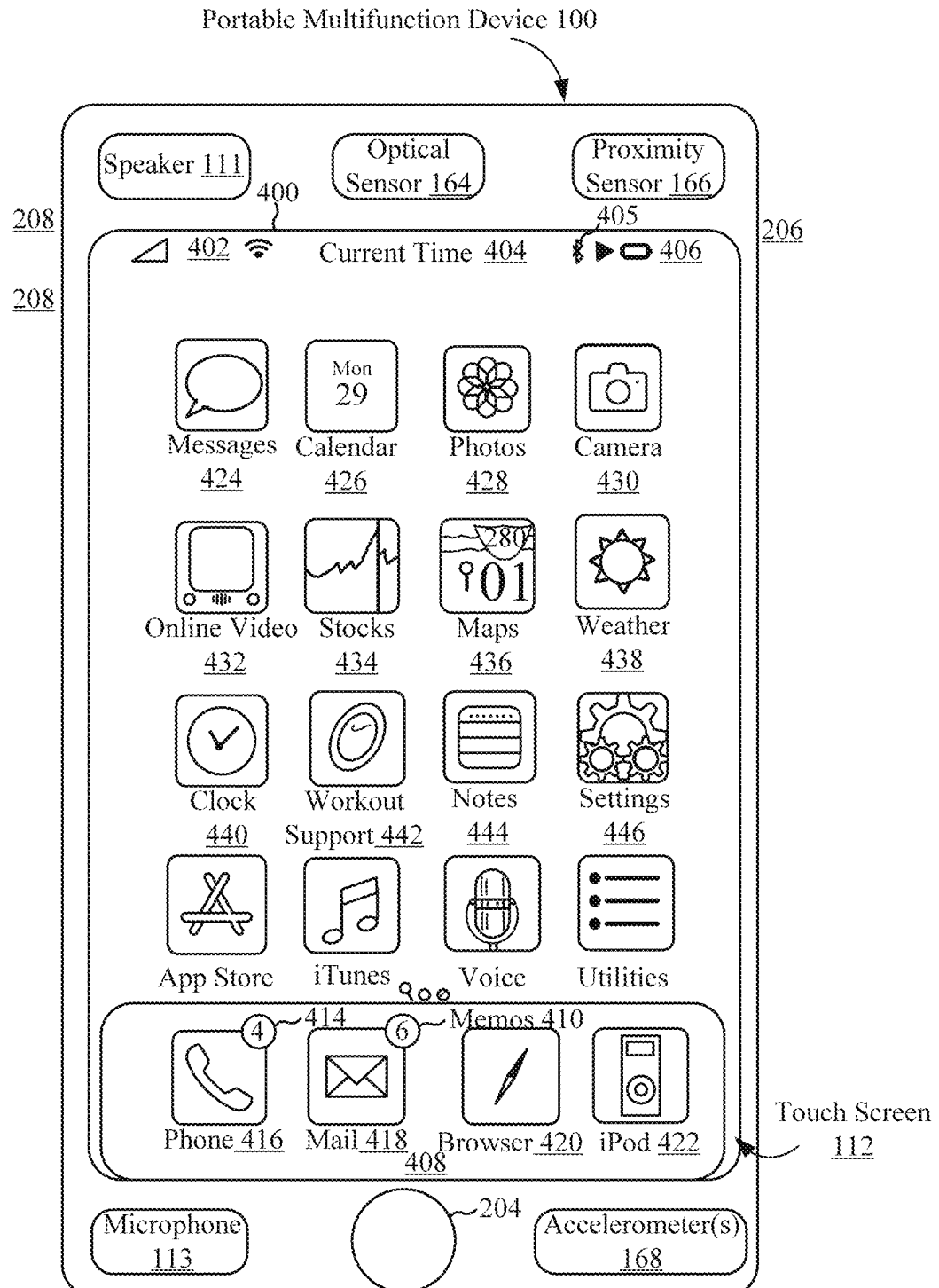
FIG. 4A illustrates an exemplary user interface for a menu of applications on a portable multifunction device in accordance with some examples.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
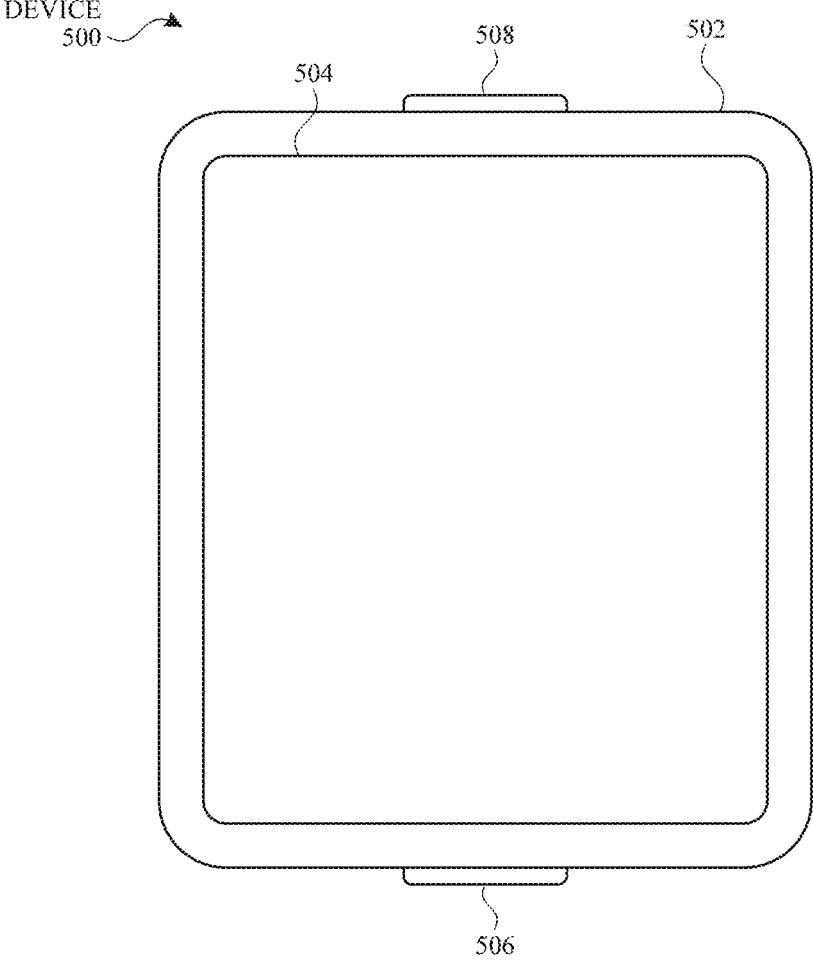
FIG. 5A illustrates a personal electronic device in accordance with some examples.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
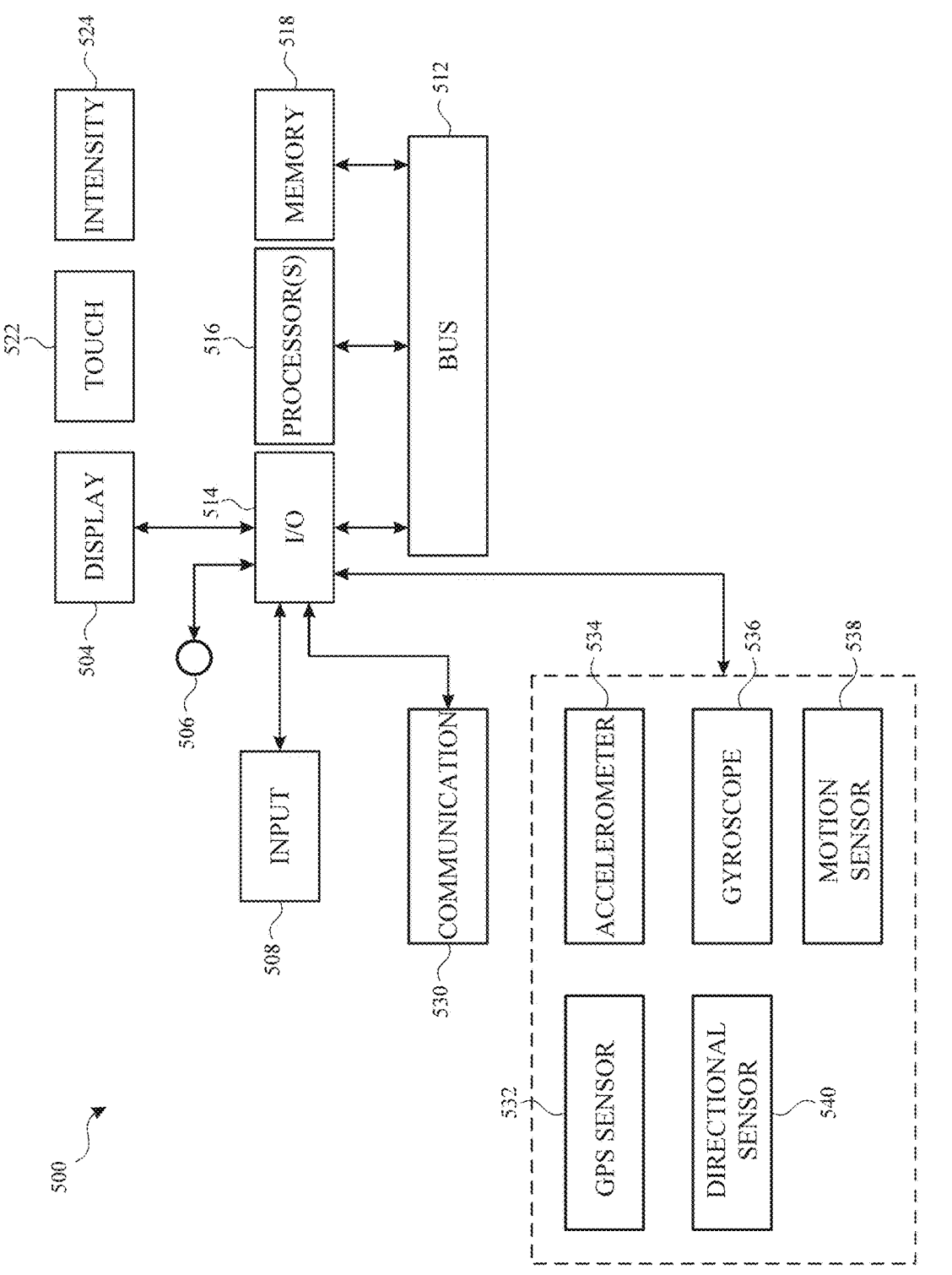
FIG. 5B is a block diagram illustrating a personal electronic device in accordance with some examples.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, 1200, and 1300 (FIGS. 7, 8, 10, 12, and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6X illustrate exemplary user interfaces for connecting an external device in accordance with some examples. The user interfaces in these figures are used to illustrate the processes described below, including the processes in FIGS. 7 and 8.

FIGS. 6A-6D illustrate one or more scenarios where a computer system automatically connects to a set of external devices while using a first application in a first micro-location based on having a strong pattern of use that corresponds to use of the first application at the first micro-location. In some examples, a micro-location is a specific and/or a precise location within a larger geographical area (e.g., a room inside of a house and/or a room of a hotel).

FIG. 6A illustrates computer system 600 displaying home user interface 602. Home user interface 602 includes multiple application controls 604, where each control represents a different application. As illustrated in FIG. 6A, multiple application controls 604 includes music application control 604a, audiobook application control 604b, video application control 604c, and podcast application control 604d. Music application control 604a corresponds to a music application, such that computer system 600 displays a user interface for the music application in response to detecting an input directed to music application control 604a. Audiobook application control 604b corresponds to an audiobook application, such that computer system 600 displays a user interface for the audiobook application in response to detecting an input directed to audiobook application control 604b. Video application control 604c corresponds to a video application, such that computer system 600 displays a user interface for the video application in response to detecting an input directed to video application control 604c. Podcast application control 604d corresponds to a podcast application, such that computer system 600 displays a user interface for the podcast application in response to detecting an input directed to podcast application control 604*d*. For exemplary purposes provided herein with reference to FIGS. 6A-6X, 9A-9I, and 11A-11J, the music application and the audiobook application are a part of the same category of applications. However, the video application is in a different category of applications than the music application, the audiobook application, and the podcast application. Moreover, the podcast application is in a different category of applications than the music application and the audiobook application. In some examples, one or more of the music application, the audiobook application, the video application, and/or the podcast application are in the same category of applications as or are in different categories of applications than described above. In some examples, one or more different applications are in the same category of applications as and/or in a different category of applications than one or more of the music application, the audiobook application, the video application, and/or the podcast application. At FIG. 6A, computer system 600 detects tap input 605*a* directed to music application control 604*a*.

As illustrated in FIG. 6B, in response to detecting tap input 605*a*, computer system 600 displays music application user interface 610. Music application user interface 610 includes, amongst other controls, rewind control 612, pause control 614, fast-forward control 616, and route picker control 618. In some examples, in response to detecting an input directed to rewind control 612, computer system 600 initiates playback of a previous track. In some examples, in response to detecting an input directed to pause control 614, computer system 600 pauses playback of a current track. In some examples, in response to detecting input on fast-forward control 616, computer system 600 initiates playback of a next track.

FIG. 6B illustrates graphical representation of Jane's Home 680 to provide an example of one or more scenarios in relation to FIGS. 6A-6R. Graphical representation of Jane's Home 680 indicates the positioning of user 642 (e.g., "Jane") relative to one or more rooms (and/or micro-locations) inside of graphical representation of Jane's Home 680. In some examples, user 642 is a user of computer system 600 and is holding computer system 600 while standing at a particular position in graphical representation of Jane's Home 680. Graphical representation of Jane's Home 680 includes living room 680*a* and bedroom 680*b*. Living room 680*a* includes living room speaker 680*a*1 and living room television 680*a*2. Bedroom 680*b* includes bedroom speaker 680*b*1 and bedroom television 680*b*2. In some examples, living room speaker 680*a*1 and bedroom speaker 680*b*1 are the same type of speaker (e.g., they are both speakers as defined by one or more techniques described herein). In some examples, living room television 680*a*2 and bedroom television 680*b*2 are the same type of television (e.g., they are both televisions as defined by one or more techniques described herein). In some examples, living room television 680*a*2 and bedroom television 680*b*2 are connected media devices that cause a television to output media. In some examples, graphical representation of Jane's Home 680 includes one or more other rooms, micro-locations, and/or one or more other types of devices. In some examples, connecting to the one or more other types of devices and/or providing suggestions with respect to the one or more other devices utilize the same and/or similar techniques as described herein in relation to FIGS. 6A-6X, 9A-9I, and 11A-11J.

At FIG. 6B, computer system 600 is in living room 680*a* while playing back media via the music application (e.g., as indicated by user 642 being in living room 680*a* and playback indicator 676*a*1 illustrated with respect to graphical representation of Jane's Home 680 and computer system 600 displaying music application user interface 610). Table 690 is provided to show the relative strength of a respective pattern of use that is associated with a respective device that is associated with a respective micro-location (e.g., living room and/or bedroom). In some examples, a pattern of use is a frequency of use and/or multiple uses measured over a period of time. In some examples, a pattern of use is a historical set of uses. In some examples, the pattern of use is determined to be a strong pattern of use based on the set of historical uses. In some examples, the pattern of use is determined to be a weak pattern of use based on a detection of a minimal (e.g., below a threshold and/or no) historical set of uses (and/or inconsistent set of uses) being associated with a respective location (and/or micro-location) and a respective application. In some examples, a pattern of use is determined to be a strong (and/or stronger) pattern of use when use of an application at a respective location has occurred above a threshold number of times (and/or above a threshold amount of consistent uses), has been the most used application out of a set of applications, is in the same category of applications as another application that has been determined to have a strong (and/or stronger) pattern of use, is above a threshold level of confidence with respect to a location, and/or has been designed as a preferred application to use (e.g., overall, at a location, at a micro-location, and/or at a particular timeframe). In some examples, a pattern of use is determined to be a weaker (and/or weak) pattern of use when use of an application at a respective location has occurred below a threshold number of times, is not the most used application out of a set of applications, is not in the same category of applications as another application that has been determined to have a strong (and/or stronger) pattern of use, is below a threshold level of confidence with respect to a location, and/or has not been designated as a preferred application to use.

At FIG. 6C, computer system 600's use of the music application in living room 680*a* is associated with a stronger pattern of use for living room speaker 680*a*1 than the pattern of use associated with living room television 680*a*2, as indicated by a pattern of use for living room speaker and music application row 690*a*1 of Table 690 ("STRONGER") compared to pattern of use for living room television and music application row 690*a*2 of Table 690 ("WEAKER"). As illustrated in FIG. 6C, because a determination is made that computer system 600's use of the music application in living room 680*a* is associated with a stronger pattern of use (and/or a strong pattern of use) with respect to living room speaker 680*a*1, compared to living room television 680*a*2, computer system 600 displays automatic connection notification 622. Automatic connection notification 622 includes leftward portion 622*a* and rightward portion 622*b*. As illustrated in FIG. 6C, leftward portion 622*a* includes graphical speaker indication 622*a*1, which indicates the type of device (e.g., a speaker) that corresponds to living room speaker 680*a*1. Moreover, leftward portion 622*a* also includes a graphical album art indication 622*a*2, which corresponds to album art for the music currently being played back via the music application that computer system 600 is currently executing on computer system 600. As illustrated in FIG. 6C, rightward portion 622*b* includes reset playback control 622*b*1. In some examples, in response to detecting input on reset playback control 622*b*1, computer system 600 stops causing (e.g., stops communicating from, stops communicating with, and/or ceases playback from) living room speaker 680*a*1 to playback music. As illustrated in FIG. 6C, automatic connection notification 622 also includes text indication 630, which indicates that computer system 600 is causing living room speaker 680*a*1 to play back the media from the music application (e.g., "LIVING ROOM SPEAKER CONNECTED"). At FIG. 6C, computer system 600 causes living room speaker 680*a*1 to play back media from the music application that was previously being played back by computer system 600 of FIG. 6B (e.g., as indicated by playback indicator 676*a*1 being closer to living room speaker 680*a*1 at FIG. 6C than playback indicator 676*a*1 is to user 642 at FIG. 6B) because a determination is made that computer system 600's use of the music application in living room 680*a* is associated with a stronger pattern of use (and/or a strong pattern of use) with respect to living room speaker 680*a*1. At FIG. 6C, computer system 600 detects tap input 605*c*1 directed to leftward portion 622*a*, tap input 605*c*2 directed to rightward portion 622*b* that includes reset playback control 622*b*1, or tap input 605*c*3 directed to route picker control 618. In some examples, in response to detecting tap input 605*c*2, computer system 600 ceases causing living room speaker 680*a*1 to play back music from the music application. In some examples, in response to detecting a tap input on pause control 614, computer system 600 initiates playback of the music from the music application (e.g., using one or more techniques as described above in relation to FIG. 6B).

Before discussing tap inputs 605*c*1 and 605*c*3, FIG. 6D is provided to illustrate automatic connection notification 622 going from an expanded state as illustrated in FIG. 6C to a receded state as illustrated in FIG. 6D. After a period of time after computer system 600 displays automatic connection notification 622 of FIG. 6C, computer system 600 transitions automatic connection notification 622 from an expanded state to a receded state. To transition automatic connection notification 622 to the receded state, computer system 600 ceases to display text indication 630 and reset playback control 622*b*1, and displays a collapse and shrink transition of automatic connection notification 622, such that portions of automatic connection notification 622 are displayed within interaction area 674 (e.g., as illustrated in FIG. 6D) instead of being displayed around interaction area 674 (e.g., as illustrated in FIG. 6C). While automatic connection notification 622 is being displayed within interaction area 674, computer system 600 continues to display a leftward portion that includes graphical speaker indication 622*a*1 but updates a rightward portion to include route picker control 622*c*. At FIG. 6D, computer system 600 detects tap input 605*d*1 directed to the leftward portion that includes graphical speaker indication 622*a*1, tap input 605*d*2 directed to the rightward portion that includes route picker control 622*c*, or tap input 605*d*3 directed to route picker control 618.

As illustrated in FIG. 6E, computer system 600 displays route picker user interface 660. Router picker user interface 660 includes, amongst other things, route picker controls 662. Route picker controls 662 includes living room route picker control 662*a* and living room television route picker control 662*b*, among other route picker controls. As illustrated in FIG. 6E, living room route picker control 662*a* includes route selection control 662*a*1, and living room television route picker control 662*b* includes route selection control 662*b*1. At FIG. 6E, computer system 600 is displaying route selection control 662*a*1 with an indication (e.g., checkmark) that media (e.g., from the music application) is being routed to living room speaker 680*a*1 but is not displaying route selection control 662*b*1 with an indication (e.g., no checkmark) that media is being routed to living room television 680*a*2. At FIG. 6E, computer system 600 detects tap input 605*e*1 directed to route selection control 662*e*1 and tap input 605*e*2 directed to route selection control 662*a*2.

At FIG. 6F, in response to detecting tap input 605*e*1, computer system 600 ceases to output media from living room speaker 680*a*1 corresponding to the music application (e.g., indicated by computer system 600 removing the checkmark from route selection control 662*a*1). Moreover, at FIG. 6F, computer system 600 causes living room television 680*a*2 to output media corresponding to the music application in response to detecting tap input 605*e*2 (e.g., indicated by computer system 600 adding the checkmark to route selection control 662*a*2 and playback indicator 676*a*1 being closer to living room television 680*a*2 than living room speaker 680*a*1 in FIG. 6F). Thus, as illustrated in FIGS. 6E-6F, computer system 600 changes whether an external device is being caused to play back media based on manual inputs provided by a user, irrespective of a pattern of use associated with the media and/or an application corresponding to the media. At FIG. 6F, computer system 600 detects swipe input 605*f*.

FIGS. 6G-6H illustrate one or more scenarios where a computer system automatically connects to a different set of external devices while using a second application in a first micro-location based on having a strong pattern of use that corresponds to use of the second application at the first micro-location. At FIG. 6G, in response to detecting swipe input 605*f*, computer system 600 displays video application user interface 620. Video application user interface 620 is a user interface for a video application that is currently playing back a video. As illustrated in FIG. 6G, computer system 600 is outputting audio corresponding to the video (e.g., as indicated by playback indicator 676*b*1). In some examples, in response to detecting swipe input 605*f*, computer system 600 transitions music application (e.g., represented by music application user interface 610 of FIG. 6F) to operate in the background and transitions the video application (e.g., represented by video application user interface 620) to operate in the foreground. At FIG. 6G, computer system 600 detects that the video application is operating in the foreground and, thus, determines the pattern of use associated with the video application (e.g., instead of the music application, which is now operating in the background).

At FIG. 6H, a determination is made that computer system 600's use of the video application in living room 680*a* is associated with a stronger pattern of use for living room television 680*a*2 than the pattern of use associated with living room speaker 680*a*1, as indicated by the pattern of use for living room speaker and video application row 690*b*2 of Table 690 ("STRONGER") compared to the pattern of use for living room television and video application row 690*b*1 of Table 690 ("-"). In some examples, the indication in Table 690 of "-" indicates that no pattern of use has been determined for a particular application being used at a particular location. In some examples, an indication in Table 690 of "-" indicates that a minimal (e.g., less than a weaker and/or weak) pattern of use has been determined for a particular application being used at a particular location. In some examples, the state of devices (e.g., whether the device is on, off, currently playing back media, has recently played back media, and/or is currently configured to play back media) in living room 680*a* (e.g., living room speaker 680*a*1 and/or living room television 680*a*2) does not impact the determination that computer system 600's use of the video application in living room 680*a* is associated with a stronger pattern of use. As illustrated in FIG. 6H, because a determination is made that computer system 600's use of the video application in living room 680*a* is associated with a stronger pattern of use (and/or a strong pattern of use) with respect to living room television 680*a*2, computer system 600 displays automatic connection notification 624. Automatic connection notification 624 includes leftward portion 624*a* and rightward portion 624*b*. As illustrated in FIG. 6H, leftward portion 624*a* includes graphical television indication 624*a*1, which indicates the type of device (e.g., a television) that corresponds to living room television 680*a*2. Moreover, leftward portion 624*a* also includes a graphical box art indication 624*a*2, which corresponds to box art for the video currently being played back via the video application that computer system 600 is currently executing. As illustrated in FIG. 6H, rightward portion 624*b* includes reset playback control 624*b*1. In some examples, in response to detecting input on reset playback control 624*b*1, computer system 600 stops output of media from living room television 680*a*2. As illustrated in FIG. 6H, automatic connection notification 624 also includes text indication 626, which indicates that computer system 600 is causing living room television 680*a*2 to play back the media from the video application (e.g., "LIVING ROOM TV CONNECTED").

As illustrated in FIG. 6H, automatic connection notification 624 is different than automatic connection notification 622 of FIG. 6C. In some examples, different types of devices are indicated with different graphical indications (e.g., graphical speaker indication 622*a*1 and graphical television indication 624*a*1 for a speaker type device and a television type device, respectively) in the respective automatic connection notification (e.g., automatic connection notification 622 and automatic connection notification 624) in the respective leftward portion (e.g., leftward portion 624*a* and leftward portion 622*a*). In some examples, different media is indicated (e.g., graphical album art indication 622*a*2 and graphical box art indication 624*a*2) in the respective notification in the respective leftward portion (e.g., leftward portion 624*a* and leftward portion 622*a* corresponding to the media being played back). In some examples, different text indications (e.g., text indication 630 and text indication 626) indicate the device that is connected. In some examples, the respective controls (e.g., reset playback control 622*b*1 and reset playback control 624*b*1) are visually the same and cause computer system 600 to perform one or more similar operations in response to detecting one or more inputs directed to the respective controls.

As illustrated in FIG. 6H, because a determination is made that computer system 600's use of the video application in living room 680*a* is associated with a stronger pattern of use (and/or a strong pattern of use) with respect to living room television 680*a*2, computer system 600 bolds route control 628. In some examples, computer system 600 alters additional and/or alternative visual characteristics of route control 628 (e.g., changes color, enlarges, shrinks, ceases to display, and/or replaces the representation).

At FIG. 6H, computer system 600 causes living room television 680*a*2 to play back media from the video application that was previously being played back by computer system 600 in FIG. 6G (e.g., as indicated by playback indicator 676*b*1 being closer to living room television 680*a*2 at FIG. 6H than playback indicator 676*b*1 is to user 642 at FIG. 6G) because a determination is made that computer system 600's use of the video application in living room 680*a* is associated with a stronger pattern of use (and/or a strong pattern of use) with respect to living room speaker 680*a*1. In some examples, sometime after displaying automatic connection notification 624, computer system 600 collapses and/or shrinks automatic connection notification 624 to fill interaction area 674 (e.g., as described above in relation to FIG. 6D). In some examples, computer system 600 detects an input on the pause control of the video application. In some examples, in response to detecting the input on the pause control of the video, computer system 600 pauses playback of the media on living room television 680*a*2 before detecting swipe input 605*h*. In some examples, computer system 600 causes living room television 680*a*2 to play back media from the video application when the video application initially begins operating in the foreground (e.g., in response to detecting swipe input 605*f*) and, in some of these examples, does not cause computer system 600 to output media corresponding to the video application before living room television 680*a*2 outputs media corresponding to the video application. In some examples, computer system 600 does not automatically cause external devices to play back media corresponding to applications that are operating in the background. In some examples, computer system 600 ceases to cause external devices to play back media corresponding to an application when the application starts operating in the background. In some examples, computer system 600 ceases to cause external devices to play back media corresponding to an application when the application starts operating in the background and another media application has started operating in the foreground. In some examples, computer system 600 ceases to cause external devices to play back media corresponding to an application when the application starts operating in the background and another media application that is currently causing media to be played has started operating in the foreground. In some examples, computer system 600 does not cease to cause external devices to play back media corresponding to an application when the application starts operating in the background and another media application that is not currently causing media to be played has started operating in the foreground.

FIGS. 6I-6J illustrate one or more scenarios where a computer system automatically connects to a different set of external devices while using the first application in a second micro-location based on having a strong pattern of use that corresponds to use of the first application at the second micro-location. At FIG. 6H, computer system 600 detects swipe input 605*h* directed to user interface element 632. As illustrated in FIG. 6I, in response to detecting swipe input 605*h*, computer system 600 displays music application user interface 610. Music application user interface 610 of FIG. 6I differs from music application user interface 610 of FIG. 6B, in that a period of time has passed (e.g., as indicated in the progress bar of the music application, FIG. 6B illustrates 0:15 of playback and FIG. 6I is illustrated with 1:15 of playback). At FIG. 6I, computer system 600 is in bedroom 680*b* while playing back media via the music application (e.g., as indicated by user 642 being in bedroom 680*b* and playback indicator 676*a*1 illustrated with respect to graphical representation of Jane's Home 680 and computer system 600 displaying music application user interface 610). In some examples, computer system 600 displays music application user interface 610 in response to detecting tap input 605*c*1 of FIG. 6C. Between FIGS. 6H and 6I user 642 moves from living room 680*a* at FIG. 6H to bedroom 680*b* at FIG. 6I.

At FIG. 6J, computer system 600's use of the music application in bedroom 680*b* is associated with a stronger pattern of use for bedroom television 680*b*2 than the pattern of use associated with bedroom speaker 680*b*1, as indicated by the pattern of use for bedroom television and music application row 692*b*2 of Table 692 ("STRONGER") compared to the pattern of use for bedroom speaker and music application row 692*b*1. At FIG. 6J, because a determination is made that computer system 600's use of the music application in bedroom 680*b* is associated with a stronger pattern of use for bedroom television 680*b*2, computer system 600 connects to bedroom television 680*b*2 and causes bedroom television 680*b*2 to play back music from the music application (e.g., as indicated by playback indicator 676*a*1 being closer to bedroom television 680*b*2 than user 642 in FIG. 6J). In addition, because a determination is made that computer system 600's use of the music application in bedroom 680*b* is associated with a stronger pattern of use for bedroom television 680*b*2, computer system 600 displays automatic connection notification 634. In some examples, at FIGS. 6I-6J, computer system 600 automatically switches between causing different types of external devices to play back media as computer system 600 moves between micro-locations. Thus, in some examples, computer system 600 switches the external devices that are caused to play back media corresponding to an application based on the micro-locations that computer system 600 is moving between without any intervening user input.

As illustrated in FIG. 6J, automatic connection notification 634 includes leftward portion 634*a* and rightward portion 634*b*. In FIG. 6J, leftward portion 634*a* includes graphical television indication 634*a*1, which indicates the type of device (e.g., a television) that corresponds to bedroom television 680*b*2. Moreover, leftward portion 634*a* also includes a graphical album art indication 634*a*2, which corresponds to album art for the music currently being played back via the music application that computer system 600 is currently executing. As illustrated in FIG. 6J, rightward portion 634*b* includes reset playback control 634*b*1. In some examples, in response to detecting an input on reset playback control 634*b*1, computer system 600 stops causing output of media from bedroom television 680*b*2. As illustrated in FIG. 6J, automatic connection notification 634 also includes text indication 636, which indicates that computer system 600 is causing bedroom television 680*b*2 to playback the media from the video application (e.g., "BEDROOM TV CONNECTED").

At FIG. 6J, automatic connection notification 634 is different than automatic connection notification 622 of FIG. 6C. The respective automatic connection notification (e.g., automatic connection notification 624 and automatic connection notification 634) is different because the pattern of use (e.g., stronger pattern of use) associated with each respective micro-location is different. In other words, although the music application is used in 6C and 6J, the pattern of use associated with living room 680*a* is stronger with respect to living room speaker 680*a*1, and the pattern of use associated with bedroom 680*b* is stronger with respect to bedroom television 680*b*2 (e.g., bedroom television and music application row 692*b*2 has a stronger pattern of use than the bedroom speaker and music application row 692*b*1 in Table 692 of FIGS. 6C and 6J compared to living room speaker and music application row 690*a*1 that has a stronger pattern of use than living room television application row 690*a*2 of FIGS. 6C and 6J).

FIGS. 6K-6L illustrate one or more scenarios where a computer system does not connect to a different set of external devices while using the first application. At FIG. 6K, computer system 600 is displaying music application user interface 610 while outputting media corresponding to the music application. In addition, computer system 600 is located in bedroom 680*b* and has a stronger pattern of use for the music application with bedroom television 680*b*2 (e.g., as described above in relation to FIG. 6J). However, at FIG. 6K, bedroom television 680*b*2 is currently outputting media (e.g., as indicated by playback indicator 676*b*1). As illustrated in FIG. 6L, computer system 600 continues to output media corresponding to the music application (e.g., as indicated by playback indicator 676*a*1) and does not cause bedroom television 680*b*2 to output different media (e.g., as indicated by playback indicator 676*b*1). Here, computer system 600 does not cause bedroom television 680*b*2 to output media corresponding to the music application because bedroom television 680*b*2 was currently playing media, irrespective of whether computer system 600 was determined to have stronger pattern of use for the music application with bedroom television 680*b*2. In some examples, computer system 600 causes bedroom television 680*b*2 to automatically output media corresponding to the music application, irrespective of whether bedroom television 680*b*2 is currently outputting media. In some examples, computer system 600 displays one or more suggestion notifications (e.g., as further discussed below) that indicate that computer system 600 can connect to bedroom television 680*b*2 and/or can cause bedroom television 680*b*2 to output different media.

FIG. 6M illustrates one or more scenarios where a computer system does not connect to a different set of external devices while using the first application and outputting media through a personal accessory device (e.g., headphones and/or earbuds). As illustrated in FIG. 6M, user 642 is wearing headphones 672, where headphones 672 are connected to computer system 600 and are outputting media corresponding to the music application of music application user interface 610. In addition, computer system 600 is located in bedroom 680*b* and has a stronger pattern of use for the music application with bedroom television 680*b*2 (e.g., as described above in relation to FIG. 6J). And, unlike in FIG. 6J, bedroom television 680*b*2 is not currently outputting media. However, at FIG. 6M, computer system 600 does not cause bedroom television 680*b*2 to output media corresponding to the music application because computer system 600 is currently causing headphones 672 to output media. In some examples, computer system 600 does not cause bedroom television 680*b*2 to output media corresponding to the music application when computer system 600 is currently outputting media via another external device, such as a fitness tracking device, an accessory (e.g., speakers and/or televisions), and/or another type of device.

FIGS. 6N-6P illustrate one or more scenarios where a computer system automatically connects to a particular set of external devices based on time criteria. To serve as explanation for these one or more scenarios, it should be understood that FIG. 6N occurs at a time after computer system 600 has manually switched from being connected to and causing living room speaker 680*a*1 to output media corresponding to the music application to being connected to living room television 680*a*2 to output media corresponding to the music application (e.g., via route picker user interface 660 in FIGS. 6F-6H). In addition, after the processes as illustrated in FIG. 6N occur, the processes as illustrated in FIG. 6O or FIG. 6P occur (e.g., for exemplary purposes only). At FIG. 6N, computer system 600 is located in living room 680*a* after being in bedroom 680*b* for some time and is outputting media corresponding to the media application represented by music application user interface 610.

At FIG. 6O, approximately one minute has passed since computer system 600 was manually connected to living room speaker 680*a*2 as illustrated in FIGS. 6F-6H. At FIG.

6O, a determination is made that computer system 600 manually connected to living room television 680*a*2 less than a threshold amount of time ago (e.g., 1-300 minutes, 1-60 days, and/or 1-60 weeks), which is associated with a weaker pattern of use for the music application (e.g., as indicated by living room speaker and music application row 690*a*1 of Table 690). At FIG. 6O, computer system 600 automatically connects to living room television 680*a*2 and causes living room television 680*a*2 to output media corresponding to the music application (e.g., as indicated by playback indicator 676*a*1 being close to living room television 680*a*2). At FIG. 6O, computer system 600 automatically connects to living room television 680*a*2 and causes living room television 680*a*2 to output media corresponding to the music application because approximately one minute is less than the threshold period of time, irrespective of whether living room television 680*a*2 has a stronger pattern of use or weaker pattern of use. In addition, at FIG. 6O, computer system 600 prioritizes automatically connecting to external devices, where a manual connection has been made within a threshold period of time (e.g., 1-300 minutes, 1-60 days, and/or 1-60 weeks), over external devices that have a stronger pattern of use (e.g., living room speaker 680*a*1 having a stronger pattern of use as indicated by living room speaker and music application row 690*a*1 of Table 690).

FIG. 6P illustrates a different scenario than FIG. 6O, where a determination is made that more than the threshold amount of time has passed since computer system 600 was manually connected to living room speaker 680*a*2 as illustrated in FIGS. 6F-6H. At FIG. 6P, computer system 600 automatically connects to living room speaker 680*a*1 and causes living room speaker 680*a*1 to output media corresponding to the music application because living room speaker 680*a*1 has a stronger pattern of use and more than the threshold amount of time has passed since computer system 600 was manually caused to connect to living room speaker 680*a*2 at FIGS. 6F-6H. In some examples, computer system 600 uses one or more techniques described above in relation to FIGS. 6B-6D to connect to living room speaker 680*a*1.

FIGS. 6Q-6R illustrate one or more scenarios where a computer system provides a suggestion to connect to a set of external devices. At FIG. 6Q, at a period of time after displaying music application user interface 610 of FIG. 6N or FIG. 6P, computer system 600 displays audiobook application user interface 640. At FIG. 6Q, computer system 600 is in living room 680*a* while playing back media via the audiobook application (e.g., as indicated by user 642 being in living room 680*a* and playback indicator 676*c*1 illustrated with respect to graphical representation of Jane's Home 680 and computer system 600 displaying audiobook application user interface 640).

At FIG. 6R, computer system 600's use of the audiobook application in living room 680*a* is associated with a weaker pattern of use for living room television 680*a*2 and living room speaker 680*a*1, as indicated by a pattern of use for living room speaker and audiobook application row 690*c*1 of Table 690 ("WEAKER") and a pattern of use for living room television and audiobook application row 690*c*2 of Table 690 ("WEAKER"). At FIG. 6R, although a determination is made that computer system 600's use of the audiobook application in living room 680*a* is associated with a weaker pattern of use (and/or a weak pattern of use) with respect to living room speaker 680*a*1 and/or living room television 680*a*2, a determination is made that the audiobook application and the music application are in the same category of applications (e.g., as described above for exemplary purposes only in relation to FIG. 6A). At FIG. 6R, the music application has a stronger pattern of use for living room speaker 680*a*1 (e.g., as indicated by living room speaker and music application row 690*a*1 of Table 690 ("STRONGER")). As illustrated in FIG. 6R, because a determination is made that the music application is in the same category of application as the audiobook application and the music application has a stronger pattern of use associated with living room speaker 680*a*1, computer system 600 displays suggested connection notification 644, which indicates that computer system 600 can be connected to living room speaker 680*a*1 (e.g., "LIVING ROOM SPEAKER TAP TO CONNECT"). Here, suggested connection notification 642 indicates that computer system 600 can be connected to living room speaker 680*a*1 instead of living room television 680*a*2 because of the music application's stronger pattern of use being associated with living room speaker 680*a*1 and not living room television 680*a*2. Notably, suggested connection notification 644 does not include an indication of the content that will be played back (e.g., no album art, cover art, and/or box art that is displayed with the automatic connection notification described herein). At FIG. 6R, computer system 600 does not actually connect to living room speaker 680*a*1 and/or cause living room speaker 680*a*1 to output media corresponding to the audiobook application because of the determination that the music application is in the same category of applications as the audiobook application and the music application has a stronger pattern of use associated with living room speaker 680*a*1. In some examples, computer system 600 does not actually connect to living room speaker 680*a*1 and/or cause living room speaker 680*a*1 to output media corresponding to the audiobook application because the audiobook application itself is not associated with a stronger pattern of use with living room speaker 680*a*1. In some examples, computer system 600 automatically connects to living room speaker 680*a*1 and/or causes living room speaker 680*a*1 to output media corresponding to the audiobook application because an application in the same category of applications (e.g., the music application) has a stronger pattern of use with living room speaker 680*a*1 at FIG. 6R.

As illustrated in FIG. 6R, suggested connection notification 644 includes leftward portion 644*a* and rightward portion 644*b*. As illustrated in FIG. 6R, leftward portion 644*a* includes graphical speaker indication 644*a*1, which indicates the type of device (e.g., a television) that corresponds to living room television 680*a*2. Moreover, leftward portion 644*a* also includes a graphical cover art indication 644*a*2, which corresponds to cover art for the audiobook currently being played back via the audiobook application that computer system 600 is currently executing. As illustrated in FIG. 6R, rightward portion 644*b* includes route picker playback control 644*b*1, which is notably different from the reset playback control 622*b*1 displayed in a rightward portion of an automatic connection notification (e.g., automatic connection notification 622 as described above in relation to FIG. 6C). In some examples, suggested connection notification 644 does not need to include a reset playback control because computer system 600 has not been automatically connected to an external device due to the determination that caused suggested connection notification 644 to be displayed. As illustrated in FIG. 6R, suggested connection notification 644 also includes text indication 646, which indicates that computer system 600 will cause living room speaker 680*a*1 to play back the media from the audiobook application in response to detecting a tap input on suggested connection notification 644 (e.g., "LIVING ROOM SPEAKER TAP TO CONNECT"). At FIG. 6R, computer system 600 detects tap input 605r1 directed to leftward portion 644a or detects tap input 605r2 directed to rightward portion 644b.

At FIG. 6S, in response to detecting tap input 605r1 or tap input 605r2, computer system 600 automatically connects to living room speaker 680a1 and causes living room speaker 680a1 to output media corresponding to the audiobook application (e.g., as indicated by playback indicator 676c1). Notably, computer system 600 performs the same operation (e.g., automatically connects to living room speaker 680a1) irrespective of whether an input is detected on the rightward portion of a suggested connection notification or the leftward portion of the suggested connection notification. However, as described in relation to automatic connection notification 622 and tap inputs 605c1 and 605c2, computer system 600 performs different operations based on whether an input is detected on the rightward portion or the leftward portion of an automatic connection notification. Looking back at FIG. 6R, computer system 600 also detected tap input 605r3 on route picker control 618.

As illustrated in FIG. 6S, in response to detecting tap input 605r3, computer system 600 displays route picker user interface 660 using one or more techniques as described above in relation to FIG. 6E. As illustrated in FIG. 6S, computer system 600 is displaying route selection control 662b2 with an indication (e.g., checkmark) that media (e.g., from the audiobook application, as indicated by playback indicator 676c1) is being routed to living room speaker 680a1 but is not displaying route selection control 662b1 with an indication (e.g., no checkmark) that media is being routed to living room television 680a2. At FIG. 6S, computer system 600 detects tap input 605s1 directed to route selection control 662b1 and tap input 605s2 directed to route selection control 662b2.

At FIG. 6T, in response to detecting tap input 605s1, computer system 600 ceases to output media from living room speaker 680a1 and begins to output media corresponding to the audiobooks application from living room television 680a2 (e.g., indicated by computer system 600 removing the checkmark from route selection control 662b2). Moreover, at FIG. 6T, computer system 600 causes living room television 680a2 to output media corresponding to the audiobooks application in response to detecting tap input 605s2 (e.g., indicated by computer system 600 adding the checkmark to route selection control 662b2 and playback indicator 676c1 being closer to living room television 680a2 than living room speaker 680a1 in FIG. 6T). At FIG. 6T, a determination is made that the pattern of use associated with the audiobook application and living room television 680a2 should be a stronger pattern of use. Thus, at FIG. 6T, living room television and audiobook application row 690c2 of Table 690 has been updated to reflect this determination (e.g., "STRONGER" in FIG. 6T changed from "WEAKER" in FIG. 6S). In some examples, the determination is made that the pattern of use associated with the audiobook application and living room television 680a2 should be a stronger pattern of use based on computer system 600 manually connecting to living room television 680a2 for outputting media corresponding to the audiobook application a threshold number of times, where the manual connection described in relation to FIGS. 6S-6T was the manual connection needed to pass the threshold. In some examples, this determination is made based on historical uses involving the audiobook application and living room television 680a2 in view of the use described in FIGS. 6S-6T. In some examples, this determination is made based on historical uses of one or more other computer systems (e.g., associated with the same user and/or account as computer system 600) and/or a historical use of one or more applications that are in the same category of applications as the audiobook application.

FIGS. 6U-6V illustrate one or more scenarios where a computer system displays a suggested connection notification for an external device that has been newly added (e.g., newly installed on a device and/or newly added to a network (e.g., a home network, an office network, and/or a smart device network) of external devices). At FIG. 6U, computer system 600 is displaying podcast application control 604d and is currently outputting media corresponding to podcast application user interface 650. As illustrated in FIG. 6U (e.g., as indicated by playback indicator 676d1 being close to user 642), computer system 600 is located in living room 680a, which includes living room subwoofer 680a3 in addition to living room speaker 680a1 and living room television 680a2. Living room subwoofer 680a3 has been newly added to living room 680a (e.g., recently connected to a network of external devices associated with living room 680a) (e.g., as indicated by table 694 indicated with "-" as the pattern of use). At FIG. 6U, a determination is made that living room subwoofer 680a3 has been newly added to living room 680a. As illustrated in FIG. 6V, because the determination is made that living room subwoofer 680a3 has been newly added to living room 680a, computer system 600 displays suggested connection notification 652 (e.g., using one or more similar techniques to those described above in relation to automatic connection notification 624). Suggested connection notification 652 indicates that selecting the notification will cause computer system 600 to connect to room subwoofer 680a3 (e.g., using one or more techniques described above in relation to FIG. 6R). In some examples, computer system 600 displays suggested connection notification 652 because a determination is made that living room subwoofer 680a3 has been newly added to living room 680a and that the podcast application does not have a stronger pattern of use with any external device in living room 680a (e.g., as indicated by Table 694).

FIG. 6W-6X illustrates one or more scenarios where a computer system displays a suggested connection notification when computer system 600 is at a new location and/or a non-location of interest, such as a public place, a park, and/or a hotel room. At FIG. 6W, user 642 is located in hotel room 696. Hotel room 696 includes hotel room speaker 696a1 and hotel television 6962a2. At FIG. 6W, computer system 600 is also displaying video application user interface 620 while outputting media corresponding to video application user interface 620.

As illustrated in FIG. 6W, computer system 600 displays automatic suggestion notification 682, which indicates that computer system 600 can be connected to hotel television 696a2. Here, computer system 600 displays automatic suggestion notification 682 even though computer system 600 has no pattern of use associated with hotel television 696a2. In some examples, automatic suggestion notification 682 indicates that computer system 600 can be connected to hotel television 696a2 because computer system 600 is currently outputting media corresponding to the video application. In some examples, automatic suggestion notification 682 would indicate that another type of external device could be connected (e.g., in situations where computer system 600 is playing music, a speaker can be recommended instead of the television). In some examples, computer system 600 does not automatically connect to external devices in a non-location of interest. In some examples, computer system 600 automatically connects to external devices in a location of interest (e.g., a private space, a friend's living room, a stranger's bathroom, and/or an office) even if computer system 600 has never visited the location. In some examples, computer system 600 does not automatically connect to external devices in a location of interest when computer system 600 has never visited the location. At FIG. 6W, computer system 600 detects tap input 605*w* directed to automatic suggestion notification 682. As illustrated in FIG. 6X, in response to detecting tap input 605*w*, computer system 600 connects to and causes hotel television 696*a*2 to output media (e.g., as indicated by playback indicator 676*b*1).

FIG. 7 is a flow diagram illustrating a method (e.g., method 700) for automatically connecting an external device in accordance with some examples. Some operations in method 700 are, optionally, combined, the orders of some operations are, optionally, changed, and some operations are, optionally, omitted.

As described below, method 700 provides an intuitive way for automatically connecting an external device. Method 700 reduces the cognitive burden on a user for automatically connecting an external device, thereby creating a more efficient human-machine interface. For battery-operated computing devices, enabling a user to automatically connect to an external device faster and more efficiently conserves power and increases the time between battery charges.

In some examples, method 700 is performed at a first computer system (e.g., 600). In some examples, the first computer system is a phone, a watch, a tablet, a fitness tracking device, a wearable device, a television, a multimedia device, an accessory, a speaker, a head-mounted display (HMD), and/or a personal computing device. In some examples, the first computer system is in communication with input and/or output devices, such as one or more cameras, speakers, microphones, and/or sensors (e.g., heart rate sensor, monitors, Bluetooth, near-field communication sensors, and/or Wi-Fi sensors).

At 702, while the first computer system (e.g., 600) is at a location (e.g., a location inside of a home, building, and/or office and/or a trusted location) (e.g., a portion of a physical location and/or environment), the first computer system detects a use of a set of one or more applications (e.g., as indicated by 604*a*, 604*b*, 604*c*, 604*d*, 610, 620, 650, and/or 660) (e.g., one or more applications (e.g., a music, audiobook, video, movie, educational, and/or entertainment application) and/or one or more applications in one or more categories of applications) (e.g., at and/or via the first computer system), wherein the use corresponds to (e.g., includes one or more characteristics of and/or is tracked as belonging to) a pattern of use (e.g., 690) associated with (e.g., the pattern of use of the set of one or more applications meets a threshold frequency of use of a particular device associated with, assigned to, and/or designated to be included at the location, location associated with the pattern of use at and/or corresponding to a particular type of location, location associated with pattern of use is a location of interest, and/or the use is in the foreground) the set of one or more applications and the location (e.g., 680, 680*a*, 680*b*, and/or 696). In some examples, the use includes one of more tracked gestures, inputs, taps, and/or selections directed to one or more user interfaces of the set of one or more applications. In some examples, the use includes operation of an application in the foreground and does not include operation of the application in the background. In some examples, the use includes displaying the application in the foreground and/or displaying the application the background. In some examples, the use of the set of one or more applications is detected while the first computer system is displaying a user interface that corresponds to an application in the set of one or more applications. In some examples, a pattern of use includes multiple tracked uses of an application and/or a set of applications and/or of a computer system at different instances in time, over different and/or distinct time periods, and/or at one or more distinct locations (e.g., micro-locations (e.g., as described above in FIGS. 6B and/or 6J), such as rooms within a building, offices within a building, and/or rooms (e.g., 680*a*, and/or 680*b*) within a house (e.g., 680)). In some examples, as a part of detecting the use, the first computer system detects the pattern of use.

At 704, in response to detecting the use of the set of one or more applications (e.g., as indicated by 604*a*, 604*b*, 604*c*, 604*d*, 610, 620, 650, and/or 660) and in accordance with (at 706) a determination that a first set of one or more use criteria (e.g., the pattern of use of the set of one or more applications meets a threshold confidence with respect to a particular device associated with, assigned to, and/or designated to be included at the location) is satisfied with respect to (e.g., one or more of, any of, and/or all of) the use and the pattern of use (e.g., 690), the first computer system automatically (e.g., without intervening user input to cause the content to be associated with another computer system) causes output of content (e.g., 676*a*1, 676*b*1, 676*c*1, and/or 676*d*1) (e.g., media content, video media, photo media, audio media, and/or written media) (e.g., via one or more output devices, such as a speaker and/or a haptic output device) associated with the set of one or more applications (e.g., as indicated by 604*a*, 604*b*, 604*c*, 604*d*, 610, 620, 650, and/or 660) via (e.g., at, on, using, and/or by way of) a second computer system (e.g., 680*a*1, 680*a*2, 680*b*1, and/or 680*b*2) (e.g., a home audio device, a home video device, a watch, a tablet, a fitness tracking device, a wearable device, a television, a multi-media device, an accessory, a speaker, a head-mounted display (HMD), and/or a personal computing device) different from the first computer system (e.g., 600).

At 704, in response to detecting the use of the set of one or more applications (e.g., as indicated by 604*a*, 604*b*, 604*c*, 604*d*, 610, 620, 650, and/or 660) and in accordance with (at 708) a determination that a second set of one or more use criteria (e.g., the pattern of use of the set of one or more applications meets a threshold frequency of use of a particular device associated with, assigned to, and/or designated to be included at the location, a location associated with the pattern of use at a particular type of location, a location associated with pattern of use is a location of interest, and/or the use is in the foreground), different from (e.g., corresponds to a different device and/or a different type of device at the location than the device and/or type of device that is associated with the first set of use criteria) the first set of one or more use criteria, is satisfied with respect to the use and the pattern of use (e.g., 690), the first computer system automatically causes output of the content (e.g., 676*a*1, 676*b*1, 676*c*1, and/or 676*d*1) associated with the set of one or more applications (e.g., as indicated by 604*a*, 604*b*, 604*c*, 604*d*, 610, 620, 650, and/or 660) via (e.g., on, using, and/or by way of) a third computer system (e.g., as indicated by 604*a*, 604*b*, 604*c*, 604*d*, 610, 620, 650, and/or 660) (e.g., a home audio device, a home video device, a watch, a tablet, a fitness tracking device, a wearable device, a television, a multi-media device, an accessory, a speaker, a head-mounted display (HMD), and/or a personal computing device) different from the first computer system (e.g., 600) and the second computer system (e.g., 680*a*1, 680*a*2, 680*b*1, and/or 680*b*2). In some examples, in response to detecting a respective use of a respective application and in accordance with a determination that the respective use does not correspond to a pattern of use associated with the set of one or more applications, the first computer system does not automatically cause output of content associated with the respective application via another computer system. In some examples, in response to detecting a second use of the set of one or more applications and in accordance with a determination that the use does not correspond to a pattern of use associated with the location (and/or a computer system associated with the location), the first computer system does not automatically cause output of content associated with the set of one or more applications via another computer system. In some examples, in response to detecting the use of the set of one or more applications and in accordance with a determination that the first set of one or more use criteria is satisfied with respect to the use and the pattern of use, the first computer system does not automatically cause output of content associated with the set of one or more applications via the third computer system. In some examples, in response to detecting the use of the set of one or more applications and in accordance with a determination that the second set of one or more use criteria is satisfied with respect to the use and the pattern of use, the first computer system does not automatically cause output of content associated with the set of one or more applications via the second computer system. In some examples, in response to detecting the use of the set of one or more applications and in accordance with a determination that the first set of one or more use criteria is satisfied with respect to the use and the pattern of use (or, in some examples, in accordance with a determination that the second set of one or more use criteria is satisfied with respect to the use and the pattern of use), the first computer system ceases to cause output of content associated with the set of one or more applications via the third computer system. In some examples, in response to detecting the use of the set of one or more applications and in accordance with a determination that the first set of one or more use criteria is satisfied with respect to the use and the pattern of use (or, in some examples, in accordance with a determination that the second set of one or more use criteria is satisfied with respect to the use and the pattern of use), the first computer system continues to cause and/or initiates causing output of content associated with the set of one or more applications via the third computer system. Automatically causing output of content associated with the set of one or more applications via the second computer system and/or causing output of content associated with the set of one or more applications via the third computer system based on one or more prescribed conditions being met enables the first computer system to automatically route content to a respective computer system for a respective type of application based on the pattern of use, thereby reducing the number of inputs needed to perform an operation, providing improved feedback to the user, and performing an operation when a set of conditions has been met without requiring further user input.

In some examples, the first set of one or more use criteria includes a criterion that is satisfied when a determination is made that the location (e.g., 680, 680*a*, 680*b*, and/or 696) is a first type of location (e.g., a location of interest, a living room, a bedroom, an/or a micro-location inside of a particular area and/or location (e.g., a room inside of a home, an office inside of a building, a cubicle inside of a room, and/or a restroom inside of a store)). In some examples, the first set of one or more use criteria does not include a criterion that is satisfied when a determination is made that the location is a second type of location that is different from the first type of location (e.g., as described above in FIGS. 6B-6C, 6G-6J, 6Q-6R, and/or 6U-6V). In some examples, the second set of one or more use criteria includes a criterion that is satisfied when a determination is made that the location is the second type of location (e.g., a location of interest, a micro-location, a non-location of interest, the first type of location, and/or a location that is different from the second type of location). In some examples, the second set of one or more use criteria does not include the criterion that is satisfied when the determination is made that the location is the first type of location. In some examples, the first type of location is a location of interest. In some examples, the second type of location is a location of interest that is different from the first location of interest. In some examples, the second type of location is a non-location of interest. Automatically causing output of content associated with the set of one or more applications via the second computer system based on a determination that the location is a first type of location and automatically causing output of content associated with the set of one or more applications via the third computer system based on a determination that the location is a second type of location enables the first computer system to automatically route content to a respective computer system based on the pattern of use associated with a particular type of location, thereby reducing the number of inputs needed to perform an operation, providing improved feedback to the user, and performing an operation when a set of conditions has been met without requiring further user input.

In some examples, the first set of one or more use criteria includes a criterion that is satisfied when a determination is made that the pattern of use (e.g., 690) of the set of one or more applications (e.g., as indicated by 604*a*, 604*b*, 604*c*, 604*d*, 610, 620, 650, and/or 660) is above a respective threshold confidence level (e.g., a strong pattern of use and/or a confidence level that is based on and/or includes a frequency of the use, a type of location (e.g., bedroom, living room, and/or kitchen), a type of use (e.g., playback music, stream video, and/or initiate HMD media), and/or a type of content associated with the pattern of use (e.g., music, video, and/or HMD media)) associated with (e.g., corresponding to, assigned to, and/or designated to be included at) the location (e.g., as described above in FIGS. 6B-6C, 6G-6J, 6Q-6R, and/or 6U-6V). In some examples, the second set of one or more use criteria includes a second criterion that is satisfied when a determination is made that the pattern of use of the set of one or more applications is above the respective threshold confidence level associated with the location. In some examples, the criterion that is satisfied when a determination is made that the pattern of use of the set of one or more applications is above a respective threshold confidence level is a first criterion, and in accordance with a determination that the first criterion is not satisfied (e.g., a weak pattern of use and/or a weaker pattern of use than a strong pattern of use), the first computer system does not (e.g., forgoes) automatically cause output of content associated with the set of one or more applications. In some examples, in accordance with a determination that the second criterion is not satisfied (e.g., a weak pattern of use and/or a weaker pattern of use than a strong pattern of use), the first computer system does not automatically cause output of content associated with the set of one or more applications. In some examples, in accordance with a determination that the pattern of use of the set of one or more applications is below the respective threshold confidence level, the first set of one or more use criteria and/or the second set of one or more use criteria is not satisfied. Automatically causing output of content associated with the set of one or more applications via the second computer system based on the pattern of use being above the threshold confidence level enables the first computer system to automatically route content when a pattern of use is determined to have at least a threshold level of confidence and/or the computer system is confident that the pattern of use is a particular type of pattern of use (e.g., strong versus weak), thereby reducing the number of inputs needed to perform an operation, providing improved feedback to the user, and performing an operation when a set of conditions has been met without requiring further user input.

In some examples, the first set of one or more use criteria includes a criterion that is satisfied when a determination is made that the set of one or more applications (e.g., as indicated by 604*a*, 604*b*, 604*c*, 604*d*, 610, 620, 650, and/or 660) includes an application (e.g., as indicated by 604*a*, 604*b*, 604*c*, 604*d*, 610, 620, 650, and/or 660) (e.g., that corresponds to a first application) that was previously used at the location (e.g., 680, 680*a*, 680*b*, and/or 696) (e.g., as described above in FIGS. 6B-6C, 6G-6J, 6Q-6R, and/or 6U-6V). In some examples, the first set of one or more use criteria does not include a criterion that is satisfied when a determination is made that the set of one or more applications does not include the application that was previously used at the location. In some examples, the second set of one or more use criteria includes a criterion that is satisfied when a determination is made that the set of one or more applications includes an application (e.g., that corresponds to a second application) that was previously used at the location. Automatically causing output of content associated with the set of one or more applications via the second computer system and/or via the third computer system based on an application that was being previously used at the location enables the first computer system to automatically route content to a respective computer system for a respective application previously used at the location and, in some examples, enables the computer system to provide a user with an automatic connection that matches the application previously used at the location, thereby reducing the number of inputs needed to perform an operation, providing improved feedback to the user, and performing an operation when a set of conditions has been met without requiring further user input.

In some examples, the first set of one or more use criteria includes a criterion that is satisfied when a determination is made that at least one application (e.g., as indicated by 604*a*, 604*b*, 604*c*, 604*d*, 610, 620, 650, and/or 660) in the set of one or more applications (e.g., as indicated by 604*a*, 604*b*, 604*c*, 604*d*, 610, 620, 650, and/or 660) is operating in the foreground (e.g., as described above in FIGS. 6I-6H) (e.g., of the first computer system and/or as a foreground process) (and are not operating in the background and/or as a background process). In some examples, an application is operating in the foreground when a user interface of the application is currently being displayed and/or overlayed by another user interface by the first computer system, is currently in focus, is currently selected, and/or is currently being interacted with. In some examples, an application is operating in the background when a user interface is not currently being displayed by the first computer system, is not currently in focus, is not currently selected, is not currently being interacted with, and/or is not currently updating and/or being altered. In some examples, the second set of one or more use criteria includes a criterion that is satisfied when a determination is made that at least one application of the set of one or more in the set of one or more applications is operating in the foreground. In some examples, in accordance with a determination that at least one application in the set of one or more applications is operating in the background, the first set of one or more use criteria and/or the second set of one or more use criteria is not satisfied. Automatically causing output of content associated with the set of one or more applications via the second computer system and/or causing output of content associated with the set of one or more applications via the third computer system based on at least one application in the set of one or more applications operating in the foreground enables the first computer system to automatically route content to a respective computer system for a respective application operating in the foreground based on the pattern of use, thereby reducing the number of inputs needed to perform an operation, providing improved feedback to the user, and performing an operation when a set of conditions has been met without requiring further user input.

In some examples, the first set of one or more use criteria includes a criterion that is satisfied when a determination is made that the location (e.g., 680, 680*a*, 680*b*, and/or 696) is a location of interest (e.g., as described above in FIGS. 6W-6X) (e.g., defined and/or designated by a user of the first computer system) (e.g., defined and/or automatically designated). In some examples, the first set of one or more use criteria (and/or the second set of one or more use criteria) does not include a criterion that is satisfied when a determination is made that the location is not a location of interest. In some examples, the second set of one or more use criteria includes a criterion that is satisfied when a determination is made that the location is a location of interest. In some examples, the location of interest is a particular type of location and/or a private location and/or a location that is limited to a particular set of users (and, in some examples, during a particular timeframe). In some examples, a non-location of interest is a public location and/or a location that is not limited to a particular set of users (and, in some examples, during a particular timeframe). Automatically causing output of content associated with the set of one or more applications via the second computer system and/or causing output of content associated with the set of one or more applications via the third computer system based on the location being the location of interest enables the first computer system to automatically route content to a respective computer system based on a pattern of use being detected at a location of interest, thereby reducing the number of inputs needed to perform an operation, providing improved feedback to the user, and performing an operation when a set of conditions has been met without requiring further user input.

In some examples, the first set of one or more use criteria includes a criterion that is satisfied when a determination is made that the first computer system (e.g., 600) is not in communication with (and/or, in some examples, is not connected to, is not active with respect to, is not within a certain proximity of (e.g., 0.1-5 meters), and/or has been previously in communication with while within a certain proximity of) one or more personal devices (e.g., 672) (e.g., as described above in FIG. 6M) (e.g., a peripheral device, an output device, a Bluetooth speaker, a new device, and/or a set of headphones) (e.g., with respect to the use of the set of one or more applications) (e.g., with respect to the one or more personal devices currently outputting media with respect to the set of one or more applications). In some examples, the second set of one or more use criteria includes a criterion that is satisfied when a determination is made that the first computer system is not connected to and/or in communication with the one or more personal devices. In some examples, the first set of one or more use criteria (and/or second set of one or more use criteria) does not include a criterion that is satisfied when a determination is made that the first computer system is connected to one or more personal devices. Automatically causing output of content associated with the set of one or more applications via the second computer system and/or causing output of content associated with the set of one or more applications via the third computer system based on the first computer system being in communication with one or more personal devices enables the first computer system to automatically route content to a respective computer system based on the pattern of use and the first computer system not being in communication with one or more personal devices and, in some examples, enables the computer system to reliably automatically connect to the respective computer system without erroneously removing connection to the personal device, thereby reducing the number of inputs needed to perform an operation, providing improved feedback to the user, and performing an operation when a set of conditions has been met without requiring further user input.

In some examples, the first set of one or more use criteria includes a criterion that is satisfied when a determination is made that the first computer system (e.g., 600) is not currently outputting (e.g., not playing back and/or configured to playback) media (e.g., 676a1, 676b1, 676c1, and/or 676d1) (e.g., music, video, and/or photo media). In some examples, the first set of one or more use criteria does not include a criterion that is satisfied when a determination is made that the first computer system is currently outputting media (e.g., as described above in FIGS. 6K-6L). In some examples, the second set of one or more use criteria includes a criterion that is satisfied when a determination is made that the first computer system is not currently outputting (e.g., not playing back and/or configured to playback) media (e.g., music, video, and/or photo media). In some examples, the second set of one or more use criteria does not include a criterion that is satisfied when a determination is made that the first computer system is currently outputting media. In some examples, the first computer system is assigned to and/or logged into a user (e.g., a user account) of the first computer system, the second computer system is assigned to and/or logged into the user of the first computer system, and/or the third computer system is assigned to and/or logged into the user of the first computer system. In some examples, the first computer system is a threshold distance (e.g., a predetermined proximity, and/or a proximity configured to enable communication (e.g., via ultra-wide sensors, Bluetooth, and/or Wi-Fi)) from the second computer system and/or the first computer system is within the threshold distance from the second computer system. In some examples, the first computer system is a first type of device (e.g., a new device and/or a category of devices (e.g., an audio device (e.g., speaker), a video device (e.g., display, television, and/or computer), and/or an HMD device)), the second computer system is the first type of device, and/or the third computer system is the first type of device. Automatically causing output of content associated with the set of one or more applications via the second computer system and/or causing output of content associated with the set of one or more applications via the third computer system based on whether or not the first computer system is currently outputting media enables the first computer system to automatically route content to a respective computer system and, in some examples, enables the computer system to not disrupt playback of media that is currently being output, thereby reducing the number of inputs needed to perform an operation, providing improved feedback to the user, and performing an operation when a set of conditions has been met without requiring further user input.

In some examples, the set of one or more applications (e.g., as indicated by 604a, 604b, 604c, 604d, 610, 620, 650, and/or 660) include an application that corresponds to a first category of applications, and the pattern of use (e.g., 690) is a pattern of use (and/or, in some examples, a pattern of use for the particular application and/or a pattern of use for particular application that overrides a pattern of use for the category of applications) that is associated with the first category of applications (e.g., as described above in FIGS. 6A-6B and 6R). In some examples, the pattern of use that causes the first set of one or more use criteria to be satisfied (and/or the pattern of use that causes the second set of one or more use criteria to be satisfied) is satisfied based on use of an application that corresponds to the first category and is not in the set of one or more applications. Automatically causing output of content associated with the set of one or more applications via the second computer system and/or causing output of content associated with the set of one or more applications via the third computer system based on the category of use to which the pattern of use corresponds enables the first computer system to automatically route content to the respective computer system for a respective category of applications even if, in some examples, the application producing the content was not used in establishing the pattern of use, thereby reducing the number of inputs needed to perform an operation, providing improved feedback to the user, and performing an operation when a set of conditions has been met without requiring further user input.

In some examples, detecting the use of the set of one or more applications (e.g., as indicated by 604a, 604b, 604c, 604d, 610, 620, 650, and/or 660) includes detecting that a respective application in the set of one or more applications is operating in the foreground (e.g., as described above in FIGS. 6I-6H). In some examples, detecting the use of the set of one or more applications includes causing the respective application to operate in the foreground. In some examples, detecting the use of the set of one or more applications includes displaying a user interface corresponding to the respective application in the set of one or more applications to operate in the foreground. In some examples, detecting the use of the set of one or more applications includes causing the respective application to stop operating in the background, to operate in the foreground, and/or changing a process corresponding to the respective application to become a foreground process and/or changing the process corresponding to the respective application from a background process to a foreground process. In some examples, in accordance with a determination that the respective operation has transitioned from operating in the foreground to operating in the background, the first computer system ceases to cause output of the content at the second computer system and/or the third computer system. Detecting that the respective application in the set of one or more applications is operating in the foreground as a part of detecting the use of the set of one or more applications enables the first computer system to automatically route content to a respective computer system for a respective type of application running in the foreground based on the pattern of use and, in some examples, prevents erroneous automatic connections for applications that are in the background, thereby reducing the number of inputs needed to perform an operation, providing feedback to the user, and performing an operation when a set of conditions has been met without requiring further user input.

In some examples, after automatically causing output of content (e.g., 676a1, 676b1, 676c1, and/or 676d1) associated with the set of one or more applications (e.g., as indicated by 604a, 604b, 604c, 604d, 610, 620, 650, and/or 660) via the second computer system (e.g., 680a1, 680a2, 680b1, and/or 680b2), the first computer system detects a set of one or more inputs (e.g., 605e2, 605r1, 605r2, and/or 605w). In some examples, in response to detecting the set of one or more inputs, the first computer system causes output of content associated with the set of one or more applications via a fourth computer system (e.g., 680a1, 680a2, 680b1, and/or 680b2) that is different from the second computer system (and, in some examples, the third computer system) (and, in some examples, ceasing to cause output of the content via the second computer system). In some examples, after causing output of content associated with the set of one or more applications via the fourth computer system (and, in some examples, after ceasing to cause output of the content via the second computer system), the first computer system detects a second use of one or more applications (e.g., a use as described above) in the set of one or more applications at the location (e.g., 680, 680a, 680b, and/or 696). In some examples, the use of the set of application is a first use. In some examples, the second use is different from the first use. In some examples, the second use is the same as the first use. In some examples, in response to detecting the second use of the one or more applications in the set of one or more applications, in accordance with a determination that a predetermined period of time (e.g., 0.1-1000000 seconds, minutes, hours, and/or days) has not elapsed since content associated with the set of one or more applications was output (e.g., initially and/or last previously causes to be output) via the fourth computer system (and, in some examples, in accordance with a determination that the first set of one or more use criteria is satisfied with respect to the second use of the one or more applications in the set of one or more applications), the first computer system automatically causes output of the content associated with the set of one or more applications via the fourth computer system (e.g., as described above in FIGS. 6N-6O) (and, in some examples, without automatically causing output of the content associated with the set of one or more applications via the second computer system). In some examples, in response to detecting the second use of the one or more applications in the set of one or more applications, in accordance with a determination that the predetermined period of time has elapsed since content associated with the set of one or more applications was output (e.g., initially and/or last previously caused to be output) via the fourth computer system (and, in some examples, in accordance with a determination that the first set of one or more use criteria is satisfied with respect to the second use of the one or more applications in the set of one or more applications), the first computer system automatically causes output of the content associated with the set of one or more applications via the second computer system (e.g., as described above in FIGS. 6O and 6P) (and, in some examples, without automatically causing output of the content associated with the set of one or more applications via the fourth computer system). In some examples, after automatically causing output of content associated with the set of one or more applications via the second computer system, the first computer system detects a second set of one or more inputs. In some examples, in response to detecting the second set of one or more inputs, the first computer system causes output of content associated with the set of one or more applications via a fifth computer system that is different from the second computer system (and, in some examples, the second computer system) (and, in some examples, ceasing to cause output of the content via the second computer system). In some examples, after causing output of content associated with the set of one or more applications via the fifth computer system (and, in some examples, after ceasing to cause output of the content via the second computer system), the first computer system detects a third use of one or more applications (e.g., a use as described above) in the set of one or more applications at the location. In some examples, the third use is different from the first use. In some examples, the third use is the same as the first use. In some examples, in response to detecting the third use of the one or more applications in the set of one or more applications, the first computer system, in accordance with a determination that a second predetermined period of time (e.g., the predetermined period of time and/or another predetermined period of time that is different from the predetermined period of time) (e.g., 0.1-1000000 seconds, minutes, hours, and/or days) has not passed since the content was caused to be output via the fifth computer system (and/or, in some examples, since the first set of one or more use criteria was satisfied with respect to the use of the one or more applications (and, in some examples, in accordance with a determination that the first set of one or more use criteria is satisfied with respect to the second use of the one or more applications in the set of one or more applications)), automatically causes output of the content associated with the set of one or more applications via the fifth computer system (and, in some examples, without automatically causing output of the content associated with the set of one or more applications via the second computer system), and in accordance with a determination that the predetermined period of time has passed since the content was caused to be output via the fifth computer system (and, in some examples, the first set of one or more use criteria was satisfied with respect to the use of the one or more applications (and, in some examples, in accordance with a determination that the first set of one or more use criteria is satisfied with respect to the second use of the one or more applications in the set of one or more applications)), automatically causes output of the content associated with the set of one or more applications via the second computer system (and, in some examples, without automatically causing output of the content associated with the set of one or more applications via the fifth computer system). In some examples, after automatically causing output of content associated with the set of one or more applications via the third computer system, the first computer system detects a set of one or more inputs, and in response to detecting the set of one or more inputs, the first computer system causes output of content associated with the set of one or more applications via a sixth computer system that is different from the third computer system (and, in some examples, the second computer system) (and, in some examples, ceasing to cause output of the content via the second computer system). In some examples, after causing output of content associated with the set of one or more applications via the sixth computer system (and, in some examples, after ceasing to cause output of the content via the second computer system), the first computer system detects a fourth use of one or more applications (e.g., a use as described above) in the set of one or more applications at the location. In some examples, the fourth use is different from the first use. In some examples, the fourth use is the same as the first use. In some examples, in response to detecting the fourth use of the one or more applications in the set of one or more applications and in accordance with a determination that the predetermined period of time (e.g., 0.1-1000000 seconds, minutes, hours, and/or days) has not passed since the content was caused to be output via the sixth computer system (and, in some examples, the second set of one or more use criteria was satisfied with respect to the use of the one or more applications (and, in some examples, in accordance with a determination that the second set of one or more use criteria is satisfied with respect to the fourth use of the one or more applications in the set of one or more applications)), the first computer system automatically causes output of the content associated with the set of one or more applications via the third computer system (and, in some examples, without automatically causing output of the content associated with the set of one or more applications via the sixth computer system). In some examples, in accordance with a determination that the predetermined period of time has passed since the content was caused to be output via the sixth computer system (and, in some examples, the first set of one or more use criteria was satisfied with respect to the use of the one or more applications (and, in some examples, in accordance with a determination that the second set of one or more use criteria is satisfied with respect to the fourth use of the one or more applications in the set of one or more applications)), the first computer system automatically causes output of the content associated with the set of one or more applications via the third computer system (and, in some examples, without automatically causing output of the content associated with the set of one or more applications via the sixth computer system). Automatically causing output of the content associated with the set of one or more applications via the fourth computer system in accordance with a determination that a predetermined period of time has not passed since content associated with the set of one or more applications was caused to be output via the fourth computer system and/or automatically causing output of the content associated with the set of one or more applications via the second computer system in accordance with a determination that the predetermined period of time has passed since content associated with the set of one or more applications was caused to be output via the fourth computer system enables the first computer system to automatically cause output via a respective computer system based on the recency of the connection and, in some examples, allows the first computer system to automatically cause output via the most recent respective computer system and not necessarily one with the strongest pattern of use, thereby reducing the number of inputs needed to perform an operation, providing improved feedback to the user, and performing an operation when a set of conditions has been met without requiring further user input.

In some examples, the first computer system (e.g., 600) is in communication with a display generation component (e.g., a touch sensitive display, a projector, a display, and/or a surface), and in response to detecting the use of the set of one or more applications (e.g., as indicated by 604a, 604b, 604c, 604d, 610, 620, 650, and/or 660), in accordance with the determination that the first set of one or more use criteria is satisfied with respect to the use and the pattern of use (e.g., 690), the first computer system displays, via the display generation component, a first notification (e.g., 622, 626, and/or 634) indicating that the second computer system (e.g., as indicated by 604a, 604b, 604c, 604d, 610, 620, 650, and/or 660) is outputting the content (e.g., 676a1, 676b1, 676c1, and/or 676d1) associated with the set of one or more applications. In some examples, in response to detecting the use of the set of one or more applications (e.g., as indicated by 604a, 604b, 604c, 604d, 610, 620, 650, and/or 660), in accordance with a determination that the second set of one or more use criteria is satisfied with respect to the use and the pattern of use, the first computer system displays, via the display generation component, a second notification (e.g., 622, 626, and/or 634) indicating that the third computer system (e.g., as indicated by 604a, 604b, 604c, 604d, 610, 620, 650, and/or 660) is outputting the content associated with the set of one or more applications (and, in some examples, without displaying the second notification indicating that the second computer system is outputting the content associated with the set of one or more applications). In some examples, in accordance with the determination that the first set of one or more use criteria is satisfied with respect to the use and the pattern of use, the computer does not display the second notification indicating that the third computer system is outputting the content associated with the set of one or more applications. Displaying a respective notification indicating that the respective computer system is outputting the content associated with the set of one or more applications in accordance with the determination that the respective set of one or more use criteria are satisfied enables the computer system to automatically display a notification that the user is connected to the respective computer system, thereby providing improved visual feedback to the user and performing an operation when a set of conditions has been met without requiring further user input.

In some examples, the first notification (e.g., 622, 626, and/or 634) indicating that the second computer system (e.g., 680a1, 680a2, 680b1, and/or 680b2) is outputting the content (e.g., 676a1, 676b1, 676c1, and/or 676d1) associated with the set of one or more applications (e.g., as indicated by 604a, 604b, 604c, 604d, 610, 620, 650, and/or 660) is displayed inside of (e.g., in and/or at) a first area (e.g., the area of interaction area 674 of notifications 622, 626, and/or 634) (e.g., a first predefined and/or preset area). In some examples, after displaying the first notification indicating that the second computer system is outputting the content associated with the set of one or more applications in the first area (and/or after a predetermined period of time since displaying the notification indicating that the second computer system is outputting the content associated with the set of one or more applications in the first area), the first computer system displays, via the display generation component, a second notification (e.g., 642 and/or 682) indicating that the second computer system is outputting the content associated with the set of one or more applications inside of a second area (e.g., the area of interaction 674 of 622) (e.g., a second predefined and/or preset area) that is different from (e.g., smaller or bigger and/or at a different location from) the first area. In some examples, the second area is inside of the first area. In some examples, after displaying the notification indicating that the second computer system is outputting the content associated with the set of one or more applications in the first area, the first computer system shrinks the size of the first notification indicating that the second computer system is outputting the content associated with the set of one or more applications to display the second notification indicating that the second computer system is outputting the content associated with the set of one or more applications. In some examples, the second notification is narrower and/or shorter than the first notification. In some examples, the first notification is selectable (e.g., to display a user interface corresponding to the first notification) and the second notification is not selectable. In some examples, the first and/or second notification is displayed irrespective of the type (e.g., category of media, music, video, HMD media, video games, audiobooks and/or podcasts) of the set of one or more applications and/or the content that is displayed in accordance with first set of one or more use criteria and/or the second set of one or more use criteria being satisfied. In some examples, the first and/or second notification is displayed irrespective of the application (e.g., music application, video application, HMD media application, video game application, audiobook application, and/or podcast application) that corresponds to a respective notification. In some examples, notifications of different types are displayed in the first area and/or the second area at different times. Displaying a second notification indicating that the second computer system is outputting the content associated with the set of one or more applications inside of a second area provides the user feedback about the state of device and that the computer system is outputting the content, thereby providing improved visual feedback to the user.

In some examples, while displaying, via the display generation component, the second notification (e.g., 622, 626, and/or 634) indicating that the second computer system (e.g., as indicated by 604a, 604b, 604c, 604d, 610, 620, 650, and/or 660) is outputting the content (e.g., 676a1, 676b1, 676c1, and/or 676d1) associated with the set of one or more applications (e.g., as indicated by 604a, 604b, 604c, 604d, 610, 620, 650, and/or 660), the first computer system detects an input (e.g., 605c1, 605d1, and/or 605d2) directed to the second notification indicating that the second computer system is outputting the content associated with the set of one or more applications. In some examples, in response to detecting the input directed to the second notification indicating that the second computer system is outputting the content associated with the set of one or more applications, the first computer system displays, via the display generation component, a plurality of connection controls (e.g., 662), including first connection control (e.g., 662a and/or 662b). In some examples, the first computer system a first connection control (e.g., 662a and/or 662b) corresponding to a fifth computer system that is different from the first computer system (e.g., 600), wherein, in response to detecting selection (e.g., 605e1 and/or 605e2) of the first connection control, the first computer system (e.g., 600) causes content to be output via the fifth computer system (e.g., as indicated by 604a, 604b, 604c, 604d, 610, 620, 650, and/or 660). In some examples, the first computer system a second connection control (e.g., 662a and/or 662b) corresponding to a sixth computer system that is different from the first computer system (e.g., 600) and the fifth computer system, wherein, in response to detecting selection of the second connection control, the first computer system causes content to be output via the sixth computer system (e.g., as indicated by 604a, 604b, 604c, 604d, 610, 620, 650, and/or 660) (without, in some examples, causing content to be output via the fifth computer system). Displaying the plurality of connection controls including the first connection control and the second connection control in response to detecting the input directed to the second notification indicating the second computer system is outputting the content provides the user feedback about the state of the device and gives the user control over the computer system to display additional connection controls, thereby providing improved visual feedback to the user and providing additional control options without cluttering the user interface with additional displayed controls.

In some examples, while the first computer system displays, via the display generation component, the first notification (e.g., 622, 626, and/or 634) indicating that the second computer system (e.g., 680a1, 680a2, 680b1, and/or 680b2) is outputting the content (e.g., 676a1, 676b1, 676c1, and/or 676d1) associated with the set of one or more applications (e.g., as indicated by 604a, 604b, 604c, 604d, 610, 620, 650, and/or 660), detecting an input (e.g., 605c2) directed to the first notification (or, in some examples, the second notification while the second notification is displayed) (e.g., and/or a portion of the first notification) indicating that the second computer system is outputting the content associated with the set of one or more applications. In some examples, in response to detecting the input directed to the first notification indicating that the second computer system is outputting the content associated with the set of one or more applications, the first computer system ceases to cause output of the content associated with the set of one or more applications via the second computer system (as described above in FIG. 6C) (e.g., and/or causing output of the content associated with the set of one or more applications via the first computer system). In some examples, while displaying, via the display generation component, the first notification indicating that the third computer system is outputting the content associated with the set of one or more applications, the first computer system detects an input directed to the first notification (or, in some examples, the second notification while the second notification is displayed) indicating that the third computer system is outputting the content associated with the set of one or more applications, and in response to detecting the input directed to the first notification indicating that the third computer system is outputting the content associated with the set of one or more applications, the first computer system ceases to cause output of the content associated with the set of one or more applications via the third computer system. Ceasing to cause output of the content associated with the set of one or more applications via the second computer system in response to detecting the input directed to the first notification indicating that the second computer system is outputting the content associated with the set of one or more applications provides to the user the ability to stop outputting content that was automatically being output and enables the user to undo connections, thereby providing improved feedback to the user and providing additional control options without cluttering the user interface with additional displayed controls.

In some examples, the location (e.g., 680, 680a, 680b, and/or 696) is a first location. In some examples, after causing output of the content (e.g., 676a1, 676b1, 676c1, and/or 676d1) via the second computer system (e.g., 680a1, 680a2, 680b1, and/or 680b2) or the third computer system (e.g., as indicated by 604a, 604b, 604c, 604d, 610, 620, 650, and/or 660) and after the first computer system (e.g., 600) has moved from the first location to a second location that is different from the first location, the first computer system detects a third use of the set of one or more applications (e.g., as indicated by 604a, 604b, 604c, 604d, 610, 620, 650, and/or 660), wherein the third use corresponds to a second pattern of use (e.g., 690) (and, in some examples, different from the pattern of use) associated with the set of one or more applications and the second location. In some examples, the second location is a micro-location that is inside of the same location as the first location, which is a micro-location (e.g., another room in a house, where the first location and the second location are rooms in a house and/or hotel; another office in a building, where the first location and the second location are offices in a building; and/or another department in a store, where the first location and second location are different departments of a store). In some examples, in response to detecting the third use of the set of one or more applications (and, in some examples, in accordance with a determination that a second set of one or more use criteria, different from the first set of one or more use criteria and the second set of one or more use criteria, is satisfied with respect to the third use and the second pattern of use), the first computer system automatically causes output of the content associated with the set of one or more applications via a computer system that is different from the second computer system and the third computer system (e.g., as described above in FIGS. 6B and 6I). In some examples, automatically causing output of the content associated with the set of one or more applications via the first computer system that is different from the second computer system and the third computer system includes ceasing causing output of the content associated with the set of one or more applications via the second computer, the third computer system, the first computer system, and/or any combination thereof. Automatically causing output of the content associated with the set of one or more applications via a computer system that is different from the second computer system and the third computer system in response to detecting the third use of the set of one or more applications enables the computer system to switch output of content when the first computer system moves from the first location to the second location, thereby providing improved feedback to the user, providing additional control options without cluttering the user interface with additional displayed controls, and performing an operation when a set of conditions has been met without requiring further user input.

In some examples, the second computer system (e.g., 680a1, 680a2, 680b1, and/or 680b2) or (e.g., and/or) the third computer system (e.g., as indicated by 604a, 604b, 604c, 604d, 610, 620, 650, and/or 660) includes (e.g., is) a display generation component (e.g., a television, a display, a device that is connected to a television and/or a display, and/or a device configured to cause a television and/or display to output content) (e.g., configured to output video of the content and/or configured to output audio and video content).

In some examples, the second computer system (e.g., 680a1, 680a2, 680b1, and/or 680b2) or (e.g., and/or) the third computer system (e.g., as indicated by 604a, 604b, 604c, 604d, 610, 620, 650, and/or 660) includes (e.g., is) an audio output component (e.g., configured to output audio of the content and, in some examples, not configured to output video content) (e.g., a speaker, a home audio device, a home video device configured to play audio, a watch, a tablet, a fitness tracking device, a wearable device, a television, a multi-media device, an accessory, a speaker, a head-mounted display (HMD), and/or a personal computing device). In some examples, the second computer system and/or the third computer system does not output video content and/or is directly connected and/or coupled to a device that outputs video content.

Note that details of the processes described above with respect to method 700 (e.g., FIG. 7) are also applicable in an analogous manner to other methods described herein. For example, method 1200 optionally includes one or more of the characteristics of the various methods described above with reference to method 700. For example, one or more steps of method 700 can be used to automatically connect to external devices and, after connecting the external devices, one or more controls and/or notifications can be displayed using one or more steps of method 1200. For brevity, these details are not repeated below.

FIG. 8 is a flow diagram illustrating a method (e.g., method 800) for connecting to an external device in accordance with some examples. Some operations in method 800 are, optionally, combined, the orders of some operations are, optionally, changed, and some operations are, optionally, omitted.

As described below, method 800 provides an intuitive way for connecting to an external device. Method 800 reduces the cognitive burden on a user for connecting to an external device, thereby creating a more efficient human-machine interface. For battery-operated computing devices, enabling a user to connect to an external device faster and more efficiently conserves power and increases the time between battery charges.

In some examples, method 800 is performed at a first computer system (e.g., 600) (e.g., a phone, computer, tablet, and/or wearable). In some examples, the computer first system is a phone, a watch, a tablet, a fitness tracking device, a wearable device, a television, a multi-media device, an accessory, a speaker, a head-mounted display (HMD), and/or a personal computing device. In some examples, the first computer system is in communication with input/output devices, such as one or more cameras, speakers, microphones, sensors (e.g., heart rate sensor, monitors, Bluetooth, near-field communication sensors, and/or Wi-Fi sensors).

At 802, while the first computer system (e.g., 600) is at a location (e.g., 680, 680a, 680b, and/or 696), the first computer system detects use of a set of one or more applications (e.g., as indicated by 604a, 604b, 604c, 604d, 610, 620, 650, and/or 660) (e.g., one or more applications and/or one or more applications in one or more categories of applications) (e.g., at and/or via the first computer system), wherein the use corresponds to (e.g., includes one or more characteristics of and/or is tracked as belonging to) a pattern of use (e.g., 690) associated with (e.g., the pattern of use of the set of one or more applications meets a threshold frequency of use of a particular device associated with, assigned to, and/or designated to be included at the location, location associated with the pattern of use at a particular type of location, location associated with pattern of use is a location of interest, and/or the use is in the foreground) the set of one or more applications and the location. In some examples, the use includes one or more tracked gestures, inputs, taps, and/or selections directed to one or more user interfaces of the set of one or more applications. In some examples, the user includes operation of an application in the foreground and does not include operation of the application in the background. In some examples, the use includes display of the application in the foreground and/or displaying the application. In some examples, the use of the set of one or more applications is detected while the first computer system is displaying a user interface that corresponds to an application in the set of one or more applications. In some examples, a pattern of use includes multiple tracked uses of an application and/or a set of applications and/or of a computer system at different instances in time, over different and/or distinct time periods, and/or at one or more distinct locations (e.g., micro-locations, such as rooms within a building, offices within a building, and/or rooms within a house). In some examples, as a part of detecting the use, the first computer system detects the pattern of use. In some examples, a pattern of use is a pattern of a plurality of uses.

At 804, in response to detecting the use of the set of one or more applications (e.g., as indicated by 604a, 604b, 604c, 604d, 610, 620, 650, and/or 660) and in accordance with (at 806) a determination that the pattern of use (e.g., 690) is a first type of pattern of use (690a1, 690b2, and/or 692b2)

(e.g., a pattern of use that satisfies the first set of one or more use criteria and/or the second set of one or more use criteria, as described above in relation to method 700), the first computer system automatically connects to a second computer system (e.g., as indicated by 604*a*, 604*b*, 604*c*, 604*d*, 610, 620, 650, and/or 660) (e.g., linking the second computer system to, configuring the second computer system to respond to one or more actions and/or inputs at, and/or configuring the second computer system to adjust playback of media that was originally being played back at the second computer system) different from the first computer system (e.g., 600), and wherein the second computer system corresponds to (e.g., associated to, assigned to, programmatically associated with and/or assigned to, physical present at, and/or detected via one or more sensors at the location) the location. In some examples, the second computer system is a different type (e.g., photo vs. laptop vs. watch) of computer system than the first computer system. In some examples, the second computer system is automatically connected to the first computer system. In some examples, the second computer system initializes the connection between the first computer system and the second computer system. In some examples, the first computer system initializes the connection between the second computer system and the first computer system.

At 804, in response to detecting the use of the set of one or more applications (e.g., as indicated by 604*a*, 604*b*, 604*c*, 604*d*, 610, 620, 650, and/or 660) and in accordance with (at 808) a determination that the pattern of use (e.g., 690) is a second type of pattern of use (690*a*2, 690*c*1, 690*c*2, and/or 692*b*2) (e.g., a pattern of use that satisfies the first set of one or more use criteria and/or the second set of one or more use criteria, as described above in relation to FIGS. 6A-6X), different from the first type of pattern of use (690*a*1, 690*b*2, and/or 692*b*2), the computer system forgoes automatic connection to the second computer system (e.g., as indicated by 604*a*, 604*b*, 604*c*, 604*d*, 610, 620, 650, and/or 660). In some examples, the pattern of use is the first type of pattern of use when a determination is made that the pattern of use at the location is above a first confidence interval (e.g., a non-zero confidence interval). In some examples, the pattern of use is the second type of pattern of use when a determination is made that the pattern of use at the location is below the first confidence interval (and, in some examples, above a second confidence interval (e.g., a non-zero confidence interval)). In some examples, the first confidence interval is determined by the frequency of use, the type of location, the type of use, and/or the type of content associated with the use and/or the pattern of use. In some examples, in accordance with a determination that the pattern of use is a second type of pattern of use, the first computer system forgoes automatically connecting to another computer system.

In some examples, in response to detecting the use of the set of one or more applications (e.g., as indicated by 604*a*, 604*b*, 604*c*, 604*d*, 610, 620, 650, and/or 660) (and, in some examples, after (and/or, in some examples, subsequent to, immediately after, and/or while) automatically connecting the second computer system to the first computer system) and in accordance with the determination that the pattern of use (e.g., 690) is the first type of pattern of use (690*a*1, 690*b*2, and/or 692*b*2), the first computer system causes (e.g., automatically (e.g., without intervening user input, and/or without intervening user input directed to the first computer system and/or the second computer system) causing, and/or automatically transmitting (e.g., directly (e.g., to the second computer system and/or via peer to peer communication) and/or indirectly (e.g., via a third computer system and/or server)) an instruction to the second computer system that causes) the first computer system (e.g., 600) to output (e.g., visually, haptically, and/or auditorily via one or more input output devices of the second computer system) content (e.g., 676*a*1, 676*b*1, 676*c*1, and/or 676*d*1) (e.g., media content, video media, photo media, audio media, and/or written media) (e.g., content that was previously being played back by the first computer system) corresponding to (e.g., produced by, being output by, being enabled to be output by, and/or included with) the set of one or more applications (and/or at least one application in the set of one or more applications). In some examples, in response to detecting the use of the set of one or more applications, the first computer system ceases outputting content corresponding to the set of one or more applications (e.g., via at least one input device that was previously outputting the content). Causing the first computer system to output content corresponding to the set of one or more applications in response to detecting the use of the set of one or more applications based on the pattern of use being the first type of pattern of use enables the first computer system to automatically output content based on the first type of pattern of use, thereby reducing the number of inputs needed to perform an operation, providing improved feedback to the user, and performing an operation when a set of conditions has been met without requiring further user input.

In some examples, the first computer system (e.g., 600) is in communication with a display generation component (e.g., a touch-sensitive display, a display, and/or a projector). In some examples, in response to detecting the use of the set of one or more applications (e.g., as indicated by 604*a*, 604*b*, 604*c*, 604*d*, 610, 620, 650, and/or 660) and in accordance with the determination that the pattern of use (e.g., 690) is the second type of pattern of use (690*a*2, 690*c*1, 690*c*2, and/or 692*b*2), the first computer system displays, via the display generation component, a suggestion notification (e.g., 642, and/or 682). In some examples, the suggestion notification includes a graphical display (e.g., a textual display, animation, and/or visual display) that the first computer system can (e.g., within communication range, and/or detects the second computer system) and/or is recommended to connect to the second computer system. In some examples, the suggestion connection notification includes an indication (e.g., a text, a graphical image, a symbol, and/or an animation) that the first computer system can connect to another computer system (e.g., to output media and/or content corresponding to the set of one or more applications). In some examples, the first computer system overlays the suggestion connection notification on top of a user interface of an application in the set of one or more applications. In some examples, while displaying the suggestion notification, the first computer system detects an input (e.g., 605*r*) (e.g., a tap, and/or a non-tap input (e.g., a gaze input, an air input (e.g., a pointing input above a screen, and/or a hover action), and/or a mouse click)) directed to the suggestion notification. In some examples, in response to detecting the input directed to the suggestion notification, the first computer system connects the second computer system (e.g., as indicated by 604*a*, 604*b*, 604*c*, 604*d*, 610, 620, 650, and/or 660) to the first computer system (e.g., 600). In some examples, in response to not detecting the input, the first computer system does not connect the second computer system to the first computer system (e.g., continues to display the suggestion notification and/or maintains display of the suggestion notification). In some examples, in conjunction with (e.g., after, while, and/or simultaneously with) detecting the input directed to the suggestion notification, the first computer system displays, via the display generation component, an indication (e.g., a textual indication, a graphical indication, and/or animation) of automatic connection notification. In some examples, the automatic connection notification includes a graphical indication (e.g., a textual indication, animation, and/or visual indication) that the first computer system is connected to the second computer system. In some examples, in response to detecting the input directed to the suggestion notification, the first computer system causes the second computer system to output content corresponding to the set of one or more applications. In some examples, in response to detecting the input directed to the suggestion notification, the first computer system ceases outputting content corresponding to the set of one or more applications. Displaying the suggestion notification and in response to detecting the input directed to the suggestion notification, connecting the second computer system to the first computer system allows the first computer system to automatically provide the user with a control option to connect to the second computer system in certain situations, thereby reducing the number of inputs needed to perform an operation, performing an operation when a set of conditions has been met without requiring further user input, and providing additional control options without cluttering the user interface with additional displayed controls.

In some examples, in response to detecting the use of the set of one or more applications (e.g., as indicated by 604a, 604b, 604c, 604d, 610, 620, 650, and/or 660) and in accordance with a determination that the pattern of use (e.g., 690) is the first type of pattern of use (690a1, 690b2, and/or 692b2), the first computer system displays, via the display generation component, an automatic connection notification (e.g., 622, 626, and/or 634) (e.g., a textual notification, a graphical notification, and/or an animation). In some examples, the automatic connection notification is in a first user interface. In some examples, the automatic connection notification includes a graphical display (e.g., a textual display, animation, and/or visual display) that the first computer system is connected to the second computer system. In some examples, the automatic connection notification includes an indication (e.g., a textual notification, a graphical notification, and/or animation) that the first computer system is automatically connected and/or has been automatically connected to another computer system. In some examples, the first computer system overlays the automatic connection notification on top of a user interface of an application in the set of one or more applications. In some examples, while displaying the automatic connection notification, the first computer system detects an input (e.g., 605r and/or 605w) (e.g., a tap, and/or a non-tap input (e.g., a gaze input, an air input (e.g., a pointing input above a screen, and/or a hover action), and/or a mouse click)) directed to the automatic connection notification (e.g., a portion of the automatic connection notification). In some examples, in response to detecting the input directed to the automatic connection notification, the first computer system displays, via the display generation component, a user interface (e.g., different from the first user interface) that includes an indication that the first computer system (e.g., 600) is connected (e.g., currently connected and/or has been connected) to the second computer system (e.g., as indicated by 604a, 604b, 604c, 604d, 610, 620, 650, and/or 660). In some examples, the user interface includes a plurality of representations (e.g., a plurality of representations described with respect to FIGS. 9A-9I). In some examples, the indication that the first computer system is connected to the second computer system is displayed with an indication that the second computer system is outputting content corresponding to the set of one or more applications. In some examples, the indication that the first computer system is connected is displayed with a first control that, when selected, causes the first computer system to connect with a third computer system (e.g., different from the first and/or second computer system) and/or causes the content to be output by the third computer system; and/or a second control that, when selected, causes the first computer system to connect with a fourth computer system (e.g., different from the first, second, and/or third computer system) and/or causes the content to be output by the fourth computer system (and, in some examples, not the third computer system). Displaying the user interface that includes the indication that the first computer system is connected to second computer system in response to detecting the input directed to the automatic connection notification allows the user to select to display the user interface when desired, thereby reducing the number of inputs needed to perform an operation and providing additional control options without cluttering the user interface with additional displayed controls.

In some examples, the automatic connection notification includes an indication (e.g., 622a1, 624a2, 634a2, and/or 644a2) (e.g., a graphical indication, image, symbol, text, album art, artist name, and/or song art) of content (e.g., media content, video media, photo media, audio media, and/or written media) being played back on the second computer system (e.g., as indicated by 604a, 604b, 604c, 604d, 610, 620, 650, and/or 660). In some examples, the suggestion notification (e.g., 642, and/or 682) does not include the indication of the content being played back on the second computer system. In some examples, the suggestion notification does not include an indication of any content that can be played back. Displaying an automatic connection notification that includes an indication of content being played back in response to detecting the input directed to the automatic connection notification enables the first computer system to display an indication of the current playback of content based on one or more inputs from the user, thereby reducing the number of inputs needed to perform an operation and providing additional control options without cluttering the user interface with additional displayed controls.

In some examples, the first computer system detects an input (e.g., 605c1, 605c2, 605r1 and/or 605r2) (e.g., a tap, and/or a non-tap input (e.g., a gaze input, an air input (e.g., a pointing input above a screen, and/or a hover action), and/or a mouse click)). In some examples, in response to detecting the input, in accordance with a determination that the input is at (e.g., detected at, and/or directed to) a first location (e.g., 680, 680a, 680b, and/or 696) (e.g., a location of the display, and/or a distal side of) with respect to (e.g., on and/or directed to) the automatic connection notification (e.g., 622, 626, and/or 634) (e.g., while the automatic notification is displayed. In some examples, in response to detecting the input, without the suggestion notification being displayed), the first computer system causes a first operation to be performed (e.g., as described above in FIGS. 6C and 6E) (e.g., executed and/or generated). In some examples, in response to detecting the input, the first operation is to display a route picker user interface (e.g., as described below in relation to FIGS. 9A-9I). In some examples, in response to detecting the input, in accordance with a determination that the input is at a second location (e.g., 680, 680a, 680b, and/or 696) (e.g., a location of the display, a distal side of, and/or at icon to undo), the first computer system different from the first location, with respect to the automatic connection notification (e.g., while the automatic notification is displayed and, in some examples, without the suggestion notification being displayed), causing a second operation, different from the first operation, to be performed (e.g., as described above in FIG. 6C). In some examples, the first operation is to disconnect from the second computer system and/or cease display of the automatic connection notification. In some examples, in accordance with a determination that the input is at the first location (e.g., 644, 644*a*, and/or 644*b*) with respect to the suggestion notification (e.g., 642, and/or 682) (e.g., while the suggestion notification is displayed and, in some examples, without the automatic connection notification being displayed), the first computer system causes a third operation (e.g., action by the first computer system, and/or connect to the second computer system) to be performed (e.g., as described above in FIGS. 6R-6S). In some examples, the third operation is to connect to the second computer system. In some examples, the third operation is different from the first operation and/or the second operation. In some examples, the third operation is the same as the first operation or the second operation. In some examples, in accordance with a determination that the input is at the second location (e.g., 644, 644*a*, and/or 644*b*) with respect to the suggestion notification, the first computer system causes the third operation (e.g., as described above in FIG. 6R) (e.g., while the suggestion notification is displayed and, in some examples, without the automatic connection notification being displayed). Causing the first operation to be performed in accordance with a determination that the input is at the first location, causing a second operation to be performed in accordance with a determination that the input is at the second location, and/or causing the third operation in accordance with a determination that the input is at the second location with respect to the suggestion notification enables the first computer system to perform operations based on the location of the input and the user to control the operation to be performed based on placement of the input without the need to display additional controls, thereby providing additional control options without cluttering the user interface with additional displayed controls and reducing the number of inputs needed to perform an operation.

In some examples, the determination that the respective use is the first type of pattern of use (690*a*1, 690*b*2, and/or 692*b*2) includes a determination that the respective pattern of use is above a respective strength threshold (e.g., a threshold that denotes a strength (e.g., strong, stronger, average, weak, and/or weaker), amount, and/or degree of a pattern of use). In some examples, the determination that the respective use is the second type of pattern of use (690*a*2, 690*c*1, 690*c*2, and/or 692*b*2) occurs when a determination is made that the respective pattern of use is below the respective strength threshold (e.g., as described above in FIGS. 6B and 6R). In some examples, the strength threshold is based on a respective threshold confidence level (e.g., a strong pattern of use, a frequency of the use; a determination of the type of location (e.g., bedroom, living room, and/or kitchen); a determination of the type of the use (e.g., playback music, stream video, and/or initiate HMD media); and/or a determination of the type of content associated with the pattern of use (e.g., music, video, and/or HMD media) associated with (e.g., assigned to, and/or designated to be included at) the location). Automatically connecting to a second computer system in accordance with the determination that the pattern of use is the first type of pattern of use that includes the determination that the respective pattern of use is above the respective strength threshold and in response to detecting the use of the set of one or more applications and/or not automatically connecting to a second computer system in accordance with the determination that the pattern of use is the second type of pattern of use that includes the determination that the respective pattern of use is below the respective strength threshold and in response to detecting the use of the set of one or more applications to automatically connect or forgo connecting to the second computer system enables the first computer system to automatically connect when the pattern of use is above the strength threshold, providing fewer erroneous connections, thereby reducing the number of inputs needed to perform an operation and performing an operation when a set of conditions has been met without requiring further user input.

In some examples, in accordance with a determination that an application (e.g., any applications in the set of one or more applications and/or applications that have a different category of use in the set of one or more applications) in the set of one or more applications (e.g., as indicated by 604*a*, 604*b*, 604*c*, 604*d*, 610, 620, 650, and/or 660) is in a category of applications (e.g., as described above in FIGS. 6A-6B and 6R) (e.g., music category of applications, video category of applications, and/or social category of applications), wherein a respective application (e.g., as indicated by 604*a*, 604*b*, 604*c*, 604*d*, 610, 620, 650, and/or 660) in the category of applications is (e.g., is currently and/or was previously) determined to (e.g., categorized as, and/or defined by the category of applications to) be associated with (e.g., historical and/or previous use of the application has been determined to have) the first type of pattern of use (690*a*1, 690*b*2, and/or 692*b*2), the determination is made that the pattern of use is the first type of pattern of use (e.g., as described above in FIGS. 6A-6B). In some examples, classifying a category of applications as having the first pattern of use includes determining that a first respective application that is in the same category of applications as the set of one or more applications has the first pattern of use. In some examples, the first respective application is a different application from the one or more applications in the set of one or more applications and/or the first respective application is not in the set of one or more applications. In some examples, in accordance with a determination that the application in the set of one or more applications is not in the category of applications, the determination is made that the pattern of use is the second type of pattern of use. Automatically connecting to a second computer system based on the application in the set of one or more applications being in the category of applications and wherein the application is in the category of applications enables the first computer system to automatically connect when the specific application in use is not the first type of pattern of use but the specific application corresponds to a category of applications that are the first type of pattern of use, thereby reducing the number of inputs needed to perform an operation and performing an operation when a set of conditions has been met without requiring further user input.

In some examples, in accordance with a determination that a respective type of pattern of use of the first computer system (e.g., 600) has not been previously determined at the location (e.g., 680, 680*a*, 680*b*, and/or 696) (e.g., a new location, a hotel room, a location for public use, a location that belongs to a user of the first computer system, a location that was not previously associated with the user, a location that is not associated with the user being a guest (e.g., friend of the user) and/or designed as a guest user that can control one or more computer systems in multiple rooms at the location (e.g., a house guest and, in some examples, not a hotel guest)), the determination is made that the pattern of use (e.g., 690) is the second type of pattern of use (e.g., 690*b*1, 694, and/or 698) (e.g., as described above in FIG. 6R). In some examples, the location is a first location. In some examples, the first pattern of use is a first pattern of use. In some examples, the use of the set of one of more applications is a first use. In some examples, after automatically connecting to the second computer system, the computer system detects a second use of the set of one or more applications (e.g., the same or a different from the first use). In some examples, the second use corresponds to (e.g., includes one or more characteristics of and/or is tracked as belonging to) a second pattern of use (e.g., the same or a different from the first pattern of use) associated with (e.g., the second pattern of use of the set of one or more applications meets a threshold frequency of use of a particular device associated with, assigned to, and/or designated to be included at the second location, a second location associated with the second pattern of use at a particular type of location, a second location associated with the second pattern of use is a location of interest, and/or the use is in the foreground) the set of one or more applications and a second location different from the first location. In some examples, the second use includes one of more tracked gestures, inputs, taps, and/or selections directed to one or more user interfaces of the set of one or more applications. In some examples, the second use includes operation of an application in the foreground and does not include operation of the application in the background. In some examples, the second use includes display of the application in the foreground and/or displaying the application. In some examples, the second use of the set of one or more applications is detected while the first computer system is displaying a user interface that corresponds to an application in the set of one or more applications. In some examples, a second pattern of use includes multiple tracked uses of an application and/or a set of applications and/or of a computer system at different instances in time, over different and/or distinct time periods, and/or at one or more distinct locations (e.g., micro-locations, such as rooms within a building, offices within a building, and/or rooms within a house). In some examples, as a part of detecting the second use, the first computer system detects the second pattern of use. In some examples, the second pattern of use is a pattern of a plurality of uses. In some examples, in response to detecting the second use of the set of one or more applications, the computer system, in accordance with a determination that a respective type of pattern of use of the first computer system has been previously determined at the second location (e.g., a historical location, a previous use has been associated with the second location), and the second pattern of use is the first type of pattern of use, automatically connects to a third computer system (e.g., linking the third computer system to, configuring the third computer system to respond to one or more actions and/or inputs at, and/or configuring the third computer system to adjust playback of media that was originally being played back at the third computer system) different from the first computer system and the second computer system. In some examples, the third computer system corresponds to (e.g., associated to, assigned to, programmatically associated with and/or assigned to, physically present at, and/or detected via one or more sensors at the location) the second location; in accordance with a determination that the respective type of pattern of use of the first computer system has been previously determined at the second location, and the second pattern of use is the second type of pattern of use, does not automatically connect to the third computer system; in accordance with a determination that the respective type of pattern of use of the first computer system has not been previously determined at the second location (e.g., a new location, a hotel room, a location for public use, a location that belongs to a user of the first computer system, a location that was not previously associated with the user, a location that is not associated with the user being a guest (e.g., friend of the user) and/or designed as a guest user that can control one or more computer systems in multiple rooms at the location (e.g., a house guest and, in some examples, not a hotel guest)), does not automatically connect to the third computer system; and in accordance with a determination that the respective type of pattern of use of the first computer system has not been previously determined at the second location, and the second pattern of use is the second type of pattern of use, does not automatically connect to the third computer system. In some examples, in accordance with a determination that a respective type of pattern of use of the first computer system has not been previously determined at the location (e.g., a new location, a hotel room, a location for public use, a location that belongs to a user of the first computer system, a location that was not previously associated with the user, a location that is not associated with the user being a guest (e.g., friend of the user) and/or designed as a guest user that can control one or more computer systems in multiple rooms at the location (e.g., a house guest and, in some examples, not a hotel guest)), the determination is made that the pattern of use is the second type of pattern of use. In some examples, in accordance with a determination that the respective type of pattern of use of the first computer system has been previously determined at the location, a determination is made that the pattern use is the first type of pattern of use, the second type of pattern of use, or a third type of pattern of use that is different from the first type of pattern of use and the second type of pattern of use.

In some examples, in accordance with a determination that a pattern of use (e.g., 690) with respect to the second computer system (e.g., 680*a*3, 696*a*1, and/or 696*a*2) has not been determined (e.g., the second computer system was recently added and/or assigned to the location, the second computer system has recently been unboxed and/or wiped before detecting use of the set of one or more applications, and/or the second computer system was recently turned on and/or activated (e.g., with no or little previous pattern of use)), the determination is made that the pattern of use is the second type of use (e.g., as described above in FIGS. 6U-6X). In some examples, the second computer system is a new computer system (e.g., not previously associated with a user of the first computer system, not previously connected to the first computer system, a computer system and/or device that was recently added to the location, and/or the second computer system was set up within a period of time (e.g., 0.1-108 hours)). In some examples, in accordance with a determination that a pattern of use with respect to the second computer system has not determined the pattern of use is the first type of pattern of use.

In some examples, the use of the set of one of more applications (e.g., as indicated by 604*a*, 604*b*, 604*c*, 604*d*, 610, 620, 650, and/or 660) is a first use. In some examples, after forgoing automatically connecting the second computer system (e.g., as indicated by 604*a*, 604*b*, 604*c*, 604*d*, 610, 620, 650, and/or 660) in accordance with a determination that the pattern of use (e.g., 690) is the second type of pattern of use (690*a*2, 690*c*1, 690*c*2, and/or 692*b*2), the first computer system detects a second use of the set of one or more applications and at the location (e.g., 680, 680*a*, 680*b*, and/or 696). In some examples, in response to detecting the second use of the set of one or more applications (e.g., as indicated by 604*a*, 604*b*, 604*c*, 604*d*, 610, 620, 650, and/or 660), the first computer system automatically connects the second computer system to the first computer system (e.g., 600) (e.g., because the pattern of use was determined to be the first type of pattern of use) (e.g., as described above in FIGS. 6S-6T). In some examples, an application with the second type of pattern of use can become an application with the first type of pattern of use. Automatically connecting the second computer system to the first computer system in response to detecting the second use of the set of one or more applications allows the first computer system to detect additional uses that change the pattern of use for the set of one or more applications at the location from a first pattern of use to a second pattern of use, enabling a user to use the set of one or more applications at the location and change the behavior of automatic connection, thereby reducing the number of inputs needed to perform an operation and performing an operation when a set of conditions has been met without requiring further user input.

In some examples, the location (e.g., 680, 680*a*, 680*b*, and/or 696) is a first location (e.g., 680, 680*a*, 680*b*, and/or 696). In some examples, after forgoing automatically connecting the second computer system (e.g., as indicated by 604*a*, 604*b*, 604*c*, 604*d*, 610, 620, 650, and/or 660) in accordance with a determination that the pattern of use (e.g., 690) is the second type of pattern of use (690*a*2, 690*c*1, 690*c*2, and/or 692*b*2), the first computer system detects a third use of the set of one or more applications (e.g., as indicated by 604*a*, 604*b*, 604*c*, 604*d*, 610, 620, 650, and/or 660) and at a second location (e.g., 680, 680*a*, 680*b*, and/or 696) different from the first location. In some examples, in response to detecting the third use of the set of one or more applications (e.g., as indicated by 604*a*, 604*b*, 604*c*, 604*d*, 610, 620, 650, and/or 660), the first computer system automatically connects a third computer system (e.g., as indicated by 604*a*, 604*b*, 604*c*, 604*d*, 610, 620, 650, and/or 660) to the first computer system (e.g., 600) (e.g., because the pattern of use was determined to be the first type of pattern of use) (e.g., in accordance with a determination that the pattern of use associated with the third use is the first type of pattern of use), wherein the third computer system is the same type of computer system as the second computer system, and wherein the third computer system is at the second location and the second computer system is at the first location (e.g., as described above in FIGS. 6H-6I). In some examples, after automatically connecting the second computer system in accordance with a determination that the pattern of use is the first type of pattern of use, the first computer system detects a fourth use of the set of one or more application and at the second location different from the first location. In some examples, in response to detecting the fourth use of the set of one or more applications, the first computer system does not automatically connect a fourth computer system to the first computer system (e.g., because the pattern of use was determined to be the second type of pattern of use) (e.g., in accordance with a determination that the pattern of use associated with the third us is the second type of pattern of use). In some examples, the fourth computer system is the same type of computer system as the second computer system. In some examples, the fourth computer system is at the second location and the second computer system is at the first location. Automatically connecting the third computer system to the first computer system in response to detecting the third use of the set of one or more applications enables the first computer system to have different behavior for different locations for the same set of one or more applications, thereby reducing the number of inputs needed to perform an operation and performing an operation when a set of conditions has been met without requiring further user input.

Note that details of the processes described above with respect to method 800 (e.g., FIG. 8) are also applicable in an analogous manner to other methods described herein. For example, method 1000 optionally includes one or more of the characteristics of the various methods described above with reference to method 800. For example, one or more steps of method 800 can be used to not automatically connect to one external device, and then suggest a different external device in a list using one or more steps of method 1000. For brevity, these details are not repeated below.

FIGS. 9A-9I illustrate exemplary user interfaces for managing a set of external devices in accordance with some examples. The user interfaces in these figures are used to illustrate the processes described below, including the processes in FIG. 10.

Figure 9A:
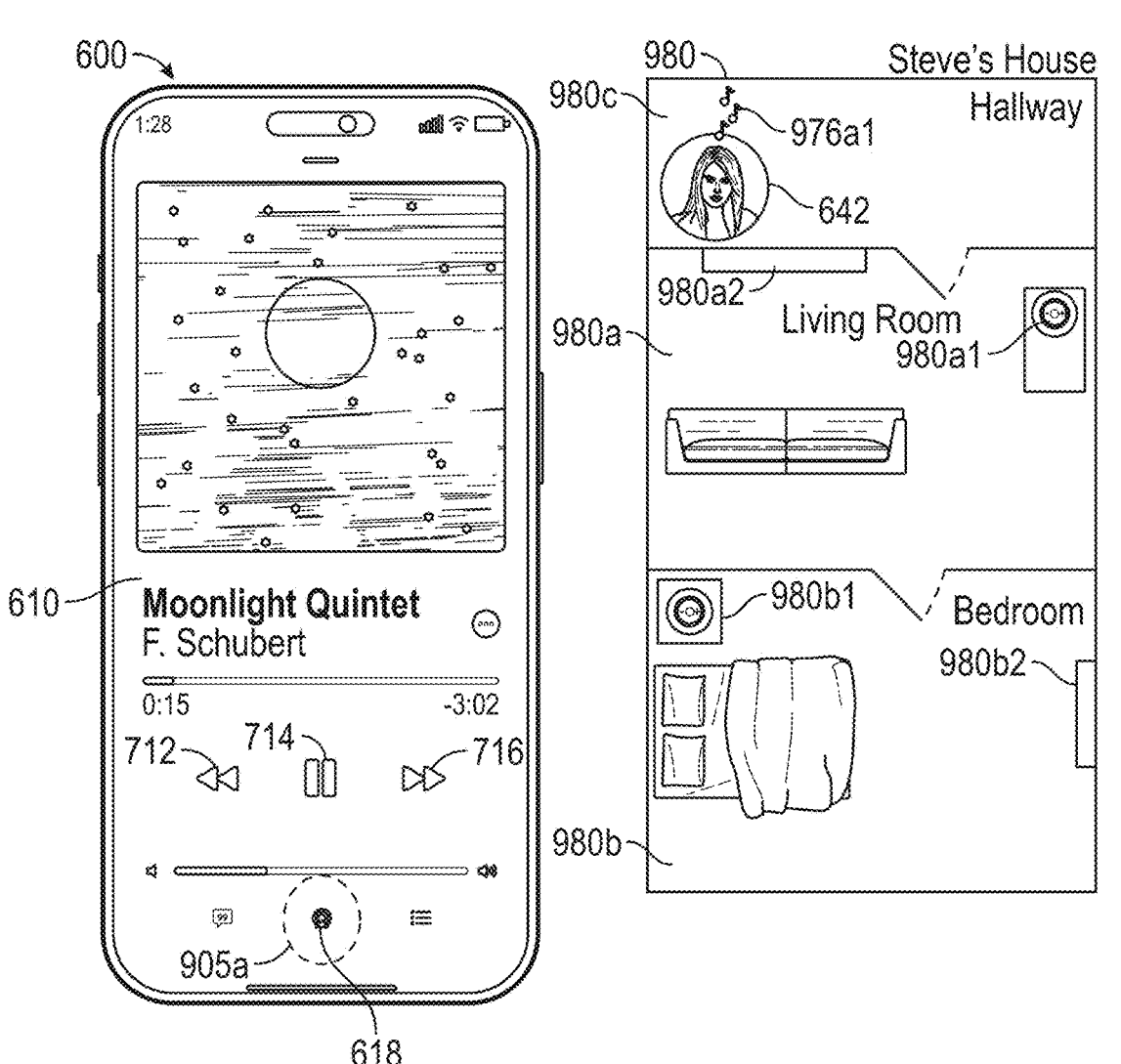
FIGS. 9A-9I illustrate exemplary user interfaces for managing a set of external devices in accordance with some examples.

FIG. 9A illustrates computer system 600 displaying music application user interface 610. Music application user interface 610 includes, amongst other controls, skip-back control 612, pause control 614, skip-forward control 616, and route control 618. As illustrated in FIG. 9A, graphical representation of Steve's House 980 indicates the positioning of user 642 (e.g., "Jane") relative to one or more rooms (and/or micro-locations) inside of Steve's House 980. User 642 is a is holding computer system 600 while standing at a particular position in graphical representation of Steve's House 980. Graphical representation of Steve's House 980 includes living room 980*a*, bedroom 980*b*, and hallway 980*c*. Living room 980*a* includes living room speaker 980*a*1 and living room television 980*a*2. Bedroom 980*b* includes bedroom speaker 980*b*1 and bedroom television 980*b*2. In some examples, living room speaker 980*a*1 and bedroom speaker 980*b*1 are the same type of speaker. In some examples, living room television 980*a*2 and bedroom television 980*b*2 are the same type of television. In some examples, living room television 980*a*2 and bedroom television 980*b*2 are connected media devices that cause a television to output media. In some examples, Steve's House 980 includes one or more other rooms and/or micro-locations and/or one or more additional devices (e.g., additional types of devices and/or the same types of devices). In some examples, connecting to the one or more other devices and/or providing suggestions with respect to the one or more other devices utilizes the same and/or similar techniques as described herein in relation to FIGS. 6A-6X, 9A-9I, and 11A-11J.

At FIG. 9A, computer system 600 is in hallway 980*c* while playing back media via the music application (e.g., as indicated by user 642 being in hallway 980*c* and playback indicator 976*a*1 illustrated with respect to graphical representation of Steve's House 980 and computer system 600 displaying music application user interface 610). At FIG. 9A, computer system 600 detects tap input 905*a* directed to route control 618.

Figure 9B:
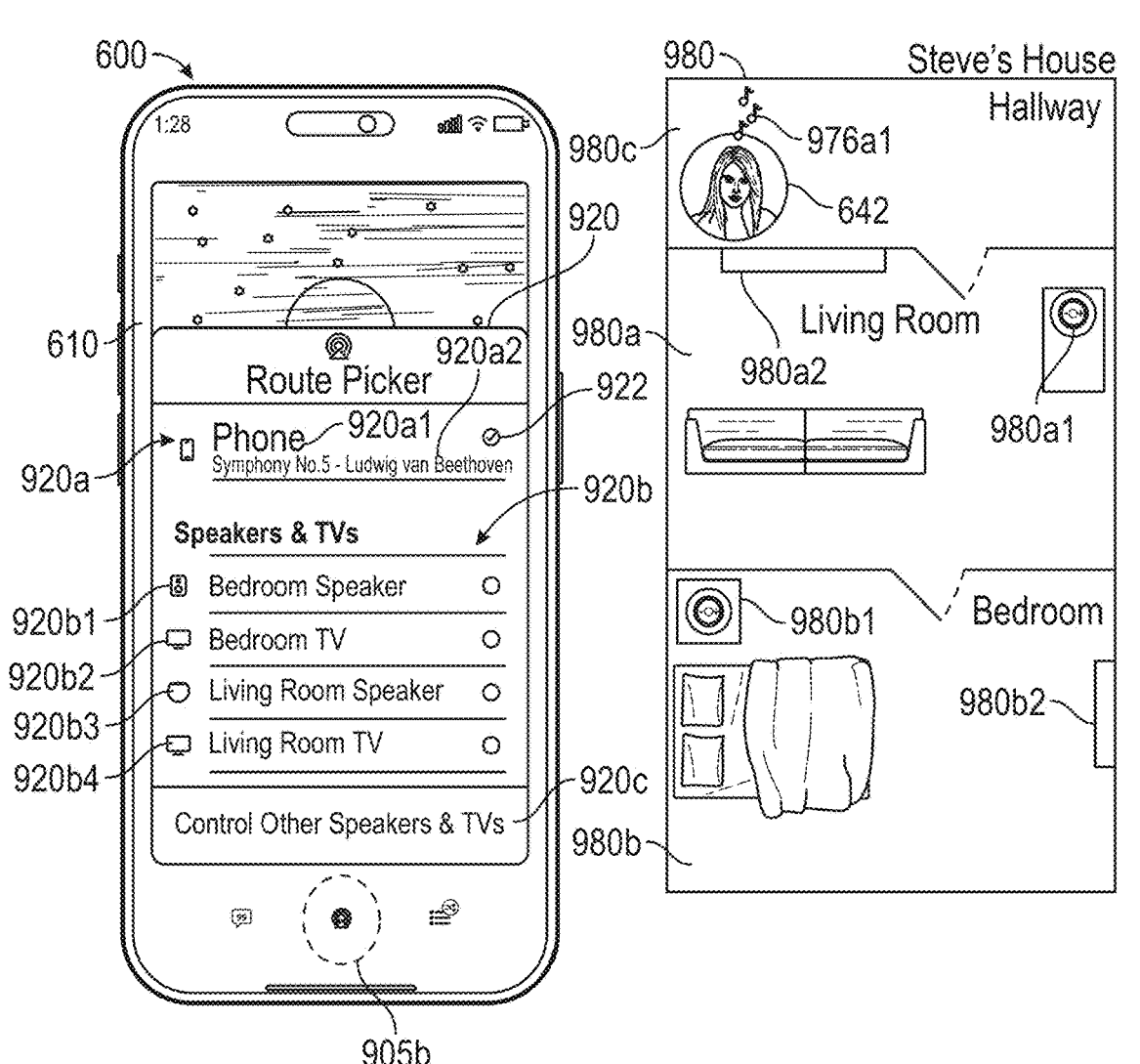

As illustrated in FIG. 9B, in response to detecting tap input 905*a*, computer system 600 displays route picker user interface 920. In some examples, route picker user interface 920 is overlaid on a portion of music application user interface 610. Route picker user interface 920 includes phone portion 920*a*, speakers and televisions portion 920*b*, and other speakers and televisions control 920*c* (e.g., as discussed below in relation to FIGS. 9D-9E). As illustrated in FIG. 9B, phone portion 920*a* includes phone control 920a1, text indication 920a2, and playback device indication 922. In some examples, text indication 920a2 indicates which media computer system 600 is causing computer system 600 to playback the media from the music application (e.g., "Symphony No. 5—Ludwig van Beethoven"). As illustrated in FIG. 9B, playback device indication 922 indicates which device is currently playing back the media (e.g., playback device indication 922 is on phone control 920a1).

At FIG. 9B, speakers and televisions portion 920b includes devices that are connected to the network at the location. Speakers and televisions portion 920b includes bedroom speaker control 920b1, bedroom television control 920b2, living room speaker control 920b3, and living room television control 920b4. As illustrated at FIG. 9B, each of bedroom speaker control 920b1, bedroom television control 920b2, living room speaker control 920b3, and living room television control 920b4 are listed alphabetically. As illustrated at FIG. 9B, bedroom speaker control 920b1 is adjacent to bedroom television control 920b2, bedroom television control 920b2 is adjacent to living room speaker control 920b3, and living room speaker control 920b3 is adjacent to living room television control 920b4. In some examples, bedroom speaker control 920b1 corresponds to bedroom speaker 980b1, such that computer system 600 causes bedroom speaker 980b1 to output media from the music application in response to detecting an input directed to bedroom speaker control 920b1. In some examples, bedroom television control 920b2 corresponds to bedroom television 980b2, such that computer system 600 causes bedroom television 980b2 to output media from the music application in response to detecting an input directed to bedroom television control 920b2. In some examples, living room speaker control 920b3 corresponds to living room speaker 980a1, such that computer system 600 causes living room speaker 980a1 to output media from the music application in response to detecting an input directed to living room speaker control 920b3. In some examples, living room television control 920b4 corresponds to living room television 980a2, such that computer system 600 causes living room television 980a2 to output media from the music application in response to detecting an input directed to living room television control 920b4. In some examples, additional, fewer, and/or alternative devices are listed in route picker user interface 920.

At FIG. 9B, speaker and television portion 920b are listed in alphabetical order based on the name of each corresponding control. In some examples, each of the controls in speaker and television portion 920b are listed in order of proximity to computer system 600, and/or are all listed based on the pattern of use (e.g., as described below at FIG. 9C). In some examples, route picker user interface 920 is displayed without displaying music application user interface 610 (e.g., in response to detecting tap input 905a, computer system 600 ceases display of music application user interface 610 and displays route picker user interface 920). At FIG. 9B, computer system 600 detects tap input 905b directed to route control 618. In some examples, in response to detecting tap input 905b computer system 600 displays music application user interface 610.

Figure 9C:
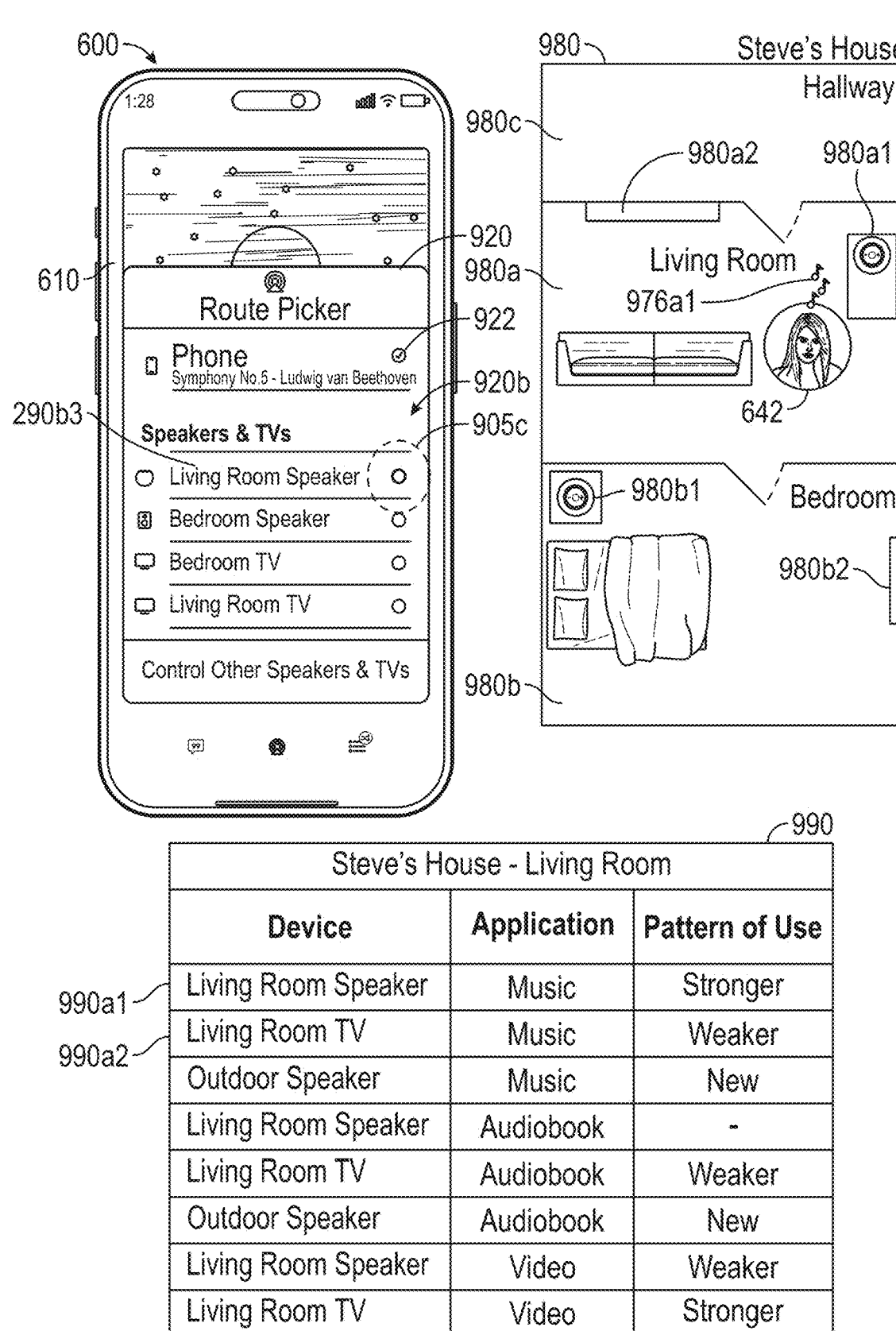

Between FIGS. 9B to 9C, user 642 moves from hallway 980c at FIG. 9B to living room 980a at FIG. 9C. At FIG. 9C, computer system 600 is in living room 980a while playing back media via the music application (e.g., as indicated by user 642 being in living room 980a and playback indicator 976a1 illustrated with respect to graphical representation of Steve's House 980 and computer system 600 displaying music application user interface 610). In some examples, the location of computer system 600 is a micro-location. In some examples, bedroom 980b is a micro-location in Steve's House 980. In some examples, living room 980a is a micro-location associated with Steve's House 980. In some examples, hallway 980c is a micro-location associated with Steve's House 980.

At FIG. 9C, computer system 600 is in living room 980a while playing back media via the music application (e.g., as indicated by user 642 being in living room 980a). Table 990 is provided to show the strength of a respective pattern of use that is associated with a respective device associated with a respective micro-location (e.g., living room 980a and/or bedroom 980b). In some examples, a pattern of use is a frequency and/or multiple uses measured over a period of time. In some examples, a pattern of use is a historical set of uses. In some examples, the pattern of use is determined to be a strong pattern of use based on the set of historical uses. In some examples, the pattern of use is determined to be a weak pattern of use based on a detection of minimal (e.g., below a threshold and/or no) historical set of uses being associated with a respective location (and/or micro-location) and a respective application (e.g., a particular application). In some examples, a pattern of use is determined to be a strong (and/or stronger) pattern of use when use of an application at a respective location has occurred above a threshold number of times, has been the most used application out of a set of applications, is in the same category of applications as another application that has been determined to have a strong (and/or stronger) pattern of use, is above a threshold level of confidence with respect to a location, and/or has been designed as a preferred application to use (e.g., overall, at a location, at a micro-location, and/or at a particular timeframe). In some examples, the pattern of use is determined to be a strong (and/or stronger) pattern of use when use of an application at a respective location has occurred at a location of a particular type (e.g., a music application has a high pattern of use for a speaker device in a living room type location, a video application has a strong pattern of use for a television device in a hotel type location). In some examples, a pattern of use is determined to be a weaker (and/or weak) pattern of use when use of an application at a respective location has occurred below a threshold number of times, is not the most used application out of a set of applications, is not in the same category of applications as another application that has been determined to have a strong (and/or stronger) pattern of use, is below a threshold level of confidence with respective to a location, and/or has not been designed at a preferred application to use. In some examples, a pattern of use is determined to be the strong (and/or stronger) and/or weak (and/or weaker) pattern of use when the application is running in the foreground of computer system 600. In some examples, a pattern of use is determined to be a stronger (and/or strong) pattern of use if the device was more recently used than other devices. In some examples, the pattern of use is not determined to be stronger (and/or strong) solely if the device was more recently used than other devices. It should be understood that, in FIGS. 9A-9B, a pattern of use table (e.g., 990 described below in FIG. 9C) was not provided because there are no corresponding devices in hallway 980c.

At FIG. 9C, computer system 600's use of the music application in the foreground while in living room 980a is associated with a stronger pattern of use for living room speaker 980a1 than the pattern of use associated with living room television 980a2, as indicated by pattern of use for living room speaker and music application row 990a1 of Table 990 ("STRONGER") compared to pattern of use for living room television and music application row 990*a*2 of Table 990 ("WEAKER"). As illustrated in FIG. 9C, because a determination is made that computer system 600's use of the music application in living room 980*a* is associated with a stronger pattern of use (and/or a strong pattern of use) with respect to living room speaker 980*a*1, computer system 600 displays living room speaker control 920*b*3 at the top of the speaker and television portion 920*b* while maintaining the alphabetical order of the remaining controls (e.g., speaker and television portion 920*b* of FIG. 9B where living room speaker control 920*b*3 is the third sequential item, compared to the speakers and televisions portion 920*b* of FIG. 9C where living room speaker control 920*b*3 is the first sequential item). In some examples, computer system 600 updates display of living room speaker control 920*b*3 to the top of the speaker and television portion 920*b* automatically as user 642 moves from hallway 980*c* at FIG. 9B to living room 980*a* at FIG. 9C. In some examples, computer system 600 does not automatically update display of living room speaker control 920*b*3 to be at the top of the speaker and television portion 920*b* and, instead, displays living room speaker control 920*b*3 at the top of the speaker and television portion 920*b* when route picker user interface 920 is re-displayed. In some examples, computer system 600 displays living room speaker control 920*b*3 irrespective of if living room speaker 980*a*1 was the most recently used device. At FIG. 9C, computer system 600 detects tap input 905*c* directed to living room speaker control 920*b*3.

Figure 9D:
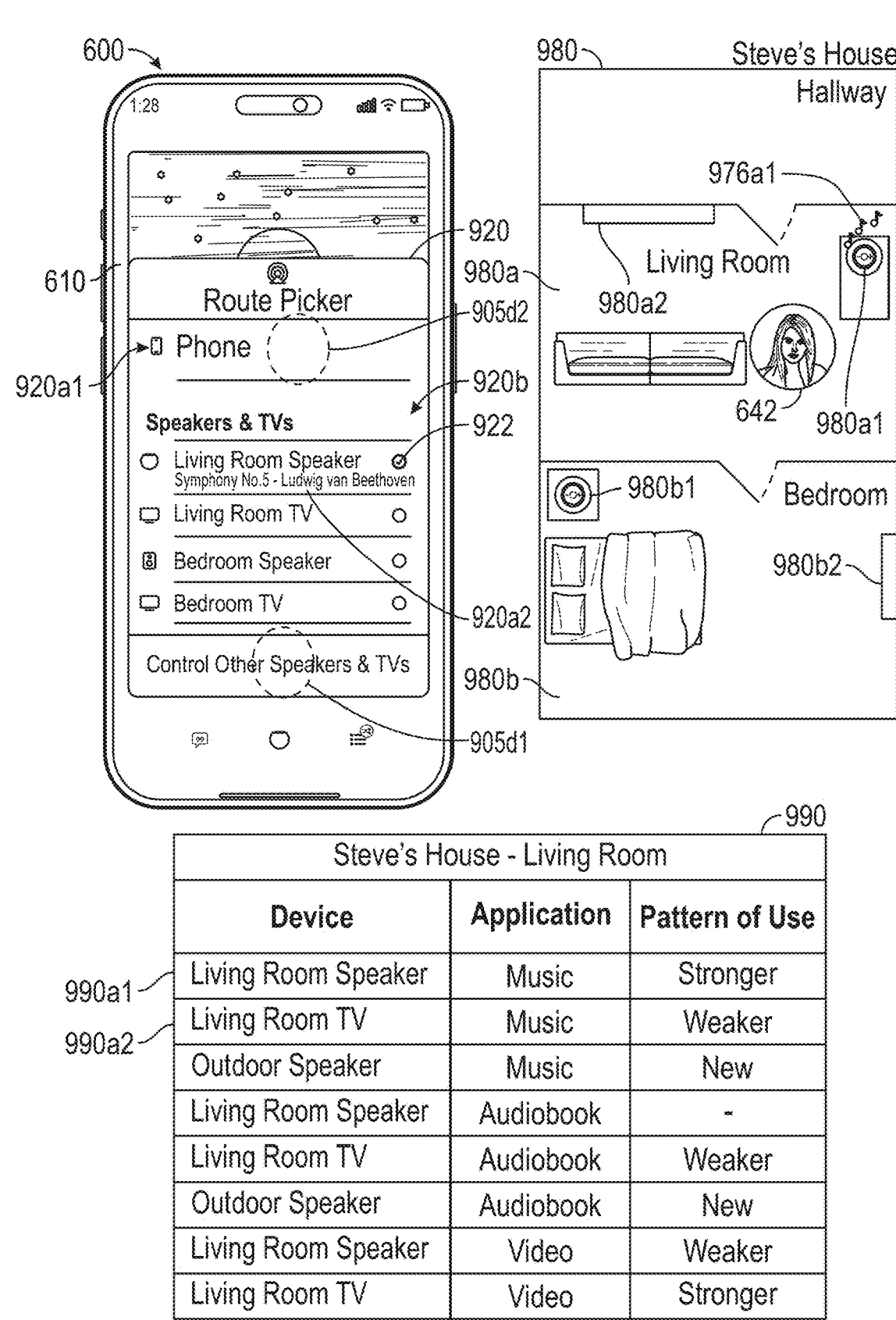

As illustrated in FIG. 9D, in response to detecting tap input 905*c*, computer system 600 causes living room speaker 980*a*1 to play back the media from the music application. At FIG. 9D, computer system 600 causes living room speaker 980*a*1 to play back media from the music application that was previously being played back by computer system 600 of FIG. 9C (e.g., as indicated by playback indicator 976*a*1 being closer to living room speaker 980*a*1 at FIG. 9D compared to playback indicator 976*a*1 to user 642 at FIG. 6C). As illustrated in FIG. 9D, in response to detecting tap input 905*c*, computer system 600 updates route picker user interface 920 by displaying playback device indication 922 to indicate living room speaker 980*a*1 is caused to play back media from the music application. As illustrated in FIG. 9D, phone portion 920*a* includes phone control 920*a*1, and speakers and televisions portion 920*b* includes living room speaker control 920*b*3 with text indication 920*a*2 (e.g., "Symphony No. 5—Ludwig van Beethoven") and playback device indication 922. At FIG. 9D, playback device indication 922 has a different visual characteristic than playback device indication 922 in FIG. 9C. In some examples, playback device indication 922 at FIG. 9D has the same visual characteristic as playback device indication 922 at FIG. 9C. In some examples, in response to detecting tap input 905*d*2, computer system 600 displays route picker user interface 920 as described above at FIG. 9C. In some examples, in response to detecting tap input 905*d*2, computer system 600 causes computer system 600 to playback media from the music application that was previously being played back by living room speaker 980*a*1 of FIG. 9D.

Figure 9E:
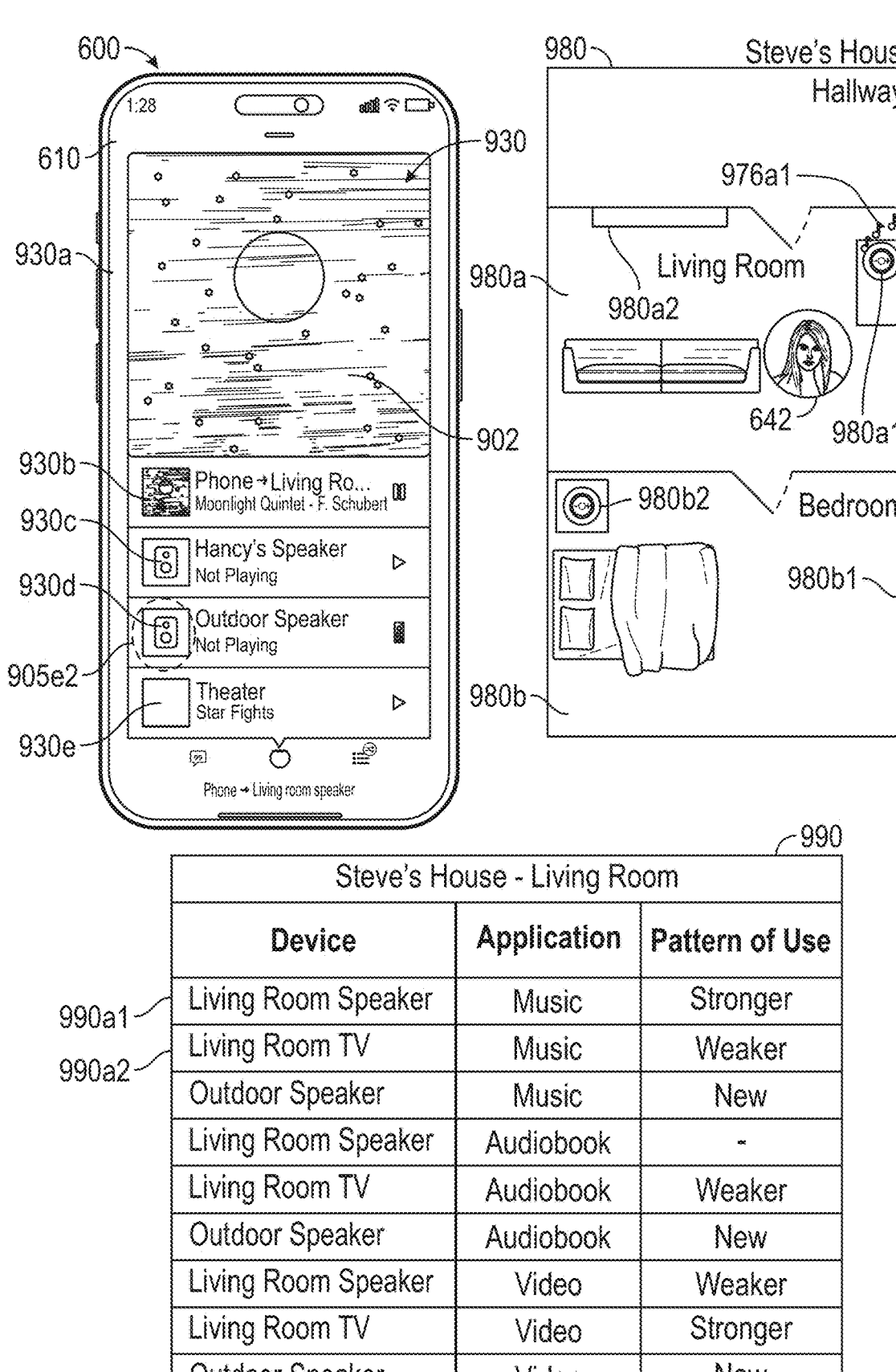

FIGS. 9D-9E illustrate one or more scenarios where a computer system connects to a set of external devices that were not previously listed in the route picker interface. At FIG. 9D, computer system 600 detects tap input 905*d*1 directed to other speaker and television control 920*c*. As illustrated in FIG. 9E, in response to detecting tap input 905*d*1, computer system 600 displays additional devices user interface 930. In some examples, additional devices user interface 930 is overlaid on a portion of music application user interface 610. In some examples, additional devices user interface 930 replaces display of route picker user interface 920. In some examples, additional devices user interface 930 is displayed without displaying music application user interface 610.

Additional devices user interface 930 includes music indication 930*a*, currently playing control 930*b*, Hancy's speaker control 930*c*, outdoor speaker control 930*d*, and theater control 930*e*. In some examples, music indication 930*a* indicates the media that computer system 600 is playing via the music application. In some examples, music indication 930*a* is not displayed in additional devices user interface 930 and/or is not displayed in additional devices user interface 930 for specific types of media (e.g., audiobook, music, and/or video media). In some examples, Hancy's speaker control 930*c* corresponds to Hancy's speaker (e.g., a speaker belonging to Hancy and not Jane), such that computer system 600 causes Hancy's speaker to output media from the music application in response to detecting an input directed to Hancy's speaker control 930*c*. In some examples, outdoor speaker control 930*d* corresponds to an outdoor speaker (a speaker not shown in Steve's House 980), such that computer system 600 causes the outdoor speaker to output media from the music application in response to detecting an input directed to outdoor speaker control 930*d*. In some examples, theater control 930*e* corresponds to a theater device (a home theater, speaker, television, and/or media device in communication (e.g., wired or wireless communication) with a television and/or a display device), such that computer system 600 causes the theater device to output media from the music application in response to detecting an input directed to theater control 930*e*. In some examples, in response to detecting input on currently playing control 930*b*, computer system 600 pauses (e.g., stops communicating from, stops communicating with, and/or ceases playback) playback of media from living room speaker 980*a*1. In some examples, in response to detecting input on currently playing control 930*b*, computer system 600 causes playback of media via computer system 600 (e.g., from computer system 600). In some examples, additional, fewer, and/or alternative devices are listed in additional devices interface 930.

At FIG. 9E, additional devices user interface 930 lists currently playing control 930*b* on top and the remaining controls in alphabetical order: Hancy's speaker control 930*c*, outdoor speaker control 930*d*, and theater control 930*e*. In some examples, each of the controls of additional devices user interface 930 are listed in order of proximity to computer system 600, and/or are all listed based on the pattern of use (e.g., as described above with respect to FIG. 9C).

At FIG. 9E, the one or more controls displayed via additional devices user interface 930 is different from the one or more controls displayed via route picker user interface 920 of FIG. 9D. Additional devices user interface 930 of FIG. 9E includes one or more controls corresponding to additional devices that user 642 connected to previously, devices not in Steve's House 980, hub devices (e.g., devices that synchronize and/or communicate with other devices on a network to provide additional functionality), devices on an alternative network than computer system 600, infrequently used devices not listed in route picker user interface 920, devices with weaker (e.g., and/or weak) pattern of use, and/or additional connected devices not listed in route picker user interface 920 of FIG. 9D (e.g., a thermostat, and/or a portable and/or desktop computer). Route picker user interface 920 of FIG. 9D includes one or more controls corresponding to devices that are in Steve's House 980, connected to the same network as computer system 600, frequently used devices (e.g., devices that computer system 600 causes to play back media), and/or devices with strong (e.g., and/or stronger) pattern of use. In some examples, one or more of the external devices represented by one or more of the controls of additional devices user interface 930 is not a device that is associated with Steve's House 980. In some examples, one or more of the external devices is an external device that computer system 600 connected to previously and/or a user account assigned to computer system 600 has connected to previously (and, in some examples, at one or more different locations).

At FIG. 9E, additional devices user interface 930 includes one or more visual characteristics that are different than route picker user interface 920 of FIG. 9D (e.g., additional devices user interface 930 are displayed in platters that include a representation of the corresponding device). In some examples, the display of additional devices user interface 930 includes one or more of the visual characteristics of route picker user interface 920.

Figure 9F:
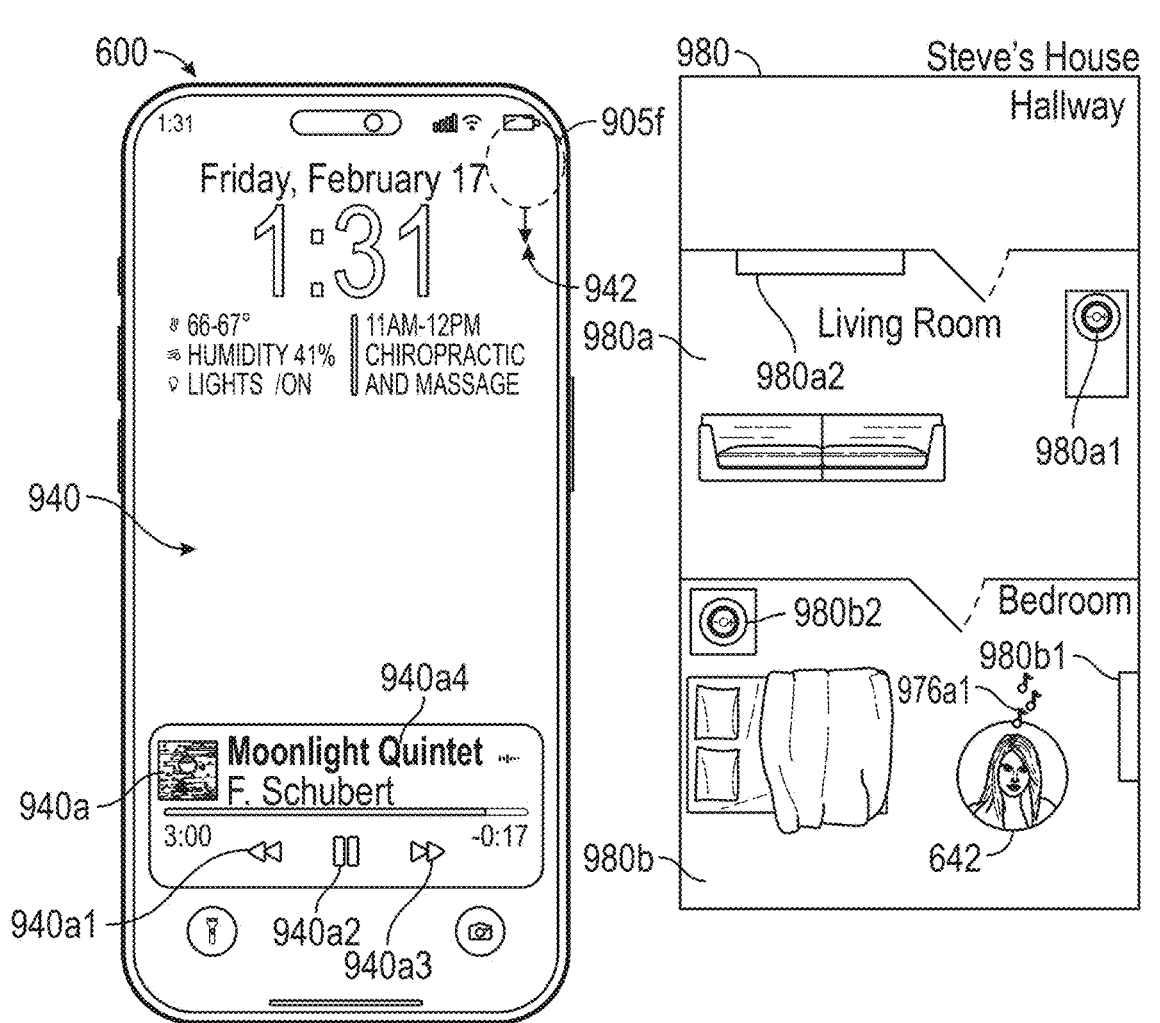

FIGS. 9F-9I illustrate one or more scenarios where a computer system suggests a set of external devices while using a first application in a second micro-location based on having a strong pattern of use that corresponds to use of the first application at the second micro-location. Between FIGS. 9E and 9F, user 642 moves from living room 980a at FIG. 9E to bedroom 980b at FIG. 9F. As illustrated in FIG. 9F, computer system 600 is displaying lock screen user interface 940 that includes a plurality of indications and media control region 940a. The plurality of indications includes an indication of time and date, calendar events, and an indication of data from various smart home devices. Media control region 940a includes, amongst other controls, skip-back control 940a1, pause control 940a2, skip-forward control 940a3, and currently playing media indication 940a4. In some examples each of skip-back control 940a1, pause control 940a2, and skip-forward control 940a3 includes one or more features as described at FIG. 9C for skip-back control 612, pause control 614, and ski-forward control 616, respectively. In some examples, currently playing media indication 940a4 indicates the particular media (e.g., the media title, author, application, and/or genre) that computer system 600 is currently playing back from the music application in the background of the lock screen user interface 940. At FIG. 9F, computer system 600 is in bedroom 980b while playing back media via the music application (e.g., as indicated by user 642 being in bedroom 980b and playback indicator 976a1 illustrated with respect to graphical representation of Steve's House 980 and computer system 600 displaying media control region 940a). At FIG. 9F, computer system 600 detects swipe input 905f directed to top right portion 944 of lock screen user interface 940.

Figure 9G:
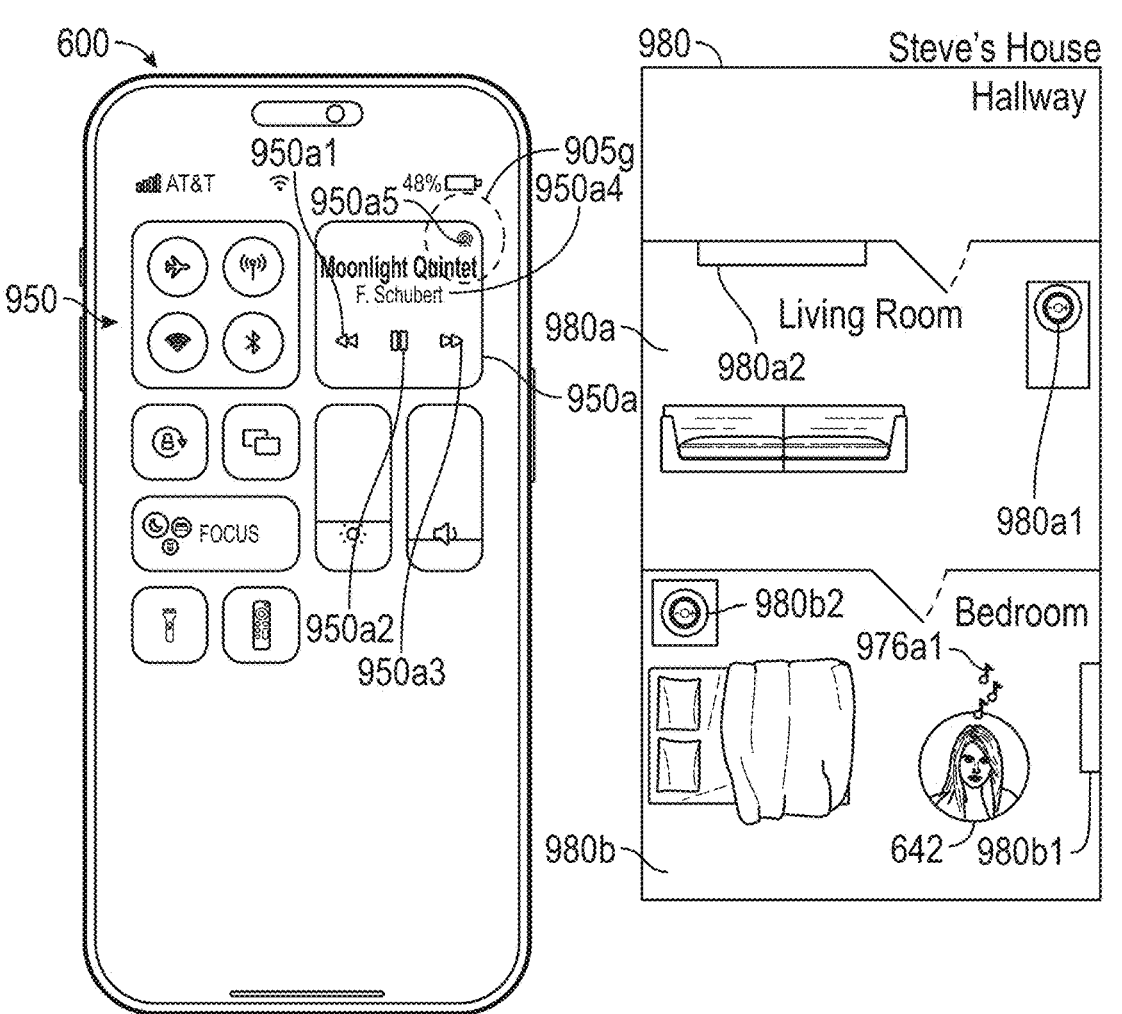

As illustrated in FIG. 9G, in response to detecting swipe input 905f, computer system 600 displays control panel user interface 950. Control panel user interface 950 includes, amongst other controls, media control region 950a. Media control region 950a includes, amongst other controls, skip-back control 950a1, pause control 950a2, skip-forward control 950a3, currently playing media indication 950a4, and route control 950a5, using one or more techniques as described above with respect to FIG. 9F. At FIG. 9G, computer system 600 detects tap input 905g directed to route control 950a5.

Figure 9H:
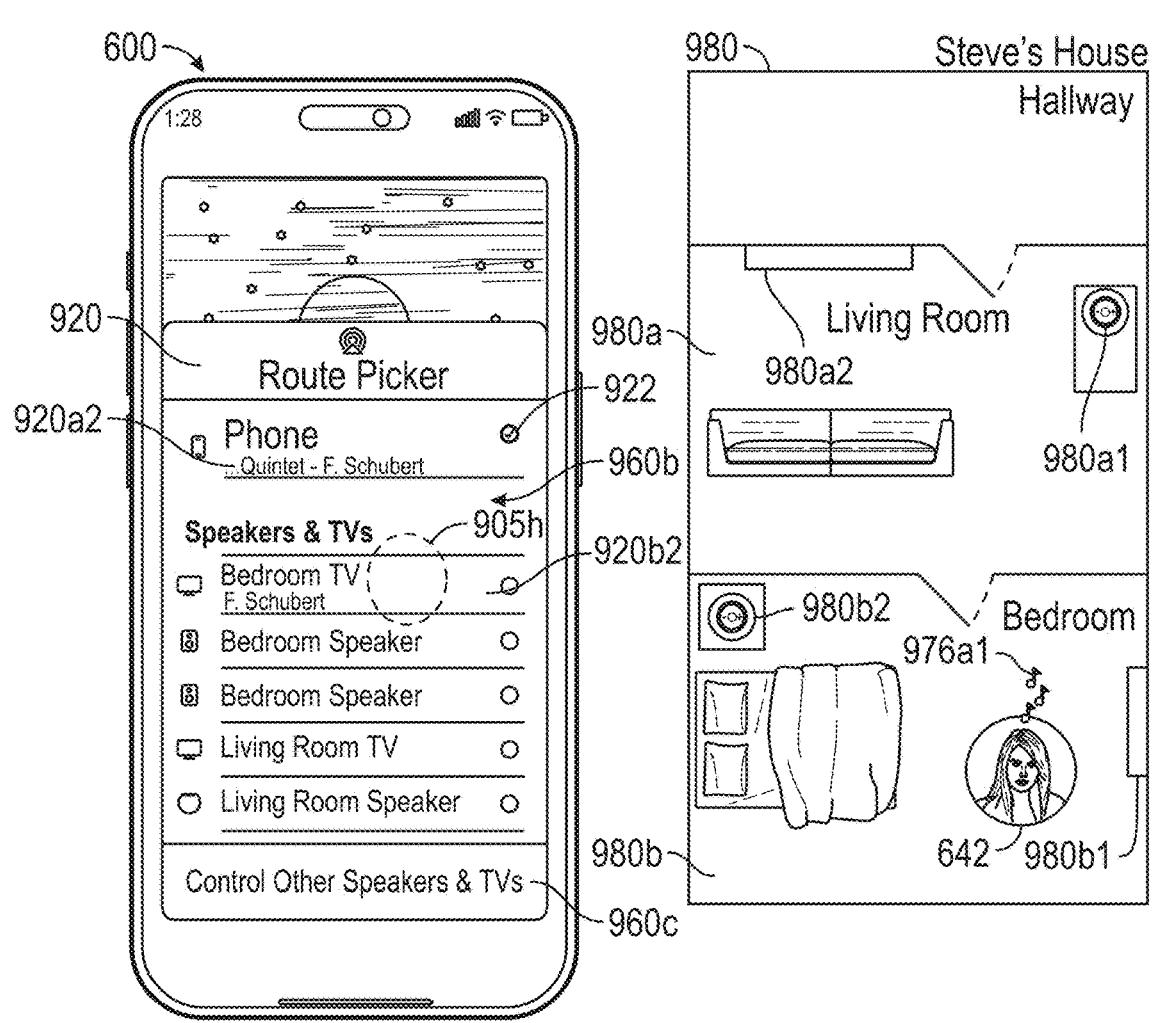

As illustrated in FIG. 9H, in response to detecting tap input 905g, computer system 600 displays route picker user interface 920. In some examples, in response to tap input 905g, computer system 600 displays route picker user interface 920 overlaid on control panel user interface 950. In some examples, in response to tap input 905g, computer system 700 displays route picker user interface 920 to replace display of control panel user interface 950 of FIG. 9G. At FIG. 9H, route picker user interface 920 includes text indication 920a2 closer to phone control 920a1 to indicate computer system 600 is currently playing back the media from the music application (e.g., " . . . Quintet—F. Schubert") as indicated by playback device indication 922d.

At FIG. 9H, computer system 600's use of the music application is associated with a stronger pattern of use for bedroom television 980b1 than the pattern of use associated with bedroom speaker 980b2, as indicated by the pattern of use for bedroom speaker 980b2 and music application row 990b2 of Table 990 ("WEAKER") compared to the pattern of use for bedroom television and music application row 990b1 of Table 990 ("STRONGER"). In some examples, because computer system 600's use of the music application in bedroom 980b is associated with a stronger pattern of use (and/or a strong pattern of use) with respect to bedroom television 980b1, computer system 600 displays bedroom television control 920b2 at the top of the speaker and television portion 920b while maintaining the alphabetical order of the remaining controls (e.g., speaker and television portion 920b of FIG. 9B where bedroom television control 920b2 is the second sequential item, compared to the speaker and television portion 920b of FIG. 9H where bedroom television control 920b2 is the first sequential item). At FIG. 9H, computer system 600 detects tap input 905h directed to bedroom television control 920b2.

Figure 9I:
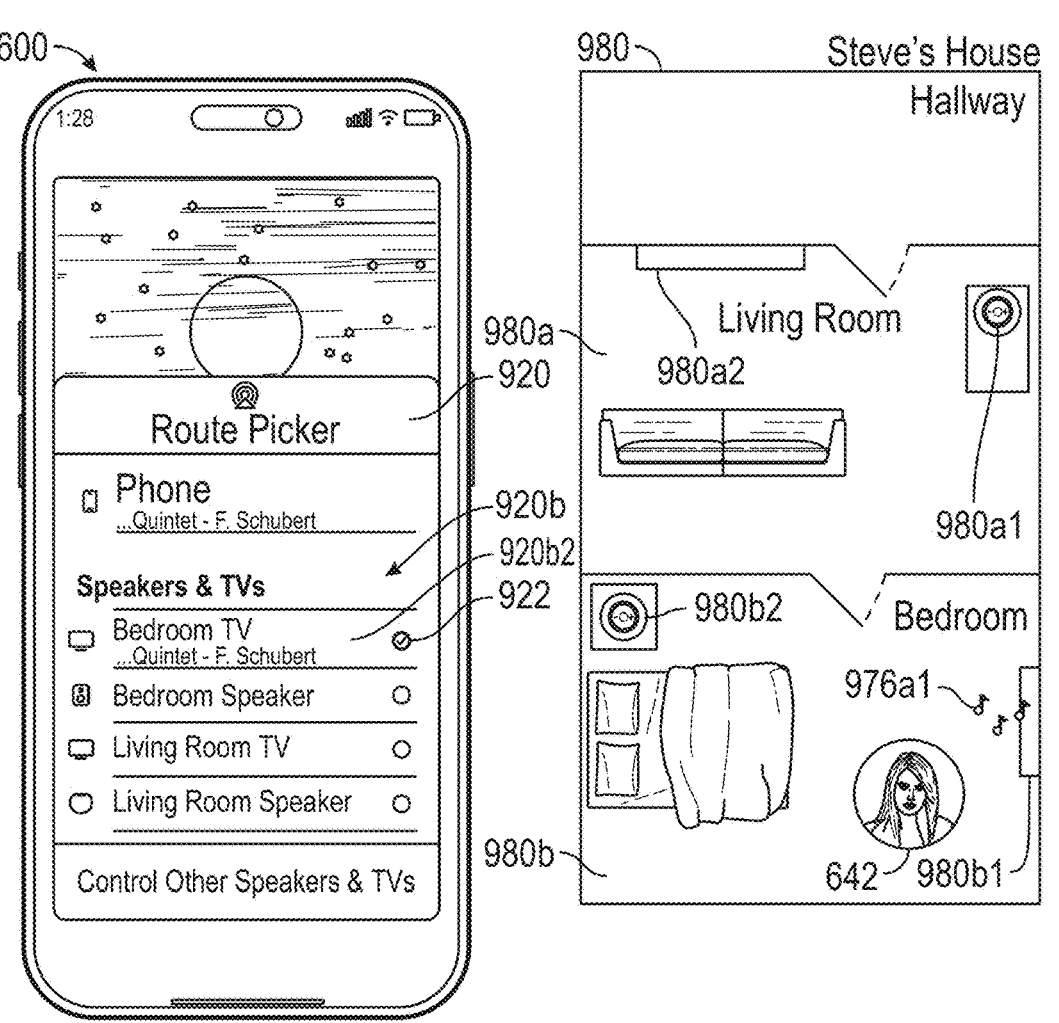

As illustrated in FIG. 9I, in response to detecting tap input 905h, computer system 600 causes bedroom television 980b1 to play back the media from the music application. At FIG. 9I, computer system 600 causes bedroom television 980b1 to play back media from the music application that was previously being played back by computer system 600 of FIG. 9H (e.g., as indicated by playback indicator 976a1 being closer to bedroom television 980b1 at FIG. 9I compared to playback indicator 976a1 being closer to user 642 at FIG. 6H). At FIG. 9I, in response to detecting tap input 905h, computer system 600 updates route picker user interface 920 to indicate that computer system 600 has caused bedroom television 980b1 to playback media from the music application (e.g., as indicated by playback device indication 922).

Although examples described above are with reference to a music application, alternative applications have one or more of the features described above with regards to FIGS. 9A-9I (e.g., media can be from a video application, audiobook application, social media application, and/or podcast application).

FIG. 10 is a flow diagram illustrating a method (e.g., method 1000) for managing a set of external devices in accordance with some examples. Some operations in method 1000 are, optionally, combined, the orders of some operations are, optionally, changed, and some operations are, optionally, omitted.

As described below, method 1000 provides an intuitive way for managing a set of external devices. Method 1000 reduces the cognitive burden on a user for managing a set of external devices, thereby creating a more efficient human-machine interface. For battery-operated computing devices, enabling a user to manage a set of external devices faster and more efficiently conserves power and increases the time between battery charges.

In some examples, method 1000 is performed at a computer system (e.g., 600) (e.g., a phone, computer, tablet, and/or wearable device) that is in communication with a display generation component (e.g., a display). In some examples, the computer system is a phone, a watch, a tablet, a fitness tracking device, a wearable device, a television, a multi-media device, an accessory, a speaker, a head-mounted display (HMD), and/or a personal computing device. In some examples, the computer system is in communication with input/output devices, such as one or more cameras, speakers, microphones, sensors (e.g., heart rate sensor, monitors, Bluetooth, near-field communication sensors, and/or Wi-Fi sensors).

At 1002, the computer system displays, via the display generation component, a user interface (e.g., 920) that includes a plurality of representations (e.g., 920b1, 920b2, 920b3, and/or 920b4) (e.g., text, visual content, a name of an audio source and/or an audio output device (e.g., a speaker, a television, and/or a mobile device), a name assigned and/or that designates an audio source and/or an audio output device (e.g., a speaker, a television, and/or a mobile device), a user interface element, button, and/or affordance), the plurality of representations including: a representation (e.g., a graphical representation, an image, user interface element, button, and/or affordance) that includes an indication (e.g., 920b1, 920b2, 920b3, and/or 920b4) (e.g., a textual indication, a graphical indication, and/or animation) of a first playback device (e.g., 980a1, 980a2, 980b1, and/or 980b2) (e.g., an external audio device, an external video device) and a representation (e.g., a graphical representation, an image, user interface element, button, and/or affordance) that includes an indication (e.g., 920b1, 920b2, 920b3, and/or 920b4) (e.g., a textual indication, a graphical indication, and/or animation) of a second playback device (e.g., 980a1, 980a2, 980b1, and/or 980b2) (e.g., an external audio and/or video device). In some examples, in accordance with a determination that the computer system is in communication with the first playback device, the plurality of representations includes the representation of the indication of the first playback device. In some examples, in accordance with a determination that the computer system is not in communication with the first playback device, the computer system does not include the representation of the indication of the first playback device in the plurality of representations. In some examples, the representations are a list of playback devices. In some examples, in accordance with a determination that the computer system is in communication with the second playback device, the plurality of representations includes the representation of the indication of the second playback device. In some examples, in accordance with a determination that the computer system is not in communication with the second playback device, the computer system does not include the representation of the indication of the second playback device in the plurality of representations. In some examples, the first playback is different from the second playback device. In some examples, the first playback device is a different type of device (e.g., speaker, television, mobile device, and/or a head-mounted display).

At 1002, the computer system displays, via the display generation component, a user interface (e.g., 920) that includes a plurality of representations (e.g., 920b1, 920b2, 920b3, and/or 920b4) (e.g., text, visual content, a name of an audio source and/or an audio output device (e.g., a speaker, a television, and/or a mobile device), a name assigned and/or that designates an audio source and/or an audio output device (e.g., a speaker, a television, and/or a mobile device), a user interface element, button, and/or affordance), the plurality of representations including an accordance with (at 1004) a determination that a pattern of use associated with the first playback device (e.g., 980a1, 980a2, 980b1, and/or 980b2) is a respective type of pattern of use (e.g., 990a1, and/or 990b2) (e.g., strongest pattern of use and/or highest pattern of use, and/or most confidence pattern of use (e.g., determined by a pattern of use score and/or condition)), the computer system displays a representation that includes the indication (e.g., 920b1, 920b2, 920b3, and/or 920b4) of the first playback device displayed at a first position (e.g., the position of living room speaker control 920b3 in FIG. 9C, and/or the position of bedroom television control 920b2 in FIG. 9H) (e.g., a first position in a sequential list of the plurality of representations and/or a first location on the display generation component) on the user interface (e.g., 920) and the representation (e.g., 920b1, 920b2, 920b3, and/or 920b4) that includes the indication of the second playback device (e.g., 980a1, 980a2, 980b1, and/or 980b2) is displayed at a second position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) (e.g., a second position in a sequential list of the plurality of representations and/or a second location on the display generation component) on the user interface that is different from the first position on the user interface; and in accordance with a determination that a pattern of use associated with the first playback device (e.g., 980a1, 980a2, 980b1, and/or 980b2) is a respective type of pattern of use (e.g., 990a1, and/or 990b2) (e.g., strongest pattern of use and/or highest pattern of use, and/or most confidence pattern of use (e.g., determined by a pattern of use score and/or condition)), the representation that includes the indication (e.g., 920b1, 920b2, 920b3, and/or 920b4) of the first playback device is displayed at a first position (e.g., the position of living room speaker control 920b3 in FIG. 9C, and/or the position of bedroom television control 920b2 in FIG. 9H) (e.g., a first position in a sequential list of the plurality of representations and/or a first location on the display generation component) on the user interface (e.g., 920) and the representation (e.g., 920b1, 920b2, 920b3, and/or 920b4) that includes the indication of the second playback device (e.g., 980a1, 980a2, 980b1, and/or 980b2) is displayed at a second position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) (e.g., a second position in a sequential list of the plurality of representations and/or a second location on the display generation component) on the user interface that is different from the first position on the user interface.

At 1002, the computer system displays, via the display generation component, a user interface (e.g., 920) that includes a plurality of representations (e.g., 920b1, 920b2, 920b3, and/or 920b4) (e.g., text, visual content, a name of an audio source and/or an audio output device (e.g., a speaker, a television, and/or a mobile device), a name assigned and/or that designates an audio source and/or an audio output device (e.g., a speaker, a television, and/or a mobile device), a user interface element, button, and/or affordance), the plurality of representations including in accordance with (at 1006) the determination that the pattern of use associated with determination that the pattern of use associated with the second playback device (e.g., 980*a*1, 980*a*2, 980*b*1, and/or 980*b*2) is the respective type of pattern of use (e.g., 990*a*1, and/or 990*b*2) (and, in some examples, that the pattern of use associated with the first playback device is not the respective pattern of use) (e.g., not the strongest pattern of use and/or not the highest pattern of use, and/or not the most confident pattern of use (e.g., determined by a pattern of use score and/or condition)), the representation that includes the indication (e.g., 920*b*1, 920*b*2, 920*b*3, and/or 920*b*4) of the second playback device is displayed at the first position (e.g., the position of living room speaker control 920*b*3 in FIG. 9C, and/or the position of bedroom television control 920*b*2 in FIG. 9H) on the user interface (e.g., 920) and the representation that includes the indication of the first playback device (e.g., 980*a*1, 980*a*2, 980*b*1, and/or 980*b*2) is displayed at a third position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) on the user interface that is different from the first position. In some examples, the third position is the same as the second position. In some examples, the third position is different from the second position. In some examples, a representation of a third playback device is displayed at the second position while the representation that includes the indication of the second playback device is displayed at the third position. In some examples, the first type of pattern of use is a frequency of use of a device below a confidence interval (a non-zero confidence interval). In some examples, the second type of pattern of use is a frequency of use of a device above a confidence interval (a non-zero confidence interval). In some examples, the first type of pattern of use and the second type of pattern of use satisfies the first set of one or more use criteria and/or the second set of one or more use criteria, as described above in relation to FIGS. 6A-6X. In some examples, the first playback device is a first type of device (e.g., a category of devices that play back audio media). In some examples, the second playback device is a second type of device (e.g., a category of devices that play back video media) different from the first type of device. Displaying the representation that includes the indication of the first playback device is displayed at the first position on the user interface and the representation that includes the indication of the second playback device is displayed at the second position in accordance with the determination that the pattern of use associated with the first playback device is the respective type of pattern of use and/or displaying the representation that includes the indication of the second playback device at the first position on the user interface and the representation that includes the indication of the first playback device is displayed at the third position on the user interface that is different from the first position in accordance with the determination that the pattern of use associated with the second playback device is the respective type of pattern of use, allows the computer system to suggest the device (e.g., display the playback device at the first position) based on the pattern of use and enables the user to see the options in an order that is determined to be most relevant based on the pattern of use, thereby reducing the number of inputs needed to perform an operation, providing improved visual feedback to the user, and performing an operation when a set of conditions has been met without requiring further user input.

In some examples, the first position (e.g., the position of living room speaker control 920*b*3 in FIG. 9C, and/or the position of bedroom television control 920*b*2 in FIG. 9H) on the user interface (e.g., 920) is a terminal position (e.g., the top (e.g., the position of living room speaker control 920*b*3 and/or the position of bedroom television control 920*b*2) and/or bottom position (e.g., the position of living room television control in FIG. 9C, and/or the position of living room speaker control in FIG. 9H) of speakers and televisions portion 920*b* and/or 960*b*) (e.g., a top position, bottom position, the first listed, and/or last listed) in a list of a plurality of representations (e.g., 920*b*1, 920*b*2, 920*b*3, and/or 920*b*4) of external playback devices (e.g., as described above in FIG. 9B). In some examples, the second position is not a terminal position. Displaying the representation that includes the indication of a respective playback device at a terminal position allows the computer system to display the respective playback device at the terminal position when on or more conditions are met, thereby reducing the number of inputs needed to perform an operation, providing improved visual feedback to the user, and performing an operation when a set of conditions has been met without requiring further user input.

In some examples, before displaying the user interface (e.g., 920) that includes the plurality of representations (e.g., 920*b*1, 920*b*2, 920*b*3, and/or 920*b*4), the computer system displays, via the display generation component, a user interface (e.g., 910 and/or 950) that includes a first control (e.g., 612, 614, 616, 618, 950*a*1, 950*a*2, 950*a*3, 950*a*4, and/or 950*a*5) (e.g., a user interface object (e.g., a user interface element, a button, and/or an affordance)). In some examples, the second user interface includes a plurality of controls (e.g., pause, play, and/or skip) for changing playback of content (e.g., media content, video media, photo media, audio media, and/or written media) on the computer system. In some examples, the second user interface is a control center user interface that is accessed from an input on a home screen, such as a swipe down input. In some examples, the control center user interface includes one or more controls for connecting the computer system to Wi-Fi, Bluetooth, and/or GPS and/or one or more controls for turning on, off, and/or control one or more timers, one or more flashlights, and/or one or more accessory devices corresponding to a home. In some examples, while displaying the user interface that includes the first control, the computer system detects an input (e.g., 905*a* and/or 905*g*) (e.g., a tap, and/or, in some examples, a non-tap input (e.g., a gaze input, an air input (e.g., a pointing input above a screen, and/or a hover action), and/or a mouse click)) directed to the first control. In some examples, in response to detecting the input directed to (e.g., on, and/or selection of) the first control, the computer system displays, via the display generation component, the user interface that includes the plurality of representations (e.g., 920). Displaying the first user interface that includes the plurality of representations in response to detecting the input directed to the first control enables the computer system to display the plurality of representations as directed, thereby providing improved feedback and/or providing additional control options without cluttering the user interface.

In some examples, displaying the user interface (e.g., 920) that includes the plurality of representations (e.g., 920*b*1, 920*b*2, 920*b*3, and/or 920*b*4) includes overlaying the user interface that includes the plurality of representations over (e.g., on top of, overlaid on, and/or overlaid over) a portion (e.g., a subset set and/or an area) of the user interface (e.g., 910 and/or 950) that includes the first control (e.g., 612, 614, 616, 618, 950*a*1, 950*a*2, 950*a*3, 950*a*4, and/or 950*a*5) (e.g., as described above in FIGS. 9C and/or 9H) (and, in some examples, without overlaying the user interface that includes the plurality of representations over another portion of the user interface that includes the first control). In some examples, while displaying the user interface that includes the plurality of representations, the computer system ceases to display the first control. In some examples, while displaying the user interface that includes the plurality of representations, the computer system continues to display the first control. Displaying the user interface that includes the plurality of representations in response to detecting the input directed to the first control including overlaying the user interface that includes the plurality of representations over a portion of the user interface that includes the first control enables the computer system to maintain the user interface while still providing the user the plurality of representations and reduces visual distractions from displaying an entirely different user interface, thereby providing additional control options without cluttering the user interface, reducing the number of inputs needed to perform an operation, and providing improved visual feedback to the user.

In some examples, in response to detecting the input (e.g., 905a and/or 905g) directed to the first control (e.g., 612, 614, 616, 618, 950a1, 950a2, 950a3, 950a4, and/or 950a5), the computer system ceases display of the user interface (e.g., 910 and/or 950) that includes the first control (e.g., 612, 614, 616, 618, 950a1, 950a2, 950a3, 950a4, and/or 950a5) (e.g., as described above in FIGS. 9C and/or 9H). In some examples, in response to detecting the input directed to the user interface that includes the plurality of representations (e.g., an input directed to an exited control and/or an input outside of the user interface that includes the plurality of representations), the computer system re-displays the user interface that includes the first control. Displaying the user interface that includes the plurality of representations in response to detecting the input directed to the first control, and not displaying the user interface that includes the first control in response to detecting the input directed to the first control, enables the computer system to display the user interface as directed, thereby providing additional control options without cluttering the user interface and providing improved visual feedback to the user.

In some examples, the plurality of representations (e.g., 920b1, 920b2, 920b3, and/or 920b4) include an indication (e.g., 920b1, 920b2, 920b3, and/or 920b4) of a third playback device (e.g., 980a1, 980a2, 980b1, and/or 980b2) (e.g., an external audio device, an external video device) in communication with a network (e.g., as described above in FIG. 9B) (e.g., a Wi-Fi network, wired network, a home network, and/or a network of external accessory devices (e.g., a smart light, door, fan, and/or outlet) that are associated with a location). In some examples, most of the plurality of representations are listed alphabetically (e.g., except for the representation in the terminal position). In some examples, the computer system is associated with and/or connected to the network. In some examples, the first playback device and the second playback device are in communication with the network. In some examples, the plurality of representations include additional respective indications of respective playback devices, and each of the respective playback devices are in communication with the network. Displaying the representation of the plurality of representations that includes the indication of the third playback device in communication with the network allows the computer system to suggest a device that, in some examples, is not associated with a pattern of use using the computer system and enables a user to see additional options, thereby reducing the number of inputs needed to perform an operation, providing improved visual feedback to the user, and performing an operation when a set of conditions has been met without requiring further user input.

In some examples, the plurality of representations (e.g., 920b1, 920b2, 920b3, and/or 920b4) is a first plurality of representations. In some examples, the user interface (e.g., 920) that includes the plurality of representations (e.g., 920b1, 920b2, 920b3, and/or 920b4) includes a second control (e.g., 920c) (e.g., a user interface object, a selectable user interface object, a user interface element, a selectable user interface element, a button, and/or an affordance). In some examples, while displaying the user interface that includes the second control, the first computer system detects an input (e.g., 905b, and/or 905d1) (e.g., a tap, and/or a non-tap input (e.g., a gaze input, an air input (e.g., a pointing input above a screen, and/or a hover action), and/or a mouse click)) directed to the second control. In some examples, in response to detecting the input directed to the second control, displaying, via the display generation component, a user interface (e.g., 930) that includes a second plurality of representations (e.g., 930b, 930c, 930d, and/or 930e) different from the first plurality of representations, wherein the second plurality of representations includes a representation that includes an indication (e.g., 930b, 930c, 930d, and/or 930e) of a third playback device that is different from the first playback device (e.g., 980a1, 980a2, 980b1, and/or 980b2) and the second playback device (e.g., 980a1, 980a2, 980b1, and/or 980b2). In some examples, the indication and/or any indication concerning the third playback device was not displayed with the first plurality of representations. In some examples, the second plurality of representations does not include one or more of the representations that include the indication of the first playback device and the representation that includes the indication of the second playback device. In some examples, the second plurality of representations does include any indication of the first playback device and/or any indication of the second playback device. In some examples, the third playback device is a device that is not connected to the same network as the first playback device and/or the second playback device. In some examples, the third playback device is a device that the computer system connected to previously (and, in some examples, is associated and/or not associated with a location at which the first playback device and/or the second playback device is associated). In some examples, the representation that includes the indication of the third playback device is a different size and/or shape than the representation that includes the indication of the first playback device. In some examples, the representation that includes the indication of the first playback device is the same size as the representation that includes the indication of the second playback device. Displaying, via the display generation component, the user interface that includes the second plurality of representations different from the first plurality of representations, where the second plurality of representations includes a representation that includes an indication of a third playback device that is different from the first playback device and the second playback device, in response to detecting the input directed to the second control, enables the computer system to display additional playback devices as directed without requiring all the playback devices to displayed at once, thereby providing additional control options without cluttering the user interface, reducing the number of inputs needed to perform an operation, and providing improved visual feedback to the user.

In some examples, the third playback device (e.g., 980a1, 980a2, 980b1, and/or 980b2) and the computer system (e.g., 600) are currently associated with (and/or connected to) different networks (e.g., as described above in FIG. 9E) (e.g., and/or are currently in communication with (e.g., and/or associated, assigned to, and/or connected to) different networks) (e.g., the computer system is currently connected to a first network, and the third playback device is currently connected to a second network different from the first network). In some examples, the computer system, the first playback device, and the second playback device are currently associated with the same network. Displaying, via the display generation component, the user interface that includes the second plurality of representations different from the first plurality of representations, where the computer system is associated with different networks in response to detecting the input directed to the second control, enables the computer system to display additional playback devices from different networks as directed without requiring all the playback devices to be displayed at once, thereby providing additional control options without cluttering the user interface, reducing the number of inputs needed to perform an operation, and providing improved visual feedback to the user.

In some examples, while the representation that includes the indication (e.g., 920b1, 920b2, 920b3, and/or 920b4) of the first playback device (e.g., 980a1, 980a2, 980b1, and/or 980b2) is displayed at the first position (e.g., the position of living room speaker control 920b3 in FIG. 9C, and/or the position of bedroom television control 920b2 in FIG. 9H) on the user interface (e.g., 920), the first playback device is not a device to which the computer system (e.g., 600) was most recently connected (e.g., upon initially displaying the user interface that includes the plurality of representations and/or while the representation that includes the indication of first playback device was initially displayed at the first position). In some examples, the determination to display the first playback device or the second playback device at the first position is based on multiple criteria, where a criterion of the one or more criteria is satisfied when a respective playback device is most recently connected to the first computer system at the first location. In some examples, while the representation that includes the indication of the second playback device (e.g., 980a1, 980a2, 980b1, and/or 980b2) is displayed at the first position on the user interface, the second playback device is not the device to which the computer system was most recently connected (e.g., as described above in FIG. 9C) (e.g., upon initially displaying the user interface that includes the plurality of representations and/or while the representation that includes the indication of the second playback device was initially displayed at the first position). Having the representation that includes the indication of the respective playback device displayed at the first position on the user interface including the respective playback device not be the device to which the computer system was most recently connected enables the computer system to display playback devices that are not recently connected, thereby providing improved visual feedback to the user.

In some examples, the determination that a pattern of use associated with a first respective playback device (e.g., 980a1, 980a2, 980b1, and/or 980b2) (e.g., the first playback device, the second playback device, and/or another playback device) (e.g., the determination that the pattern of use associated with the first playback device is the respective type of pattern of use and/or the determination that the pattern of use associated with the second playback device is the respective type of pattern of use) includes a determination being made that the pattern of use associated with the first respective playback device corresponds to use via the respective playback device (e.g., as described above in relation to method 700-method 800) at a respective type of location (e.g., as described above in FIG. 9C) (e.g., a hotel, a home, an office, and/or a mall) (e.g., as described above in relation to method 700-method 800) (e.g., and not at the first location). Displaying the representation that includes the indication of the first playback device is displayed at the first position on the user interface and the representation that includes the indication of the second playback device is displayed at the second position based on the determination being made that the pattern of use associated with the first respective playback device corresponds to use via the respective playback device at the respective type of location allows the computer system to display a playback device based on the type of location at which the pattern of use is detected, thereby providing improved visual feedback to the user and performing an operation when a set of conditions has been met without requiring further user input.

In some examples, the determination that a pattern of use associated with a first respective playback device (e.g., 980a1, 980a2, 980b1, and/or 980b2) (e.g., the first playback device, the second playback device, and/or another playback device) (e.g., the determination that the pattern of use associated with the first playback device is the respective type of pattern of use and/or the determination that the pattern of use associated with the second playback device is the respective type of pattern of use) is made in accordance with a determination being made that the pattern of use associated with the first respective playback device corresponds to use of a respective application (e.g., 610) (e.g., a media application, a music application, a video application, and/or a podcast application) via the respective playback device at a respective location (e.g., a micro-location inside of a home, office, building, and/or apartment) (e.g., as described above in relation to method 700-method 800) (e.g., as described above in FIG. 9C). Displaying the representation that includes the indication of the respective playback device is displayed at the first position on the user interface based on whether the pattern of use corresponds to use of a respective application allows the computer system to display a playback device that has a pattern of being used while the computer system is executing a respective application at a respective location, thereby providing improved visual feedback to the user and performing an operation when a set of conditions has been met without requiring further user input.

In some examples, the respective application is an application (e.g., 610) that is operating in the foreground (e.g., as described above in relation to method 700-method 800). In some examples, the respective application is not an application that is operating in the background (e.g., as described above in relation to method 700-method 800) (e.g., as described above in FIG. 9C). Displaying the representation that includes the indication of the respective playback device is displayed at the first position on the user interface based on whether the pattern of use corresponds to use of a respective application that is operating in the foreground allows the computer system to display a playback device that has a pattern of being used while the computer system is executing respective application in the foreground at a respective location, thereby providing improved visual feedback to the user and performing an operation when a set of conditions has been met without requiring further user input.

In some examples, while displaying the user interface that includes the plurality of representations (e.g., 920*b*1, 920*b*2, 920*b*3, and/or 920*b*4), the computer system detects an input (e.g., 905*c*) (e.g., a tap, and/or a non-tap input (e.g., a gaze input, an air input (e.g., a pointing input above a screen, and/or a hover action), and/or a mouse click)) directed to a respective representation of the plurality of representations. In some examples, in response to detecting the input directed to the respective representation of the plurality of representations, in accordance with a determination that the input is directed to the representation that includes the indication (e.g., 920*b*1, 920*b*2, 920*b*3, and/or 920*b*4) of the first playback device (e.g., 980*a*1, 980*a*2, 980*b*1, and/or 980*b*2), the computer system causes the first playback device to output content (e.g., 976*a*1) that the computer system (e.g., 600) is configured to (outputting content and/or set to output content) playback (e.g., before and/or immediately before the detecting the input directed to the plurality of representations) (and, in some examples, without causing the second playback device to output content that the computer system was configured to play back). In some examples, in response to detecting the input directed to the respective representation of the plurality of representations, in accordance with a determination that the input is directed to the representation that includes the indication of the second playback device (e.g., 980*a*1, 980*a*2, 980*b*1, and/or 980*b*2), the computer system causes the second playback device to output the content that the computer system is configured to playback (and, in some examples, without causing the first playback device to output content that the computer system was configured to playback). Causing the first playback device to output content that the computer system is configured to play back in accordance with a determination that the input is directed to the representation that includes the indication of the first playback device and/or causing the second playback device to output the content that the computer system is configured to playback in accordance with the determination that the input is directed to the representation that includes the indication of the second playback device enables the computer system to output content to the respective playback device as directed and allows the user control of which playback device to cause output from a location, thereby providing additional control options without cluttering the user interface, providing improved visual feedback to the user, and reducing the number of inputs needed to perform an operation.

In some examples, the first position (e.g., the position of living room speaker control 920*b*3 in FIG. 9C, and/or the position of bedroom television control 920*b*2 in FIG. 9H) is adjacent to the second position (e.g., the position of bedroom speaker control in FIG. 9C and/or 9H, the position of bedroom television control in FIG. 9H, the position of living room television control in FIGS. 9C and/or 9H, and/or the position of living room speaker control in FIG. 9C) (e.g., as described above in FIG. 9B). In some examples, the first position is adjacent to the second position in a sequential list. In some examples, the plurality of representations are in the sequential list. In some examples, the first position is listed sequentially above, to the right of, to the left of, and/or below and adjacent to the second position in the sequential list of representations.

In some examples, the second position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) is not adjacent to the first position (e.g., the position of living room speaker control 920*b*3 in FIG. 9C, and/or the position of bedroom television control 920*b*2 in FIG. 9H). In some examples, a representation that includes an indication (e.g., 920*b*1, 920*b*2, 920*b*3, and/or 920*b*4) of a fourth playback device (e.g., 980*a*1, 980*a*2, 980*b*1, and/or 980*b*2) that is displayed at a fourth position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) on the user interface (e.g., 920) is between the first position and the second position. In some examples, a representation that includes an indication of a fifth playback device (e.g., 980*a*1, 980*a*2, 980*b*1, and/or 980*b*2) is displayed at a fifth position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) on the user interface is between the first position of the second position. In some examples, the fifth playback device is different from the first playback device (e.g., 980*a*1, 980*a*2, 980*b*1, and/or 980*b*2), the second playback device (e.g., 980*a*1, 980*a*2, 980*b*1, and/or 980*b*2), and the fourth playback device. In some examples, the fourth playback device is different from the first playback device and the second playback device (e.g., 980*a*1, 980*a*2, 980*b*1, and/or 980*b*2). In some examples, the fourth position is different from the first position, the second position, and the fifth position. In some examples, the fifth position is different from the first position and the second position. In some examples, the representation that includes the indication of the fourth playback device is in (e.g., are arranged in, display of these are in and/or ordered in) alphabetical order relative to the representation that includes the indication of the fifth playback device and the other representations (and/or, in some examples, all) in the plurality of representations.

Note that details of the processes described above with respect to method 1000 (e.g., FIG. 10) are also applicable in an analogous manner to other methods described herein. For example, method 700 optionally includes one or more of the characteristics of the various methods described above with reference to method 1000. For example, one or more steps of method 1000 can be used to display a set of external devices at particular positions after automatically connecting to an external device of the set of external devices using one or more steps of method 700. For brevity, these details are not repeated below.

FIGS. 11A-11J illustrate exemplary user interfaces for managing media controls in accordance with some examples. The user interfaces in these figures are used to illustrate the processes described below, including the processes in FIGS. 12 and 13.

Figure 11A:
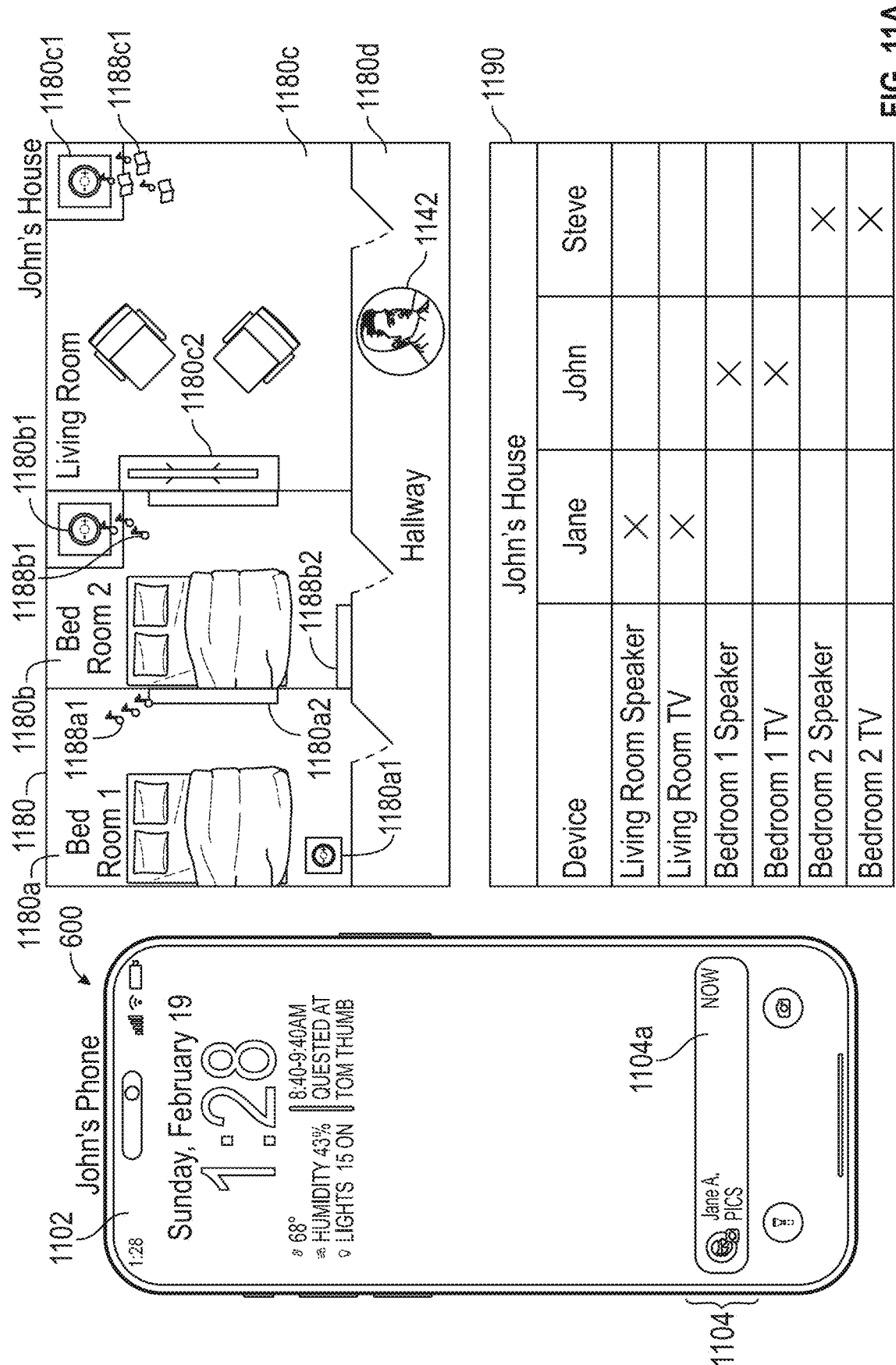
FIGS. 11A-11J illustrate exemplary user interfaces for managing media controls, in accordance with some examples.

FIG. 11A illustrates graphical representation of John's House 1180 for exemplary purposes to describe one or more scenarios in relation to FIGS. 11A-11J. Graphical representation of John's House 1180 indicates the position of user 1142 (e.g., "John") relative to one or more rooms (and/or micro-locations) inside of John's House. At FIG. 11A, user 1142 is holding computer system 600 while standing at a particular position in John's House 1180. Graphical representation of John's House 1180 includes bedroom 1180*a*, bedroom 1180*b*, living room 1180*c*, and hallway 1180*d*. Bedroom 1180*a* includes bedroom speaker 1180*a*1 and bedroom television 1180*a*2. Bedroom 1180*b* includes bedroom speaker 1180*b*1 and bedroom television 1180*b*2 and living room 1180*c* includes living room speaker 1180*c*1 and living room television 1180*c*2. In FIG. 11A, hallway 1180*d* does not include any speakers and/or televisions, and user 1142 is positioned in hallway 1180*d*. As indicated by Table 1190, Jane is the last person to have played media using living room speaker 1180*c*1 and living room television 1180*c*2 (e.g., represented by the "X" in Table 1190), John is the last person to have played media using bedroom speaker 1180*a*1 and bedroom television 1180*a*2, and Steve is the last person to have played media using bedroom speaker 1180*b*1 and bedroom television 1180*b*2. Moreover, at FIG. 11A, bedroom television 1180*a*2 is outputting media (e.g., indicated by playback indication 1188*a*1), bedroom speaker 1180*b*1 is outputting media (e.g., indicated by playback indicator 1188*b*1), and living room speaker 1180*c*1 is outputting media (e.g., indicated by playback indicator 1188*c*1). In addition to the description above, the state of the external devices described in relation to the graphical representation of John's House 1180, for exemplary purposes, are provided to describe one or more scenarios in relation to FIGS. 11A-11J and, in particular, one or more scenarios involving how one or more notifications and/or controls are displayed via computer system 600 (e.g., John's Phone) as John moves between micro-locations (e.g., rooms) in John's House. Even further, one or more determinations will be described concerning whether John initiated playback of media and/or whether John is near a particular external device in order to cause computer system 600 to display one or more notifications and/or controls.

As illustrated in FIG. 11A, computer system 600 is displaying a lock screen user interface 1102 while computer system 600 is operating in a locked state. While displaying lock screen user interface 1102, computer system 600 displays set of notifications 1104, which includes message notification 1104*a* at FIG. 11A. At some point between FIGS. 11A-11B, user 1142 (e.g., John) moves from hallway 1180*d* to bedroom 1180*a*, which includes bedroom speaker 1180*a*1 and bedroom television 1180*a*2.

Figure 11B:
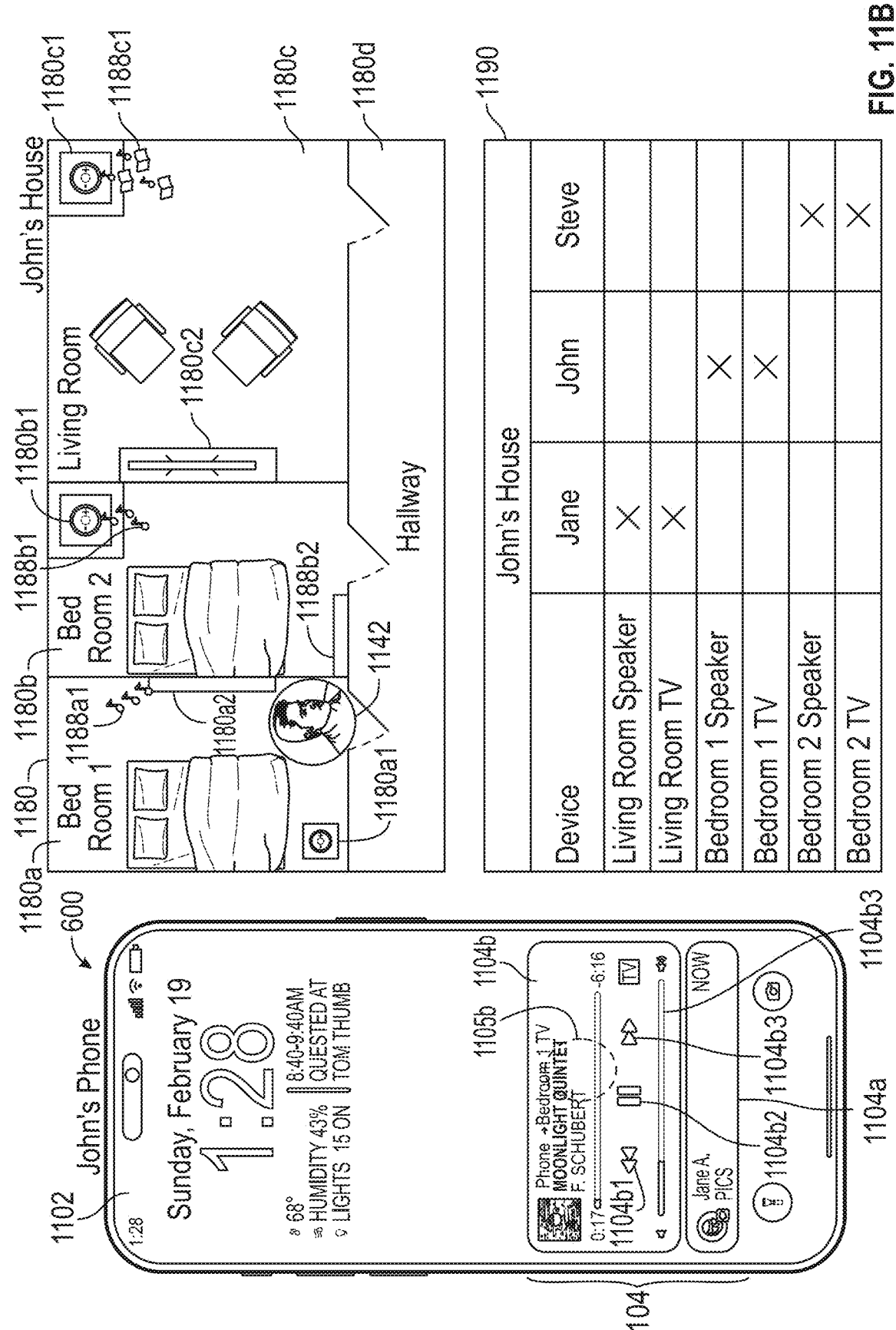

At FIG. 11B, a determination is made that computer system 600 is near (e.g., within a predetermined distance (e.g., 1-10 meters) and/or within a micro-location that includes) bedroom television 1180*a*2 while bedroom television 1180*a*2 is currently playing back media (e.g., as indicated by playback indicator 1188*a*1) and John was the last person to cause bedroom television 1180*a*2 to playback media (e.g., as indicated by table 1190). Because this determination is made, computer system 600 displays media control notification 1104*b* as a part of the set of notifications 1104 and above message notification 1104*a*. Media control notification 1104*b* includes an identification of bedroom television 1180*a*2 ("Bedroom 1 TV"), an identification of the media being played back by bedroom television 1180*a*2 ("MOONLIGHT QUINTENT|F. SCHUBERT"), one or more controls for managing media being played back by bedroom television 1180*a*2, such as skip-back control 1104*b*1, pause control 1104*b*2, skip-forward control 1104*b*3, and volume control 1104*b*4. In some examples, in response to detecting an input directed to skip-back control 1104*b*1, computer system 600 causes bedroom television 1180*a*2 to play a previous track of media. In some examples, in response to detecting an input directed to pause control 1104*b*2, computer system 600 causes bedroom television 1180*a*2 to pause playback of media. In some examples, in response to detecting input on skip-forward control 1104*b*3, computer system 600 causes bedroom television 1180*a*2 to play a next track of media. In some examples, in response to detecting an input directed to volume control 1104*b*4, computer system 600 causes bedroom television 1180*a*2 to adjust the volume of media being played back. In some examples, computer system 600 detects tap input 1105*b* on media control notification 1104*b*. In some examples, in response to detecting tap input 1105*b*, computer system 600 displays a music application user interface, using similar techniques described below in relation to displaying media user interface 1120 at FIG. 11G. In some examples, computer system 600 is configured to control media at an external device while displaying a media notification control. At some point between FIGS. 11B-11C, user 1142 (e.g., John) moves from bedroom 1180*a* to bedroom 1180*b*, which includes bedroom speaker 1180*b*1 and bedroom television 1180*b*2.

Figure 11C:
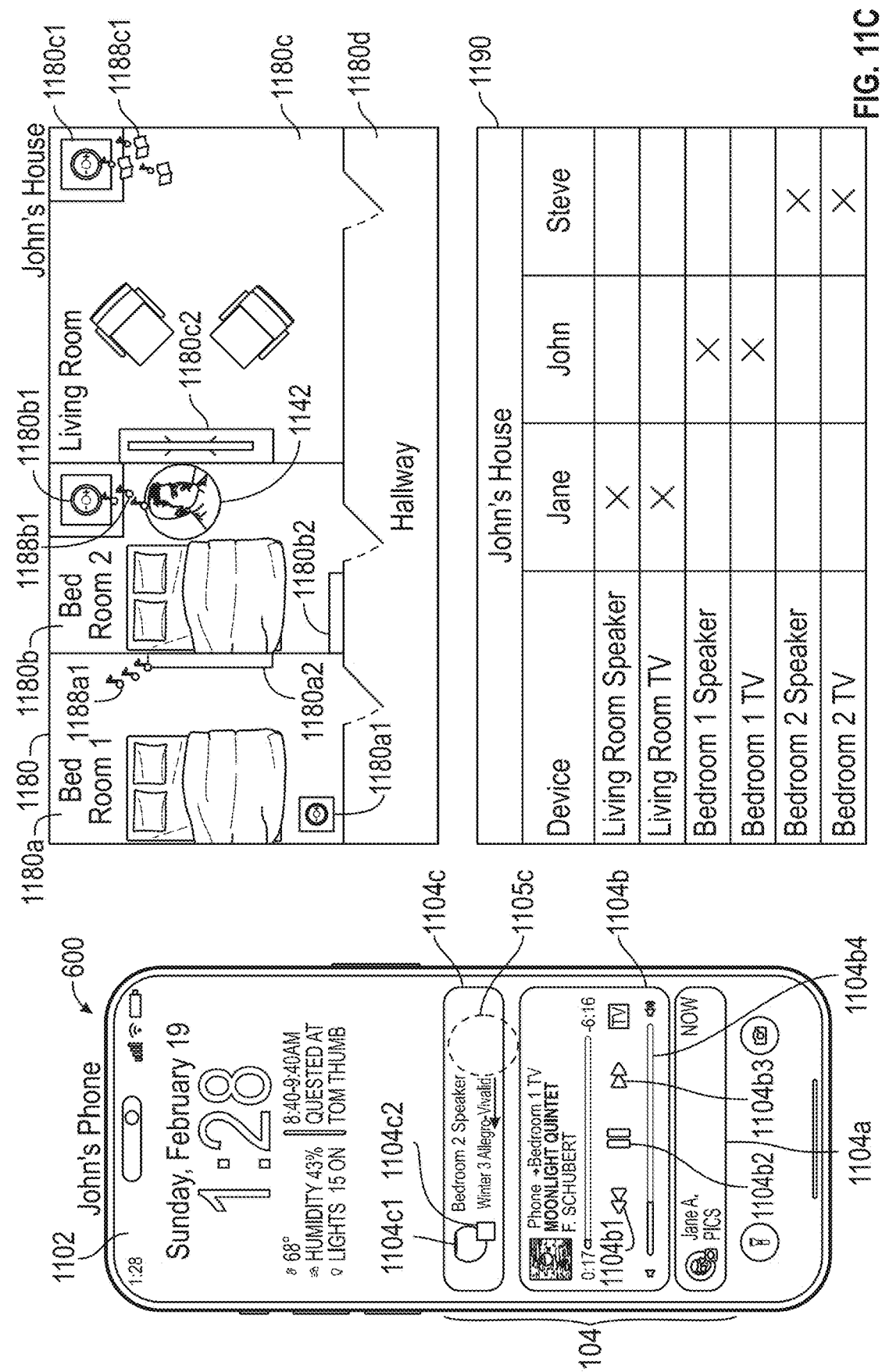

At FIG. 11C, a determination is made that computer system 600 is near bedroom speaker 1180*b*1 while bedroom speaker 1180*b*1 is currently playing back media (e.g., as indicated by playback indicator 1188*b*1) and John was not the last person to cause bedroom speaker 1180*b*1 to playback media (e.g., as indicated by table 1190). Because and/or as a result that this determination is made, computer system 600 displays suggestion to control notification 1104*c*. Notably, control notification 1104*c* does not include one or more controls that would cause bedroom speaker 1180*b*1 to adjust playback of media. Here, the reason why computer system 600 displays suggestion to control notification 1104*c*, instead of a media control notification, is due to the fact that John is not the owner (e.g., the last person to cause bedroom speaker 1180*b*1 to playback media) of the operation that caused bedroom speaker 1180*b*1 to initiate playback of media. In other words, computer system 600 did not cause bedroom speaker 1180*b*1 to initiate playback of the media that is currently playing via bedroom speaker 1180*b*1. As illustrated in FIG. 11C, computer system 600 displays device speaker indication 1104*c*1 on control notification 1104*c*, which indicates that computer system 600 can cause a speaker (e.g., bedroom speaker 680*b*1) to playback media (e.g., "WINTER 3 ALLEGRO|VIVALDI" indicated on control notification 1104*c*). As illustrated in FIG. 11C, computer system 600 displays graphical album art indication 1104*c*2 which indicates what bedroom speaker 680*b*1 is currently playing back.

Notably, computer system 600 displays suggestion to control notification 1104*c* concurrently with media control notification 1104*b*, where one or more inputs on media control notification 1104*b* causes bedroom television 1180*a*2 to adjust playback of media (e.g., as described above in relation to FIG. 6B). Thus, at FIG. 11C, computer system 600 provides access to both a suggestion to control (e.g., notification) and a control that, when selected, causes the computer system to adjust playback of media on at least one external device. At FIG. 11C, computer system 600 detects leftward swipe input 1105*c* on suggestion to control notification 1104*c*.

Figure 11D:
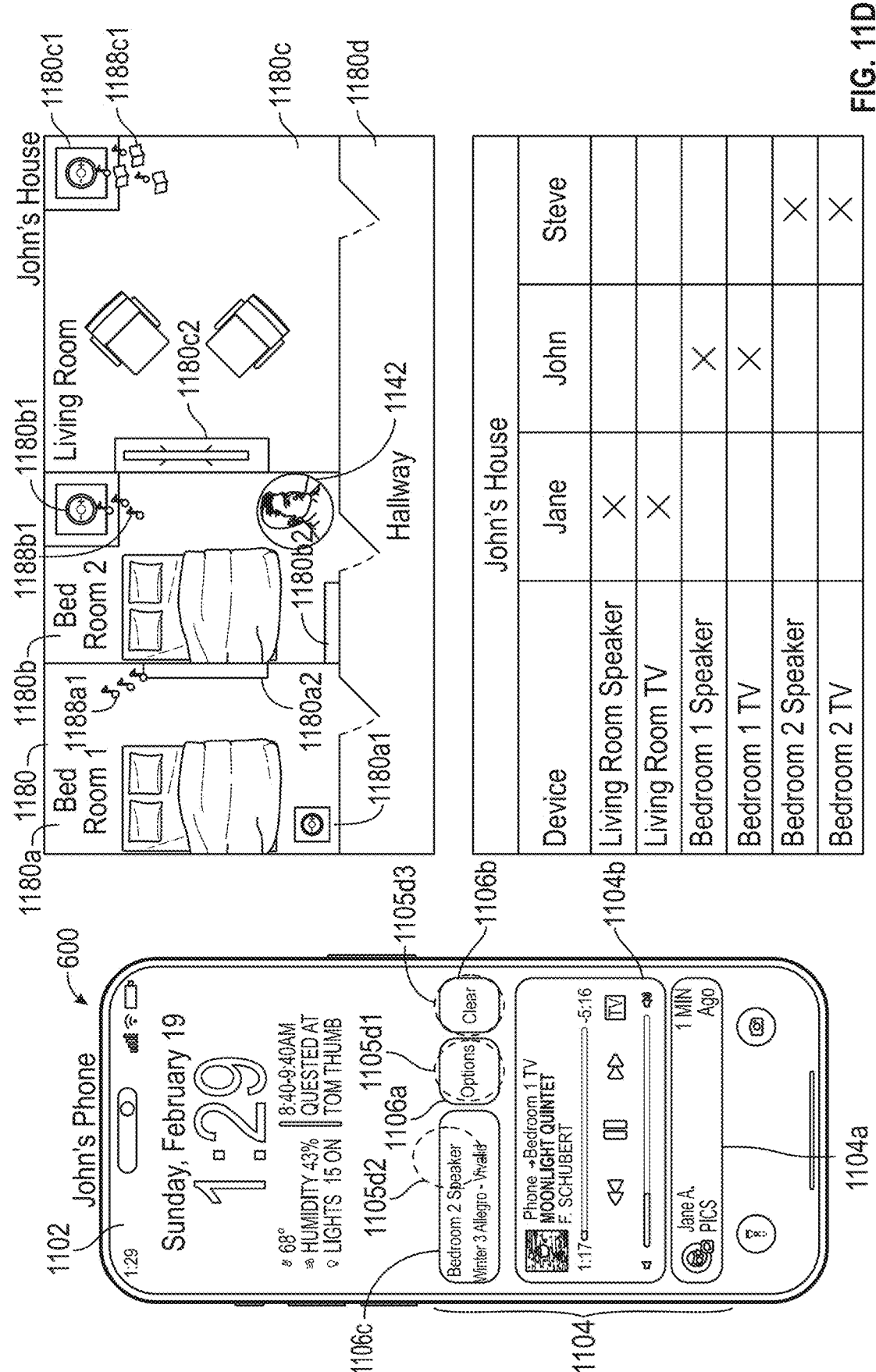

As illustrated in FIG. 11D, in response to detecting leftward swipe input 1105*c*, computer system 600 moves control notification 1104*c* and displays options control 1106*a* and clear control 1106*b* in the space vacated by control notification 1104*c*. In some examples, in response to detecting tap input 1105*d*1 directed to options control 1106*a*, computer system 600 displays one or more settings concerning notifications (e.g., how notifications are delivered and/or how notifications are displayed via the lock screen user interface 1102). In some examples, in response to detecting tap input 1105*d*2 directed to clear control 1106*b*, computer system 600 ceases to display control notification 1104*c* (and, in some examples, options control 1106*a* and clear control 1106*b*). In some examples, in response to detecting tap input 1105*d*2 directed to clear control 1106*b*, computer system 600 continues to display media control notification 1104*b*. At FIG. 11D, computer system 600 detects tap input 1105*d*3 on control notification 1104*c*.

Figure 11E:
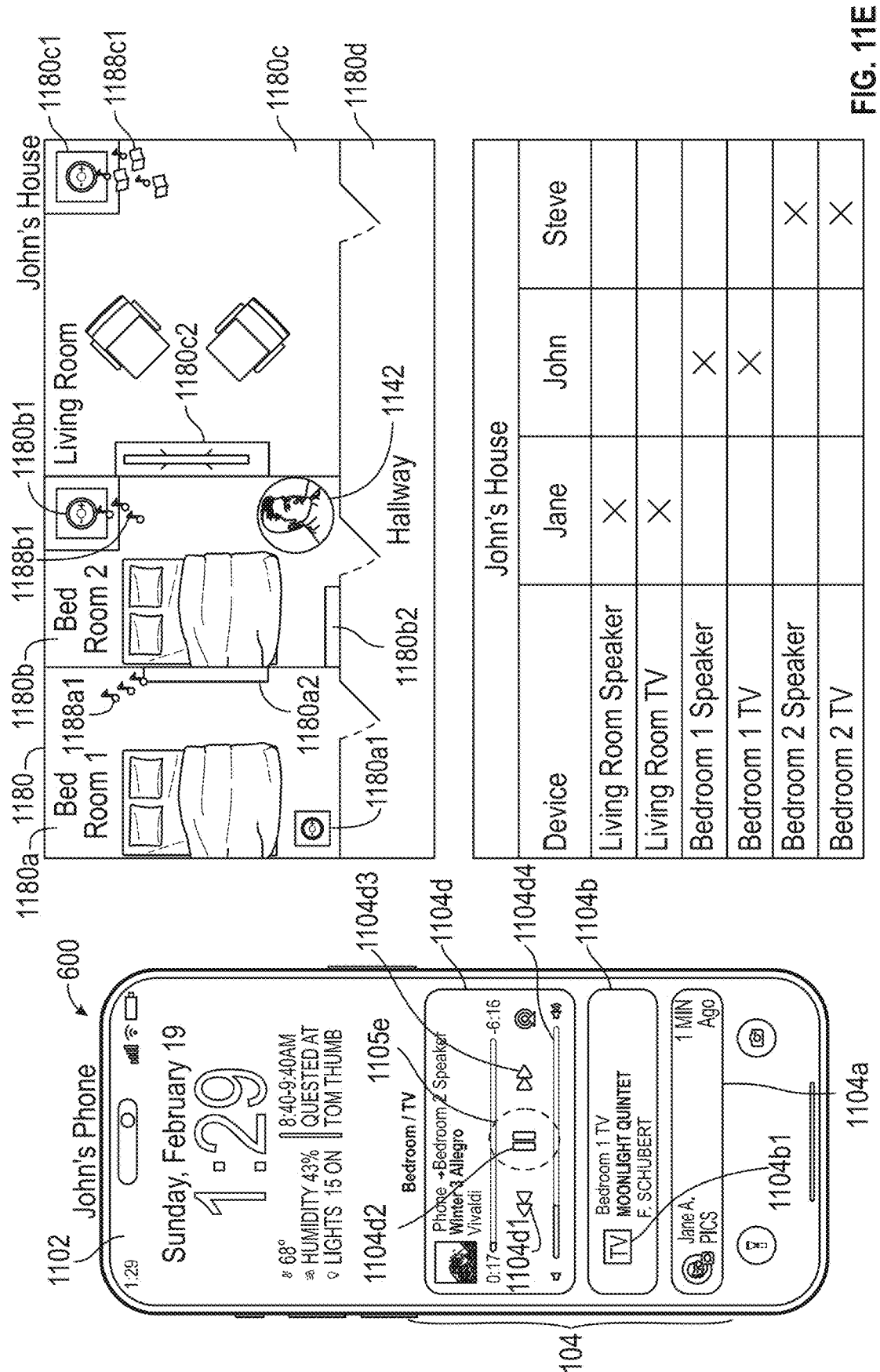

As illustrated in FIG. 11E, in response to detecting tap input 1105*d*, computer system 600 expands control notification 1104*c* as illustrated in FIG. 11D to display media control notification 1104*d* as illustrated in FIG. 11E. Media control notification 1104*d* includes one or more controls for managing media being played back by bedroom speaker 1180*b*1, such as skip-back control 1104*d*1, pause control 1104*d*2, skip-forward control 1104*d*3, and volume control 1104*d*4. In some examples, in response to detecting an input directed to skip-back control 1104*d*1, computer system 600 causes bedroom speaker 1180*b*1 to play a previous track of media. In some examples, in response to detecting an input directed to pause control 1104*d*2, computer system 600 causes bedroom speaker 1180*b*1 to pause playback of media. In some examples, in response to detecting an input on skip-forward control 1104*d*3, computer system 600 causes bedroom speaker 1180*b*1 to play a next track of media. In some examples, in response to detecting an input directed to volume control 1104*d*4, computer system 600 causes bedroom speaker 1180*b*1 to adjust the volume of media being played back.

As illustrated in FIG. 11E, in response to detecting tap input 1105*d*, computer system 600 collapses media control notification 1104*b* as illustrated in FIG. 11D to display suggestion to control notification 1104*e*. As illustrated in FIG. 11E, media control notification 1104*b* includes device television indication 1104*b*1 which indicates that computer system 600 can cause bedroom television 1180*a*2 to playback media (e.g., "MOONLIGHT QUINTET|F SCHUBERT" indicated on media control notification 1104*b*).

By collapsing media control notification 1104*b* of FIG. 11D to display suggestion to control notification 1104*e*, computer system 600 makes room to display media control notification 1104*d* as illustrated in FIG. 11E. At FIG. 11E, computer system 600 detects tap input 1105*e* on pause control 1104*d*2.

Figure 11F:
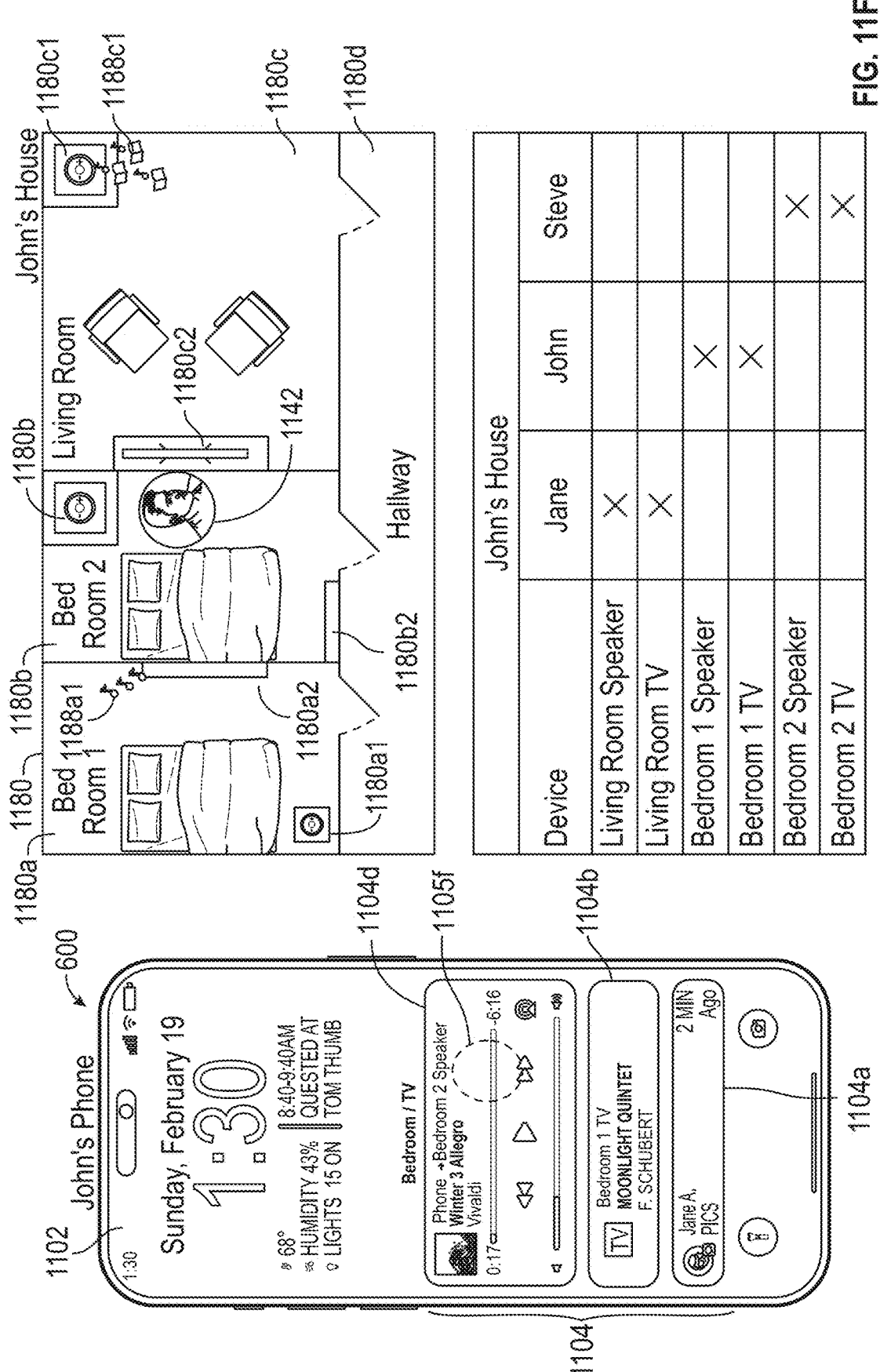

As illustrated in FIG. 11F, in response to detecting tap input 1105*e*, computer system 600 causes bedroom speaker 1180*b*1 to pause playback of music (e.g., which is indicated by no playback indicator being illustrated in FIG. 11F by bedroom speaker 1180*b*1 as compared to playback indicator 1188*b*1 being illustrated in FIG. 11E). At FIG. 11F, computer system 600 detects tap input 1105*f* on display media control notification 1104*d*.

Figure 11G:
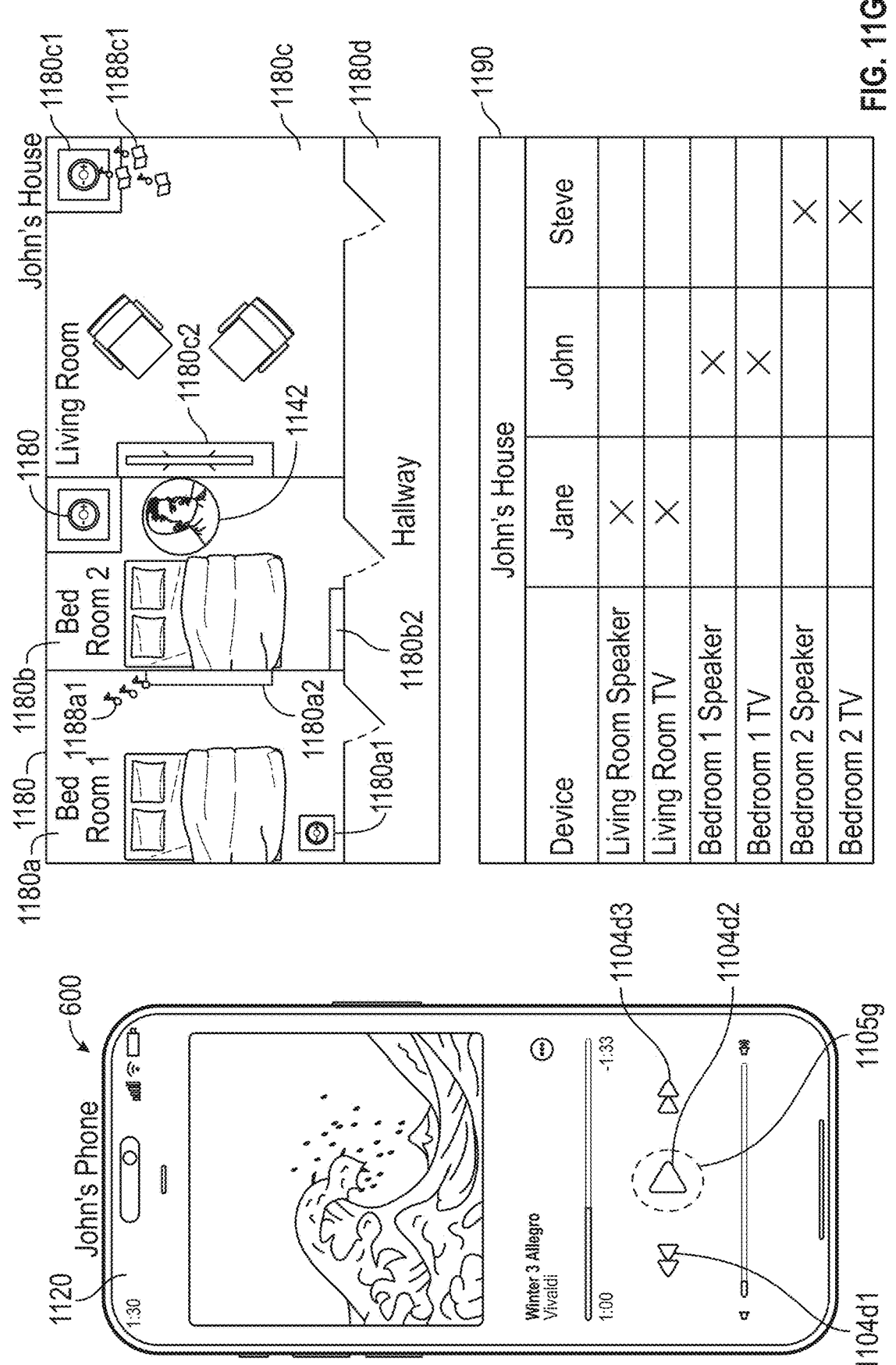

As illustrated in FIG. 11G, in response to detecting tap input 1105*f*, computer system 600 displays media user interface 1120, which includes skip-back control 1104*d*1, play control 1104*d*2, and skip-forward control 1104*d*3. At FIG. 11G, computer system 600 detects tap input 1105*g* on play control 1104*d*2.

Figure 11H:
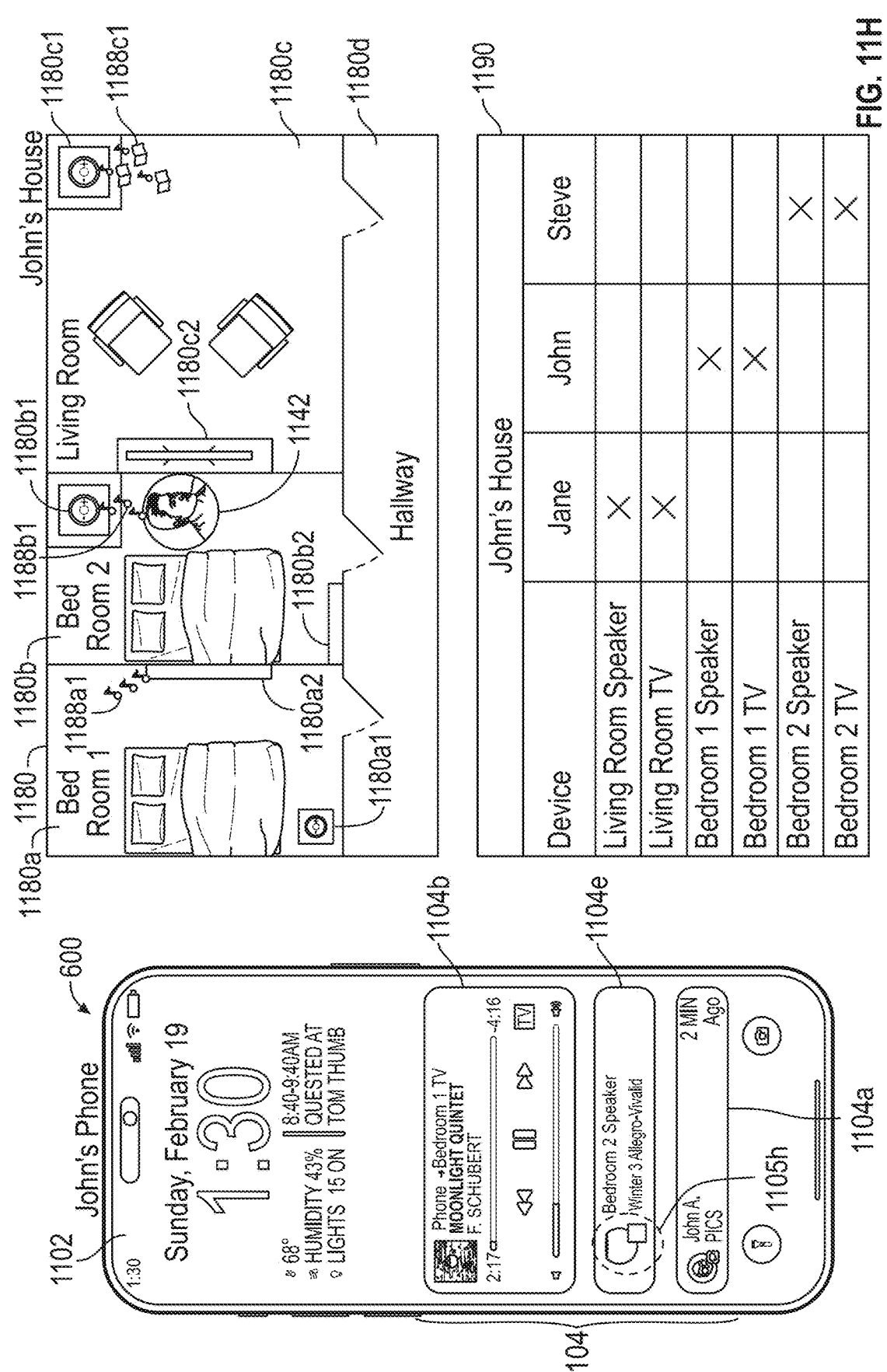

At FIG. 11H, in response to detecting tap input 1105*g*, computer system 600 causes bedroom speaker 1180*b*1 to continue playback of music (e.g., as indicated by 1188*b*1). It should be understood that FIG. 11H is displayed sometime after detecting tap input 1105*g* and, in some examples, is not displayed in response to detecting tap input 1105*g*. In some examples, FIG. 11H is displayed after detecting that a lock event has occurred (e.g., a user has requested to unlock computer system 600 and/or a user has not used computer system 600 for a predetermined period of time (1-300 seconds)). At FIG. 11H, computer system 600 detects tap input 1105*h* directed to suggestion to control notification 1104*e*.

Figure 11I:
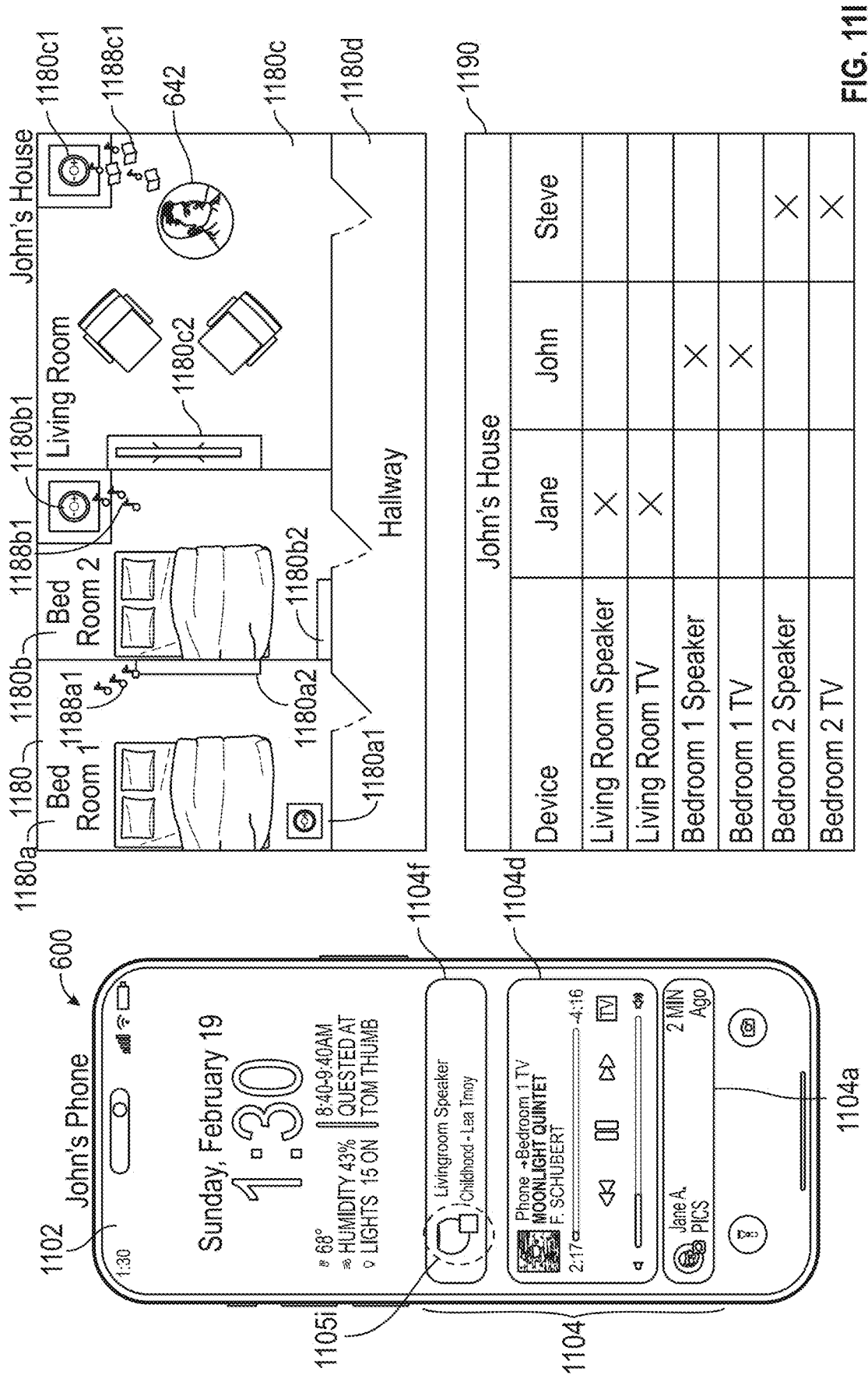

As illustrated in FIG. 11I, in response to detecting tap input 1105*h*, computer system 600 expands suggestion to control notification 1104*e* to display media control notification 1104*d*. At FIG. 11I, computer system 600 displays media control notification 1104*d* for managing media being played back by bedroom television 1180*a*2, using one or more techniques as described above in relation to FIGS. 11B-11C. In some examples, in response to detecting tap input 1105*h*, computer system 600 collapses media control notification 1104*d* to display suggestion to control notification 1104*c*.

Moreover, at some point between FIGS. 11H-11I, user 1142 (e.g., John) moves from bedroom 1180*b* to living room 1180*c*, which includes living room speaker 1180*c*1 and living room television 1180*c*2. At FIG. 11I, a determination is made that computer system 600 is near living room speaker 1180*c*1 while living room speaker 1180*c*1 is currently playing back media (e.g., as indicated by playback indicator 1188*c*1) and John was not the last person to cause living room speaker 1180*c*1 to playback media (e.g., as indicated by table 1190). Because and/or as a result that this determination is made, computer system 600 displays suggestion to control notification 1104*f* at FIG. 11I. In some examples, computer system 600 replaces suggestion to control notification 1104*c* of FIG. 11H with suggestion to control notification 1104*f* of FIG. 11I after and/or in response to this determination being made. At FIG. 11I, computer system 600 detects tap input 1105*i* on suggestion to control notification 1104*f*.

Figure 11J:
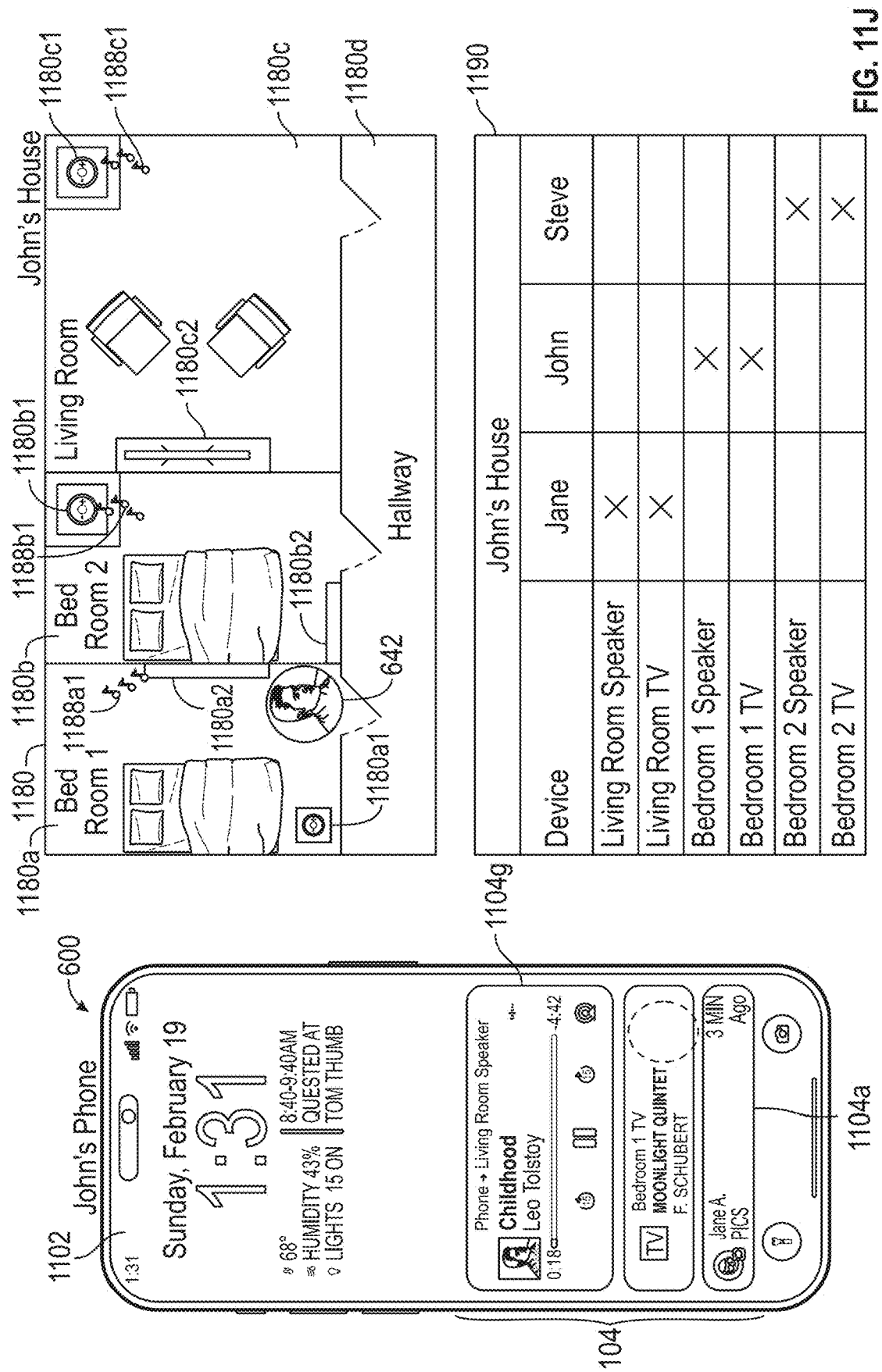

As illustrated in FIG. 11J, in response to detecting tap input 1105*i*, computer system 600 expands suggestion to control notification 1104*f* to media control notification 1104*g*, where media control notification 1104*g* includes one or more controls (e.g., similar to those described above to the other media controls notification) for managing media being output by living room speaker 1180*c*1. FIG. 11J is provided to illustrate that computer system 600 displays media control notification 1104*g*, although user 642 is back in bedroom 1180*a* while bedroom television 1180*a*2 is outputting media (e.g., as indicated by playback indicator 1188*a*1). Here, computer system 600 does not re-display one or more controls for managing media output by bedroom speaker 1180*a*1 even though user 642 (e.g., "John") initiated playback of media output by bedroom speaker 1180*a*1 (e.g., as indicated by Table 1190) and user 642 is near bedroom speaker 1180*a*1 while bedroom speaker 1180*a*1 is outputting media. In some examples, computer system 600 automatically re-displays one or more controls for managing media output by bedroom speaker 1180*a*1 because a determination is made that user 642 initiated playback of media output by bedroom speaker 1180*a*1 and user 642 is near bedroom speaker 1180*a*1 while bedroom speaker 1180*a*1 is outputting media.

FIG. 12 is a flow diagram illustrating a method (e.g., method 1200) for controlling media playback in accordance with some examples. Some operations in method 1200 are, optionally, combined, the orders of some operations are, optionally, changed, and some operations are, optionally, omitted.

As described below, method 1200 provides an intuitive way for controlling media playback. Method 1200 reduces the cognitive burden on a user for controlling media playback, thereby creating a more efficient human-machine interface. For battery-operated computing devices, enabling a user to control media playback faster and more efficiently conserves power and increases the time between battery charges.

In some examples, method 1200 is performed at a first computer system (e.g., 600) (e.g., a phone, computer, tablet, and/or wearable device) that is in communication with a display generation component. In some examples, the first computer system is a phone, a watch, a tablet, a fitness tracking device, a wearable device, a television, a multimedia device, an accessory, a speaker, a head-mounted display (HMD), and/or a personal computing device. In some examples, the first computer system is in communication with input/output devices, such as one or more cameras, speakers, microphones, sensors (e.g., heart rate sensor, monitors, Bluetooth, near-field communication sensors, and/or Wi-Fi sensors).

At 1202, while a second computer system (e.g., 1180*a*1, 1180*a*2, 1180*b*1, 1180*b*2, 1180*c*1, and/or 1180*c*2) (e.g., an external audio device, an external video device) is configured to (e.g., is currently playing media, is paused from playing media, and/or is preparing to play media (e.g., buffering and/or loading)) playback media (e.g., video, music, and/or applications), displaying, via the display generation component, a user interface (e.g., 1102) (e.g., lock screen, home screen, and/or a user interface that is displayed while the computer system is in a locked state (e.g., a state that requires a password and/or other information to be entered before the computer system can transition into an unlocked state and/or a state that is more secure, less functional, and/or includes less information than another state in which the computer system can operate)) that includes (at 1204) in accordance with a determination that at least one computer system (e.g., 1180*a*1, 1180*a*2, 1180*b*1, 1180*b*2, 1180*c*1, and/or 1180*c*2) in a set of one or more computer systems (e.g., 1180*a*1, 1180*a*2, 1180*b*1, 1180*b*2, 1180*c*1, and/or 1180*c*2) that includes the first computer system (e.g., 600) initiated playback (e.g., started, paused, skipped tracks, rewind, and/or commanded the media) of media at the second computer system (e.g., 1180*a*1, 1180*a*2, 1180*b*1, 1180*b*2, 1180*c*1, and/or 1180*c*2) (and, in some examples, a determination that a user of the first computer system initiated playback of media and/or the set of computer systems) and that the first computer system (e.g., 600) is within a predetermined distance (e.g., within a non-zero threshold distance, and/or a set proximity) (e.g., 1-5 meters) (e.g., 1-10 mm, cm, and/or m) (e.g., inside and/or outside of a bubble, area, and/or section surrounding the computer system) from the second computer system, displaying a first control (e.g., 1104*b*, 1104*d*, 1104*c*, and/or 1104*g*) (e.g., play, pause, skip, rewind, add subtitles, and/or change playlists) that, when selected (e.g., 1105*c*, 1105*d*2, 1105*f*, 1105*h*, and/or 1105*i*), causes the first computer system to adjust playback of media at the second computer system. In some examples, the first computer system initiated playback of media at the second computer system. In some examples, another computer system in the set of one or more computer systems initiated playback of media at the second computer system.

At 1202, while a second computer system (e.g., 1180*a*1, 1180*a*2, 1180*b*1, 1180*b*2, 1180*c*1, and/or 1180*c*2) (e.g., an external audio device, an external video device) is configured to (e.g., is currently playing media, is paused from playing media, and/or is preparing to play media (e.g., buffering and/or loading)) playback media (e.g., video, music and/or applications), displaying, via the display generation component, a user interface (e.g., 1102) (e.g., lock screen, home screen, and/or a user interface that is displayed while the computer system is in a locked state (e.g., a state that requires a password and/or other information to be entered before the computer system can transition into an unlocked state and/or a state that is more secure, less functional, and/or includes less information than another state in which the computer system can operate)) that includes: (at 1206) in accordance with a determination at least one computer system (e.g., 1180*a*1, 1180*a*2, 1180*b*1, 1180*b*2, 1180*c*1, and/or 1180*c*2) in the set of one or more computer systems (e.g., 1180*a*1, 1180*a*2, 1180*b*1, 1180*b*2, 1180*c*1, and/or 1180*c*2) that includes the first computer system (e.g., 600) did not initiate playback (e.g., did not start, pause, skip tracks, rewind, an/or command the media) of media at the second computer system (e.g., 1180*a*1, 1180*a*2, 1180*b*1, 1180*b*2, 1180*c*1, and/or 1180*c*2) and that the first computer system is within the predetermined distance from the second computer system, the first computer system displays a suggestion (e.g., 1104*e*, and/or 1104*f*) (e.g., a notification and/or indication that does not include the control playback of media and/or a notification and/or indication that includes a prompt to control playback of second media) to control playback of media at the second computer system (and, in some examples, without displaying a control that, when selected, causes the computer system to adjust the media at the second computer system). In some examples, in accordance with a determination that a user of the first computer system initiated playback of media and that the computer system is within a predetermined distance from the second computer system, the computer system does not display the suggestion to control playback of media at the second computer system. In some examples, the first computer system determines that the user of the first computer system initiated the media and the first computer system is within the predetermined distance from the second computer system. In some examples, the first computer system determines that the user of the first computer system did not initiate the media and the first computer system is the predetermined distance from the second computer system. In some examples, the determination that the user initiated the media is received from an external computer system (e.g., the second computer system, third computer system, and/or server). In some examples, in accordance with a determination that the user was not the most recent user to control the media, the computer system displays the suggestion to control media (and, in some examples, without displaying the first control). In some examples, the set of one or more computer systems does not include the second computer system. In some examples, the set of one or more computer systems includes only and/or one or more computer systems that are logged into and/or associated with the same user account (e.g., a user of the first computer system and/or a user of another computer system). Displaying the first control that, when selected, causes the first computer system to adjust playback of media at the second computer system in accordance with the determination that at least one computer system in a set of one or more computer systems that includes the first computer system initiated playback of media at the second computer system and that the first computer system is within the predetermined distance from the second computer system and/or displaying the suggestion to control playback of media at the second computer system in accordance with a determination at least one computer system in the set of one or more computer systems that includes the first computer system did not initiate playback of media at the second computer system and that the first computer system is within the predetermined distance from the second computer system enables the first computer system to display a control for controlling playback of media or a suggestion to playback media, thereby providing additional control options without cluttering the user interface with additional displayed controls, performing an operation when a set of conditions has been met without requiring further user input, reducing the number of inputs needed to perform an operation, and providing improved visual feedback to the user.

In some examples, the second position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) is not adjacent to the first position (e.g., the position of living room speaker control 920*b*3 in FIG. 9C, and/or the position of bedroom television control 920*b*2 in FIG. 9H). In some examples, a representation that includes an indication (e.g., 920*b*1, 920*b*2, 920*b*3, and/or 920*b*4) of a fourth playback device (e.g., 980*a*1, 980*a*2, 980*b*1, and/or 980*b*2) that is displayed at a fourth position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) on the user interface (e.g., 920) that is between the first position and the second position. In some examples, a representation that includes an indication of a fifth playback device (e.g., 980*a*1, 980*a*2, 980*b*1, and/or 980*b*2) that is displayed at a fifth position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) on the user interface that is between the first position of the second position. In some examples, the fifth playback device is different from the first playback device (e.g., 980*a*1, 980*a*2, 980*b*1, and/or 980*b*2), the second playback device (e.g., 980*a*1, 980*a*2, 980*b*1, and/or 980*b*2), and the fourth playback device. In some examples, the fourth playback device is different from the first playback device and the second playback device (e.g., 980*a*1, 980*a*2, 980*b*1, and/or 980*b*2). In some examples, the fourth position is different from the first position, the second position, and the fifth position. In some examples, the fifth position is different from the first position and the second position. In some examples, the representation that includes the indication of the fourth playback device is in (e.g., are arranged in, display of these are in and/or ordered in) alphabetical order relative to the representation that includes the indication of the fifth playback device and the other representations (and/or, in some examples, all) in the plurality of representations.

In some examples, the user interface (e.g., 1102) includes: in accordance with a determination at least one computer system (e.g., 1180*a*1, 1180*a*2, 1180*b*1, 1180*b*2, 1180*c*1, and/or 1180*c*2) in the set of one or more computer systems (e.g., 1180*a*1, 1180*a*2, 1180*b*1, 1180*b*2, 1180*c*1, and/or 1180*c*2) that includes the first computer system (e.g., 600) initiated playback of media at the second computer system (e.g., 1180*a*1, 1180*a*2, 1180*b*1, 1180*b*2, 1180*c*1, and/or 1180*c*2) and that the first computer system (e.g., 600) is not within the predetermined distance from the second computer system, the first computer system displays the suggestion (e.g., 1104*e*, and/or 1104*f*) to control playback of media at the second computer system (e.g., without displaying the control that, when selected, causes the computer system to adjust the media at the second computer system) (e.g., without initiating and/or adjusting playback of the media). Displaying the suggestion to control playback of media at the second computer system in accordance with a determination at least one computer system in the set of one or more computer systems that includes the first computer system initiated playback of media at the second computer system and that the first computer system is not within the predetermined distance from the second computer system enables the first computer system to display a suggestion to control the media when a user is less likely to want to control the media, thereby providing additional control options without cluttering the user interface with additional displayed controls, performing an operation when a set of conditions has been met without requiring further user input, reducing the number of inputs needed to perform an operation, and providing improved visual feedback to the user.

In some examples, the second position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) is not adjacent to the first position (e.g., the position of living room speaker control 920*b*3 in FIG. 9C, and/or the position of bedroom television control 920*b*2 in FIG. 9H). In some examples, a representation that includes an indication (e.g., 920*b*1, 920*b*2, 920*b*3, and/or 920*b*4) of a fourth playback device (e.g., 980*a*1, 980*a*2, 980*b*1, and/or 980*b*2) that is displayed at a fourth position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) on the user interface (e.g., 920) is between the first position and the second position. In some examples, a representation that includes an indication of a fifth playback device (e.g., 980*a*1, 980*a*2, 980*b*1, and/or 980*b*2) that is displayed at a fifth position (e.g., the position of bedroom speaker control in FIGS. 9C and/or 9H, the position of bedroom television control in FIG. 9H, the position of living room television control in FIGS. 9C and/or 9H, and/or the position of living room speaker control in FIG. 9C) on the user interface that is between the first position of the second position. In some examples, the fifth playback device is different from the first playback device (e.g., 980*a*1, 980*a*2, 980*b*1, and/or 980*b*2), the second playback device (e.g., 980*a*1, 980*a*2, 980*b*1, and/or 980*b*2), and the fourth playback device. In some examples, the fourth playback device is different from the first playback device and the second playback device (e.g., 980*a*1, 980*a*2, 980*b*1, and/or 980*b*2). In some examples, the fourth position is different from the first position, the second position, and the fifth position. In some examples, the fifth position is different from the first position and the second position. In some examples, the representation that includes the indication of the fourth playback device is in (e.g., are arranged in, display of these are in and/or ordered in) alphabetical order relative to the representation that includes the indication of the fifth playback device and the other representations (and/or, in some examples, all) in the plurality of representations.

In some examples, the user interface (e.g., 1102) includes: in accordance with a determination that at least one computer system (e.g., 1180*a*1, 1180*a*2, 1180*b*1, 1180*b*2, 1180*c*1, and/or 1180*c*2) in the set of one or more computer systems (e.g., 1180*a*1, 1180*a*2, 1180*b*1, 1180*b*2, 1180*c*1, and/or 1180*c*2) that includes the first computer system (e.g., 600) initiated playback of media at the second computer system (e.g., 1180*a*1, 1180*a*2, 1180*b*1, 1180*b*2, 1180*c*1, and/or 1180*c*2) and that the first computer system (e.g., 600) is not within the predetermined distance from the second computer system, the first computer system displays the suggestion (e.g., 1104*e*, and/or 1104*f*) to control playback of media at the second computer system (e.g., without displaying the control that, when selected, causes the computer system to adjust the media at the second computer system) (e.g., without initiating and/or adjusting playback of the media). Displaying the suggestion to control playback of media at the second computer system accordance with a determination at least one computer system in the set of one or more computer systems that includes the first computer system initiated playback of media at the second computer system and that the first computer system is not within the predetermined distance from the second computer system enables the first computer system to display a suggestion to control the media when a user is less likely to want to control the media, thereby providing additional control options without cluttering the user interface with additional displayed controls, performing an operation when a set of conditions has been met without requiring further user input, reducing the number of inputs needed to perform an operation, and providing improved visual feedback to the user.

In some examples, in accordance with a determination that at least one computer system (e.g., 1180*a*1, 1180*a*2, 1180*b*1, 1180*b*2, 1180*c*1, and/or 1180*c*2) in the set of one or more computer systems (e.g., 1180*a*1, 1180*a*2, 1180*b*1, 1180*b*2, 1180*c*1, and/or 1180*c*2) that includes the first computer system (e.g., 600) did initiate playback of media at the second computer system (e.g., 1180*a*1, 1180*a*2, 1180*b*1, 1180*b*2, 1180*c*1, and/or 1180*c*2) and that the first computer system is not within the predetermined distance from the second computer system: the user interface (e.g., 1102) does not include the first control (e.g., 1104*b*, 1104*d*, 1104*c*, and/or 1104*g*); and the user interface does not include the suggestion (e.g., 1104*e*, and/or 1104*f*) to control the media at the second computer system. In some examples, in accordance with a determination that the user of the first computer system did not initiate playback of media at the second computer system and that the first computer system is not within the predetermined distance from the second computer system, the computer system does not initiate playback of media.

In some examples, while displaying, via the display generation component, the user interface (e.g., 1102) includes the suggestion (e.g., 1104*e*, and/or 1104*f*) to control playback of media (e.g., in accordance with a determination the user of the first computer system did not initiate playback of media at the second computer system and that the first computer system is within the predetermined distance from the second computer system), the first computer system detects an input (e.g., 1105*c*) (e.g., a tap, and/or a non-tap input (e.g., a gaze input, an air input (e.g., a pointing input above a screen, and/or a hover action), and/or a mouse click)) directed to the suggestion to control playback of media.

In some examples, while displaying, via the display generation component, the user interface (e.g., 1102) includes in response to detecting the input directed to the suggestion to control playback of media, the first computer system configures the first computer system (e.g., 600) to control playback of media at the second computer system (e.g., 1180*a*1, 1180*a*2, 1180*b*1, 1180*b*2, 1180*c*1, and/or 1180*c*2). In some examples, configuring the first computer system to control playback of media at the second computer system includes displaying the control that, when selected, causes the computer system to adjust the media at the second computer system. Configuring the first computer system to control playback of media at the second computer system in response to detecting the input directed to the suggestion to control playback of media enables the computer system to provide the user with a control to configure the first computer system to control playback of media at the computer system, thereby providing improved feedback and providing additional control options without cluttering the user interface with additional displayed controls.

In some examples, the user interface (e.g., 1102) is a first user interface, and wherein the first user interface includes a user interface object (e.g., 1104*b*, 1104*c*, 1104*d*, and/or 1104*g*) (e.g., a notification, the first control that, when selected, causes the first computer system to adjust the playback media at the second computer system and/or the suggestion to control playback of media at the computer system), and while displaying, via the display generation component, the first user interface that includes the first user interface object, detecting one or more inputs (e.g., 1105*b*, 1105*c*, and/or 1105*d*1) (e.g., a tap, and/or a non-tap input (e.g., a gaze input, an air input (e.g., a pointing input above a screen, and/or a hover action), and/or a mouse click)) that includes an input directed to the first user interface object.

In some examples, the user interface (e.g., 1102) is a first user interface, and wherein the first user interface includes a user interface object (e.g., 1104*b*, 1104*c*, 1104*d*, and/or 1104*g*) (e.g., a notification, the first control that, when selected, causes the first computer system to adjust the playback media at the second computer system and/or the suggestion to control playback of media at the computer system) in response to detecting the one or more inputs that includes the input directed to the first user interface object, the first computer system displays, via the display generation component, a second user interface (e.g., 1120) that includes one or more indications (e.g., 1104*d*1, 1104*d*2, and/or 1104*d*3) (e.g., media art, a song name, and/or an artist name) of media (e.g., media being played back and/or available to be played back) (e.g., at the second computer system and/or at the first computer system). In some examples, the one or more indications of media were not previously displayed on the first user interface. In some examples, the second user interface is different from the first user interface. In some examples, the second user interface is overlaid on and/or over the first user interface. In some examples, the second user interface includes one or more controls that, when selected, causes the computer system to adjust playback of media (e.g., pause, play, skip, fast forward, rewind, and/or go back to previous track). In some examples, the second user interface is full sized and/or takes up most of the display real estate of the computer system when it is shown. Displaying, via the display generation component, a second user interface that includes one or more indications of media in response to detecting the one or more inputs that includes an input directed to the first user interface object, enables the computer system to provide the user with a control for displaying a media application user interface, thereby providing improved feedback and providing additional control options without cluttering the user interface with additional displayed controls.

In some examples, while displaying, via the display generation component, the user interface (e.g., 1102) that includes the first control (e.g., 1104*b*, 1104*d*, 1104*c*, and/or 1104*g*), the first computer system detects a first input (e.g., a tap, and/or a non-tap input (e.g., a gaze input, an air input (e.g., a pointing input above a screen and/or a hover action), and/or a mouse click)) directed to the first control. In some examples, in response to detecting the first input directed to the first control, the first computer system adjusts (e.g., pausing, playing, skipping, fast-forwarding, rewinding, and/or going back to previous track) playback of media at the second computer system (e.g., 1180*a*1, 1180*a*2, 1180*b*1,

1180*b*2, 1180*c*1, and/or 1180*c*2). Adjusting playback of media at the second computer system in response to detecting the first input directed to the first control enables the first computer system to provide the user with the ability to adjust playback of media, thereby providing improved feedback and providing additional control options without cluttering the user interface with additional displayed controls.

In some examples, the user interface (e.g., 1102) is displayed while the computer system (e.g., 600) is operating in a locked state (e.g., as described above in FIG. 11A). In some examples, the controls are displayed while the computer system is not in the locked state. Displaying one or more user interfaces that include the first control or the suggestion to control while the computer system is operating in the locked state allows the computer system to provide the user with controls even while the computer system is operating in the locked state and reduces the number of inputs needed to navigate to the controls before the computer system is directed to operating in an unlock state, thereby providing additional control options without cluttering the user interface, performing an operation when a set of conditions has been met without requiring further user input, reducing the number of inputs needed to perform an operation, and providing improved visual feedback to the user.

In some examples, while displaying, via the display generation component, the user interface (e.g., 1102) that includes displaying the first control (e.g., 1104*b*, 1104*d*, 1104*c*, and/or 1104*g*), the first computer system detects a second input (e.g., 1105*c*) (e.g., a swipe, and/or a non-swipe input (e.g., a moving gaze input, an air input (e.g., a pointing and move input and/or a hover action), and/or a mouse click and drag input)) directed to the first control. In some examples, in response to detecting the second input, the first computer system displays, via the display generation component, a second control (e.g., 1106*a* and/or 1106*b*) (e.g., while continuing to display at least a portion of the first control). In some examples, while displaying the second control, the first computer system detects an input (e.g., 1105*d*1, and/or 1105*d*2) (e.g., a tap, and/or a non-tap input (e.g., a gaze input, an air input (e.g., a pointing input above a screen and/or a hover action), and/or a mouse click)) directed to the second control. In some examples, in response to detecting the input directed to the second control, the first computer system ceases to display the first control and the second control. Ceasing to display the first control and the second control in response to detecting the input directed to the second control enables the computer system to cease to display the respective controls as directed and enables a user to remove unwanted controls from the user interface, thereby providing improved visual feedback to the user and providing additional control options without cluttering the user interface with additional displayed controls.

In some examples, the first control (e.g., 1104*b*, 1104*d*, 1104*c*, and/or 1104*g*) includes an indication (e.g., album art, song name, artist name, and/or song title) of media being played back at the second computer system (e.g., 1180*a*1, 1180*a*2, 1180*b*1, 1180*b*2, 1180*c*1, and/or 1180*c*2). In some examples, the suggestion (e.g., 1104*e*, and/or 1104*f*) to control playback of media does not include the indication of media being played back at the second computer system. In some examples, the first control and the suggestion to control include an indication of the second computer system (e.g., a graphical indication corresponding to the computer system, an image of a speaker, an image of a television, and/or an image of a subwoofer). Displaying the first control that includes the indication of media being played back at the second computer system, or displaying the suggestion to control playback of media that does not include the indication of media being played back at the second computer system, enables the first computer system to display, based on the criteria, information about the media being played back when displaying the control of media at the second computer system when a user is likely to want to control the media and to display a suggestion to control the media when a user is less likely to want to control the media, thereby providing additional control options without cluttering the user interface with additional displayed controls, performing an operation when a set of conditions has been met without requiring further user input, reducing the number of inputs needed to perform an operation, and providing improved visual feedback to the user.

Note that details of the processes described above with respect to method 1200 (e.g., FIG. 12) are also applicable in an analogous manner to other methods described herein. For example, method 800 optionally includes one or more of the characteristics of the various methods described above with reference to method 1200. For example, one or more steps of method 800 can be used to forgo automatic connection to an external device and instead display a control that causes the computer system to adjust playback at the external device using one or more steps of method 1200. For brevity, these details are not repeated below.

FIG. 13 is a flow diagram illustrating a method (e.g., method 1300) for managing media controls in accordance with some examples. Some operations in method 1300 are, optionally, combined, the orders of some operations are, optionally, changed, and some operations are, optionally, omitted.

As described below, method 1300 provides an intuitive way for managing media controls. Method 1300 reduces the cognitive burden on a user for managing media controls, thereby creating a more efficient human-machine interface. For battery-operated computing devices, enabling a user to manage media controls faster and more efficiently conserves power and increases the time between battery charges.

In some examples, method 1300 is performed at a first computer system (e.g., 600) (e.g., a phone, computer, tablet, and/or wearable device) in communication with a display generation component. In some examples, the first computer system is a phone, a watch, a tablet, a fitness tracking device, a wearable device, a television, a multi-media device, an accessory, a speaker, a head-mounted display (HMD), and/or a personal computing device. In some examples, the first computer system is in communication with input/output devices, such as one or more cameras, speakers, microphones, and/or sensors (e.g., heart rate sensor, monitors, Bluetooth, near-field communication sensors, and/or Wi-Fi sensors).

At 1302, the first computer system displays, via the display generation component, a user interface (e.g., 1102) that includes a first control (e.g., 1104*b*, 1104*d*, 1104*c*, and/or 1104*g*) that, when selected (e.g., 1105*c*, 1105*d*2, 1105*f*, 1105*h*, and/or 1105*i*), causes the computer system (e.g., 600) to control playback of first media at a second computer system (e.g., 1180*a*1, 1180*a*2, 1180*b*1, 1180*b*2, 1180*c*1, and/or 1180*c*2) (and, in some examples, the second computer system is different from the first computer system).

At 1304, while displaying, via the display generation component, the user interface (e.g., 1102) that includes the first control (e.g., 1104*b*, 1104*d*, 1104*c*, and/or 1104*g*) and in accordance with a determination that a set of one or more suggestion criteria (e.g., the set of one or more suggestion criteria include the third computer system is currently configured to (e.g., is currently playing media, is paused from playing media, and/or is preparing to play (e.g., buffering and/or loading)) playback second media (e.g., video, music and/or applications), and/or detecting a third computer system is a predetermined distance (e.g., within a non-zero threshold distance, and/or a set proximity)) associated with (e.g., including at least one criteria of the set of one or more suggestion criteria that includes the control of) playback of second media (e.g., video, music and/or applications) at a third computer system (e.g., 1180*a*1, 1180*a*2, 1180*b*1, 1180*b*2, 1180*c*1, and/or 1180*c*2) (e.g., an external audio device, an external video device) has been satisfied, wherein the third computer system is different from the first computer system (e.g., 600) and the second computer system (e.g., 1180*a*1, 1180*a*2, 1180*b*1, 1180*b*2, 1180*c*1, and/or 1180*c*2), the first computer system concurrently displays (e.g., simultaneously), via the display generation component, the first control and a second control (e.g., 1104*e*, and/or 1104*f*) (e.g., a notification that does not include the control playback of second media and/or a notification that includes a prompt to control playback of second media) that, when selected, causes the computer system (e.g., 600) to control playback of second media of the third computer system. In some examples, first media is different from second media. In some examples, the second computer system and/or the third computer system is a phone, a watch, a tablet, a fitness tracking device, a wearable device, a television, a multimedia device, an accessory, a speaker, a head-mounted display (HMD), and/or a personal computing device. In some examples, the second computer system and/or the third computer system is in communication with input/output devices, such as one or more cameras, speakers, microphones, sensors (e.g., heart rate sensor, monitors, Bluetooth, near-field communication sensors, and/or Wi-Fi sensors). In some examples, in response to detecting that the set of one or more suggestion criteria have not been satisfied, the first computer system continues to display (e.g., without replacing) and/or maintains display of the user interface with the first control. In some examples, the set of one or more suggestion criteria are not satisfied (e.g., the third computer system is not currently configured to playback second media, and/or not detecting a third computer system is a predetermined distance); and in response to detecting the suggestion criteria are not satisfied, the first computer system does not display the suggestion to control playback of second media of the third computer system. Concurrently displaying, via the display generation component, the first control and the second control enables the first computer system to automatically display controls for the second computer system while also displaying controls for a third computer system, allowing a user to switch control of playback of media to the third computer system without entering a settings menu and while maintaining control of the second computer system, thereby providing additional control options without cluttering the user interface with additional displayed controls, reducing the number of inputs needed to perform an operation, and providing improved feedback to the user.

In some examples, while displaying, via the display generation component, the second control (e.g., 1104*e*, and/or 1104*f*), the first computer system detects an input (e.g., 1105*d*2, and/or 1105*h*) directed to the second control. In some examples, in response to detecting the input (e.g., a tap, and/or a non-tap input (e.g., a gaze input, an air input (e.g., a pointing input above a screen, and/or a hover action), and/or a mouse click)) directed to the second control, the first computer system configures the first computer system (e.g., 600) to control playback of second media at the third computer system (e.g., 1180*a*1, 1180*a*2, 1180*b*1, 1180*b*2, 1180*c*1, and/or 1180*c*2). In some examples, while concurrently displaying the second control (e.g., a suggestion to control playback of second media of the third computer system) with the first control, the first computer system detects the input directed to the second control. In some examples, in response to detecting the input directed to the second control, the first computer system continues to display of the first control. In some examples, in response to detecting the input directed to the second control, the first computer system ceases display of the first control. In some examples, in response to detecting input directed to the second control, the first computer system expands the second control and collapses the first control. In some examples, the first computer system expands the second control to the area that included the first control previously (e.g., while the first control was expanded). Configuring the first computer system to control playback of second media at the third computer system in response to detecting the input directed to the second control while displaying the second control enables the first computer system to change which computer system it controls from a single user interface, thereby providing additional control options without cluttering the user interface with additional displayed controls, reducing the number of inputs needed to perform an operation, and providing improved feedback to the user.

In some examples, in response to detecting the input (e.g., 1105*d*2, and/or 1105*h*) directed to the second control (e.g., 1104*e*, and/or 1104*f*), the first computer system configures the first computer system (e.g., 600) to not control playback of first media at the second computer system (e.g., 1180*a*1, 1180*a*2, 1180*b*1, 1180*b*2, 1180*c*1, and/or 1180*c*2). In some examples, before detecting the input directed to the second control, the first computer system is configured to control playback of media at the second computer system. Configuring the first computer system to not control playback of first media at the second computer system in response to detecting the input directed to the second control enables the first computer system to provide a control to a user that causes the computer system to remove controls, thereby providing additional control options without cluttering the user interface with additional displayed controls and providing improved feedback to the user.

In some examples, in response to detecting the input (e.g., 1105*d*2, and/or 1105*h*) directed to the second control (e.g., 1104*e*, and/or 1104*f*), the first computer system displays, via the display generation component, a playback control (e.g., 1104*d*1, 1104*d*2, and/or 1104*d*3) that, when selected (e.g., 1105*e*), causes the first computer system (e.g., 600) to adjust playback of second media at the third computer system (e.g., 1180*a*1, 1180*a*2, 1180*b*1, 1180*b*2, 1180*c*1, and/or 1180*c*2). Displaying, via the display generation component, the playback control that, when selected, causes the first computer system to adjust playback of second media at the third computer system in response to detecting the input directed to the second control enables the first computer system to cause adjustment of playback as directed and enables the execution of user commands, thereby providing improved visual feedback to the user and providing additional control options without cluttering the user interface with additional displayed controls.

In some examples, in response to detecting the input (e.g., 1105*d*2, and/or 1105*h*) directed to the second control (e.g., 1104*e*, and/or 1104*f*), the first computer system ceases display of the first control (e.g., 1104*b*, 1104*d*, 1104*c*, and/or 1104*g*). In some examples, in response to detecting the input directed to the second control, the first computer system changes a first visual characteristic (e.g., size, character font, and/or color) of the second control (and/or suggestion control) to a second visual characteristic (e.g., size, character font, and/or color) different than the first visual characteristic while changing the third visual characteristic of the first control to a fourth visual characteristic (e.g., size, character font, and/or color) different than the third visual characteristic. In some examples, the second visual characteristic is the same as the third visual characteristic, and the first visual characteristic is the same as the first visual characteristic. In some examples, each of the first visual characteristic, second visual characteristic, third visual characteristic, and/or fourth visual characteristic are different. In some examples, in response to detecting the input directed to the second control, the first computer system continues to display of the first control. In some examples, in response to detecting a respective input (e.g., a tap, and/or a non-tap input (e.g., a gaze input, an air input (e.g., a pointing input above a screen, and/or a hover action), and/or a mouse click)) directed to the first control, the first computer system is configured to control playback of first media at the second computer system and does not cause the first computer system to control playback of second media at the third computer system. Ceasing display of the first control in response to detecting the input directed to the second control enables the first computer system to remove the first control based on user input, thereby providing additional control options without cluttering the user interface with additional displayed controls and providing improved visual feedback to the user.

In some examples, the set of one or more suggestion criteria includes a criterion that is satisfied when a determination is made that the first computer system (e.g., 600) is within a first predetermined distance (e.g., 1-10 meters) (e.g., a predetermined proximity, and/or a proximity configured to enable communication (e.g., via ultra-wide sensors, Bluetooth, and/or Wi-Fi)) (e.g., as described above in relation to method 1200) of the third computer system (e.g., 1180*a*1, 1180*a*2, 1180*b*1, 1180*b*2, 1180*c*1, and/or 1180*c*2) and playback of third media at the third computer system was not initiated by a user of the first computer system (e.g., as described above in relation to method 1200). Concurrently displaying, via the display generation component, the first control and the second control that, when selected, cause the computer system to control playback of second media of the third computer system while displaying the user interface that includes the first control and in accordance with the determination that a set of one or more suggestion criteria associated with playback of second media at the third computer system has been satisfied. In some examples, the set of one or more suggestion criteria includes a criterion that is satisfied when a determination is made that the first computer system is within a first predetermined distance of the third computer system and playback of third media at the third computer system was not initiated by a user of the first computer system enables the first computer system to automatically display controls for the second computer system while also displaying controls for a third computer system when the first computer system is near the third computer system but did not initiate playback and allows a user to control nearby devices that they did not previously initiate playback on, thereby providing additional control options without cluttering the user interface with additional displayed controls, performing an operation when a set of conditions has been met without requiring further user input, reducing the number of inputs needed to perform an operation, and providing improved visual feedback to the user.

In some examples, the set of one or more suggestion criteria includes a criterion that is satisfied when a determination is made that the first computer system (e.g., 600) is not a within a second predetermined distance (e.g., 1-10 meters) (e.g., a predetermined proximity, and/or a proximity configured to enable communication (e.g., via ultra-wide sensors, Bluetooth, and/or Wi-Fi)) (e.g., as described above in relation to method 1200) of the third computer system (e.g., 1180*a*1, 1180*a*2, 1180*b*1, 1180*b*2, 1180*c*1, and/or 1180*c*2) and playback of third media at the third computer system was initiated by a user (e.g., 1142) of the first computer system (e.g., as described above in relation to method 1200). Concurrently displaying, via the display generation component, the first control and the second control that, when selected, causes the computer system to control playback of second media of the third computer system while displaying, the user interface that includes the first control and in accordance with the determination that a set of one or more suggestion criteria associated with playback of second media at the third computer system has been satisfied. In some examples, the set of one or more suggestion criteria includes a criterion that is satisfied when a determination is made that the first computer system is not a within a second predetermined distance of the third computer system and playback of third media at the third computer system was initiated by a user of the first computer system enables the first computer system to automatically display controls for the second computer system while also displaying controls for a third computer system when the first computer system initiated playback and not being within the distance of the third computer system, allowing a user to control devices that are not nearby that they did previously initiate playback on, thereby providing additional control options without cluttering the user interface with additional displayed controls, performing an operation when a set of conditions has been met without requiring further user input, reducing the number of inputs needed to perform an operation, and providing improved visual feedback to the user.

In some examples, concurrently displaying, via the display generation component, the first control (e.g., 1104*b*, 1104*d*, 1104*c*, and/or 1104*g*) and the second control (e.g., 1104*e*, and/or 1104*f*), the first computer system detects a respective change; and In some examples, in response to detecting the respective change and in accordance with a determination that a second set of one or more suggestion criteria (e.g., computer system is moving between micro-location and/or a new computer system is detected in a micro-location) associated with playback of third media at a fourth computer system (e.g., 1180*a*1, 1180*a*2, 1180*b*1, 1180*b*2, 1180*c*1, and/or 1180*c*2) different from the first computer system (e.g., 600), the second computer system (e.g., 1180*a*1, 1180*a*2, 1180*b*1, 1180*b*2, 1180*c*1, and/or 1180*c*2), and the third computer system (e.g., 1180*a*1, 1180*a*2, 1180*b*1, 1180*b*2, 1180*c*1, and/or 1180*c*2): the first computer system displays, via the display generation control, a third control (e.g., 1104*b*, 1104*d*, 1104*c*, and/or 1104*g*) that, when selected (e.g., 1105*c*, 1105*d*2, 1105*f*, 1105*h*, and/or 1105*i*), causes the first computer system to control playback of the third media at the fourth computer system. In some examples, the first computer system ceases display of the second control. In some examples, concurrently displaying, via the display generation component, the first control (e.g., 1104*b*, 1104*d*, 1104*c*, and/or 1104*g*) and the second control (e.g., 1104*e*, and/or 1104*f*), the first computer system detects a respective change; and In some examples, in response to detecting the respective change and in accordance with a determination that a second set of one or more suggestion criteria (e.g., computer system is moving between micro-location and/or a new computer system is detected in a micro-location) associated with playback of third media at a fourth computer system (e.g., 1180*a*1, 1180*a*2, 1180*b*1, 1180*b*2, 1180*c*1, and/or 1180*c*2) different from the first computer system (e.g., 600), the second computer system (e.g., 1180*a*1, 1180*a*2, 1180*b*1, 1180*b*2, 1180*c*1, and/or 1180*c*2), and the third computer system (e.g., 1180*a*1, 1180*a*2, 1180*b*1, 1180*b*2, 1180*c*1, and/or 1180*c*2): ceasing display of the second control. In some examples, third media is different from first media and second media. In some examples, the criterion is a location criterion, and the criterion is satisfied when the location of the first computer system moves to a different location. In some examples, the computer system displays the third control at a location where the second control was previously displayed. Displaying a third control that, when selected, causes the computer system to control playback of the third media at the fourth computer system and ceasing display of the second control enables the first computer system to automatically display different controls for different computer systems as conditions change (e.g., the user moves to another location), thereby providing additional control options without cluttering the user interface with additional displayed controls, performing an operation when a set of conditions has been met without requiring further user input, reducing the number of inputs needed to perform an operation, and providing improved visual feedback to the user.

In some examples, while concurrently displaying the first control (e.g., 1104*b*, 1104*d*, 1104*c*, and/or 1104*g*) and the second control (e.g., 1104*e*, and/or 1104*f*), the first computer system detects one or more inputs (e.g., 1105*d*2, and/or 1105*h*) (e.g., a tap, a swipe input, and/or a touch input), and/or another input (e.g., a gaze input, an air input (e.g., a pointing input above a screen, and/or a hover action), and/or a mouse click (e.g., a single click, multiple clicks, and/or a click and drag)) that includes a respective input directed to the second control. In some examples, in response to detecting the one or more inputs that includes the respective input directed to the second control, the first computer system ceases to display the second control (e.g., while continuing display of the first control). Ceasing to display the second control in response to detecting the one or more inputs that includes the respective input directed to the second control enables the first computer system to cease to display the respective controls as directed, enabling a user to remove unwanted controls from the user interface, thereby providing improved visual feedback to the user, and providing additional control options without cluttering the user interface with additional displayed controls.

Note that details of the processes described above with respect to method 1300 (e.g., FIG. 13) are also applicable in an analogous manner to the methods described herein. For example, method 800 optionally includes one or more of the characteristics of the various methods described above with reference to method 1300. For example, one or more steps of method 800 can be used to automatically connect to an external device and while displaying controls for the external device using one or more steps of method 1300. For brevity, these details are not repeated below.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve connection of computer system to external devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to connect to external devices that are most relevant to the user. Accordingly, use of such personal information data enables users to have calculated control of which external device that connects to the computer system. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case connecting to external devices, the present technology can be configured to allow users to select to "opt in" or "opt out" of participation in the collection of personal information data during registration for services or anytime thereafter. In another example, users can select not to provide use related data corresponding to the computer system of the user and one or more external devices. In yet another example, users can select to limit the length of time use of computer system and/or external device data is maintained or entirely prohibit the development of a pattern of use. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, a computer system can automatically connect to an external device or be suggested to connect to an external device based on non-personal information data or a bare minimum amount of personal information, such as the content being requested by the device associated with a user, other non-personal information available to the device management services, or publicly available information.

What is claimed is:

1. A method, comprising:
at a first computer system:
    while the first computer system is at a location, detecting a use of a set of one or more applications, wherein the use corresponds to a pattern of use associated with the set of one or more applications and the location; and
in response to detecting the use of the set of one or more applications:
    in accordance with a determination that a first set of one or more use criteria is satisfied with respect to the use and the pattern of use, automatically causing output of content associated with the set of one or more applications via a second computer system different from the first computer system; and
    in accordance with a determination a second set of one or more use criteria, different from the first set of one or more use criteria, is satisfied with respect to the use and the pattern of use, automatically causing output of the content associated with the set of one or more applications via a third computer system different from the first computer system and the second computer system.

2. The method of claim 1, wherein the first set of one or more use criteria includes a criterion that is satisfied when a determination is made that the location is a first type of location, and wherein the first set of one or more use criteria does not include a criterion that is satisfied when a determination is made that the location is a second type of location that is different from the first type of location.

3. The method of claim 1, wherein the first set of one or more use criteria includes a criterion that is satisfied when a determination is made that the pattern of use of the set of one or more applications is above a respective threshold confidence level associated with the location.

4. The method of claim 1, wherein the first set of one or more use criteria includes a criterion that is satisfied when a determination is made that the set of one or more applications includes an application that was previously used at the location.

5. The method of claim 1, wherein the first set of one or more use criteria includes a criterion that is satisfied when a determination is made that at least one application in the set of one or more applications is operating in the foreground.

6. The method of claim 1, wherein the first set of one or more use criteria includes a criterion that is satisfied when a determination is made that the location is a location of interest.

7. The method of claim 1, wherein the first set of one or more use criteria includes a criterion that is satisfied when a determination is made that the first computer system is not in communication with one or more personal devices.

8. The method of claim 1, wherein the first set of one or more use criteria includes a criterion that is satisfied when a determination is made that the first computer system is not currently outputting media, and wherein the first set of one or more use criteria does not include a criterion that is satisfied when a determination is made that the first computer system is currently outputting media.

9. The method of claim 1, wherein the set of one or more applications include an application that corresponds to a first category of applications, and the pattern of use is a pattern of use that is associated with the first category of applications.

10. The method of claim 1, wherein detecting the use of the set of one or more applications includes detecting that a respective application in the set of one or more applications is operating in the foreground.

11. The method of claim 1, further comprising:

after automatically causing output of content associated with the set of one or more applications via the second computer system, detecting a set of one or more inputs; and in response to detecting the set of one or more inputs, causing output of content associated with the set of one or more applications via a fourth computer system that is different from the second computer system;

after causing output of content associated with the set of one or more applications via the fourth computer system, detecting a second use of one or more applications in the set of one or more applications at the location; and in response to detecting the second use of the one or more applications in the set of one or more applications:

in accordance with a determination that a predetermined period of time has not elapsed since content associated with the set of one or more applications was output via the fourth computer system, automatically causing output of the content associated with the set of one or more applications via the fourth computer system; and in accordance with a determination that the predetermined period of time has elapsed since content associated with the set of one or more applications was output via the fourth computer system, automatically causing output of the content associated with the set of one or more applications via the second computer system.

12. The method of claim 1, wherein the first computer system is in communication with a display generation component, the method further comprising:

in response to detecting the use of the set of one or more applications:

in accordance with the determination that the first set of one or more use criteria is satisfied with respect to the use and the pattern of use, displaying, via the display generation component, a first notification indicating that the second computer system is outputting the content associated with the set of one or more applications; and in accordance with a determination that the second set of one or more use criteria is satisfied with respect to the use and the pattern of use, displaying, via the display generation component, a second notification indicating that the third computer system is outputting the content associated with the set of one or more application.

13. The method of claim 12, wherein the first notification indicating that the second computer system is outputting the content associated with the set of one or more applications is displayed inside of a first area, the method further comprising:

after displaying the first notification indicating that the second computer system is outputting the content associated with the set of one or more applications in the first area, displaying, via the display generation component, a second notification indicating that the second computer system is outputting the content associated with the set of one or more applications inside of a second area that is different from the first area.

14. The method of claim 12, further comprising:

while displaying, via the display generation component, the second notification indicating that the second computer system is outputting the content associated with the set of one or more applications, detecting an input directed to the second notification indicating that the second computer system is outputting the content associated with the set of one or more applications; and in response to detecting the input directed to the second notification indicating that the second computer system is outputting the content associated with the set of one or more applications, displaying, via the display generation component, a plurality of connection controls, including:

a first connection control corresponding to a fifth computer system that is different from the first computer system, wherein, in response to detecting selection of the first connection control, the first computer system causes content to be output via the fifth computer system; and a second connection control corresponding to a sixth computer system that is different from the first computer system and the fifth computer system, wherein, in response to detecting selection of the second connection control, the first computer system causes content to be output via the sixth computer system.

15. The method of claim 12, further comprising:

while displaying, via the display generation component, the first notification indicating that the second computer system is outputting the content associated with the set of one or more applications, detecting an input directed to the first notification indicating that the second computer system is outputting the content associated with the set of one or more applications; and in response to detecting the input directed to the first notification indicating that the second computer system is outputting the content associated with the set of one or more applications, ceasing to cause output of the content associated with the set of one or more applications via the second computer system.

16. The method of claim 1, wherein the location is a first location, and wherein the method further comprises:

after causing output of the content via the second computer system or the third computer system and after the first computer system has moved from the first location to a second location that is different from the first location, detecting a third use of the set of one or more applications, wherein the third use corresponds a second pattern of use associated with the set of one or more applications and the second location; and in response to detecting the third use of the set of one or more applications, automatically causing output of the content associated with the set of one or more applications via a computer system that is different from the second computer system and the third computer system.

17. The method of claim 1, wherein the second computer system or the third computer system includes a display generation component.

18. The method of claim 1, wherein the second computer system or the third computer system includes an audio output component.

19. A non-transitory computer-readable storage medium storing one or more programs configured to be executed by one or more processors of a first computer system, the one or more programs including instructions for:

while the first computer system is at a location, detecting a use of a set of one or more applications, wherein the use corresponds to a pattern of use associated with the set of one or more applications and the location; and in response to detecting the use of the set of one or more applications:

in accordance with a determination that a first set of one or more use criteria is satisfied with respect to the use and the pattern of use, automatically causing output of content associated with the set of one or more applications via a second computer system different from the first computer system; and in accordance with a determination a second set of one or more use criteria, different from the first set of one or more use criteria, is satisfied with respect to the use and the pattern of use, automatically causing output of the content associated with the set of one or more applications via a third computer system different from the first computer system and the second computer system.

20. A first computer system, comprising:

one or more processors; and memory storing one or more programs configured to be executed by the one or more processors, the one or more programs including instructions for:

while the first computer system is at a location, detecting a use of a set of one or more applications, wherein the use corresponds to a pattern of use associated with the set of one or more applications and the location; and in response to detecting the use of the set of one or more applications:

in accordance with a determination that a first set of one or more use criteria is satisfied with respect to the use and the pattern of use, automatically causing output of content associated with the set of one or more applications via a second computer system different from the first computer system; and in accordance with a determination a second set of one or more use criteria, different from the first set of one or more use criteria, is satisfied with respect to the use and the pattern of use, automatically causing output of the content associated with the set of one or more applications via a third computer system different from the first computer system and the second computer system.

* * * * *